United States Patent
O'Neall et al.

(10) Patent No.: US 12,460,633 B2
(45) Date of Patent: Nov. 4, 2025

(54) AGRICULTURAL SAMPLING SYSTEM AND RELATED METHODS

(71) Applicant: Precision Planting LLC, Tremont, IL (US)

(72) Inventors: Matthew O'Neall, Ellsworth, IL (US); Reid Harman, Trivoli, IL (US)

(73) Assignee: Precision Planting LLC, Tremont, IL (US)

( * ) Notice: Subject to any disclaimer, the term of this patent is extended or adjusted under 35 U.S.C. 154(b) by 510 days.

(21) Appl. No.: 17/995,215

(22) PCT Filed: Apr. 7, 2021

(86) PCT No.: PCT/IB2021/052876
§ 371 (c)(1),
(2) Date: Sep. 30, 2022

(87) PCT Pub. No.: WO2021/220085
PCT Pub. Date: Nov. 4, 2021

(65) Prior Publication Data
US 2023/0151810 A1 May 18, 2023

Related U.S. Application Data

(60) Provisional application No. 63/017,789, filed on Apr. 30, 2020, provisional application No. 63/017,840, (Continued)

(51) Int. Cl.
*G01N 1/40* (2006.01)
*F04B 43/00* (2006.01)
(Continued)

(52) U.S. Cl.
CPC .......... *F04B 53/22* (2013.01); *F04B 43/0054* (2013.01); *F04B 43/023* (2013.01);
(Continued)

(58) Field of Classification Search
USPC ............................. 73/864.31, 864.41, 864.43
See application file for complete search history.

(56) References Cited

U.S. PATENT DOCUMENTS

| 3,625,296 A | 12/1971 | Mabry |  |
|---|---|---|---|
| 4,304,139 A * | 12/1981 | Johnson | G01N 1/04 73/864.32 |

(Continued)

FOREIGN PATENT DOCUMENTS

| CN | 109085013 A | 12/2018 |
| DE | 2936145 B1 | 10/1980 |

(Continued)

OTHER PUBLICATIONS

UK Intellectual Property Office, Search report for related UK Application No. GB2007210.4, dated Oct. 29, 2020.
(Continued)

*Primary Examiner* — Daniel S Larkin

(57) ABSTRACT

An automated computer-controlled sampling system and related methods for collecting, processing, and analyzing agricultural samples for various chemical properties such as plant available nutrients. The sampling system allows multiple samples to be processed and analyzed for different analytes or chemical properties in a simultaneous concurrent or semi-concurrent manner. Advantageously, the system can process soil samples in the "as collected" condition without drying or grinding. The system generally includes a sample preparation sub-system which receives soil samples collected by a probe collection sub-system and produces a slurry (i.e. mixture of soil, vegetation, and/or manure and water), and a chemical analysis sub-system which processes the prepared slurry samples for quantifying multiple analytes and/or chemical properties of the sample. The sample preparation and chemical analysis sub-systems can be used to analyze soil, vegetation, and/or manure samples. A soil
(Continued)

collection system is disclosed which captures and directs samples to the sampling system for processing.

36 Claims, 85 Drawing Sheets

Related U.S. Application Data filed on Apr. 30, 2020, provisional application No. 63/018,153, filed on Apr. 30, 2020, provisional application No. 63/018,120, filed on Apr. 30, 2020.

(51) Int. Cl.
| | |
|---|---|
| *F04B 43/02* | (2006.01) |
| *F04B 43/04* | (2006.01) |
| *F04B 43/06* | (2006.01) |
| *F04B 53/22* | (2006.01) |
| *G01N 1/38* | (2006.01) |
| *G01N 33/24* | (2006.01) |

(52) U.S. Cl.
CPC ............ *F04B 43/043* (2013.01); *F04B 43/06* (2013.01); *G01N 1/38* (2013.01); *G01N 1/4077* (2013.01); *G01N 33/24* (2013.01); *G01N 33/245* (2024.05)

(56) References Cited

U.S. PATENT DOCUMENTS

| | | | |
|---|---|---|---|
| 4,356,734 A * | 11/1982 | Ivancsics | G01N 1/04 |
| | | | 172/438 |
| 9,116,078 B1 | 8/2015 | Scheiderer | |
| 11,477,937 B2 * | 10/2022 | Hodel | A01C 5/064 |
| 2005/0172733 A1 * | 8/2005 | Drummond | A01B 79/005 |
| | | | 73/864.41 |
| 2014/0251032 A1 | 9/2014 | Scheiderer et al. | |
| 2018/0124992 A1 * | 5/2018 | Koch | G01N 33/24 |
| 2020/0100418 A1 * | 4/2020 | Kornecki | A01B 33/082 |

FOREIGN PATENT DOCUMENTS

| | | | | |
|---|---|---|---|---|
| DE | 2931049 A1 | | 2/1981 | |
| KR | 101106075 B1 * | | 1/2012 | ............... A01B 3/28 |

OTHER PUBLICATIONS

European Patent Office, International Search Report related to International Patent Application No. PCT/IB2021/052876, mail date Jul. 2, 2021.

* cited by examiner

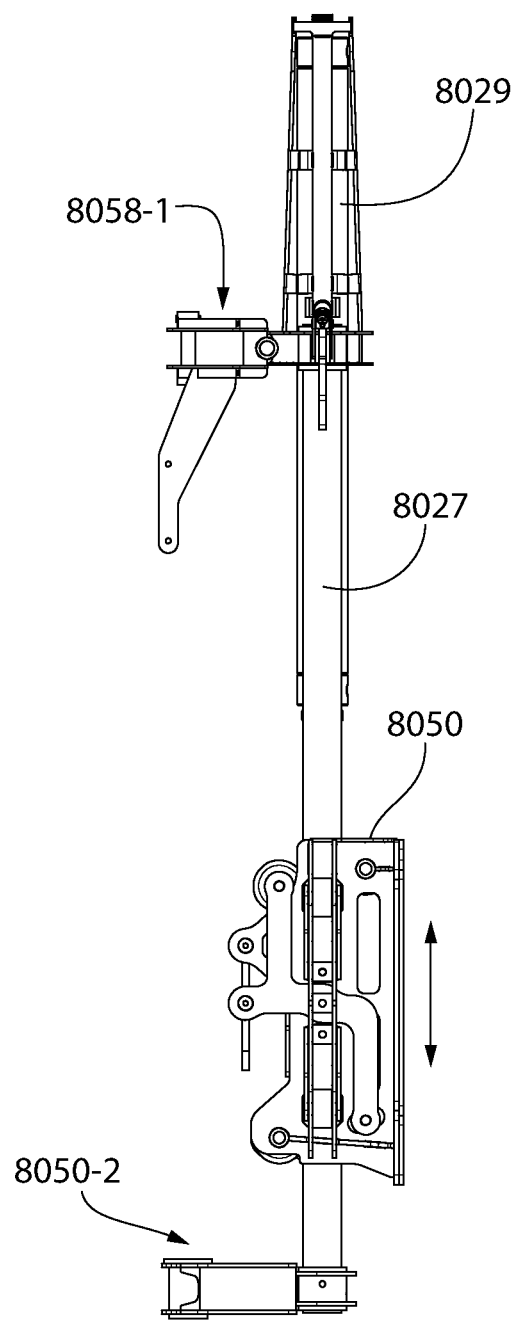
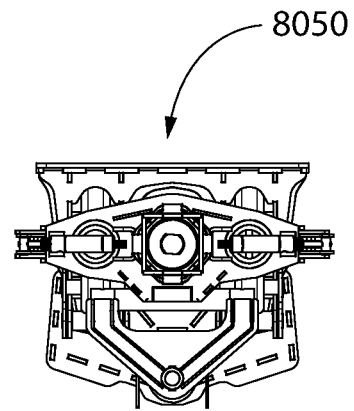
FIG. 75
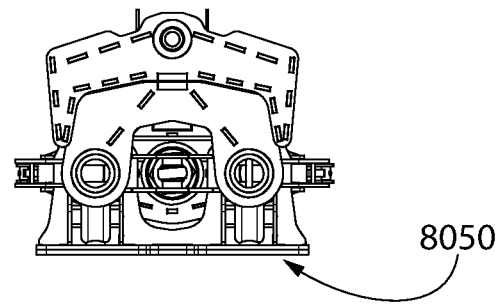
FIG. 76
FIG. 74

AGRICULTURAL SAMPLING SYSTEM AND RELATED METHODS

CROSS REFERENCE TO RELATED APPLICATIONS

This application is a national phase entry under 35 U.S.C. § 371 of International Patent Application PCT/IB2021/052876, filed Apr. 7, 2021, designating the United States of America and published in English as International Patent Publication WO 2021/220085 A1 on Nov. 4, 2021, which claims priority to U.S. Provisional Application Nos. 63/017,789, filed 30 Apr. 2020; 63/018,120, filed Apr. 30, 2020; 63/018,153, filed 30 Apr. 2020; and 63/017,840, all of which are incorporated herein by reference in their entireties.

BACKGROUND

The present disclosure relates generally to agricultural sampling and analysis, and more particularly to a fully automated system for performing soil and other types of agricultural related sampling and chemical property analysis.

Periodic soil testing is an important aspect of the agricultural arts. Test results provide valuable information on the chemical makeup of the soil such as plant-available nutrients and other important properties (e.g. levels of nitrogen, magnesium, phosphorous, potassium, pH, etc.) so that various amendments may be added to the soil to maximize the quality and quantity of crop production.

In some existing soil sampling processes, collected samples are dried, ground, water is added, and then filtered to obtain a soil slurry suitable for analysis. Extractant is added to the slurry to pull out plant available nutrients. The slurry is then filtered to produce a clear solution or supernatant which is mixed with a chemical reagent for further analysis.

Improvements in testing soil, vegetation, and manure are desired.

BRIEF SUMMARY

The present disclosure provides an automated computer-controlled sampling system and related methods for collecting, processing, and analyzing soil samples for various chemical properties such as plant available nutrients (hereafter referred to as a "soil sampling system"). The sampling system allows multiple samples to be processed and analyzed for different analytes (e.g. plant-available nutrients) and/or chemical properties (e.g. pH) in a simultaneous concurrent or semi-concurrent manner, and in relatively continuous and rapid succession. Advantageously, the system can process soil samples in the "as collected" condition without the drying and grinding steps previously described.

The present system generally includes a sample preparation sub-system which receives soil samples collected by a probe collection sub-system and produces a slurry (i.e. mixture of soil, vegetation, and/or manure and water) for further processing and chemical analysis, and a chemical analysis sub-system which receives and processes the prepared slurry samples from the sample preparation sub-system for quantification of the analytes and/or chemical properties of the sample. The described chemical analysis sub-system can be used to analyze soil, vegetation, and/or manure samples.

In one embodiment, the sample preparation system generally includes a mixer-filter apparatus which mixes the collected raw soil sample in the "as sampled" condition (e.g. undried and unground) with water to form a sample slurry. The mixer-filter apparatus then filters the slurry during its extraction from the apparatus for processing in the chemical analysis sub-system. The chemical analysis sub-system processes the slurry and performs the general functions of extractant and color-changing reagent addition/mixing, centrifugating the slurry sample to yield a clear supernatant, and finally sensing or analysis for detection of the analytes and/or chemical properties such as via colorimetric analysis.

Although the sampling systems (e.g. sample collection, preparation, and processing) may be described herein with respect to processing soil samples which represents one category of use for the disclosed embodiments, it is to be understood that the same systems including the apparatuses and related processes may further be used for processing other types of agricultural related samples including without limitation vegetation/plant, forage, manure, feed, milk, or other types of samples. The disclosure herein should therefore be considered broadly as an agricultural sampling system. Accordingly, the present disclosure is expressly not limited to use with processing and analyzing soil samples alone for chemical properties of interest.

BRIEF DESCRIPTION OF THE DRAWINGS

The present disclosure will become more fully understood from the detailed description and the accompanying drawings, wherein like elements are labeled similarly and in which:

FIG. 74 is right side view thereof;

FIG. 75 is a top view thereof;

FIG. 76 is a bottom view thereof;

Figure 1A:
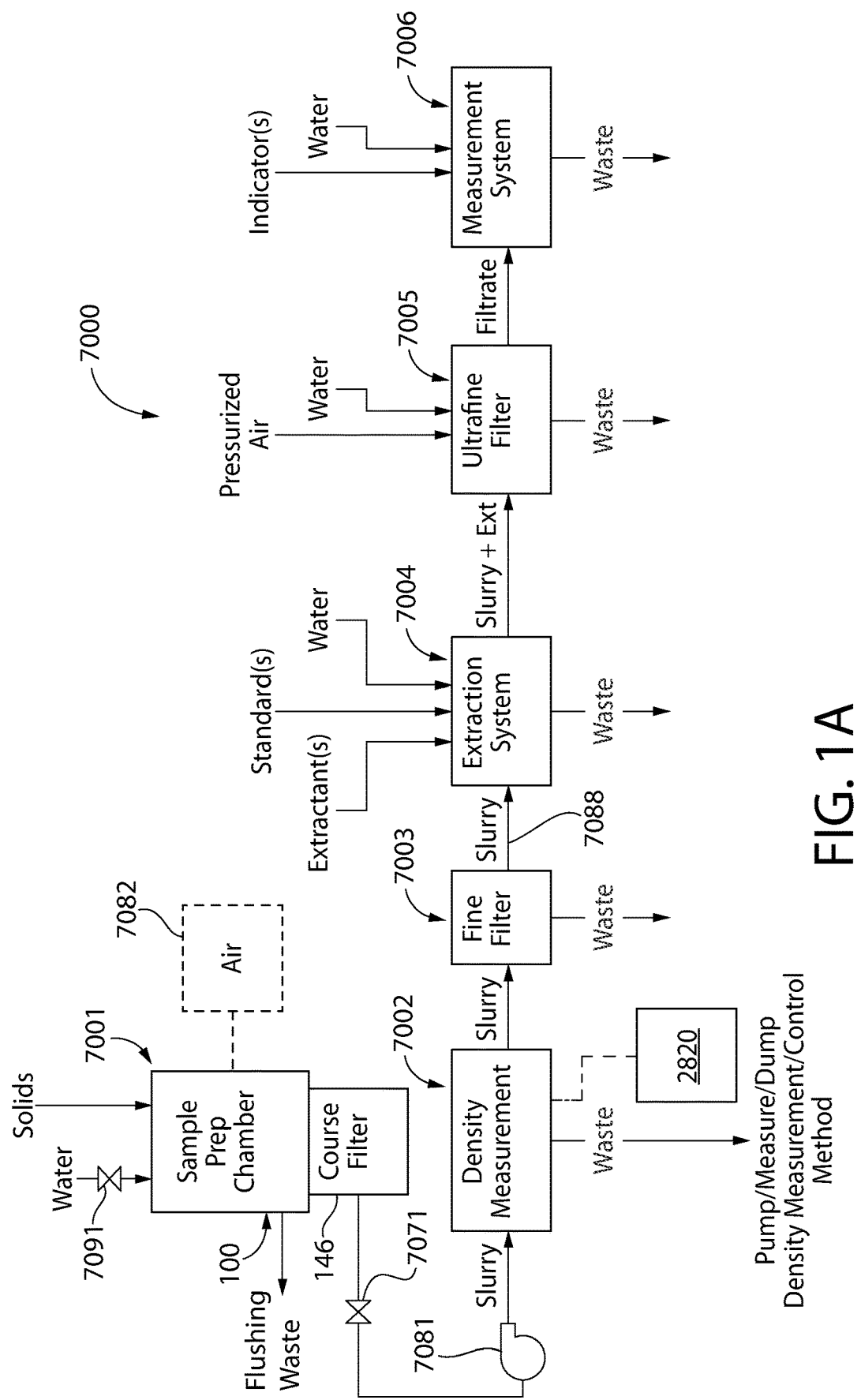
FIG. 1A is a basic schematic diagram of a first embodiment of an agricultural sample analysis system.

All drawings are not necessarily to scale. Components numbered and appearing in one figure but appearing un-numbered in other figures are the same unless expressly noted otherwise. A reference herein to a whole figure number which appears in multiple figures bearing the same whole number but with different alphabetical suffixes shall be constructed as a general refer to all of those figures unless expressly noted otherwise.

Any reference to a drawing number preceded by "P-" is a reference to the same drawing number in WO2020/012369.

DETAILED DESCRIPTION

The features and benefits of the present disclosure are illustrated and described herein by reference to exemplary ("example") embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features.

In the description of embodiments disclosed herein, any reference to direction or orientation is merely intended for convenience of description and is not intended in any way to limit the scope of the present disclosure. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

As used throughout, any ranges disclosed herein are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

The following applications are incorporated herein by reference in their entireties: International Application No. PCT/IB2019/055862 filed Jul. 10, 2019, which claims the benefit of priority to U.S. Provisional Patent Application No. 62/696,271 filed Jul. 10, 2018, U.S. Provisional Patent Application No. 62/729,623 filed Sep. 11, 2018, U.S. Provisional Patent Application No. 62/745,606 filed Oct. 15, 2018, U.S. Provisional Patent Application No. 62/792,987 filed Jan. 15, 2019, U.S. Provisional Patent Application No. 62/829,807 filed Apr. 5, 2019, U.S. Provisional Patent Application No. 62/860,297 filed Jun. 12, 2019.

Chemical can be a solvent, an extractant, and/or a reagent. Solvent can be any fluid to make a slurry as described herein. In a preferred embodiment, the solvent is water because it is readily available, but any other solvent can be used. Solvent can be used as both a solvent and an extractant. Gas can be any gas. In a preferred embodiment, the gas is air because it is readily available, but any gas can be used.

Test material refers to supernatant, filtrate, or a combination of supernatant and filtrate. When used in this description in the specific form (supernatant or filtrate), the other forms of test material can also be used.

Fluid conveyor can be a pump, a pressure difference, or a combination of a pump and pressure difference.

Microfluidic Slurry Processing System Modifications

FIGS. 31-37 depict a modification of the pneumatically-actuated diaphragm micropump 5760 such as shown in FIGS. P-256 to P-258 previously described herein. This micropump 5760 is an integral device of the analysis processing wedges 4002 of a microfluidic processing disk. Micropump 5760 may be used for an extractant pump, a slurry pump, a reagent pump, a transfer pump, or other pumps that may be required by the microfluidic agricultural sample slurry processing and analysis system. These micropumps are incorporated into the microchannel network of the microfluidic device, which may be a processing wedge 4002 of microfluidic processing disk. The micropumps apply the motive force to the fluid to drive it through the microchannel network and various flow-related features of the disk. It bears noting that in some other implementations, the micropumps may be embodied in a microfluidic manifold of any suitable polygonal or non-polygonal configuration rather than a processing wedge. Accordingly, the microfluidic devices including the micropumps are expressly not limited to wedge-shaped devices, which may be part of a microfluidic processing disk. The term "microfluidic device" should therefore be broadly construed; the processing wedge being used only as one non-limiting example of a microfluidic device for convenience of reference.

According to another aspect of the disclosure, a diaphragm restraint feature for forming the diaphragm-operated micropumps 5760 may be provided which prevents spreading of the flexible diaphragm 5763 material when the adjoining upper and lower layers 5761, 5762 of the multi-layered microfluidic processing disk that define the pressure-retention boundaries of micropump are compressed and joined together. This prevents the peripheral edges of the diaphragm from migrating outwards beyond the outer confines of the recess formed by the lower pump chamber 5765 in the lower layer 5762, which might prevent a proper leak-resistant seal from being formed around the diaphragm and lower pump chamber necessary for pneumatically pressuring the micropump during operation.

FIGS. 31-37 illustrate one non-limiting embodiment of a diaphragm restraint feature for micropump 7510. Micropump 7510 in one embodiment may therefore include a plurality of spaced apart and inwardly protruding restraining tabs 7500 (further described below) positioned around the perimeter of the upper chamber 5764 of the micropump. A perimetrically extending sealing channel 7505 is recessed into the upper layer 5761 (e.g. a first layer) around the perimeter of the upper pump chamber 5764. The lower layer 5762 previously described herein (see, e.g. FIGS. P-256 to P-258) may be considered the second layer which is interfaced with the first or upper layer. The channel 7505 is separated from the main central recess 7506 of the upper pump chamber 5764 by a raised protruding annular lip 7502 arranged at the inner edge of the sealing channel 7505. Lip 7502 supports the peripheral portion of diaphragm 5763 when positioned on the upper layer 5761 until the layers are compressed and assembled together. The main central recess 7506 defines the flat top surface 5764-2 of the upper pump chamber 5764 as previously described herein (see, also FIGS. P-257 to P-258). Preferably, but not necessarily the restraining tabs 7500 are disposed on the microfluidic device layer have the flat chamber such as upper layer 5761. FIGS. 31-37 show the upper layer 5761 on bottom as the microfluidic device or disk in the assembling position to keep the diaphragm centered between the tabs 7500 until upper and lower layers are attached to each other. This is opposite to the positions of the microfluidic processing disk upper and lower layers shown in FIGS. P-257 to P-258 which is not necessarily an assembling position.

The present micropump 7510 operates to pump fluid in the same manner previously described herein for micropump 5760. It also bears noting that although not shown in FIGS. 31-37, the lower pump chamber 5765 opposite the reconfigured upper pump chamber 5764 which is shown may optionally incorporate the anti-stall grooves 5769 already described elsewhere herein and shown in FIGS. P-256 to P-258.

The restraining tabs 7500 protrude radially inwards from the upper layer 5761 of the micropump 7510 in the microfluidic processing disk into the upper pump chamber 5764 and sealing channel 7505 as shown. Tabs 7500 may have any suitable polygonal or non-polygonal shape, or a combination thereof. In one non-limiting embodiment as illustrated, tabs 7500 may each have a flat inner surface formed between a pair of arcuately curved side surfaces connected to the upper layer 5761 (best shown in FIG. 35). The tabs may be integrally formed as a unitary structural part of the upper layer 5761; the layers of the microfluidic processing disk 310 being formed of a preferably clear polymeric material adhered together as previously described herein. Sealing channel 7505 comprises an upwardly open recess for receiving the diaphragm material at least partially therein when the diaphragm is compressed between the upper and lower layers 5761, 5762 as the multiple layers of the analysis processing wedges 312 of the microfluidic processing disk 310 are assembled. This forms a leak-resistant seal around the diaphragm and micropump 7510.

Figure 35:
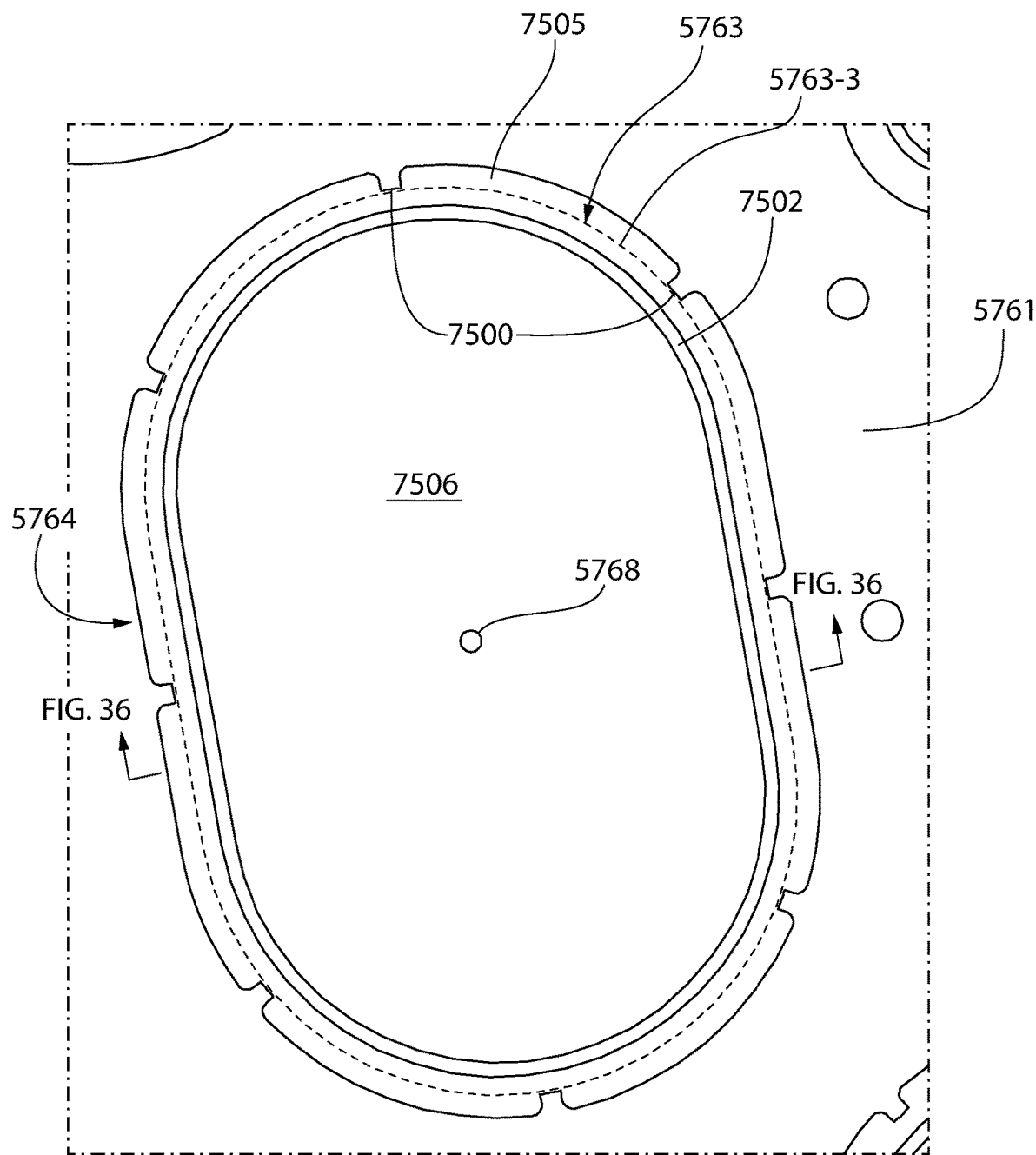
FIG. 35 is an enlarged view taken of the micropump taken from FIG. 34.
Figure 36:
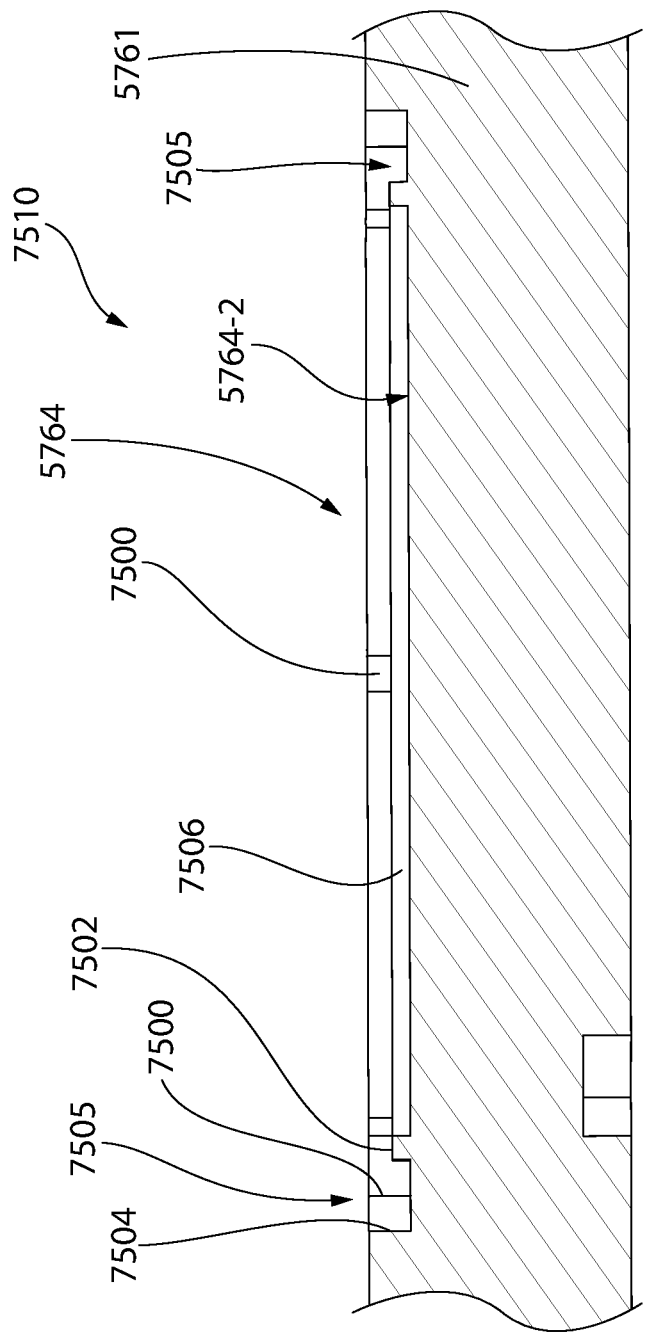
FIG. 36 is a transverse cross-sectional view thereof taken from FIG. 35.
Figure 37:
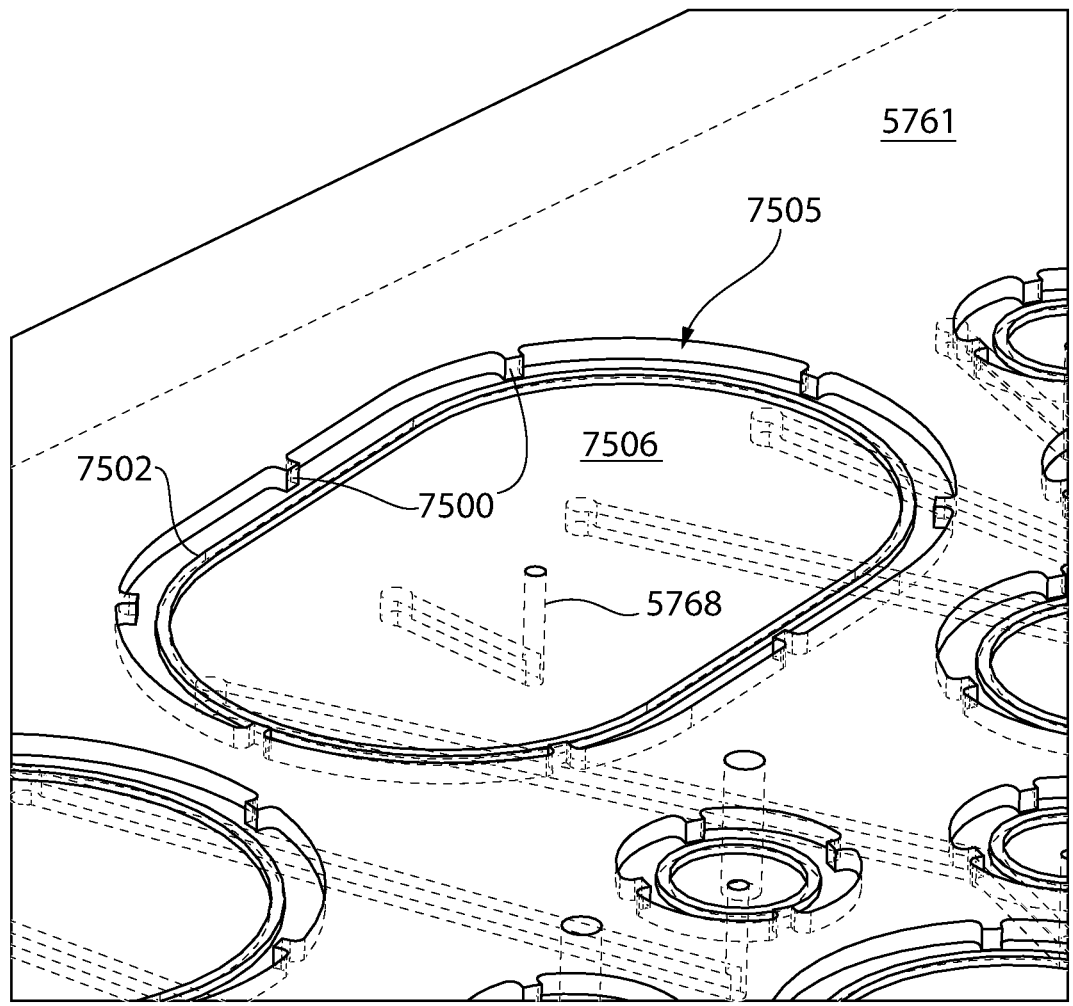
FIG. 37 is a top perspective view of the lower chamber of the micropump of FIG. 35.

FIG. 35 shows the diaphragm 5763 (shown in dashed lines) positioned in the upper pump chamber 5764 of the micropump 7510 and ready for assembly between the adjoining upper and lower layers 5761, 5762 of the microfluidic processing disk. The peripheral edges 5763-3 of diaphragm 5763 are shown lightly contacting and engaging the inner edges or surfaces of the inwardly protruding restraining tabs 7500 to properly locate the diaphragm. When the disk upper and lower layers are compressed together with the diaphragm therebetween, the deformable diaphragm will flatten out and try to grow radially outwards in all direction, but its growth is restrained by restraining tabs 7500. This prevents outward migration of diaphragm 5763 beyond sealing channel 7505 which can adversely affect the sealing to ensure that a proper leak-resistant seal is formed around the micropump 7510.

A process or method for assembling a micropump for a microfluidic device may be summarized as generally comprising: providing a first layer including a first pump chamber; positioning a resiliently deformable diaphragm on the first layer above the first pump chamber; positioning a second layer on the first layer and diaphragm; compressing the diaphragm between the first and second layers which causes the diaphragm to grow radially outwards; and engaging peripheral edges of the diaphragm with a plurality of restraining tabs arranged around the first pump chamber to restrain the outward growth of the diaphragm.

In one embodiment, a microfluidic pump for a microfluidic device may be considered to generally comprise a first layer, a second layer adjacent the first layer, a resiliently flexible diaphragm arranged at an interface between the first and second layers, the diaphragm having a peripheral edge extending perimetrically around the diaphragm, a first pump chamber formed on a first side of the diaphragm and a second pump chamber formed on a second side of the diaphragm, and a plurality of restraining tabs protruding radially inwards from the first layer into the first pump chamber. The restraining tabs abuttingly engage the peripheral edge of diaphragm to restrain the diaphragm.

Analysis Flow Cell Angled Flow Path

According to another aspect of the flow analysis cells 4150, 3800, or 337, the central flowpath and internal flow conduit extending through the portion or zone of the cells where the analyte measurement is obtained (e.g. flow cell window 4157, FIG. P-129) preferably is oriented at an angle to a horizontal reference plane Hp which can be imagined as passing through and including elongated the geometric center of the flow cell window 4157 in the referenced figure. In FIG. P-129, the flow cell window 4157 is oriented horizontally and parallel to the horizontal reference plane Hp. However, an angled orientation of the flow cell window is advantageous because any bubbles within the sample fluid (e.g. supernatant) will interfere with and disrupt the measurement reading. When the fluid flowpath of the measurement portion of the flow cell is vertical or mostly vertical, however, any air bubbles carrying over from upstream flow components (e.g. pumps, micropumps, mixing chambers, etc.) will float to the top due to their buoyancy. This carries the air bubbles through and out of the optical measurement path of the flow cell which do not become lodged or accumulate in close proximity to the measurement light path in the flow cell window 4157 (see, e.g. FIG. P-129). Fluid velocity complemented by bubble buoyancy keep bubbles in suspension and moving along the flow path until they rise out of the optical measurement zone. Without this combination, bubbles have a tendency to stick to flow path walls and surface tension makes it difficult to clear them.

Accordingly, the flow cell windows (e.g. flow cell window 4157) for measuring the analyte of any of the embodiments of flow cells disclosed herein in various embodiments may be oriented between 0 and 90 degrees to the horizontal reference plane Hp, preferably at least 30 degrees to the horizontal reference plane. In some embodiments, the flow cell analysis window may be oriented vertically or 90 degrees to the horizontal reference plane. This may be achieved in some embodiments by orienting the entire flow analysis cells or component in which the flow cell is located at an angle to the horizontal reference plane so that the measurement flow cell window is concomitantly oriented at an angle to the horizontal reference plane. This can be illustrated with reference to FIG. P-129 as an example. Flow analysis cell 4150 would be oriented at an angle so that the central flow cell window 4157 through which the colorimetric measurement light passes achieves the foregoing preferred angular orientation to horizontal reference plane Hp. In the case of the flow analysis cell 337 integrally formed within the layers of analysis processing wedges 312 of microfluidic processing disk 310 (see e.g. FIG. P-263), the entire wedge or disk is orientated angularly to the horizontal reference plane to position the analysis flow cell window angularly to the horizontal reference plane.

In addition to having the fluid flow path of the measurement portion of the flow analysis cell (i.e. flow cell window) similarly angularly oriented to the horizontal reference plane Hp such as nearly vertical in some embodiments, it is advantageous to also have whichever fluid chamber is immediately upstream of the flow cell similarly angled or vertical. This upstream fluid chamber can be a diaphragm pump, holding chamber, fluid passage, or any other chamber that allows gravity and buoyancy to separate bubbles from the flow path as fluid is drawn from preferably a lower portion of the chamber. This minimizes or prevents air bubbles from reaching the flow analysis cell devices in the first instance. This may be achieved by specifically orienting the upstream chamber preferably at least 30 degrees to the horizontal reference plane and about vertically (i.e. 90 degrees thereto) in some embodiments. In some embodiments, an air removal device such as without limitation a commercially-available bubble trap may be used upstream of the non-microfluidic processing disk flow analysis cells 4150 or 3800 disclosed herein either instead of or in addition to angularly orienting the flow cell windows of these analysis cells.

Figure 1B:
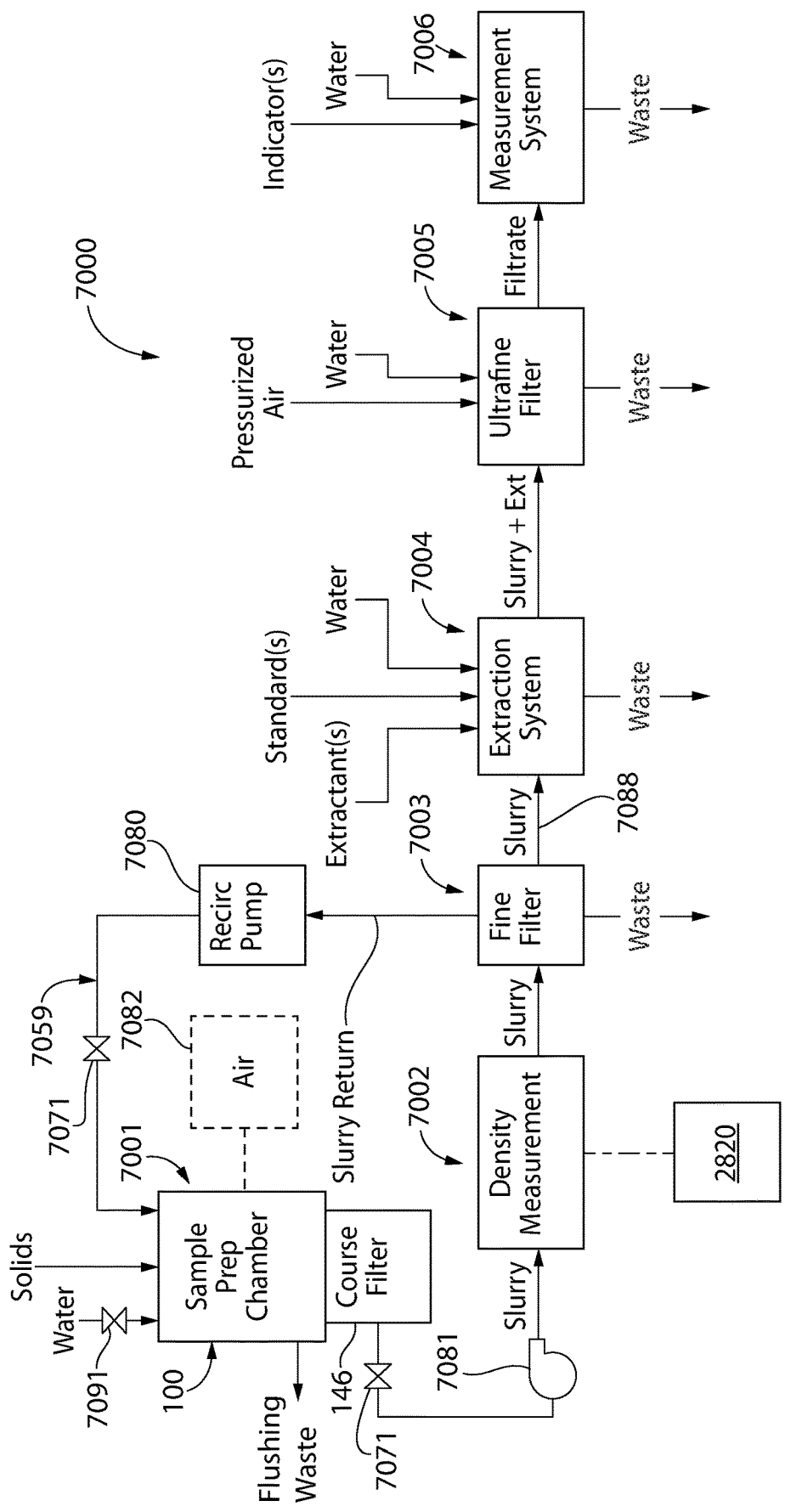
FIG. 1B is a basic schematic diagram of a second embodiment of an agricultural sample analysis system including closed flow loop slurry recirculation.

The sections which follow describe various modifications to the foregoing agricultural sample analysis systems and associated devices previously described herein which process and analyze/measure the prepared agricultural sample slurry for analytes of interest (e.g. soil nutrients such as nitrogen, phosphorous, potassium, etc., vegetation, manure, etc.). Specifically, the modifications relate to sample preparation sub-system 3002 and chemical analysis sub-system 3003 portions of soil sampling system 3000 shown in FIG. P-1. To provide broad context for discussion of the alternative devices and equipment which follows, FIG. 1A is a high-level schematic system diagram summarizing the agricultural sample analysis system process flow sequence. This embodiment illustrates static slurry batch mode density measurement as further described herein. FIG. 1B is the same, but includes a slurry recirculation loop between the fine filtration station and sample preparation mixing chamber for dynamic continuous mode slurry density measurement.

Referring now to FIGS. 1A and 1B, agricultural sample analysis systems 7000 includes in flow path sequence soil sample preparation sub-system 7001, density measurement sub-system 7002, fine filtration sub-system 7003, analyte extraction sub-system 7004, ultrafine filtration sub-system 7005, and measurement sub-system 7006. Soil sample preparation sub-system 7001 represents the portion of the system where sample slurry is initially prepared. Accordingly, sub-system 7001 may comprise a mixer-filter apparatus 100 which includes a mixing chamber (e.g. mixing chamber 102) where water is added to the bulk soil sample to prepare the slurry, and a coarse filter (e.g. filter 146) which removes larger particles (e.g. small stone, rocks, debris, etc.) from the prepared soil slurry. In addition, the coarse filter is sized to pass the desired maximum particle size in the slurry to ensure uniform flow and density of the slurry for weight/density measurement used in the process, as further described herein. The prepared slurry may be transferred from the mixer-filter apparatus to the density measurement sub-system 7002 via pumping by slurry pump 7081, or alternatively via pressurizing the mixer-filter apparatus chamber 102/207a with pressurized air provided by a fluid coupling to a pressurized air source 7082 (shown in dashed lines in FIG. 1A).

The analyte extraction sub-system 7004 and measurement sub-system 7006 may comprise the soil sampling system sub-system 3000 shown in FIGS. P-1, P-79 to P-94, and P-261 and previously described herein, or the microfluidic processing disk 310 arranged in the carousel assembly with analysis processing wedges 312 shown in FIGS. P-96 to P-121 and previously described herein. The ultrafine filtration sub-system 7005 may comprise ultrafine filter 5757 shown in FIGS. P-261 to P-262 (associated with soil sampling system 3000) or FIG. P-263 (associated with microfluidic processing disk 310). These systems and associated devices have been already described in detail and will not be repeated here for the sake of brevity.

It bears noting that the order of the devices and equipment shown in FIGS. 1A-B (e.g. pump(s), valves, etc.) can be switched and relocated in the systems without affecting the function of the unit. Moreover, additional devices and equipment such as valving, pumps, other flow devices, sensors (e.g. pressure, temperature, etc.) may be added control fluid/slurry flow and transmit additional operating information to the system controller which may control operation of the systems shown. Accordingly, the systems are not limited to the configuration and devices/equipment shown alone.

Digital Slurry Density Measurement Devices

Density measurement sub-system 7002 comprises a digital slurry density measurement device 7010 for obtaining the density of the mixed agricultural sample slurry prepared in sample preparation chamber (e.g. mixer-filter apparatus 100) of FIGS. 1A-B. In one implementation, density measurement device 7010 may be a digital density meter of the U-tube oscillator type shown in FIGS. 2-16 used to measure density of the sample slurry, which may be a soil slurry in one non-limiting example which will be used hereafter for convenience in describing one possible use recognizing that other type of agricultural samples may be processed such as plant waste, manure, etc. as previously described herein. It should be recognized that any type of agricultural sample slurry however may be processed in the same system including soil, vegetation, manure, or other. The density of the slurry is used to determine the amount of diluent required (e.g. water) to be added to the soil sample in order to achieve the desired water to soil ratio for chemical analysis of an analyte, as further described herein. The U-shaped oscillator tube 7011 is excited via a frequency transmitter or driver 7012 to oscillate the tube at its characteristic natural frequency. In various embodiments, the driver 7012 may be an electromagnetic inductor, a piezoelectric actuator/element, or a mechanical pulse generator all of which are operable to generate a user-controllable and preprogrammed excitation frequency. A corresponding sensor such as a receiver or pickup 7013 is provided which is configured to detect and obtain a vibrational measurement of the oscillator tube when excited. The pickup may be electromagnetic, inductance, piezoelectric receiver/element, optical, or other commercially available sensor capable of detecting and measuring the vibrational frequency response of the oscillator tube 7011 when excited. The pulsing or vibrational response movement of the excited oscillator tube 7011 is detected pickup 7013 which measures the amplitude of the frequency response of the tube, which is highest at a natural/resonance or secondary harmonic frequency when the tube is empty. Alternatively, the phase difference between the driving and driven frequencies may be used to narrow into the natural frequency.

In operation, the vibrational frequency of oscillator tube 7011 when excited changes relative to the density of the slurry either stagnantly filled in the oscillator tube for batch mode density measurement in one embodiment, or flowing through the U-tube at a preferably continuous and constant flow rate for continuous density measurement in another embodiment. The digital density measurement device converts the measured oscillation frequency into a density measurement via a digital controller which is programmed to compare the baseline natural frequency of the empty tube to the slurry filled tube.

The frequency driver and pickup 7012, 7013 are operably and communicably coupled to an electronic control circuit comprising a microprocessor-based density meter processor or controller 7016-2 mounted to a circuit control board 7016 supported from base 7014. Controller 7016-2 is configured to deliver a pulsed excitation frequency to the oscillator tube 7011 via the driver 7012, and measure the resultant change in the resonant frequency and phase of the excited oscillator tube. The digital density measurement device 7010 converts the measured oscillation frequency into a density measurement via the controller which is preprogrammed and configured with operating software or instructions to perform the measurement and density determination. The controller 7016-2 may be provided and configured with all of the usual ancillary devices and appurtenances similar to any of the controllers already previously described herein and necessary to provide a fully functional programmable electronic controller. Accordingly, these details of the density meter controller 7016-2 will not be described in further detail for the sake of brevity.

FIGS. 2-11 show a density measurement device 7010 having an oscillator tube according to a first embodiment. Density measurement device 7010 further includes a base 7014, a plurality of spacers 7015, a tube mounting block 7017, a flow connection manifold 7018, at least one or a pair of permanent magnets 7025, an electronic circuit control board 7016 and an electrical-communication interface unit 7016-1 configured for both electrical power supply for the board and communication interface to system controller 2820. Base 7014 is configured for mounting the density measurement device on a flat horizontal support surface, vertical support surface, or support surface disposed at any angle therebetween. Accordingly, any suitable corresponding mounting orientation of the base may be used as desired. The mounting orientation of the base may be determined by the intended direction of oscillation of the oscillator tube 7011 taking into account the force of gravity on the slurry laden oscillator tube. It is generally advantageous to mount all slurry passages in the oscillator tube in a manner that achieves the highest percent of horizontal passages as possible, so that any settling of particulate occurs perpendicular to the flow passage rather than inline with it. Base 7019 may substantially planar and rectangular in shape in one embodiment as shown; however, other polygonal and non-polygonal shaped bases may be used. The base may optionally include a plurality of mounting holes 7019 to facilitate mounting the base to the support surface with a variety of fasteners (not shown). Base 7019 defines a longitudinal centerline CA of the density measurement device 7010 which is aligned with the length of the oscillator tube 7011 (parallel to the tube's parallel legs as shown). In other words, the length of the oscillator tube extends along the centerline CA. In one embodiment, centerline CA and the flow passages within oscillator tube 7011 may be horizontal as shown so that any settling that occurs is perpendicular to the flow through the passage rather than in-line with the flow. In other embodiments, at least a majority of the flow passages inside the oscillator tube may be horizontal in orientation.

Spacers 7015 may be elongated in structure and space the control board 7016 apart from the base 7014 so that the oscillator tube 7011 may occupy the space 7015-1 created therebetween. Any suitable number of spacers may be used for this purpose. The space is preferably large enough to provide clearance for accommodating the motion of the oscillator tube 7011 and other appurtenances such as the frequency driver and pickup 7012, 7013. The planar control board 7016 may preferably be oriented parallel to the base 7014 as shown.

The frequency driver 7012 and pickup 7013 may be rigidly mounted to circuit board 7016 in one embodiment as variously shown in FIGS. 2-11. In other possible embodiments as shown in FIGS. 12-15, the driver and pickup may be rigidly mounted to separate vertical supports 7031 attached to base 7014. In each case, the driver and pickup are mounting adjacent and proximate to permanent magnets 7025, but do not contact the permanent magnets. Permanent magnets 7025 generate a static magnetic field (lines of magnetic flux) which interacts with the driver 7012 and pickup 7013 for exciting the oscillator tube 7011 and measuring its vibrational frequency when excited.

Tube mounting block 7017 is configured for rigidly mounting oscillator tube 7011 thereto in a cantilevered manner. Oscillator tube 7011 may be a straight U-tube configuration in one embodiment as shown in which all portions lie in the same horizontal plane. The straight inlet end portion 7011-1 and straight outlet end portion 7011-2 of oscillator tube 7011 are mounted to and rigidly supported by the block 7017 (see, e.g. FIG. 11) to allow the tube to oscillate analogously to a tuning fork when electronically/electromagnetically excited. The mounting block 7017 includes a pair of through bores 7017-1 which receive the end portions 7011-1, 7011-2 of the oscillator tube complete therethrough. Bores 7017-1 may be parallel in one embodiment. The U-bend portion 7011-3 of the oscillator tube opposite the inlet and outlet end portions and adjoining tube portions between the U-bend and mounting block 7017 are unsupported and able to freely oscillate in response to the excitation frequency delivered by the driver 7012.

Figure 11:
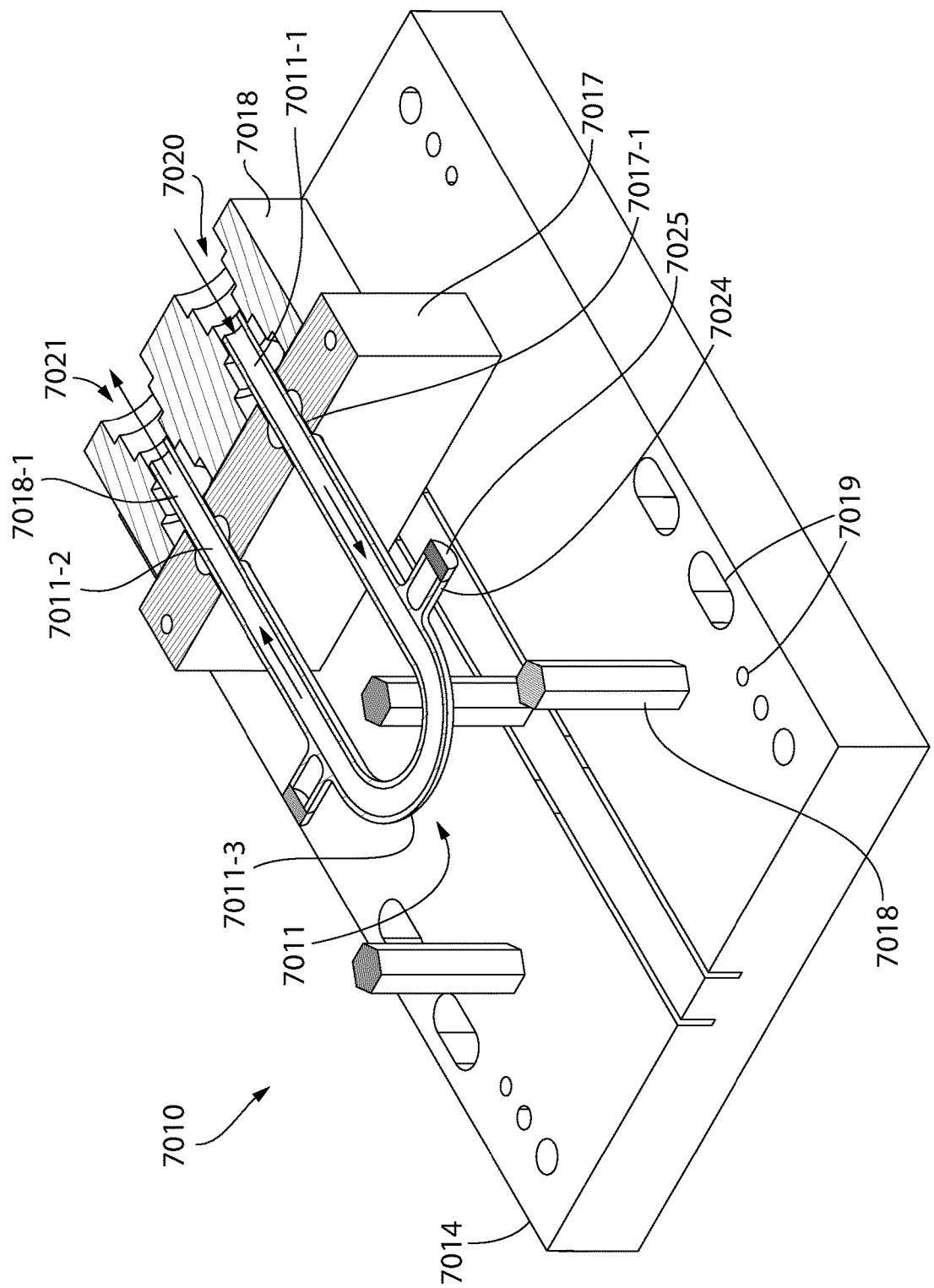
FIG. 11 is a longitudinal perspective cross sectional view thereof.
Figure 12:
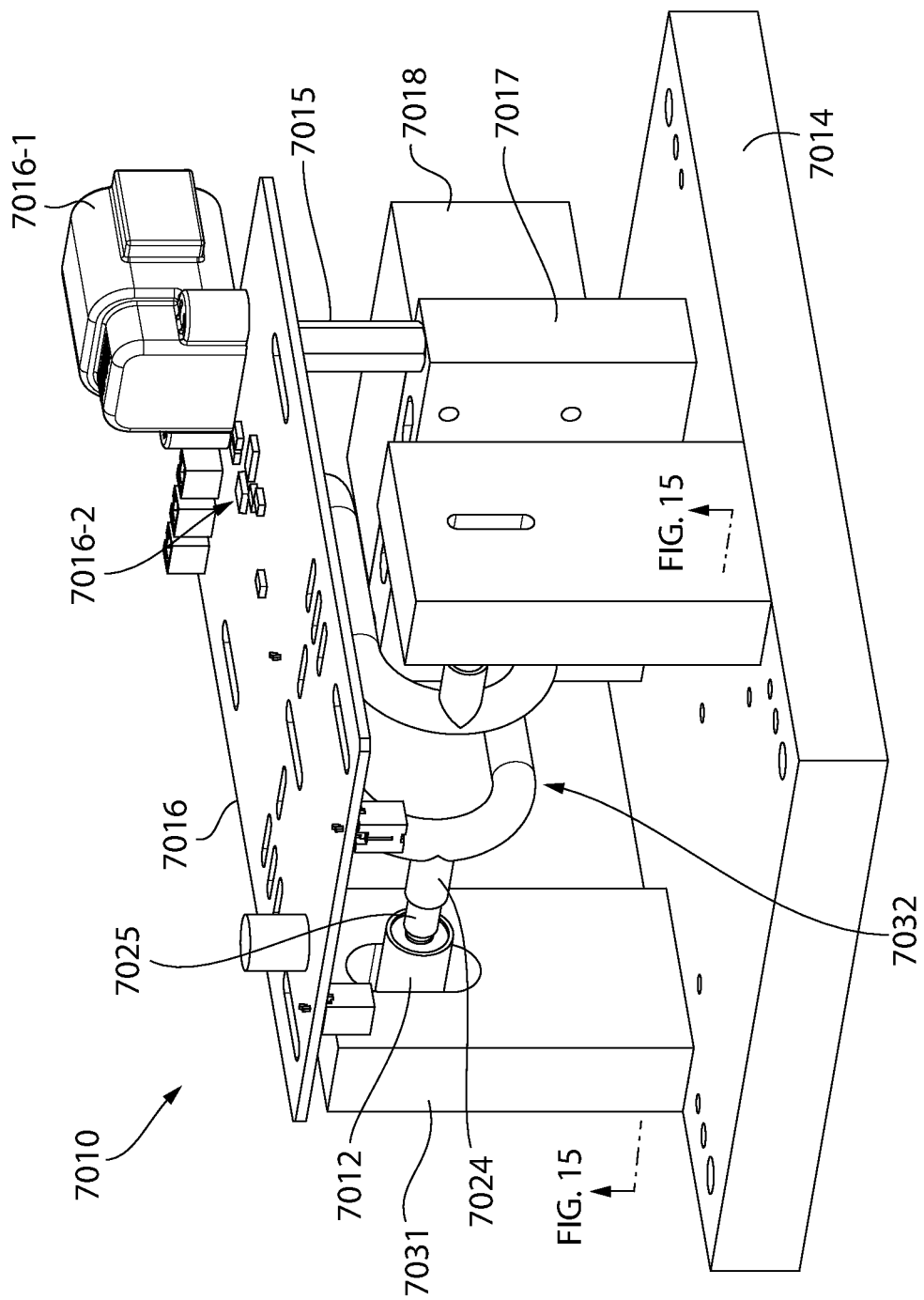
FIG. 12 is a first perspective view of a second embodiment of a slurry density meter usable in the systems of FIG. 1A or 1B.
Figure 13:
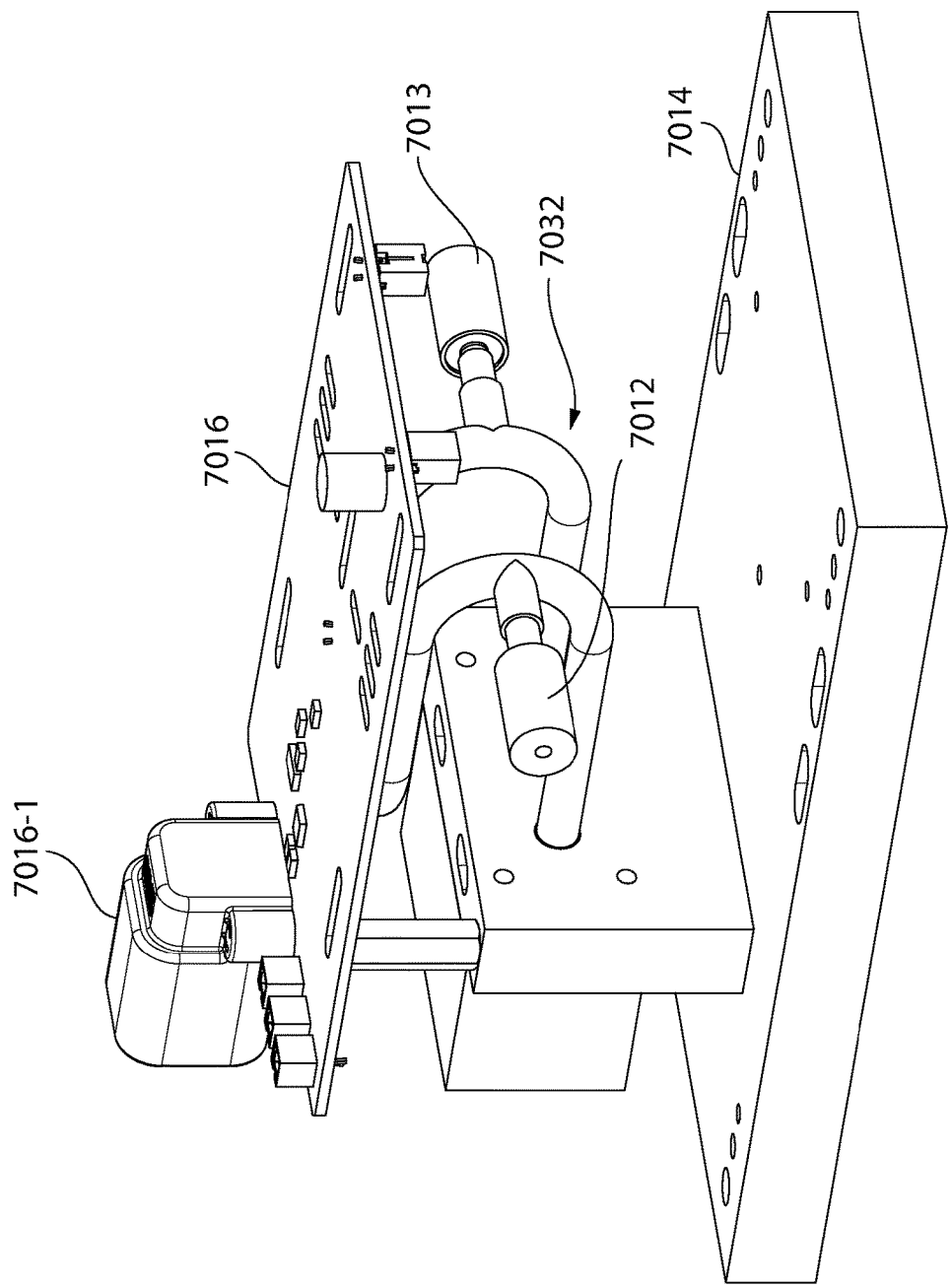
FIG. 13 is a second perspective view thereof.

The inlet end portion 7011-1 and outlet end portion 7011-2 of oscillator tube 7011 project through and beyond the tube mounting block 7017, and are each received in a corresponding open through bore or hole 7018-1 of the flow connection manifold 7018 associated with defining a slurry inlet 7020 and slurry outlet 7021 of the connection manifold 7018 (see slurry directional flow arrows in FIG. 11). Through holes 7018-1 may have any suitable configuration to hold the end portions 7011-1, 7011-2 of oscillator tube 7011 in tight and a fluidly sealed manner. Suitable fluid seals such as O-rings, elastomeric sealants, or similar may be used to achieve a leak-tight coupling between he oscillator tube and connection manifold 7018. The connection manifold 7018 abuttingly engages the mounting block 7017 to provide contiguous coupling openings therethrough for the inlet end portion 7011-1 and outlet end portion 7011-2 to fully support the end portions of oscillator tube 7011 (see, e.g. FIG. 11). In other possible embodiment contemplated, the connection manifold 7018 may be spaced apart from but preferably in relative close proximity to mounting block 7017.

The mounting block 7017, flow connection manifold 7018, and base 7014 may preferably made of a suitable metal (e.g. aluminum, steel, etc.) of sufficient weight and thickness to act as vibration dampeners such that excitation of oscillator tube which is measured by the density measurement device 7010 is indicative of only the frequency response of the filled oscillator tube 7011 without interference by any corresponding parasitic resonances that otherwise could be induced in the base or the mounting block and flow connection manifold.

In the first oscillator tube embodiment shown in FIGS. 2-11, the oscillator tube 7011 may have a conventional U-shape as shown and previously described herein. The tube may be oriented parallel to the planar top surface of the base 7014. Oscillator tube 7001 may be formed of a non-metallic material in one non-limiting embodiment. Suitable materials include glass such as borosilicate glass. In other possible embodiments, however, metallic tubes may be used. The permanent magnets 7025 are fixedly and rigidly supported from and mounted to the oscillator tube 7011, such as on opposite lateral sides of the U-tube proximate to the U-bend portion 7011-3 as shown. The U-bend portion is farthest from the cantilevered portion of the oscillator tube adjoining the mounting block 7017 and thus experiences the greatest displacement/deflection when excited by driver 7012 making the tube vibration frequency change readily detectible by the digital meter controller 7016-2. This creates the greatest sensitivity for frequency deviation measurement of the slurry-filled oscillator tube 7011 versus the natural frequency of the tube when empty; the deviation or different in frequency being used by controller 7016-2 to measure the slurry density.

Figure 16A:
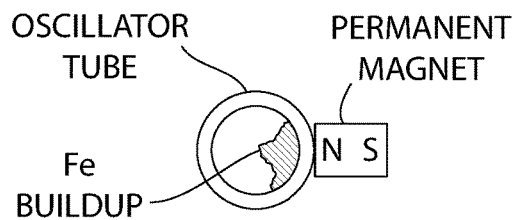
FIG. 16A shows a portion of the oscillator tube of the density meter illustrating accumulation of iron particles in the slurry on the inside of the tube caused by the magnetic field of a permanent magnet attached to the tube.

Although laboratory digital density meters having oscillator tubes are commercially available, they are not entirely compatible off the shelf for measuring soil slurries or other agricultural materials that can have a presence of varying amounts of iron (Fe) in the soil unlike other fluids. The iron in the soil slurry creates a problem which interferes with accurate soil slurry density measurement since iron particles in the slurry are attracted to the permanent magnets used in the density measurement device 7010. This causes the iron particles to aggregate on portions of the tube closest to the permanent magnets, thereby skewing the density measurement results by adversely affecting the resonant frequency of the oscillator tube when loaded with the soil slurry and excited by driver 7012. FIG. 16A shows this undesirable situation with agglomerated Fe particle in the oscillator tube.

Figure 16B:
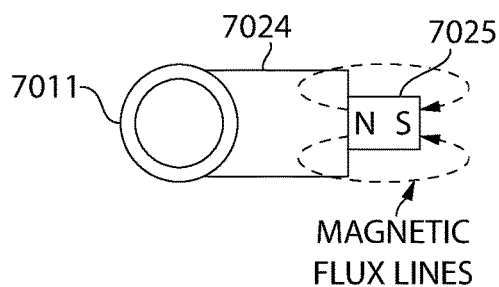
FIG. 16B shows a first embodiment of a magnetic isolation member attached to the oscillator tube.
Figure 16C:
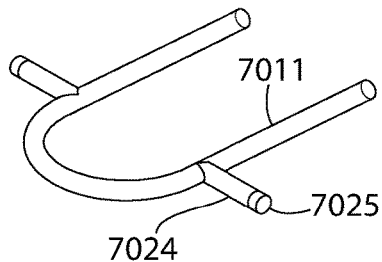
FIG. 16C shows a second embodiment of a magnetic isolation member attached to the oscillator tube.

To combat the foregoing problem when handling iron particle-containing slurries, embodiments of a density measurement device 7010 according to the present disclosure may be modified to include a variety of magnetic isolation features or members configured to magnetically isolate the permanent magnets from the oscillator tube 7011 and iron-containing slurry therein. In the embodiment of FIGS. 2-11, the permanent magnets 7025 may each be mounted to the oscillator tube 7011 by a magnetic isolation member comprising a non-magnetic standoff 7024 (also schematically shown in FIGS. 16B and 16C). The standoffs project transversely outwards from the lateral sides of oscillator tube in opposite directions and perpendicular to longitudinal centerline CA of the density measurement device 7010. Standoffs 7024 are configured with suitable dimensions or lengths to space the permanent magnets far enough away from the oscillator tube 7011 to prevent creating a static magnetic field of sufficient strength within the tube to attract and aggregate the iron particles in the soil slurry for the reasons discussed above. The magnetic field can be such that its strength is weakened to the point that allows particles to move under the force of the flow without deposition on the inside of the oscillator tube. As illustrated in FIG. 16B, the magnet flux lines (dashed) which circulate and flow from the north (N) pole of permanent magnet 7025 to the south(S) pole do not reach the oscillator tube 7011. The magnet standoffs 7024 avoid the iron agglomeration problem shown in FIG. 16A caused by direct mounting of the permanent magnets 7025 to the oscillator tube 7011.

In one embodiment where the oscillator tube 7011 is formed of a non-metallic and non-magnetic material (e.g. glass or plastic), the standoffs 7024 may be integrally formed as a monolithic unitary structural part of the tube. In other embodiments, the standoffs to which the permanent magnets are mounted may be separate discrete elements which are fixedly coupled to the oscillator tube 7011 such as via adhesives, clips, or other suitable coupling mechanical methods. Where a metallic oscillator tube is provided, the standoffs 7024 are formed of a non-metallic material (e.g. plastic or glass) attached or adhered to the oscillator tube by a suitable means (e.g. adhesives, clips, brackets, etc.).

Figure 16D:
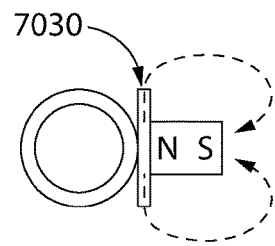
FIG. 16D shows a third embodiment of a magnetic isolation member attached to the oscillator tube.
Figure 16E:
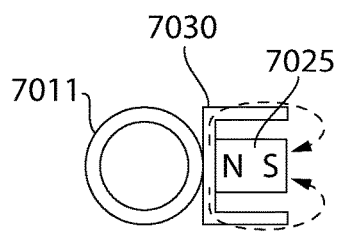
FIG. 16E shows a fourth embodiment of a magnetic isolation member attached to the oscillator tube.

Other possible arrangements for mounting the permanent magnets 7025 to oscillator tube 7011 and magnetic isolation members may be used which shield or guide the creating magnetic lines of flux generated by the magnets away from the tube. For example, FIG. 16D shows a permanent magnet assembly comprising a magnetic isolation member comprising metallic magnetic shield member 7030 interspersed between the permanent magnet and oscillator tube to direct the magazine flux lines (dashed) away from the oscillator tube. In the embodiment shown, the shield member 7030 is configured as a flat plate of metal. FIG. 16E shows a U-shaped or cup shaped shield member 7030 which performs similarly to FIG. 16D. Any suitable shape of metallic magnetic shield member may be used so long as the magazine flux lines are redirected to not reach and penetrate the oscillator tube 7011.

Figure 16F:
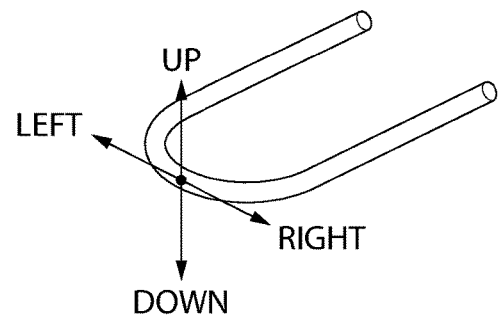
FIG. 16F shows possible directional vibrational motions for the oscillator tube.
Figure 16G:
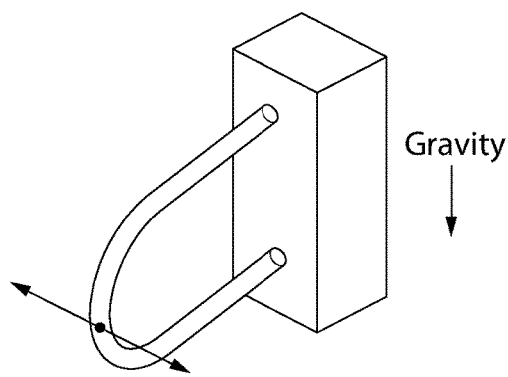
FIG. 16G shows an oscillator tube mounted in a vertically orientation.
Figure 17:
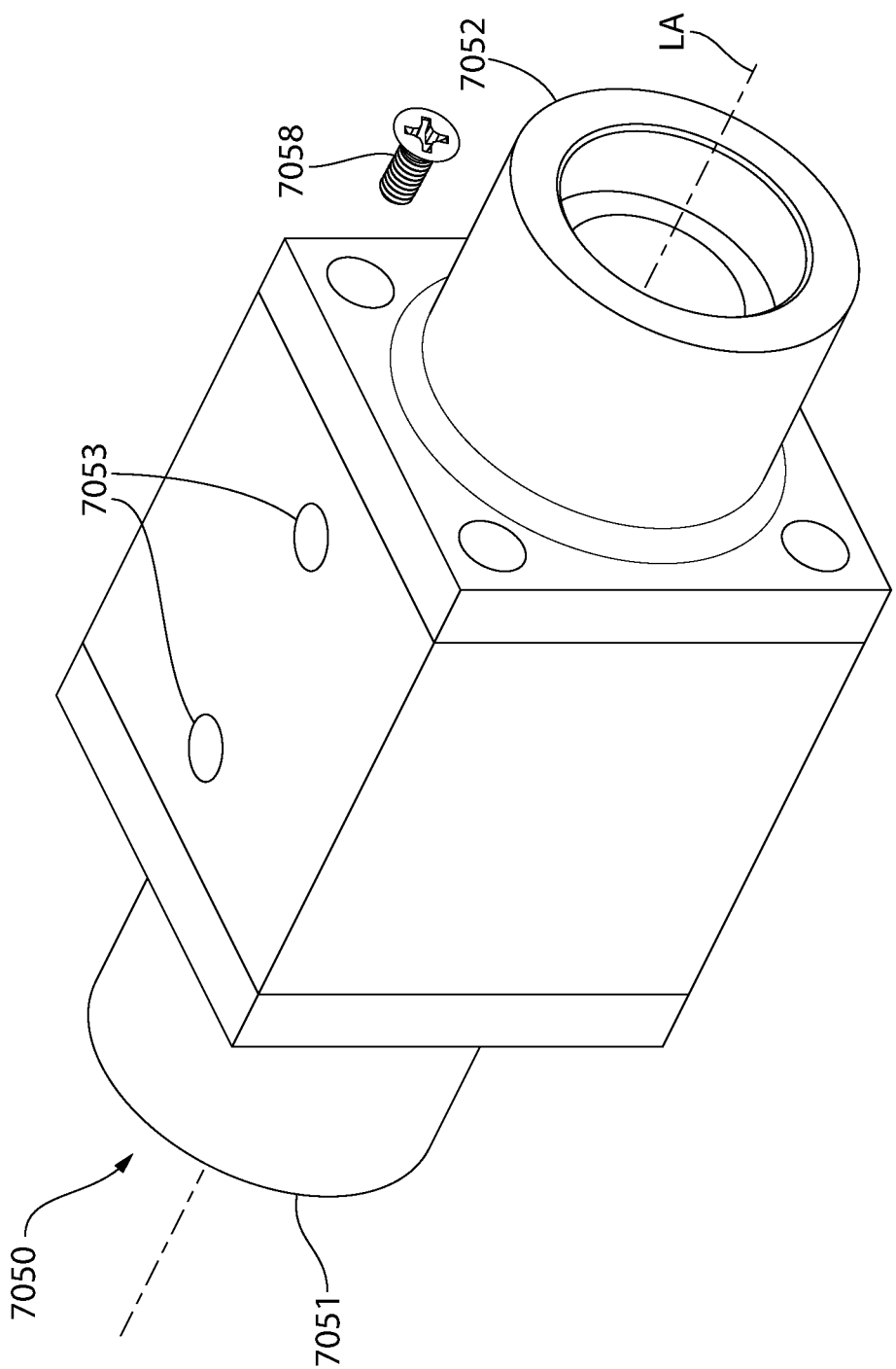
FIG. 17 is a first perspective view of a first embodiment of a fine filter unit.
Figure 18:
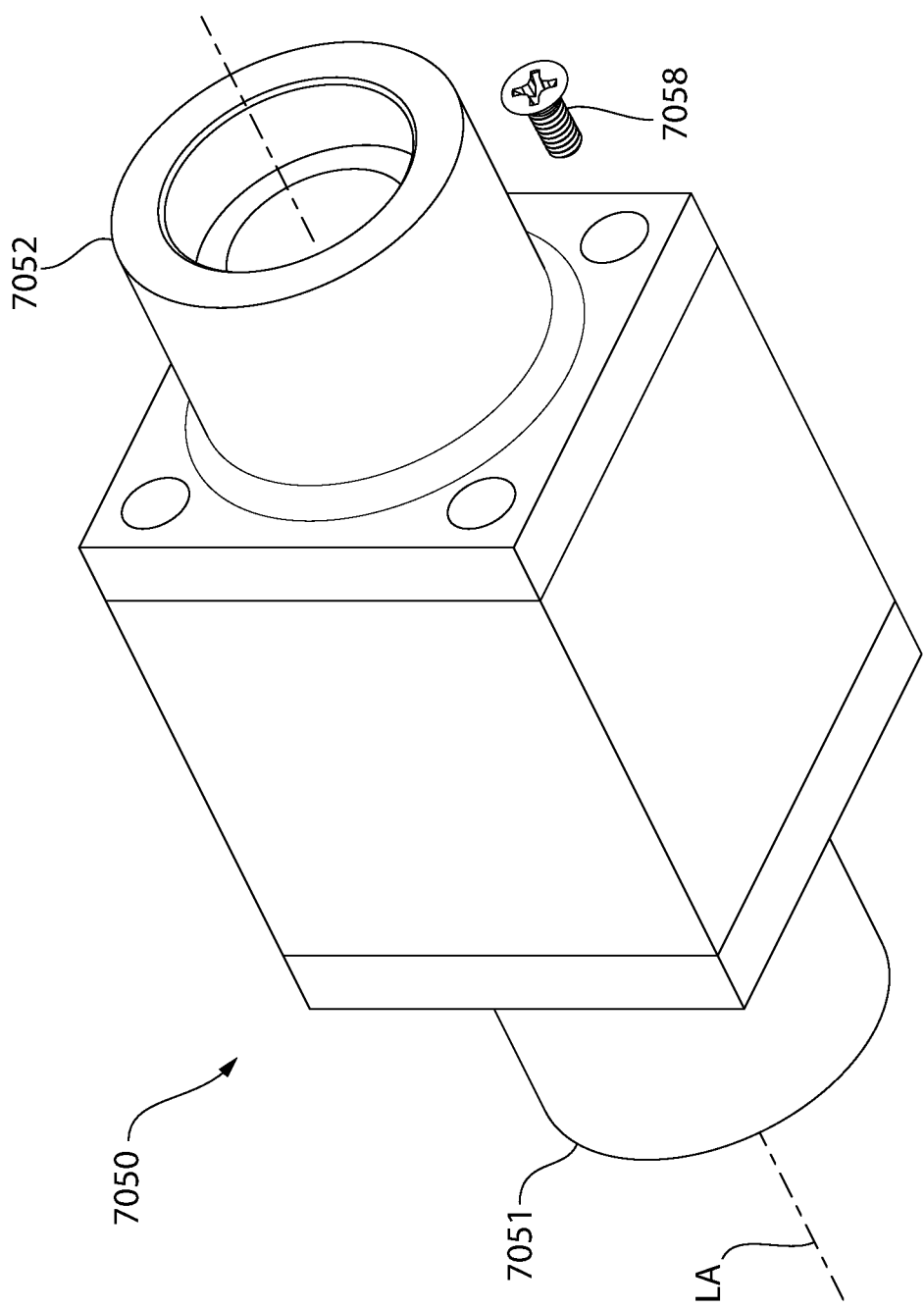
FIG. 18 is a second perspective view thereof.
Figure 19:
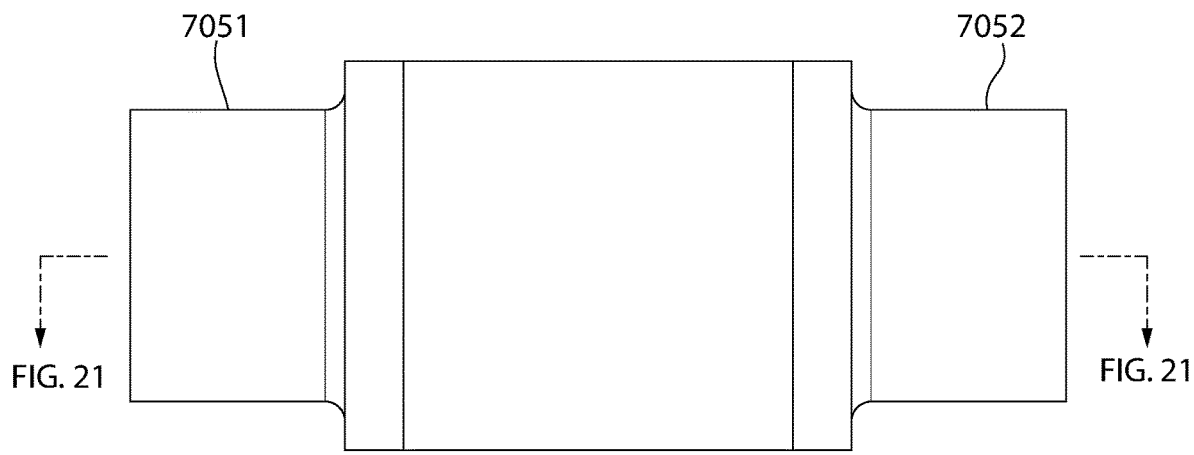
FIG. 19 is a bottom view thereof.
Figure 20:
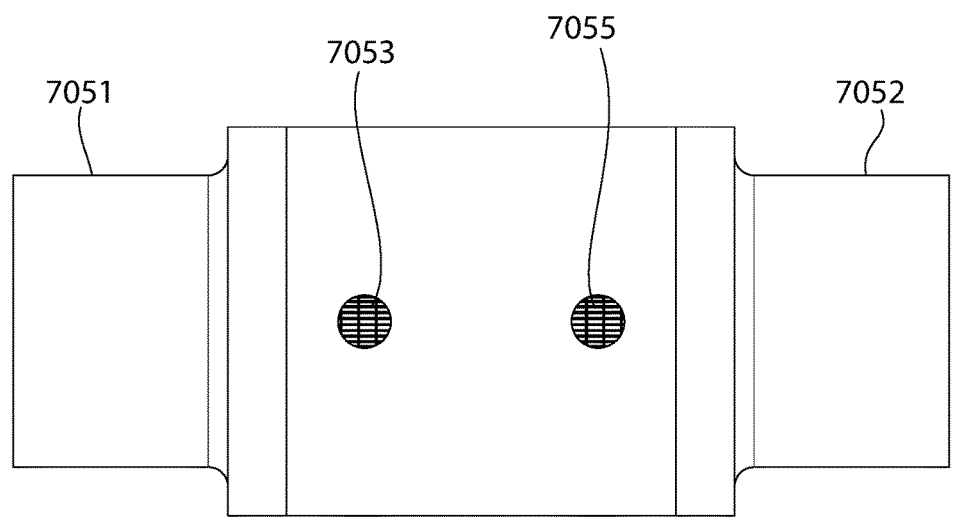
FIG. 20 is top view thereof.

FIG. 16F illustrates that the direction of the oscillator tube 7011 excitement via placement of the frequency driver and pickup 7012, 7013 could be in the stiffest direction (e.g. left/right represented by the tube oscillation movement arrows) or in the least stiff and most flexible direction (e.g. up/down) for a horizontally oriented tube. This will affect the natural frequency of the oscillator tube significantly, which forms the baseline against which the excited tube full of slurry is compared to determine the slurry density (weight). The stiffer side-to-side excitement/movement direction of the tube will have a higher natural frequency, while the more flexible up and down direction will have a lower natural frequency. Either orientation, or different angular orientations of the oscillator tube may be used. It may further be advantageous in some embodiments to have the tube significantly stiffer in the direction of gravity (i.e. vertically) than in the loading/excitement direction (i.e. horizontal represented by the tube oscillation movement arrows) as shown in FIG. 16B to help reduce system noise which could interfere with density measurement accuracy.

The density measurement device 7010 operates to obtain density measurements from the soil slurry in a conventional manner known in the art for such U-tube type density meters. The slurry density measurements are communicated to control system 2800 (programmable controller 2820) operably coupled to the density measurement device 7010 as seen in FIGS. 1A-B. The measurements are utilized by the controller to automatically determine how much water (diluent) needs to be added to the slurry to reach a preprogrammed target water to soil or other agricultural sample material ratio depending on the type of material to be sampled and analyzed.

An exemplary method/process for preparing an agricultural sample slurry using slurry density measurement with density measurement device 7010 (density meter) and a preprogrammed closed loop control scheme implemented by controller 2820 of the control system 2800 via suitable programming instructions/control logic will now be described. This example will use soil as the sample for convenience of description, but is not limited thereto and may be used for other agricultural sample materials (e.g. plants, manure, etc.). Given an arbitrary amount of soil in the collected sample with an associated arbitrary soil moisture content based on ambient conditions in the agricultural field and soil type, the soil slurry will be diluted to reach a desired target density reading thereby ensuring repeatable analytical results. Because not all soil samples are made up of particles of the same density depending on the nature of soil (i.e. sandy, clay, loam, etc.), the system will likely have a varying desired density target based on these and other characteristics of the sample being analyzed. The target is a constant soil mass to water mass ratio, which is represented by a target density.

Figure 28:
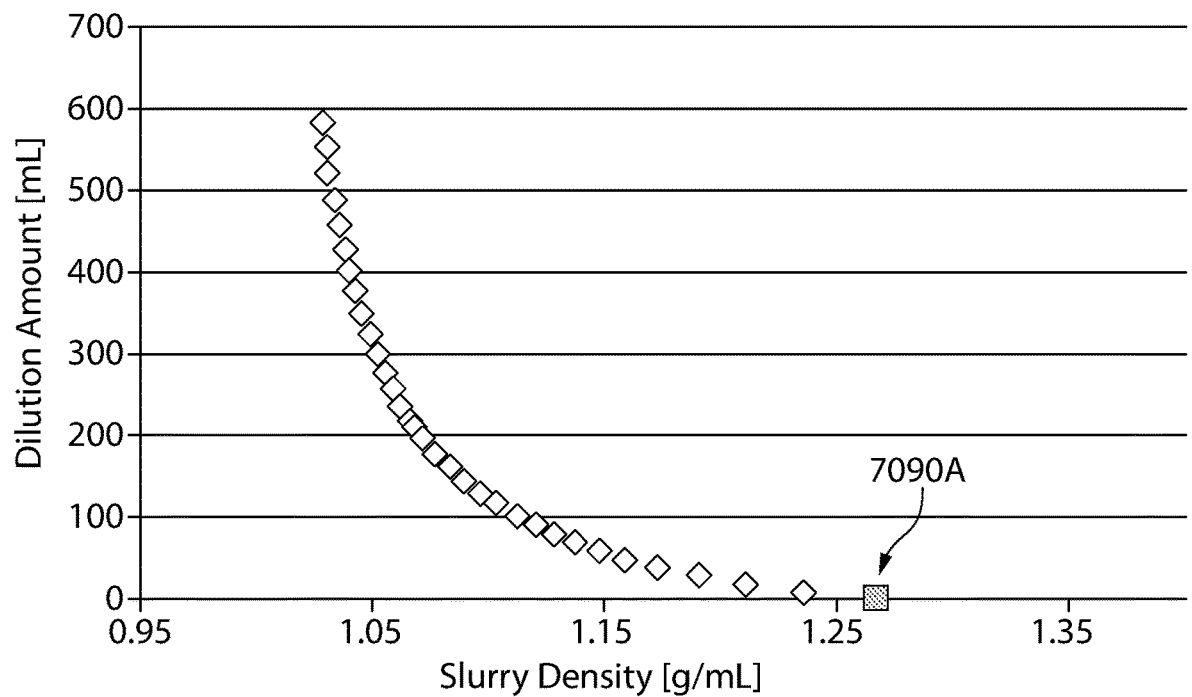
FIG. 28 is a first graph showing dilution amount of diluent (e.g. water) added to the slurry versus slurry density.
Figure 29:
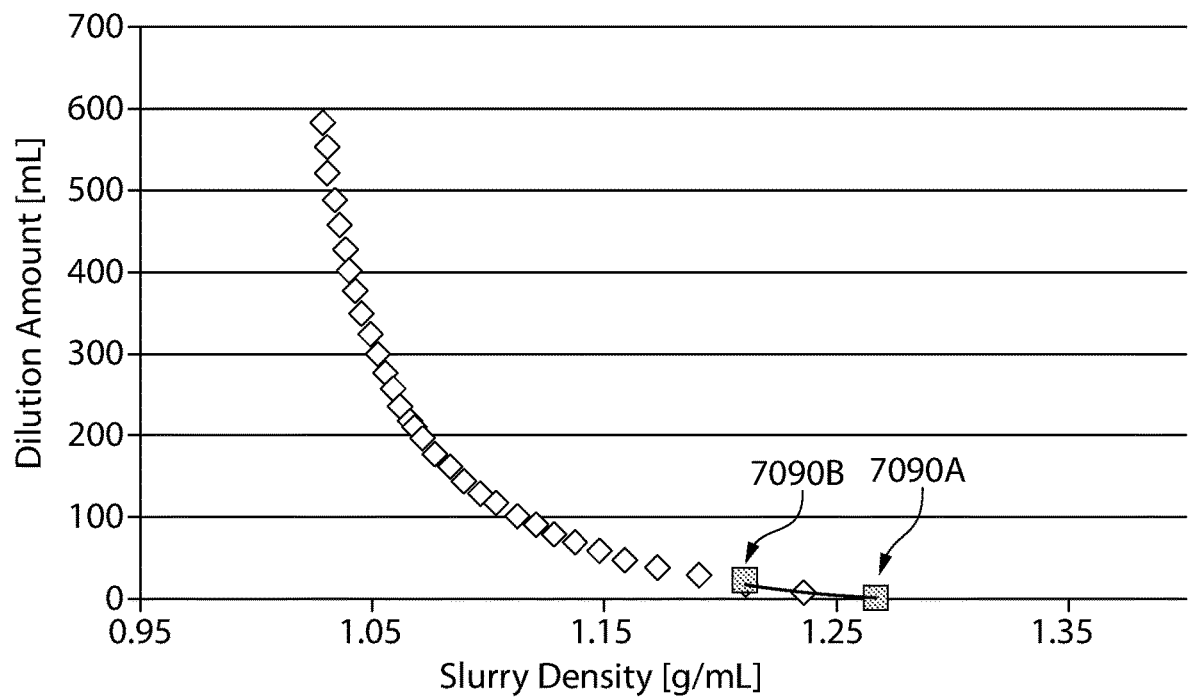
FIG. 29 is a second graph thereof.
Figure 30:
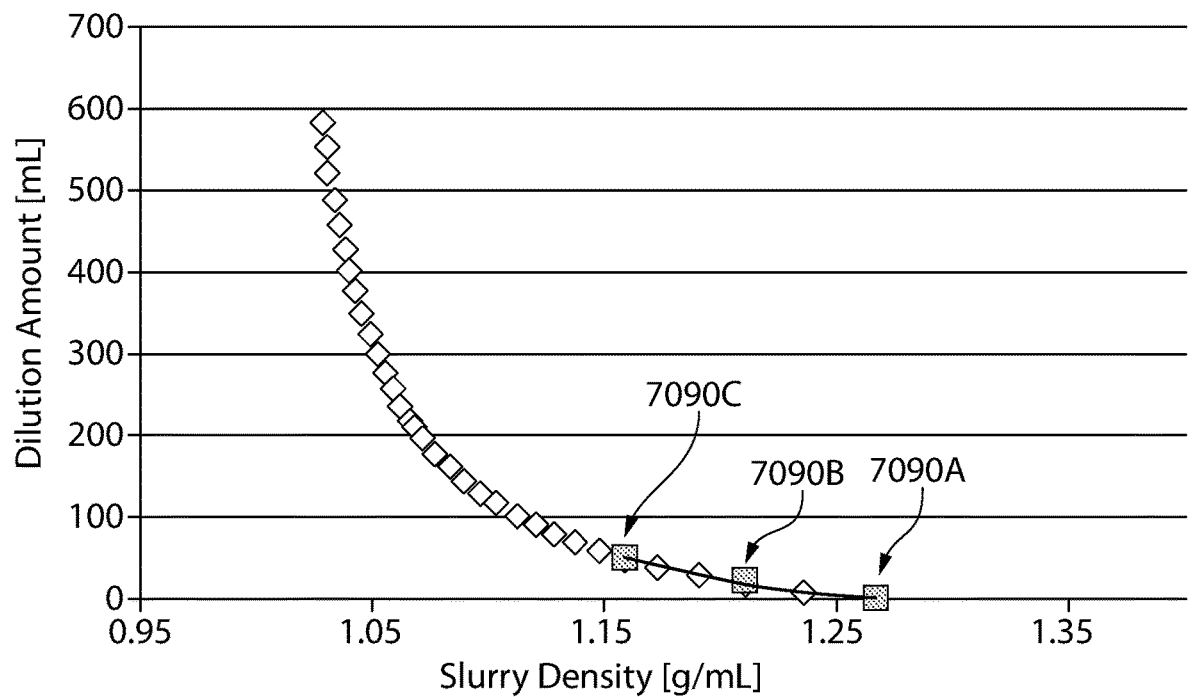
FIG. 30 is a third graph thereof.
Figure 31:
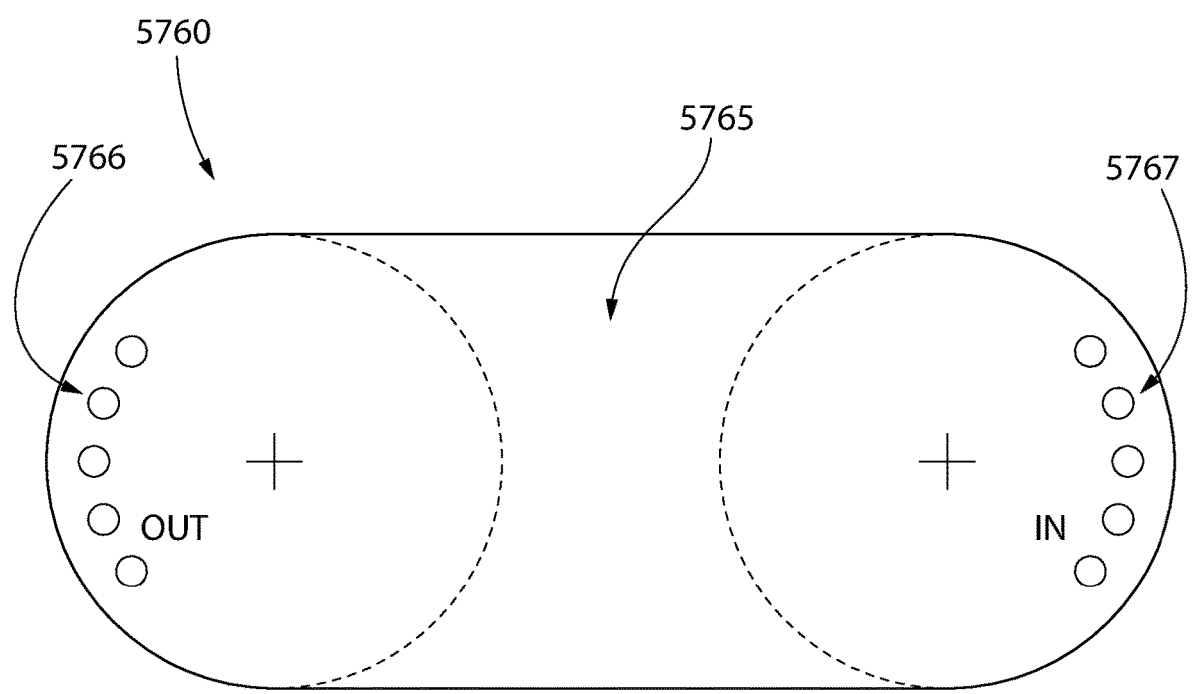
FIG. 31 is a top view of an alternative embodiment of the micropump of the microfluidic processing disk comprising a plurality of inlet and outlet ports formed in the lower chamber.
Figure 32:
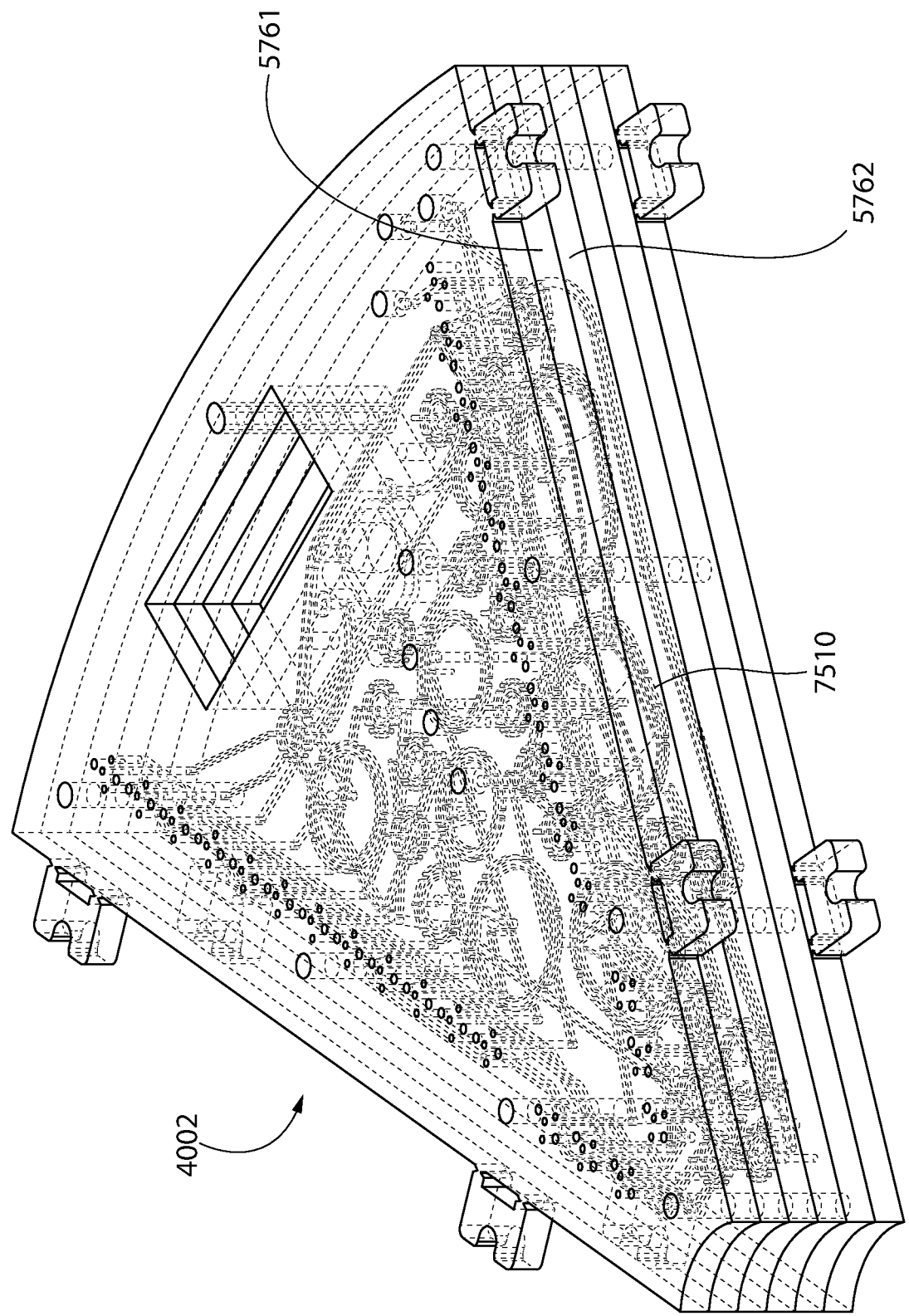
FIG. 32 is a perspective view of an analysis processing wedge of the microfluidic processing disk comprising an alternative embodiment of a micropump including diaphragm restraining tabs.
Figure 33:
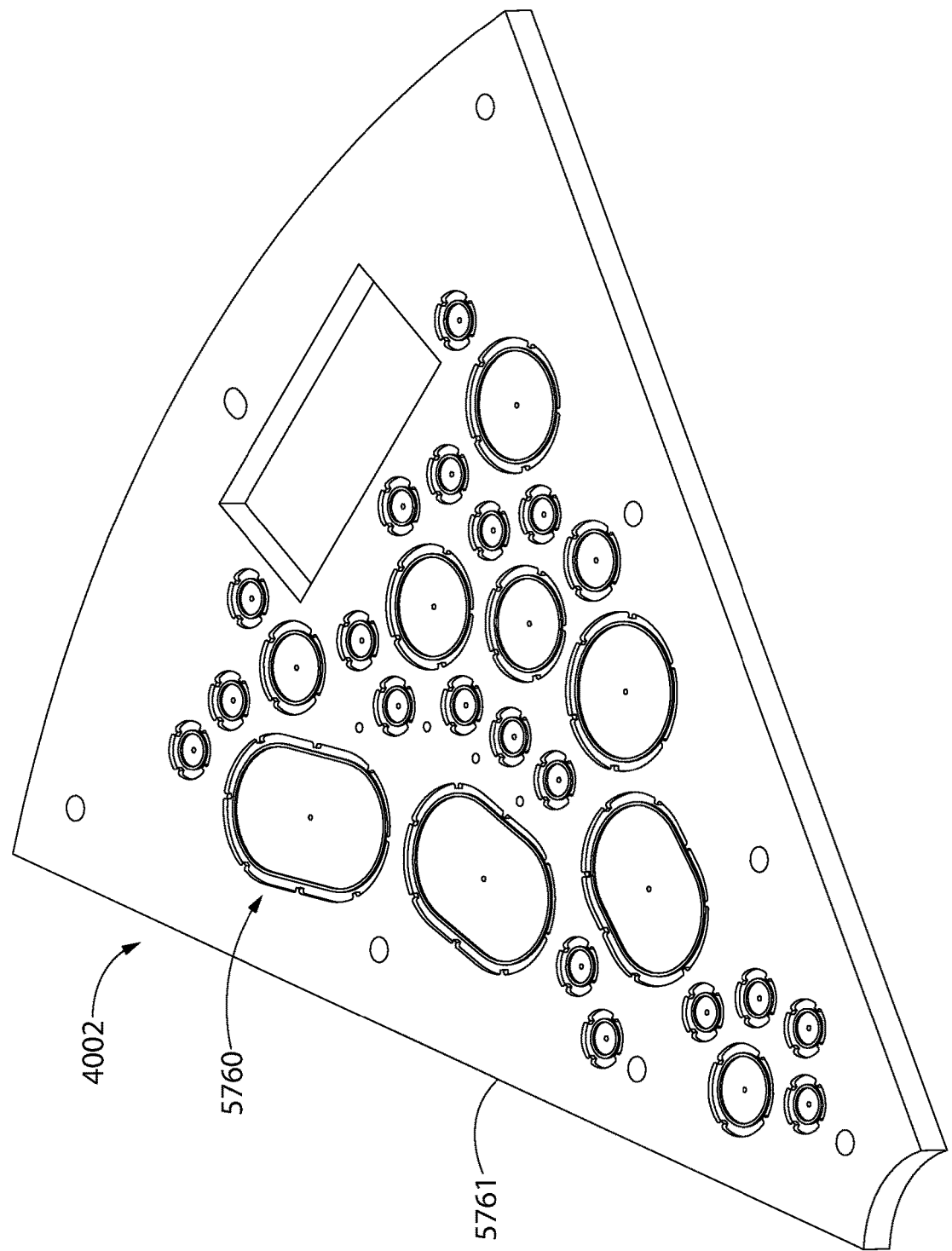
FIG. 33 is a perspective view of the active layer of the analysis processing wedge comprising the lower part of the micropump.
Figure 34:
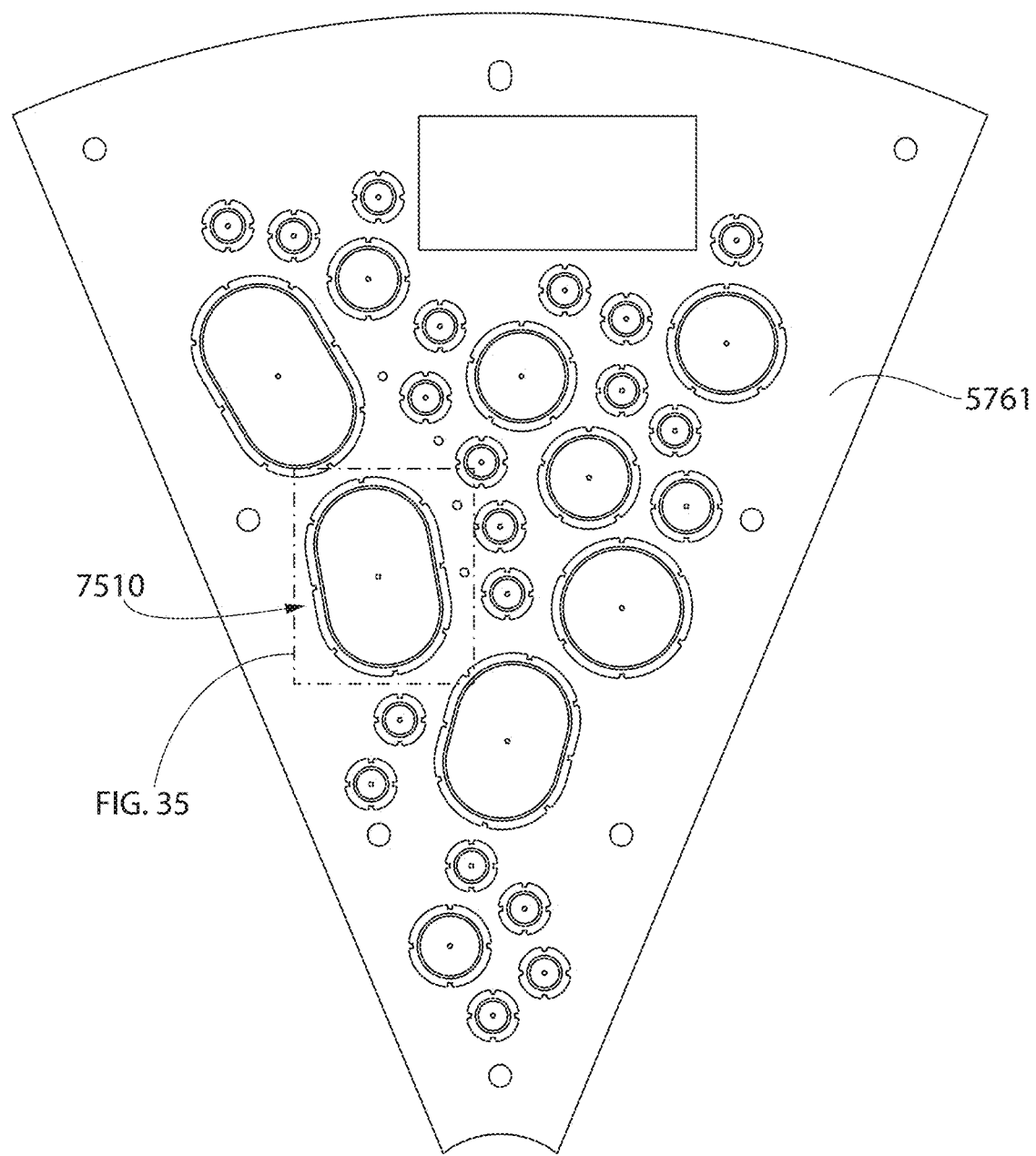
FIG. 34 is a top view thereof.

FIGS. 28-30 are curves showing dilution amount of diluent (e.g. water) added to the slurry versus slurry density which is used by controller 2820 to determine the amount of diluent required to reach the preprogrammed target water to soil ratio. The target water to soil ratio can be preprogrammed into the controller in the form of a target slurry density which can be directly equated to the ratio because the density of the diluent used is a known fixed factor. With the known density of the diluent being used (e.g. water having a density of 0.998 g/mL) also preprogrammed into the controller, as more and more diluent is added to the slurry in the system, the slurry mixture will ultimately approach the density of the diluent but can never be reversed and become less dense than this value. The relationship and curve shown in FIG. 28 is thus generated by the controller 2820 and used to reach the target slurry density (water to soil ratio). The dilution amount (Y-axis) is the total volume added to achieve the dilution. With different amounts of soil, soil moisture, and water (diluent) added to create the initial slurry mix, the slope of this curve may change but will keep the same general shape.

With additional reference to FIGS. 1A-B, the collected raw soil sample and a known amount of water are initially mixed in mixer-filter apparatus 100 a first time as indicated to prepare the slurry. Once the soil slurry has been mixed and homogenized in the mixer, a first density measurement is be sensed by the density meter and transmitted to controller 2820. Point 7090A on the curve in FIG. 28 indicates the first density measurement taken.

To determine the dilution amount versus slurry density relationship more precisely in real-time, a known amount of water is metered and added by controller 2820 via operably coupled water control valve 7091 to mixer-filter apparatus 100 in the next step (e.g. 20 mL) and the resultant slurry density is measured a second time. Point 7090B on the curve in FIG. 29 indicates the second measurement taken. A linear relationship can then be generated by the controller between the two slurry density points 7090A and 7090B taken (represented by solid line on the curve between these two points). For a given preprogrammed target slurry density (soil to water ratio), the target density can then be input to this relationship and the output calculated by controller 2820 is a first estimation of the total amount of diluent (e.g. water) needed to achieve the target density.

The controller 2820 next meters and adds the estimated amount of additional diluent necessary to reach the target slurry density to the slurry mixture which is mixed with the slurry by mixer-filter apparatus 100. The resultant slurry density is measured a third time. Point 7090C on the curve in FIG. 30 indicates the third measurement taken, which continues to add data points to the linear relationship (see longer solid line on curve). Once at least three slurry density measurements and corresponding points on the slurry density curve have been acquired by the controller, a polynomial regression can be performed on the data by the controller providing a more precise curve fit. Based on and using the preprogrammed target density, the controller 2820 then calculates the required total amount of diluent necessary based on the updated curves and adds this amount to the slurry to achieve the target slurry density. This process can be iterated to improve the accuracy of the regression model or until the actual density is sufficiently close to the target density FIGS. 12-15 depict an alternative second embodiment of a cantilevered U-shaped oscillator tube 7032 for use with density measurement device 7010 which contrasts to the straight U-shaped oscillator tube 7011 previously described herein. In this present embodiment, oscillator tube 7032 has a recurvant U-tube shape in which the 180 degree primary U-bend portion 7032-3 extends backwards over top of the straight inlet end portion 7032-1 and outlet end portion 7032-2 of the oscillator tube affixed to tube mounting block 7017 and flow connection manifold 7018. This is created by the addition of two additional 180 degree secondary U-bend portions 7032-4 between the straight end portions 7032-1, 7032-2 and the primary U-bend portion 7032-3. One secondary U-bend portion 7032-4 is disposed in the slurry inlet leg of the oscillator tube upstream of primary U-bend 7032-3, and the other in the slurry outlet leg of oscillator tube downstream of the primary U-bend portion as shown. In this recurvant oscillator tube embodiment, the standoffs 7024 are disposed on the secondary U-bend portions and protrude laterally outwards in opposite lateral directions to hold the permanent magnets 7025 in spaced part relation to the oscillator tube. The frequency driver and pickup 7012, 7013 are supported from base 7014 by separate vertical supports 7031 in proximity to the permanent magnets to excite the oscillator tube 7032 as previously described herein.

Figure 14:
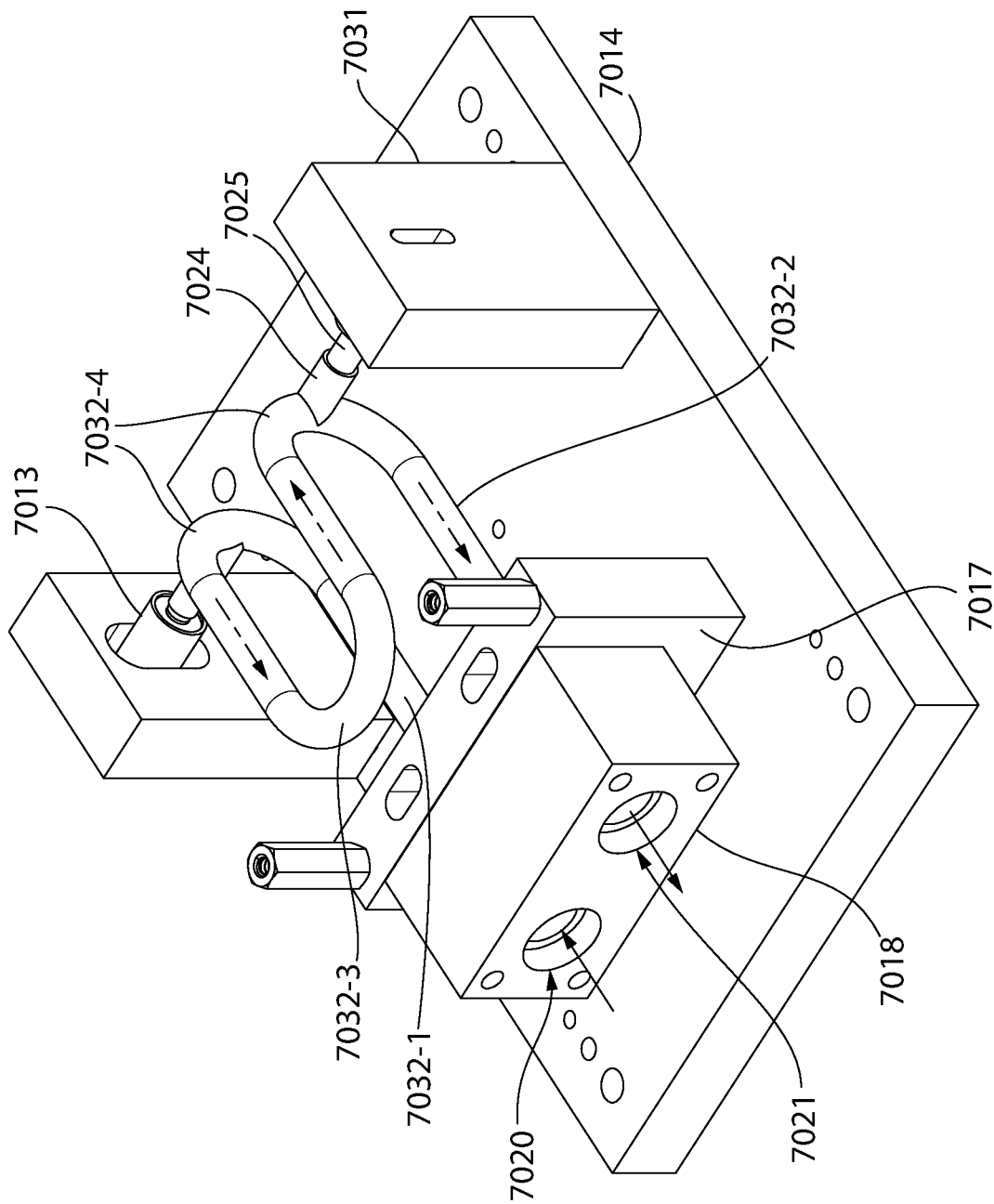
FIG. 14 is a third perspective view thereof with control system circumference board detached.
Figure 15:
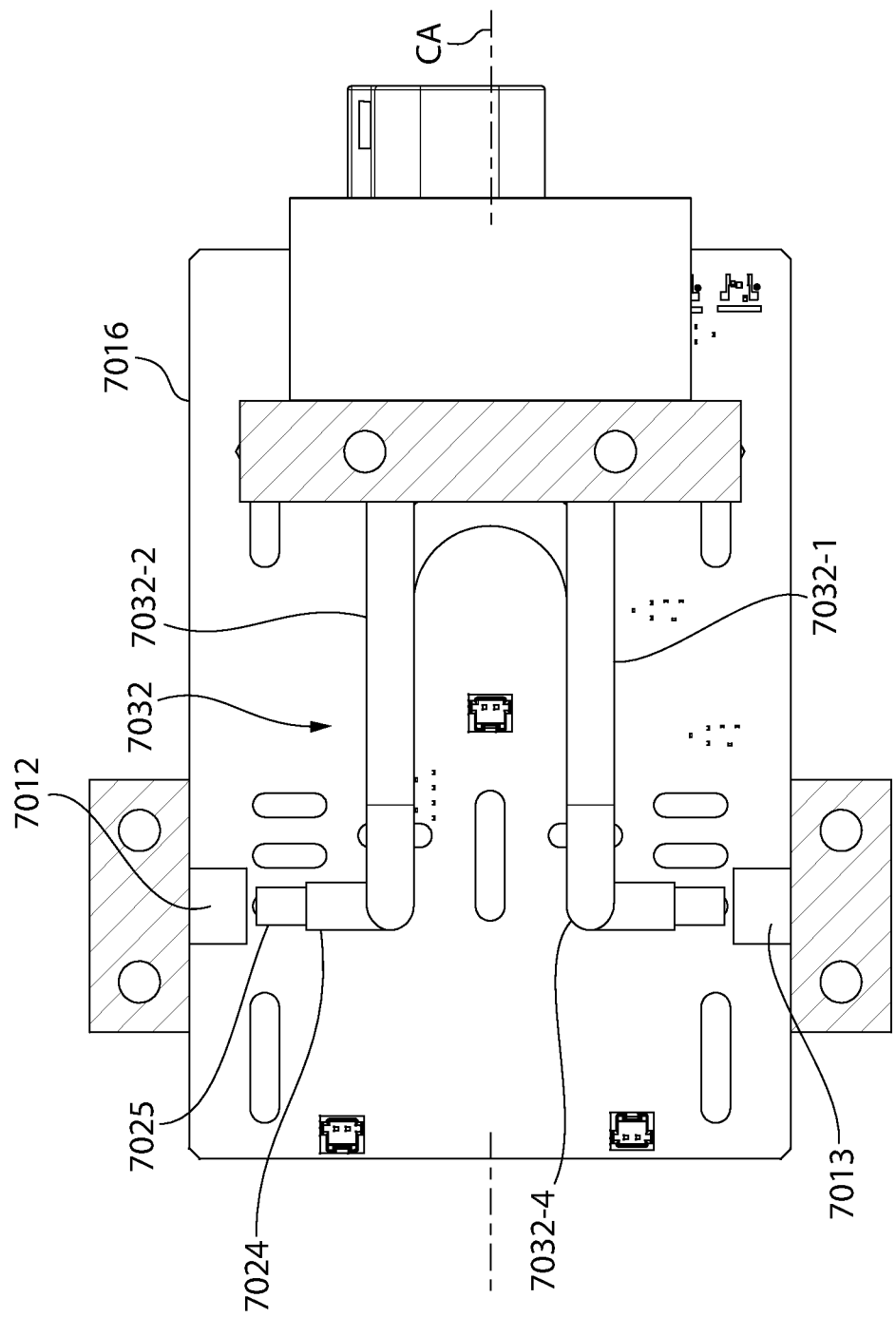
FIG. 15 is a longitudinal cross-sectional view thereof.

In recurvant oscillator tube 7032, slurry flow follows the path indicated by the directional flow arrows in FIG. 14. Slurry flow moves in a first direction parallel to centerline axis CA twice, and in an opposite direction parallel to centerline axis CA twice as well by virtue of the primary and secondary U-bend portions 7032-3 and 7032-4. Primary U-bend portion 7032-3 is oriented horizontal while second U-bend portions 7032-4 are oriented vertically. In this design, centerline CA and a majority of the flow passages within oscillator tube 7011 may remain horizontal in orientation as shown so that any settling that occurs is perpendicular to the flow through the passage rather than in-line with the flow.

Figure 2:
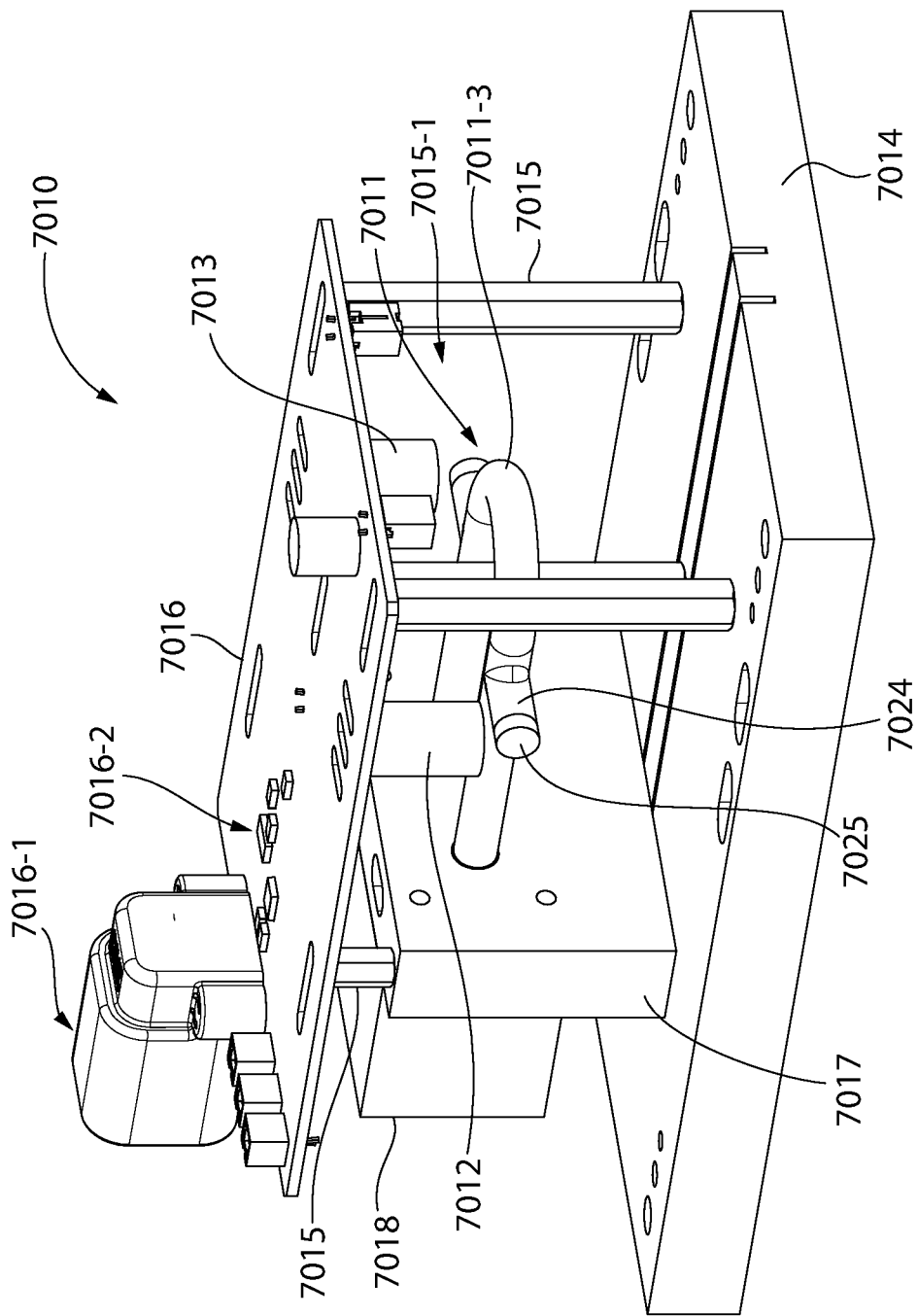
FIG. 2 is a perspective view of a first embodiment of a slurry density meter usable in the systems of FIG. 1A or 1B.
Figure 3:
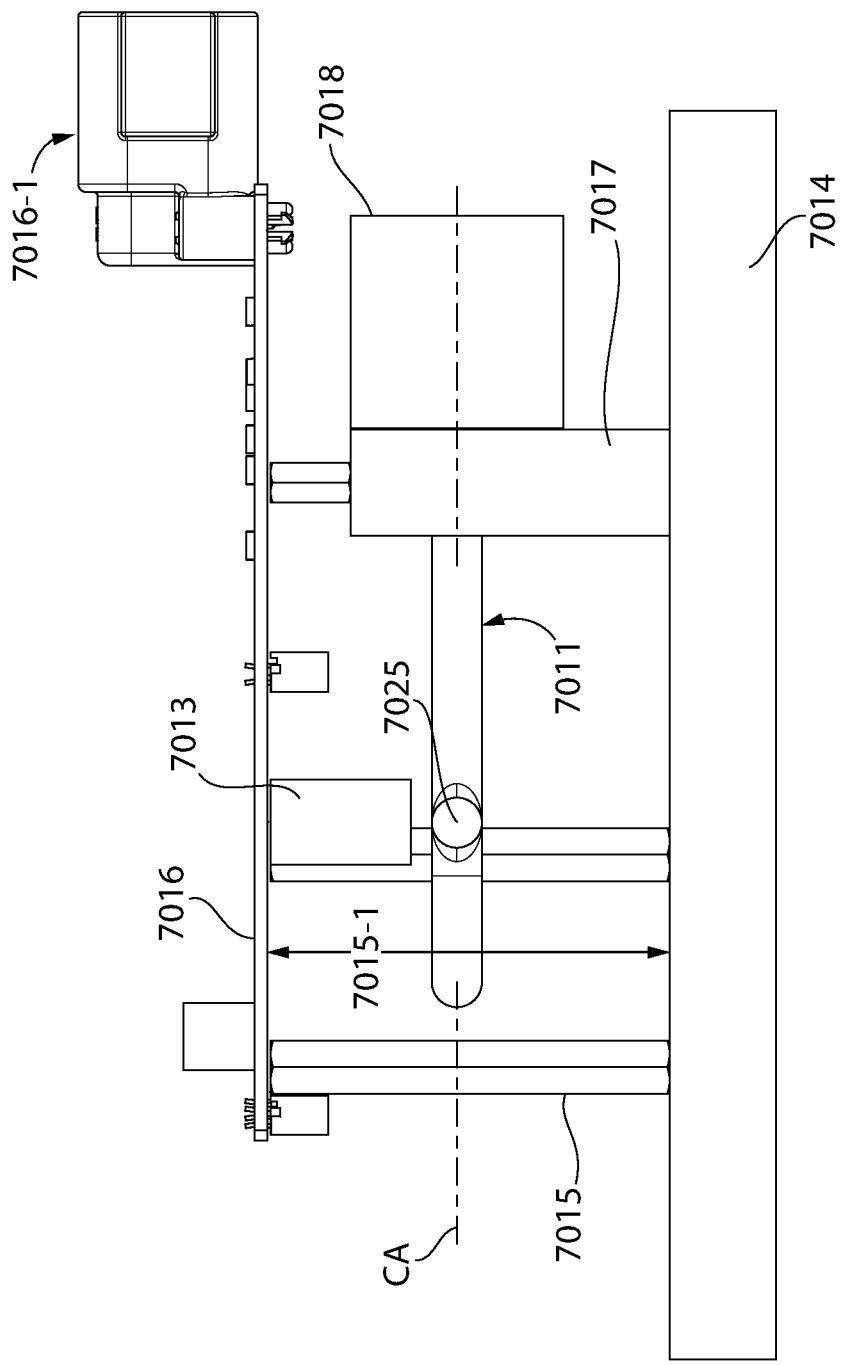
FIG. 3 is a first side view thereof.
Figure 4:
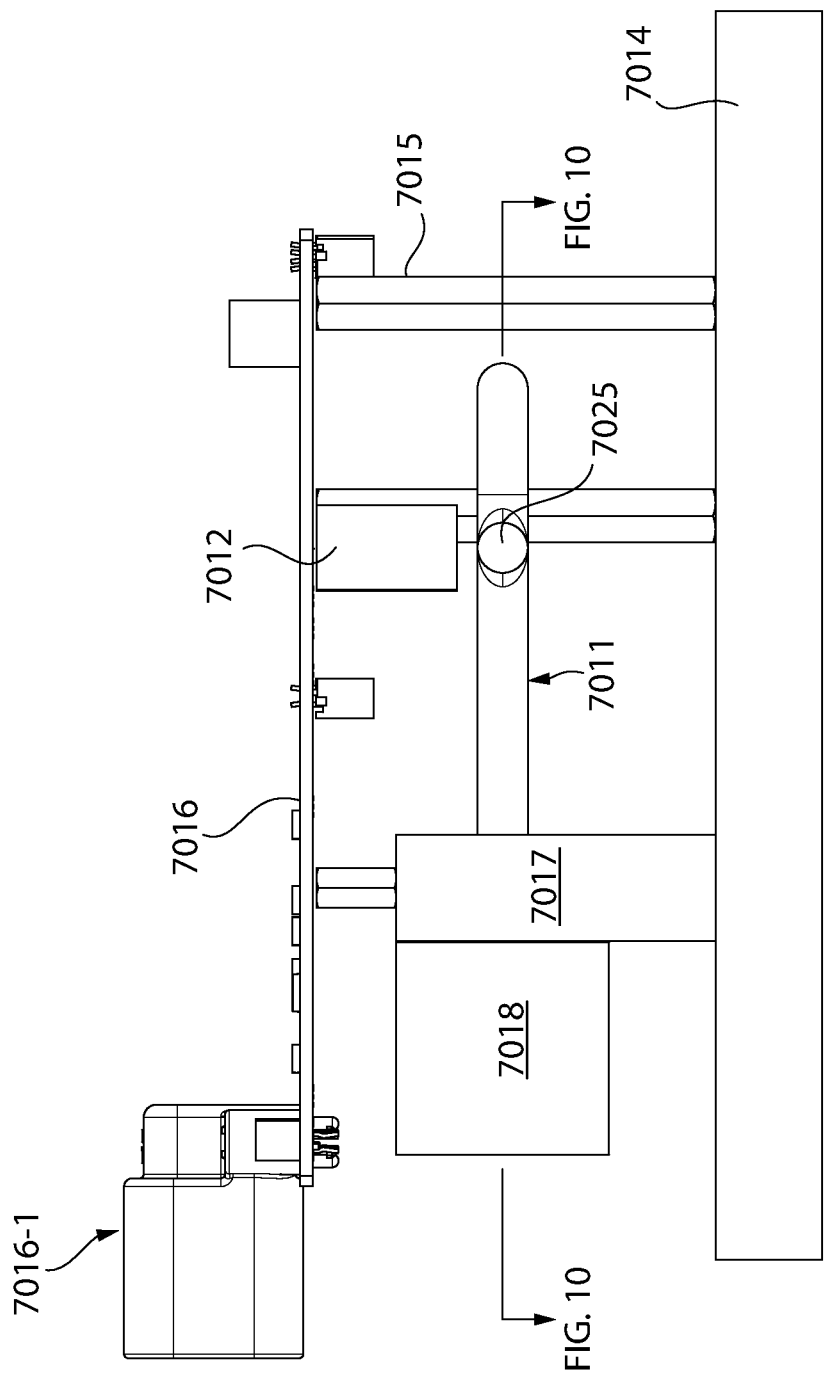
FIG. 4 is a second side view thereof.
Figure 5:
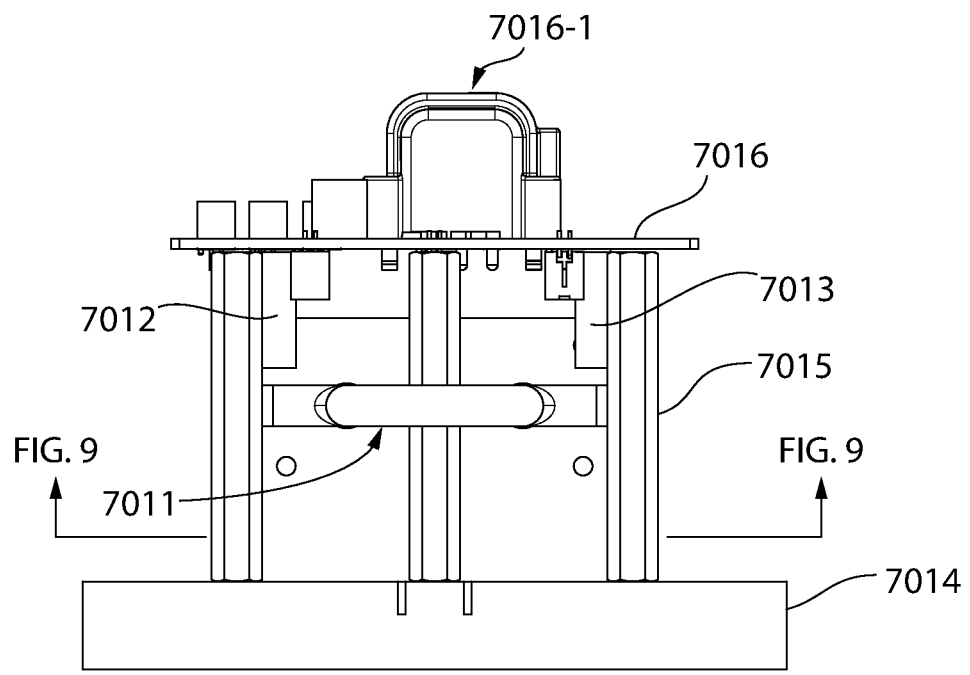
FIG. 5 is a first end view thereof.
Figure 6:
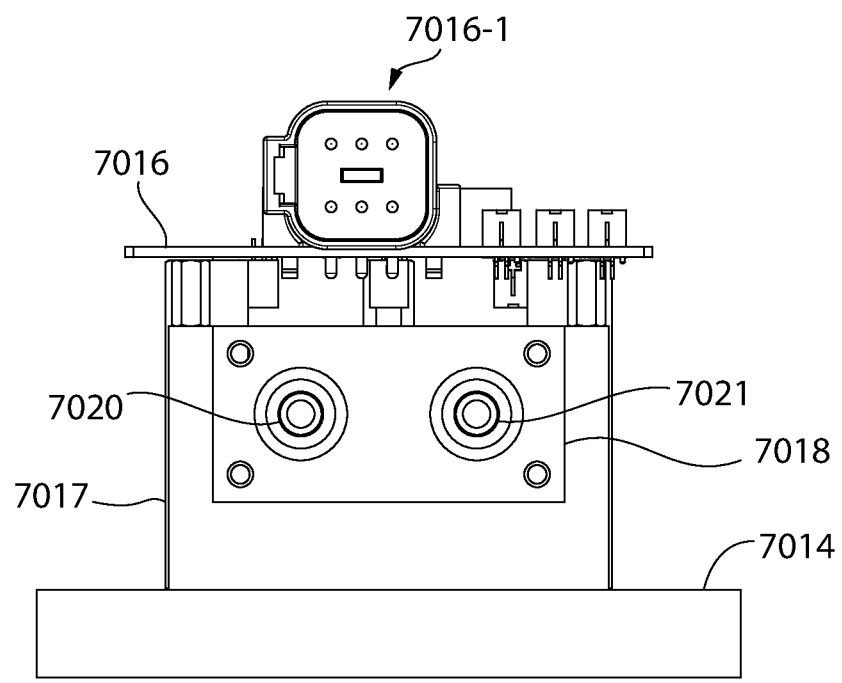
FIG. 6 is a second end view thereof.
Figure 7:
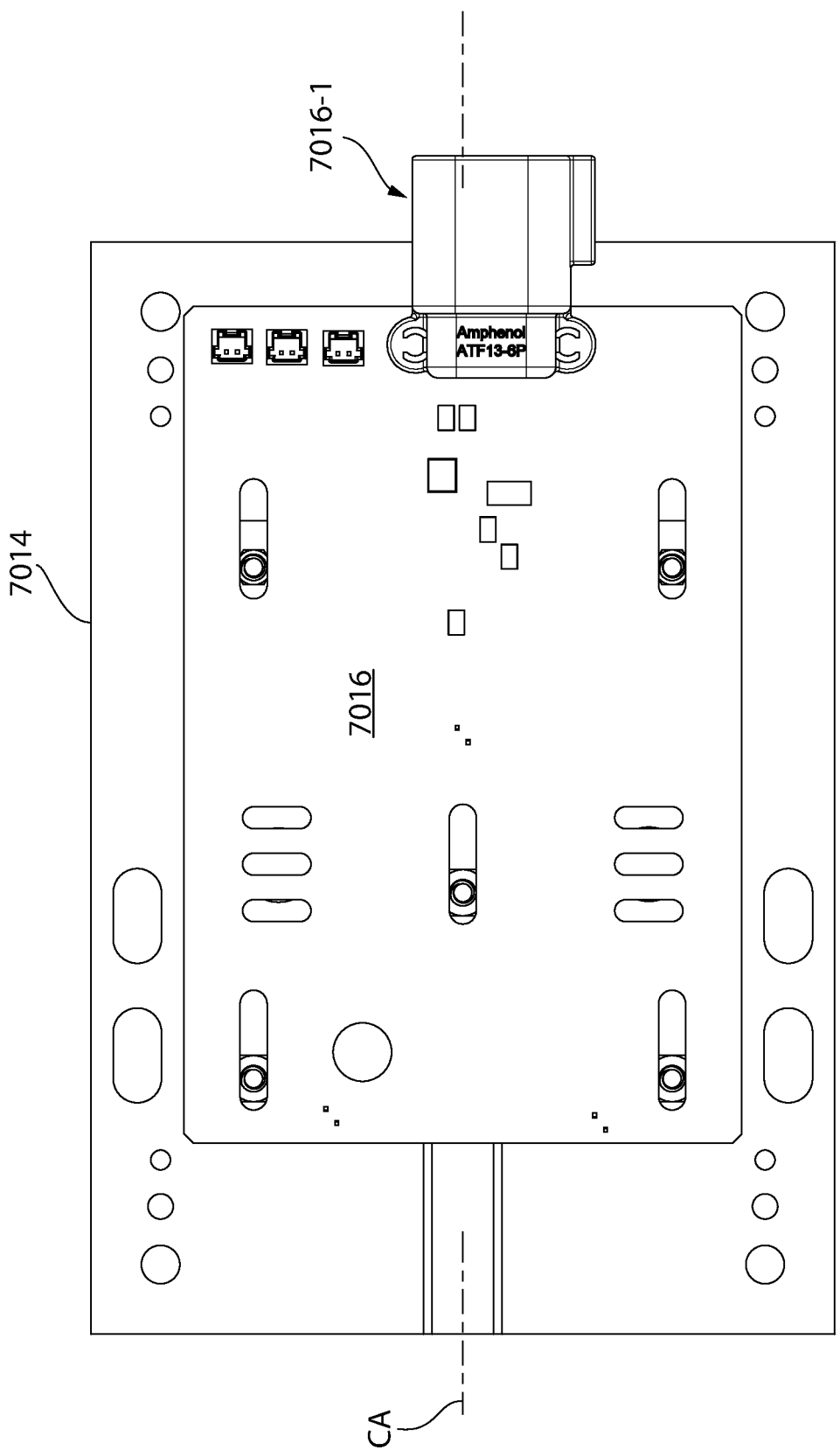
FIG. 7 is top view thereof.
Figure 8:
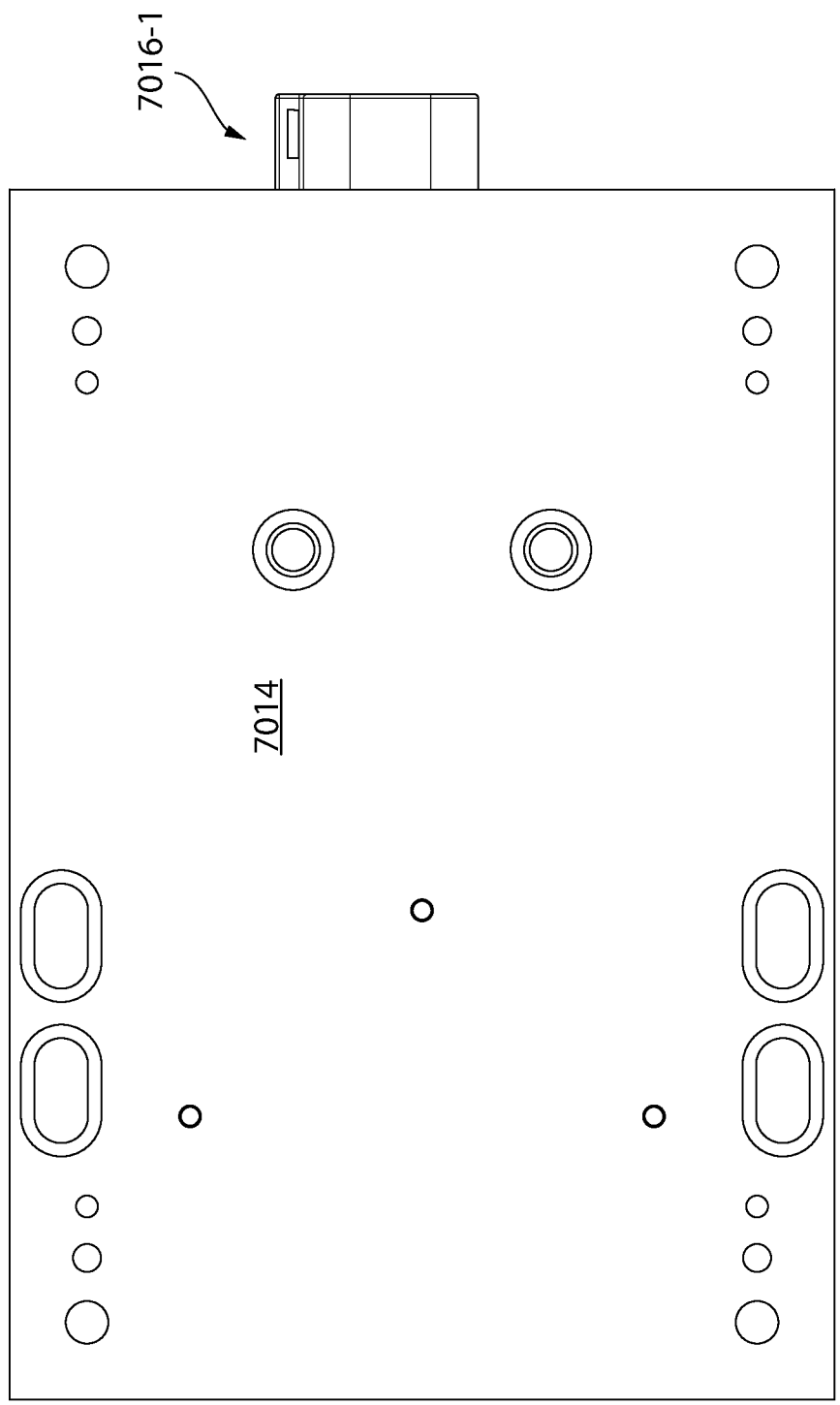
FIG. 8 is a bottom view thereof.
Figure 9:
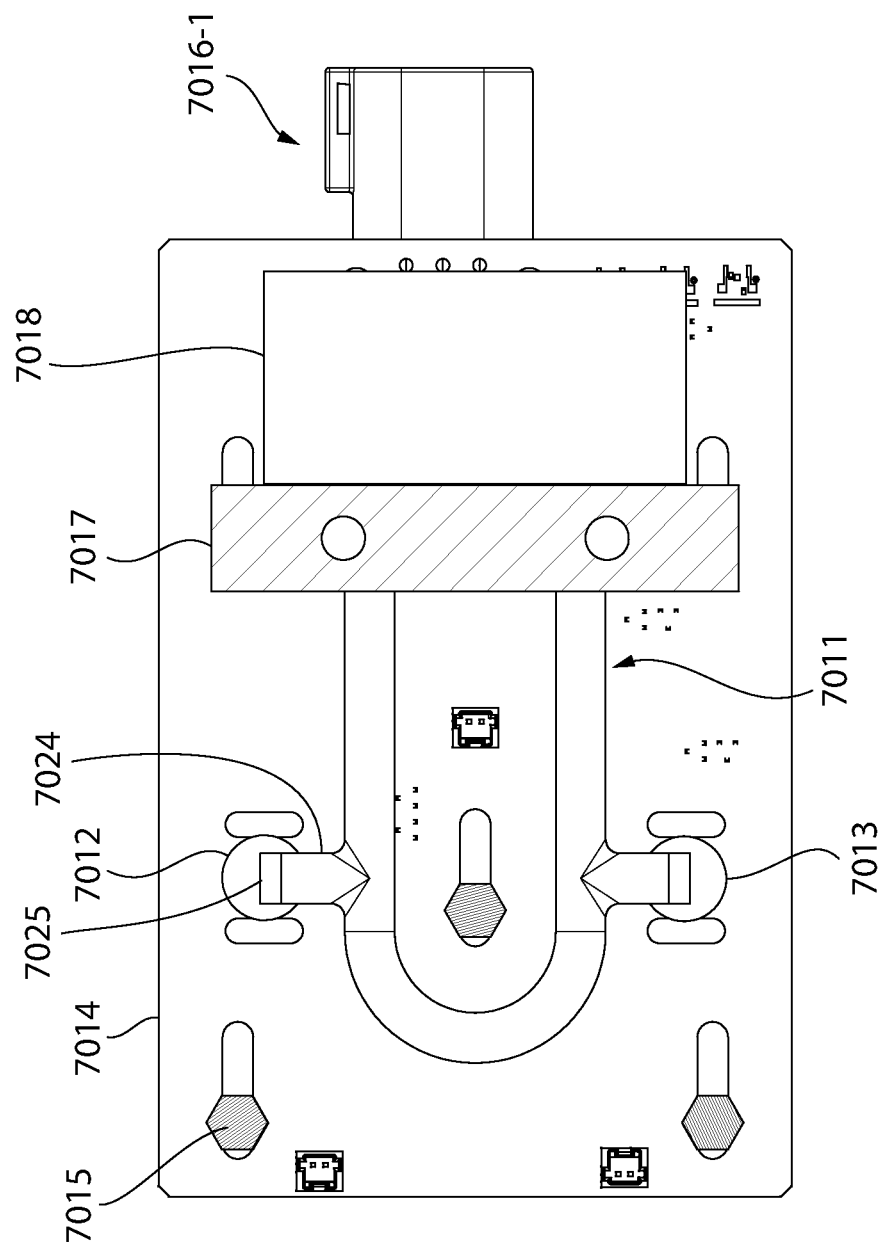
FIG. 9 is a first longitudinal cross sectional view thereof.
Figure 10:
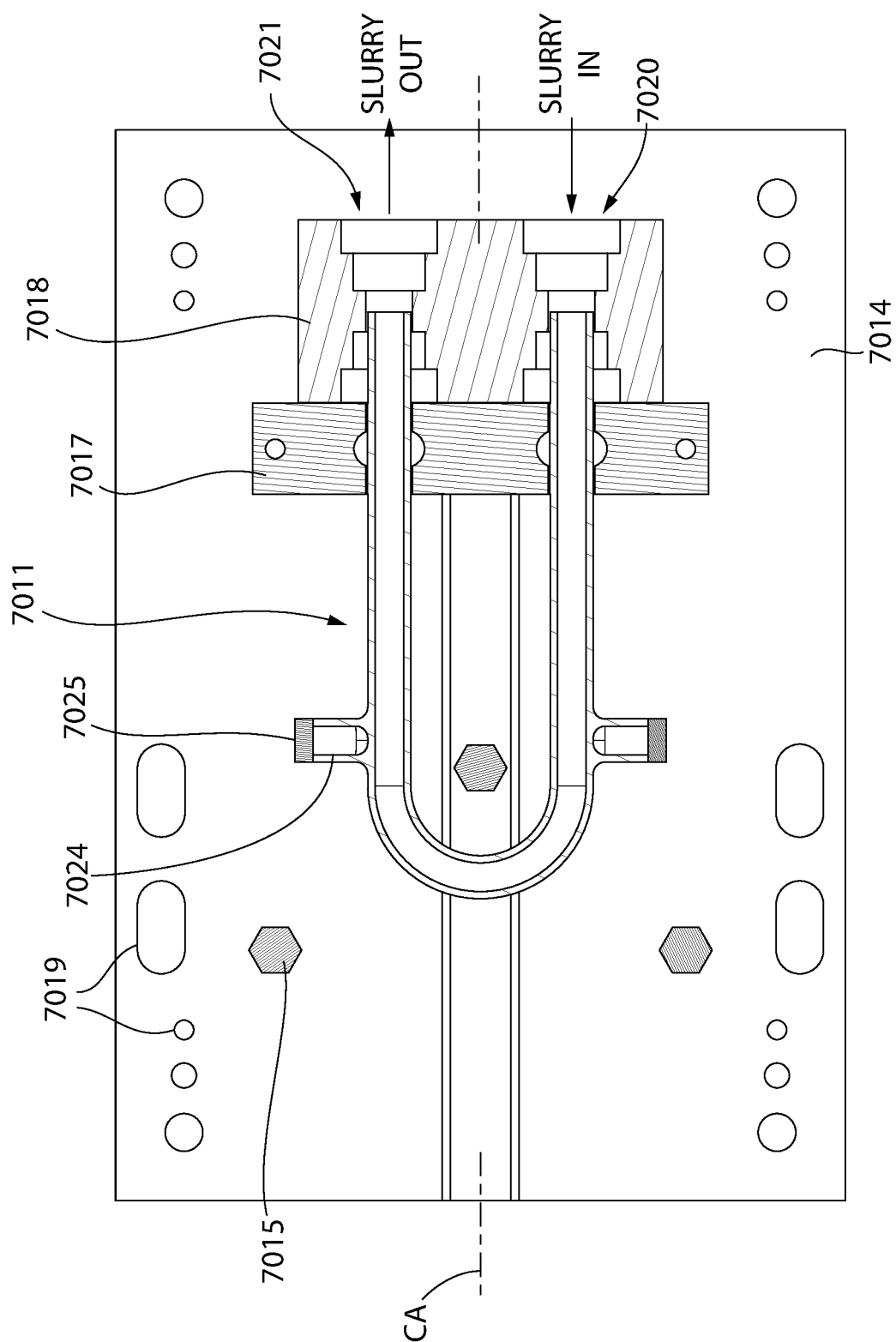
FIG. 10 is a second longitudinal cross sectional view thereof.

In contrast to the first U-shaped oscillator tube 7011 of FIG. 2 first described above, the triple bend recurvant oscillator tube 7032 design is advantageous because the vibration displacement is mirrored between the left and right sides of the tube (i.e. vertical bends 7032-4 bends move towards each other, then away from each other as the tube oscillates). Due to this, there are always equal and opposite forces canceling each other out during oscillation, and thus the vibration is not affected by external influences on mass, stiffness, or damping of the base and other components. The previous straight U-tube oscillator design would propagate vibration into the base easily as the oscillation was not counterweighted, and thus the entire system vibrates somewhat. Since the entire system vibrates, any external influences on the entire systems mass, stiffness, or damping would artificially change the natural frequency, thereby adversely affecting accuracy to some degree. The straight U-tube oscillator nonetheless may be acceptable in situations not subjected to undue external influences.

The remainder of the density measurement device 7010 setup and components are essentially the same as the embodiment utilizing oscillator tube 7011 and will not be repeated here for the sake of brevity.

In some embodiments, a single device which combines the foregoing functions of both frequency transmitter or driver 7012 and receiver or pickup 7013 may be provided in lieu of separate units. Such a device may be an ultrasonic transducer as one non-limiting example. For a combined single driver-pickup device 7012/7013, the device could be activated to excited the oscillator tube 7011, stopped for a few oscillations of the oscillator tube, and then reactivated to measure the resultant oscillation frequency response of the tube. In the combined design, only a single permanent magnet 7025 is required located proximate to the driver/pickup.

Fine Filtration Filter

The filter unit of the fine filtration sub-system 7003 shown in FIGS. 1A and 1B will now be further described. In testing, the inventors have discovered that "fine" filtering (e.g. 0.010 inches/0.254 mm) directly out of the mixer-filter apparatus can in some situations adversely and significantly affect the ability to obtain a consistent water to soil ratio (e.g. 3:1) across all types of soils which might be encountered, sampled, and tested. Accordingly, it is beneficial to understand and measure the density of the mixed raw soil sample slurry from the mixer-filter apparatus 100 before performing fine filtering. Accordingly, preferred but non-limiting embodiments of the disclosed agricultural sample analysis systems 7000 comprise both a coarse filter 146 upstream of density measurement device 7010, and a fine filter 7050 or 7060 downstream of the density measurement device; each of which is described in greater detail below. Two different exemplary configurations of the agricultural sample analysis system comprising this two-stage slurry filtering are disclosed; one with slurry recirculation from the fine filter unit back to the mixer-filter apparatus 100 shown in FIG. 1B and one without recirculation shown in FIG. 1A further discussed herein.

The agricultural sample analysis system utilizes a first coarse filter 146 having a very coarse screen (e.g. about 0.04-0.08 inch/1-2 mm maximum particle size passage in one possible implementation) to initially screen and filter out larger size stones, rocks and aggregate from the slurry to avoid clogging/plugging of the flow conduit (tubing) lines upstream of microfluidic processing disk 310 while still permitting an accurate density measurement in density measurement device 7010. Coarse filter 146 may be incorporated into mixer-filter apparatus 100 in one embodiment as previously described herein, or may be a separate downstream unit. This coarse filtering is followed by fine filtering in fine filter units 7050 or 7060 having fine screening (e.g. less than 0.04 inch/1 mm, such as about .010 inch/0.25 mm maximum particle size passage in one possible implementation) to allow the agricultural slurry sample to pass through the microfluidic flow network and components of the analysis processing wedges 312 of microfluidic processing disk 310 shown in FIGS. P-96 to P-121 without causing flow obstructions/plugging. For soil, these extremely small particles passed by the fine filter unit make up the vast majority of the nutrient content of the soil, so it is acceptable to use finely filtered slurry for the ultimate chemical analysis in the system. It bears noting that the fine filtering step and filter units 7050, 7060 are useable and applicable to slurries comprised of other agricultural materials to be sampled (e.g. vegetation, manure, etc.) and thus not limited to soil slurries alone.

FIGS. 17-21 show a first embodiment of a fine filter unit 7050 useable with either of the soil slurry preparation and analysis systems shown in FIGS. 1A-B. Fine filter unit 7050 is configured for particular use with the slurry recirculation setup of FIG. 1B which includes a closed recirculation flow loop 7059 between the fine filter unit 7050 (or 7060) and mixer-filter apparatus 100 as shown.

Figure 21:
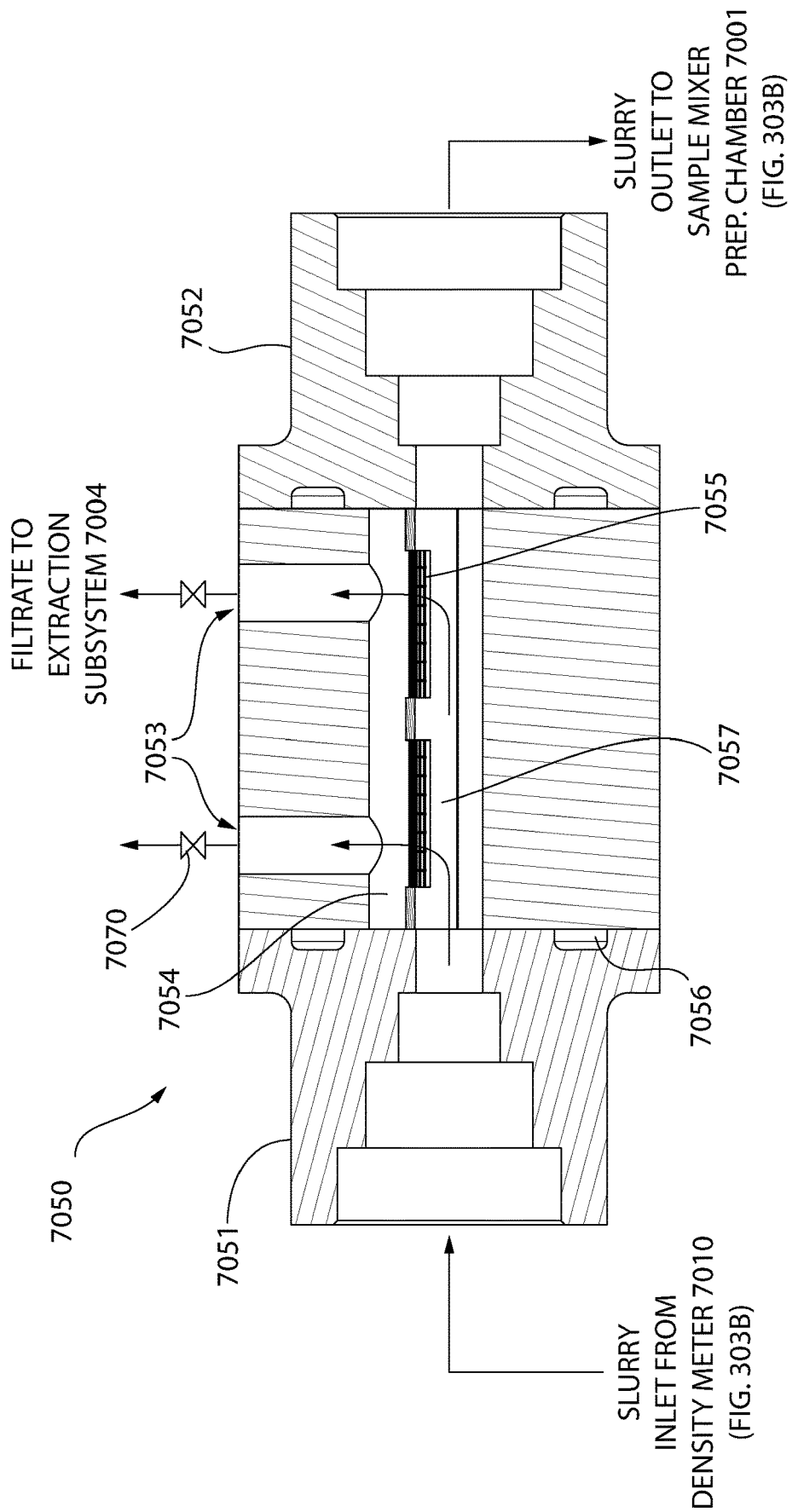
FIG. 21 is a side cross-sectional view thereof.
Figure 22:
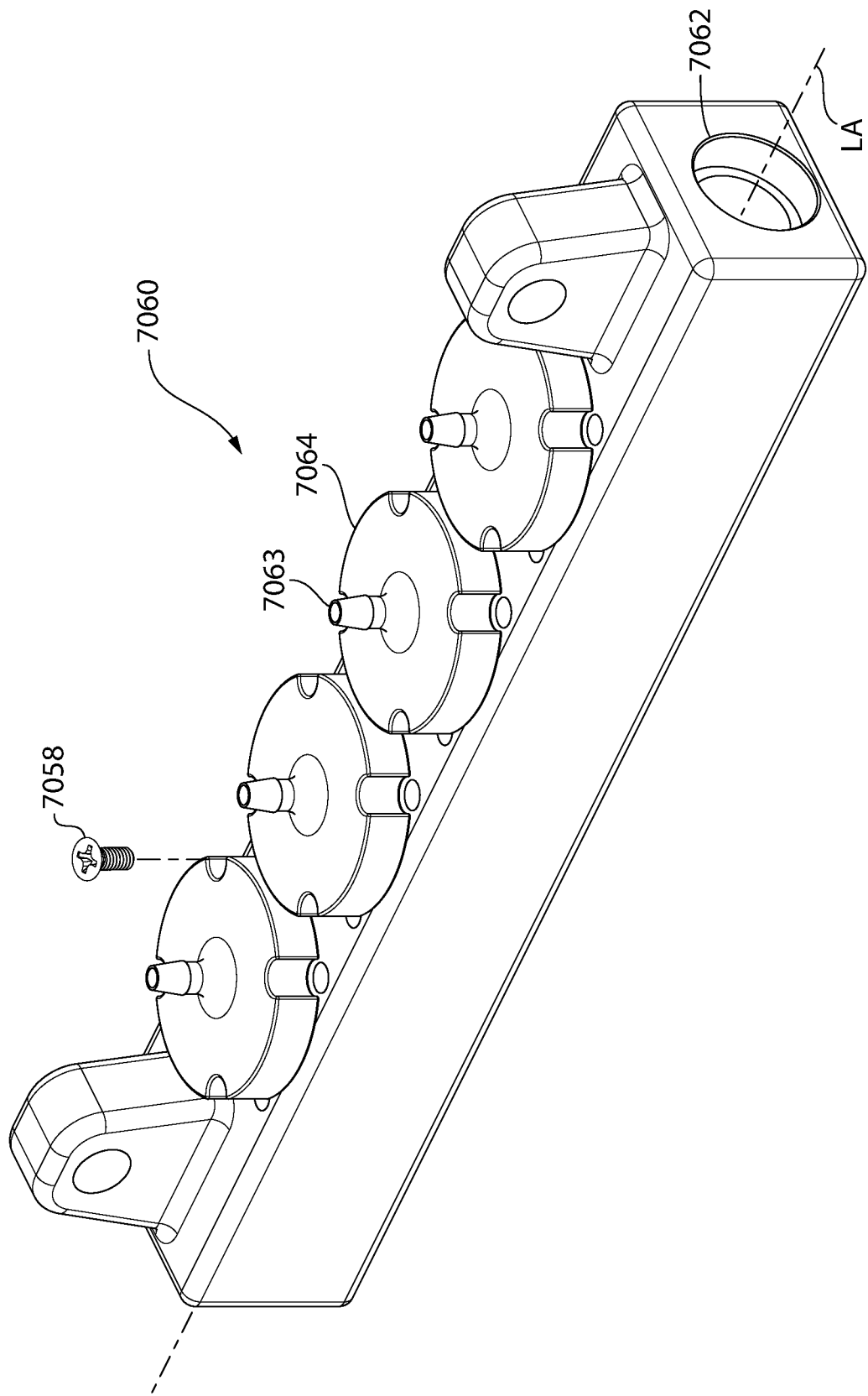
FIG. 22 is a first perspective view of a second embodiment of a fine filter unit.
Figure 23:
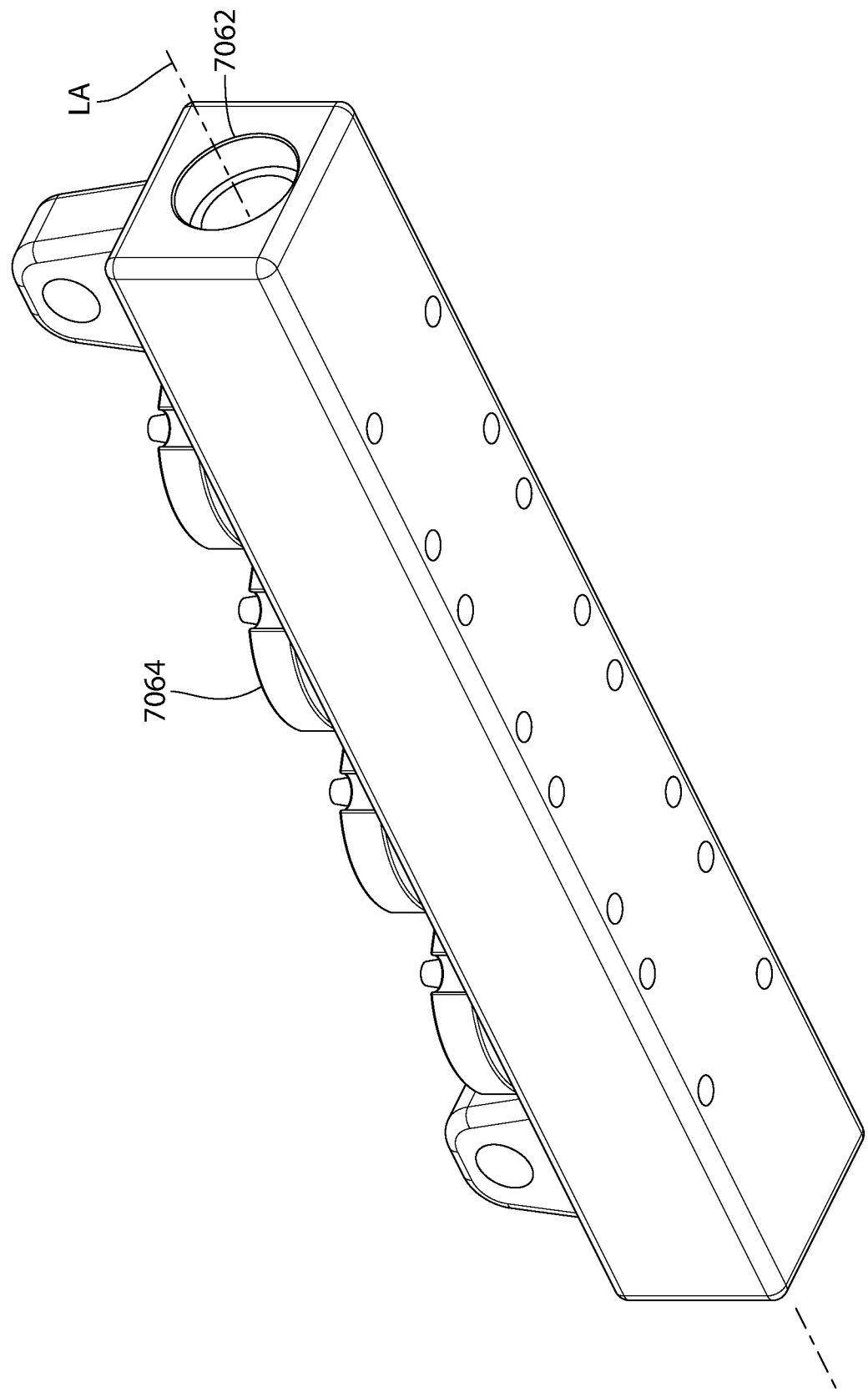
FIG. 23 is a second perspective view thereof.
Figure 24:
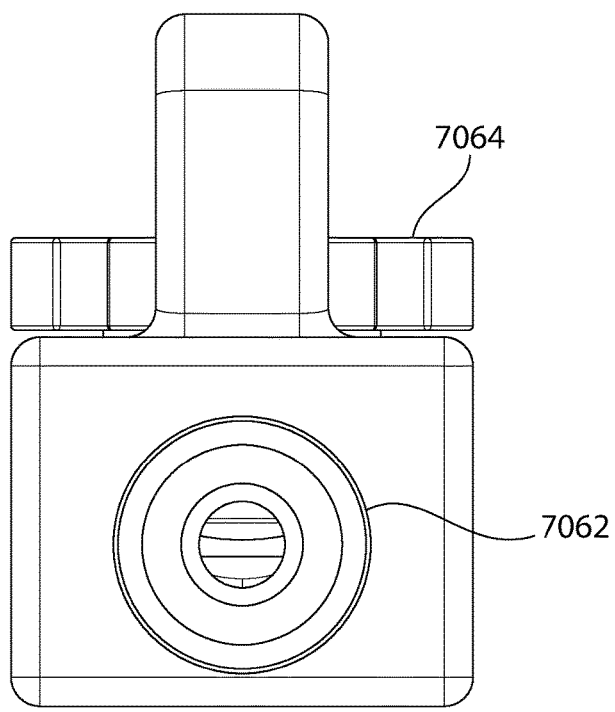
FIG. 24 is an end view thereof.
Figure 25:
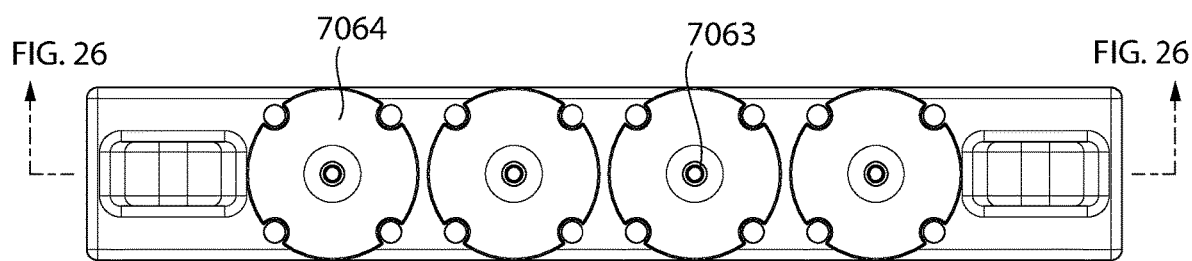
FIG. 25 is a top view thereof.

Filter unit 7050 comprises a longitudinal axis LA, pre-filtered slurry inlet nozzle 7051, pre-filtered slurry outlet nozzle 7052, plural filtrate outlets 7053 (post-filtered), internal pre-filtered slurry chamber 7057, internal filtrate chamber 7054, and one or more filter members such as screens 7055 arranged between the chambers. Screens 7055 may be arcuately shaped in one embodiment and positioned at the top of the slurry chamber 7057 as best shown in FIG. 21. Any number of screens may be provided. A pair of annular seals 7056 fluidly seals the inlet and outlet nozzles 7051, 7052 to the main body of the filter unit to allow initial placement of the filter screen 7055 inside the filter unit before securing the inlet and outlet nozzles to the body. The main body may be block-shaped, cylindrical, or another shape. The nozzles may be uncoupled from the central main filter body in order to access the interior of the filter unit and initially install or periodically replace the screens. Threaded fasteners 7058 or other suitable coupling means may be used to couple the inlet and outlet nozzles to the opposing ends of the main body. The slurry inlet and outlet nozzles 7051, 7052 may have any suitable configuration in order to accept any suitable type of tubing connector to fluidly couple the system slurry tubing 7088 to the filter 7050. One non-limiting example of tubing connector that could be used is John Guest plastic half cartridge connector which is commercially-available. Other tubing connectors may be used. Any suitable non-metallic (e.g. plastic) or metallic materials may be used to construct filter unit 7050 including screens 7055. In one embodiment, the main body of the filter unit may be plastic and the screens 7055 may be metallic such as gridded mesh defining mesh openings.

In operation and describing the slurry flow path through fine filter unit 7050 with respect to FIG. 1B, unfiltered slurry flows in sequence (upstream to downstream) from the coarse filter 146 through density measurement device 7010 and enters the fine filter unit through the inlet nozzle 7051. The slurry flows axially and linearly through pre-filtered slurry chamber 7057, and then exits the filter through outlet nozzle 7052 back to mixer-filter apparatus 100 (see, e.g. "sample prep. chamber" in FIG. 1B). A slurry recirculation pump 7080 may be provided to fluidly drive the recirculation flow in the closed recirculation flow loop 7059 and return the yet to be fine filtered slurry back to the mixer-filter apparatus. Any suitable type of slurry pump may be used. The recirculation pump may be omitted in some embodiments if the main slurry pump 7081 provides sufficient fluid power to drive the slurry flow through the entire closed recirculation flow loop 7059. The system continuously recirculates the coarsely filtered slurry back into the main blending chamber of the mixer for a period of time. This recirculation can advantageously help with getting a homogeneous slurry mixture more quickly for analysis than with the mixer alone by continuously recycling the slurry through the mixer and coarse filter in the closed recirculation flow loop 7059. During density measurement, water is automatically metered and added to the mixer-filter apparatus 100 by the previously described control system 2800 (including programmable controller 2820) based on the system monitoring the slurry density measured by density measurement device 7010, which is operably coupled to the controller in order to achieve the preprogrammed water to soil ratio. The slurry is better mixed by this continuous slurry recirculation.

Once a coarsely filtered homogeneous slurry having the desired water to soil ratio is achieved, a small minority portion of the recirculating slurry stream may be bypassed and extracted from fine filter unit 7050 for initial processing in analyte extraction sub-system 7004 and subsequent chemical analysis (see, e.g. FIG. 1B). The extracted slurry flows transversely through filter screens 7055 and into filtrate chamber 7054, and then outwards through the filtrate outlets 7053 to the analyte extraction sub-system. The flow of extracted slurry may be controlled by suitable control valves 7070 changeable in position between open full flow, closed no flow, and throttled partially open flows therebetween if needed. Valves 7070 may be manually operated or automatically operated by controller 2820 to open at an appropriate time once homogenous slurry having the desired water to soil ratio has been achieved, or as otherwise preprogrammed. Additional valves may also be used to open flow to water in order to backflush the filter during the cleaning cycle in preparation for the next sample.

Although two filtrate outlets 7053 are shown in FIGS. 17-21, other embodiments may have more than two filtrate outlets or less (i.e. one outlet). Each filtrate outlet 7053 is fluidly coupled to and supplies fine filtered slurry (filtrate) to a separate one of the dedicated soil sample slurry processing and analysis trains or systems previously described herein (e.g. analysis processing wedges 312 shown in FIGS. P-96 to P-121 or another); each train fluidly isolated from others and configured for quantifying the concentration of a different analyte of interest (e.g. plant nutrients such as nitrogen, phosphorus, potassium, etc.) in parallel.

It bears noting that the term "pre-filtered" used above only refers to the fact that the soil slurry has not been filtered yet with respect to the fine filter unit 7050 being presently described. However, the slurry may have undergone previous filtering or screen upstream however such as in coarse filter 146 seen in FIGS. 1A-B. Accordingly, the slurry may be filtered before reaching fine filter unit 7050 downstream.

Fine filter unit 7050 is configured to eliminate the passage of soil or other particles in the slurry which cause blockages in or otherwise obstruct the extremely small diameter microfluidic flow passages/conduits and microfluidic processing disk flow components such as valves, pumps, and chambers formed within the analysis processing wedges 312 of microfluidic processing disk 310 shown in FIGS. P-96 to P-121 and previously described herein. Accordingly, filter screens 7055 of fine filter unit 7050 are sized to pass soil particles compatible with the microfluidic processing disk and smaller in size than those screened out by the upstream coarse filter 146 associated with the mixer-filter apparatus. The filter screens 7055 have a plurality of openings each configured to remove particles greater than a predetermined size from the slurry to yield the filtrate. Screens 7055 may be formed of a grid-like metallic mesh in one embodiment which defines the mesh openings for filtering the slurry.

Accordingly in one preferred embodiment, the first coarse filter 146 of the system is configured to pass slurry having a first maximum particle size, and the second fine filter unit 7050 is configured to pass slurry having a second maximum particle size smaller than the first maximum particle size. Furthermore, the ultrafine filtration sub-system 7005 which comprises the third ultrafine filter 5757 (which may be incorporated into or associated with microfluidic processing disk 310 or associated with soil sampling system 3000) is configured to pass slurry having a third maximum particle size smaller than the first and second maximum particle sizes. As previously described herein, the ultrafine filter 5757 is micro-porous filter which can replace the centrifuge 331 and is configured to produce the clear filtrate from the soil slurry and extractant mixture which serves as the supernatant for chemical analysis. Accordingly, the performance of ultrafine filter 575 surpasses both the coarse and fine filters in terms of the smallest maximum passable particle size. As a non-limiting example, representative pore sizes that may be used for ultrafine filter 575 is about and including 0.05 µm to 1.00 µm. It bears noting that the foregoing terms "first," "second,", and "third" are used to connote the filter units which the slurry encounters in sequence flowing from upstream to downstream when passing through the systems shown in FIGS. 1A-B. Accordingly, the maximum slurry particle size continuously gets smaller as the slurry passes through each filter unit in sequence.

In an ordinary filter operation, all flow is directed through the screen and anything that does not pass through the screen stops on the screen and builds up. This requires the screen to be either drained or back-flushed after a period of time to keep it clean and functional for its purpose. If a lot of particulate material needs to be filtered out, this may lead to a very short time period for which the filter will work properly before needing cleaning. For this reason, the new screen fine filter units 7050, 7060 were designed which operate on the principle of extracting only a small amount soil slurry for testing from the main slurry recirculation flow path as described above instead of intercepting all of the slurry flow for fine filtering. Doing this advantageously enables the filter to stay clean for a much longer period of time because only a minority portion of the slurry flow is extracted and travels through the screen transversely to the main direction of the slurry flow through the filter unit. In addition, the main slurry flow path which preferably is oriented parallel to the plane occupied by the screen 7055 continually scrubs and cleans the filter screens 7055 (see, e.g. FIGS. 20-21) by shearing action of the flow to prevent accumulation of particles on the screens. It further bears noting that the fine filter units 7050 and 7060 advantageously avoids internal areas that have low pressure or flow where particulates can accumulate. It is also desirable to avoid internal surface orientations in the filter in which particulates will accumulate due to gravity. Accordingly, embodiments of fine filter units 7050, 7060 preferably may be oriented such that the filter screens 7055, 7065 respectively are above the main flow and juncture where the bypass slurry flow is drawn off for chemical analysis and preferably in a transverse direction to the main flow path of slurry through the filter bodies (see, e.g. FIGS. 21 and P-238).

FIGS. 22-26 shows the second embodiment of a fine filter unit 7060 noted above. Fine filter unit 7060 comprises a plurality of optionally replaceable filter screen assemblies or units 7068. In this embodiment by contrast to fine filter unit 7050, the filter screen units can be removed and replaced without breaking the end fluid connections to the system tubing/piping, thereby greatly facilitating periodic changeout of the screens over time. Filter unit 7050 has internally mounted screens 7055, which can be accessed by removing the slurry inlet and outlets nozzles 7051, 7052 as previously described herein. In some embodiments, filter screen units 7068 may be constructed to be disposable such that a new screen unit is interchanged with the used plugged screen units when needed.

Fine filter unit 7060 has an axially elongated main body which defines a longitudinal axis LA, a pre-filtered slurry inlet 7061, pre-filtered slurry recirculation outlet 7062, plural filtrate outlets 7063 (post-filtered), internal pre-filtered main slurry chamber 7067 in fluid communication with the inlet and outlet, and plurality of filter screen units 7068 each comprising a filter member such as screen 7065 arranged between the chamber 7067 and one filtrate outlet 7063. Inlet 7061 and outlet 7062 may preferably be located at opposite ends of the fine filter unit body at each end of chamber 7067, thereby allowing the main slurry chamber to define a slurry distribution manifold in fluid communication with each filtrate outlet 7063. Screens 7065 may be convexly curved and dome shaped in some embodiments (best shown in FIG. 26). The main slurry chamber 7067 extends axially between the inlet and outlets 7061, 7062 beneath the screen units 7068. Fine filter unit 7060, albeit convexly shaped, may be used in the orientation shown such that portions of the screens 7065 exposed to the slurry in main slurry chamber 7067 may be considered substantially horizontally oriented and parallel to longitudinal axis LA and the axial flow of slurry through the main slurry chamber screens. Flow through the screens is further in an upward direction (transverse to longitudinal axis LA and the axial slurry flow in the chamber) when the fine filter unit 7060 is used in the preferred horizontal position. This combines to advantageously both: (1) scrub and clean the screens 7065 as the slurry flows past the screens in the slurry chamber 7067 thereby preventing accumulation of slurry particles on the screens until the filtrate is extracted, and (2) counteracts the affects of gravity for accumulating particulate on the screens since the slurry enters the screens from the bottom thereby keeping the particles below the screens until filtrate extraction occurs.

Fine filter unit 7060 is axially elongated such that the screen units 7068 may be arranged in a single longitudinal array or row as shown so that the main slurry chamber 7067 is linearly straight to avoid creation of internal dead flow and lower pressure areas in the slurry flow path where particulate in the slurry might accumulate.

Figure 26:
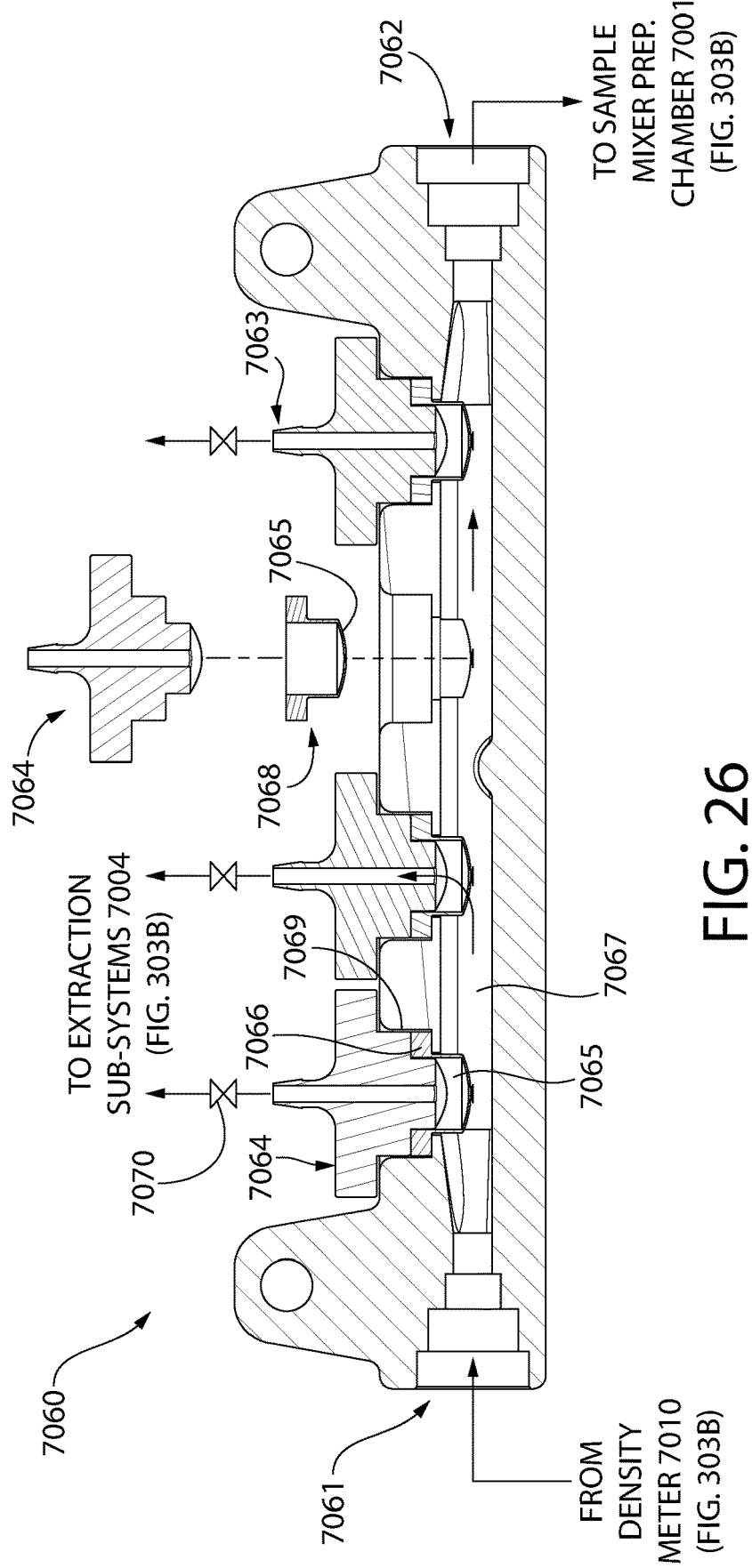
FIG. 26 is side cross sectional view thereof.

An annular seal 7066 which may be elastomeric washers in one embodiment may be incorporated directly into each filter screen unit 7068 as part of the assembly to fluidly seal the screen unit to the main body of the filter unit. Screen unit 7068 may have a cup-shaped configuration in one embodiment (best shown in FIG. 26) with the convexly curved dome-shaped screen 7065 protruding outwards/downwards from one side of the seal 7066 into the main slurry chamber 7067. Each screen unit 7068 is received in a complementary configured upwardly open receptacle 7069 formed in the main body of the filter unit 7060 which fluidly communicates with the main slurry chamber 7067 of the filter unit. A screen retainer 7064 may be detachably coupled to the filter unit main body and received at least partially in each receptacle to retain each screen unit as best shown in FIG. 26. The main body may be block-shaped, cylindrical, or another shape. The filtrate outlets 7063 may an integral unitary structural portion of the screen retainers 7064 in one embodiment, and can be terminated with a conventional tubing barb in some embodiments as shown to facilitate coupling to the flow conduit tubing of the system. Other type fluid end connections may be used. Filtrate outlets 7063 extend completely through the retainers from top to bottom (segment. FIG. 26). Retainers 7064 may have a generally stepped-shape cylindrical configuration in some embodiments. Threaded fasteners 7058 or other suitable coupling means may be used to removably couple the retainers 7064 to the main body of the filter unit. The retainers 7064 trap the filter screen units 7068 in the receptacles 7069. Any suitable non-metallic (e.g. plastic) or metallic materials may be used to construct filter unit 7060 including screens 7065. In one embodiment, the main body of the filter unit may be plastic and screens 7065 may be metallic.

Similarly to filter unit 7050 and screens 7055, the screen units 7068 have screens 7065 each configured to remove particles greater than a predetermined size from the slurry to produce the filtrate. The filter screens 7065 thus have a plurality of openings each configured to pass slurry having a predetermined maximum particle size. Screens 7065 may be formed of a grid-like metallic mesh in one embodiment which defines the mesh openings for filtering the slurry. Other embodiments of screens 7065 or 7055 may use polymeric meshes. Other type filter media may be used in other possible embodiments to perform the desired slurry screening.

An exemplary process for exchanging filter screen units 7068 includes removing the threaded fasteners 7058, withdrawing the retainers 7064 from each receptacle 7069 transversely to the longitudinal axis LA of the filter unit main body, withdrawing the filter screen units transversely, inserting new screen units transversely to the longitudinal axis LA into each receptacle, re-inserting the retainers into the receptacles, and reinstalling the fasteners.

An overview of one non-limiting method for preparing an agricultural sample slurry using the slurry recirculation and dual filtering generally comprises steps of: mixing an agricultural sample with water in a mixing device to prepare a slurry; filtering the slurry a first time; measuring a density of the slurry; recirculating the slurry back to the mixing device; and extracting a portion of the recirculating slurry through a secondary fine filter to obtain a final filtrate. Filtering the slurry the first time passes slurry comprising particles having a first maximum particle size, and filtering the slurry the second time passes slurry comprising particles having a second maximum particle size smaller than the first maximum particle size. The final filtrate then flows to any of the agricultural sample analysis systems discloses herein which are configured to further process and measure an analyte in the slurry.

It bears noting that both fine filter units 7050 and 7060 may be used with the agricultural sample analysis system of FIG. 1A without slurry recirculation by simply closing the respective recirculation outlet nozzles via a plug or a closed valve fluidly coupled to the outlet nozzle. Alternatively, the slurry could flow to waste after passing through the fine filter. In this case, the filtrate would need to be extracted from the slurry while it is flowing through the filter.

Figure 27:
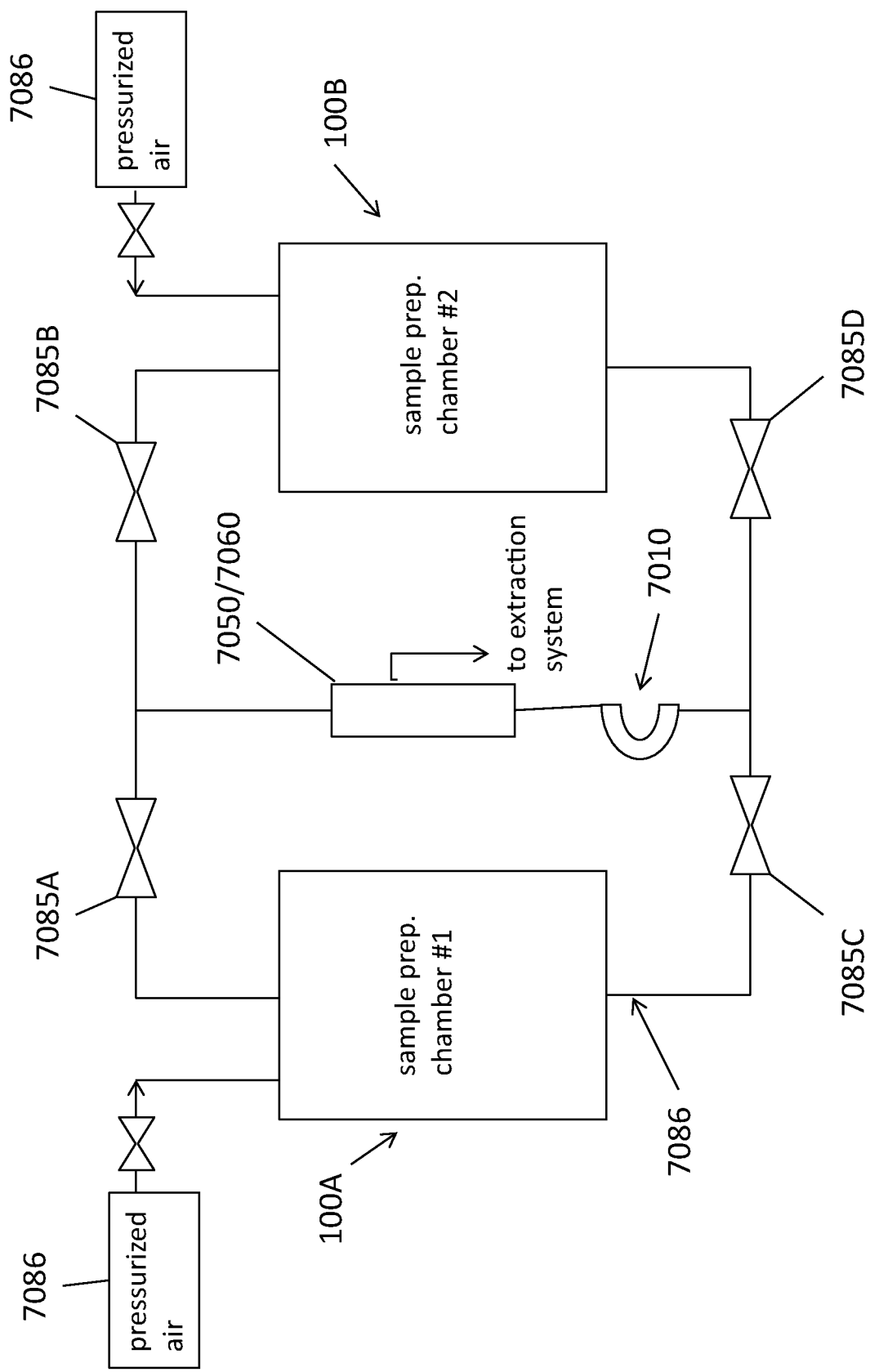
FIG. 27 is a schematic diagram of a pump-less system for blending a soil slurry using pressurized air.

In lieu of the pump recirculation system of FIG. 1B, FIG. 27 is a schematic diagonal showing an alternative equipment layout and method for recirculating the coarsely filtered slurry through fine filter units 7050 or 7060 using pressurized air instead. Two blending chambers are fluidly coupled to the inlet and outlet of a fine filter unit 7050 or 7060 as shown by the flow conduit network layout which may be piping or tubing 7086 shown. At least one of the blending chambers may be provided by mixer-filter apparatus 100A for initially preparing the water and soil slurry. The other blending chamber may be an additional mixer-filter apparatus 100B, or alternatively simply an empty pressure vessel. Four slurry valves 7085A, 7085B, 7085C, and 7085D are fluidly arranged between the fine filter unit and each of the chambers as shown for controlling the direct of the slurry during blending. In operation, if the slurry is first prepared in mixer-filter apparatus 100A (sample prep. chamber #1), valves 7085B and 7085C are opened, and valves 7085A and 7085D are closed. Mixer-filter apparatus 100A is pressurized with air from valved pressurized air source 7086 which causes the slurry to flow through density measurement device 7010 and the fine filter unit 7050 or 7060 to mixer-filter apparatus 100B. Valves 7085B and 7085C are then closed, and valves 7085A and 7085D are opened. Mixer-filter apparatus 100B is then pressurized causing the slurry to flow in a reverse direction through fine filter unit 7050 or 7060 and density measurement device 7010 back to mixer-filter apparatus 100A. The sequence cycle is repeated multiple times to continue the slurry blending. The valving and pressurized air sources may be operably coupled to and controlled by system controller 2820 pressure, which may be programmed to cause this back and forth flow to occur very rapidly. The slurry density may be measured continuously each time the slurry flows through the density meter. Once the slurry is thoroughly blended as desired, the filtrate outlets from the fine filter units are opened to direct the filtered slurry to the extraction sub-system 7004 shown in FIG. 1B for processing and chemical analysis. In some embodiments, a single pressurized air source may be used for each mixing chamber in lieu of separate sources. In another embodiment, the second chamber could be mounted directly above the first sample preparation chamber with a valve between. Instead of pressurizing the second chamber, gravity would allow the slurry to flow back down into the first chamber.

System Slurry Flow Conduit Sizing

The internal diameter (ID) of the slurry flow conduit such as slurry tubing 7088 shown in FIGS. 1A-B is critical to proper operation of the agricultural sample analysis systems 7000 without plugging the tubing. When moving slurry with large particles through a small tube, the likelihood of clogging increases. For nearly laminar flow, the velocity at the wall is near zero which may exacerbate clogging. For small tubing, this becomes significant because of high frictional forces on the slurry. If these frictional forces become too significant, particles fall out of the flow and build up in the tubing causing a flow stoppage. Additionally, large particles can wedge with other large particles in a small tube and cause blockages and flow stoppage. However, having very large tubing is problematic because it is difficult to have sufficient flow to keep particles in suspension to prevent soil particle precipitates.

The inventors have discovered that the internal diameter of the slurry tubing 7088 and passages should be designed in such a way that the internal cross sectional diameter is at a minimum two times the largest particle size in the slurry. That is, as an example, if the particles are screened to 2 mm in size (e.g. diameter) by the coarse filter 146 or fine filter units 7050 or 7060, the ID of the tubing should be no less than 4 mm diameter. Conversely, the internal diameter of tubing and passages should be designed in such a way that the cross sectional internal diameter is at most ten times the largest particle size (e.g. diameter). That is, as an example, if the particles are screened to 2 mm in size, the ID of the tubing should be no greater than 20 mm in diameter. Accordingly, the preferred internal diameter of the slurry tubing 7088 has a critical range between at least two times the largest particle size/diameter and no greater than ten times the largest particle size/diameter.

In some embodiments, the tubing material used may preferably be flexible and formed of a fluoropolymer, such as without limitation FEP (fluorinated ethylene propylene) in one non-limiting example. Other fluoropolymers such as PTFE (polytetrafluoroethylene), ETFE (polyethylenetetrafluoroethylene), and PFA (perfluoroalkoxy polymer resin). The dynamic coefficient of friction (DCOF) associated with these fluoropolymers also affects the preferred range of tubing internal diameter discussed above because the tubing material creates frictional resistance to slurry flow. FEP, PTFE, ETFE, and PFA each have a DCOF falling the range between about and including 0.02-0.4 as measured per ASTM D1894 test protocol. Accordingly, the tubing material used for slurry tubing 7088 associated with the above critical tubing internal diameter range preferably also has a DCOF in the range between about and including 0.02-0.4, and more particularly 0.08-0.3 associated with FEP in some embodiments. Testing performed by the inventors confirmed that use of FEP tubing falling within the critical internal tubing diameter range avoided the slurry flow blockage issues noted above. In other possible embodiments, nylon or other type tubing material may be used.

Multiplexed Pneumatic Control System With Pressure-Amplified Control Air Valves

Figure 38:
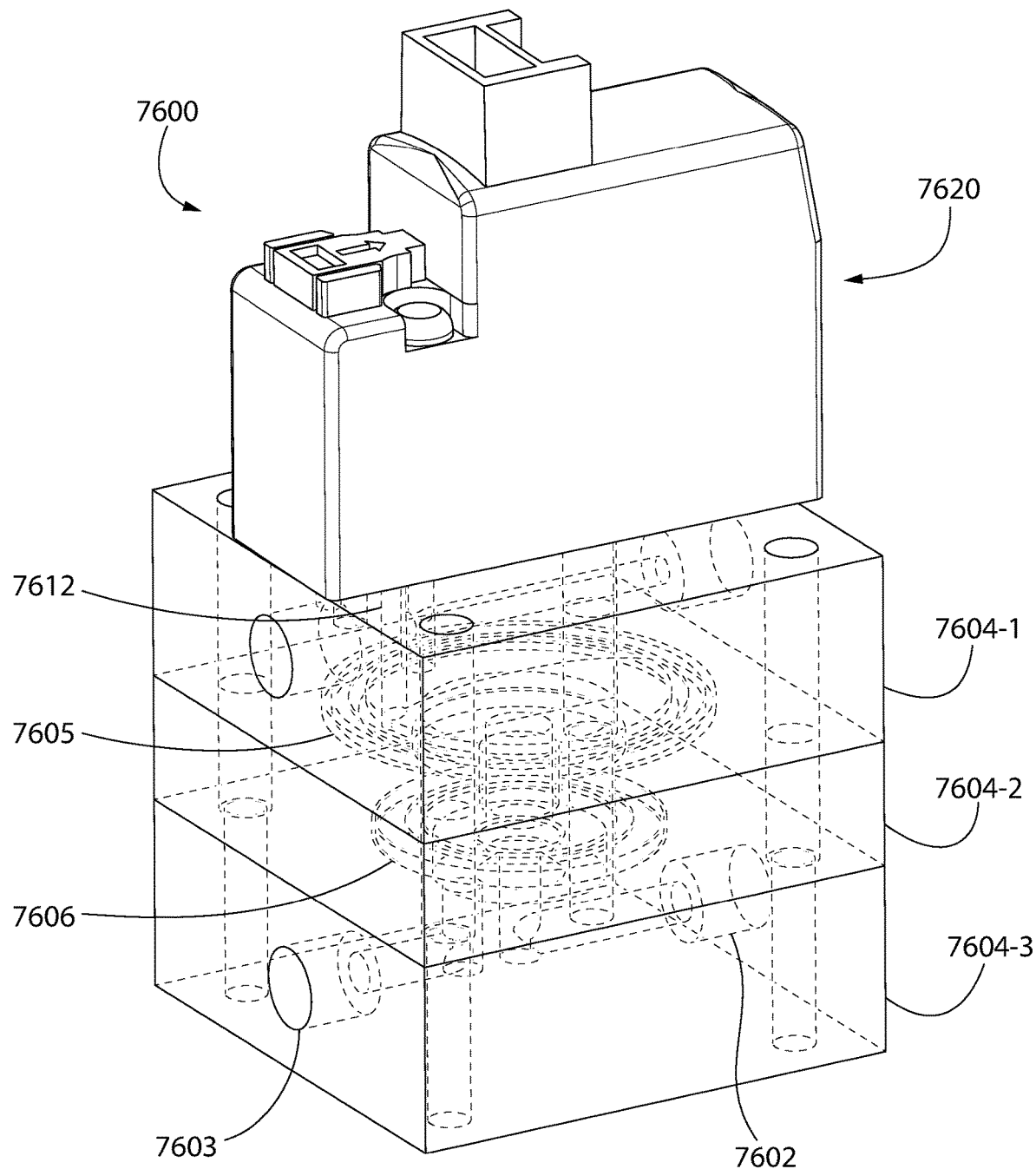
FIG. 38 is a perspective view of a pressure-amplified electro-pneumatic control air valve.
Figure 39:
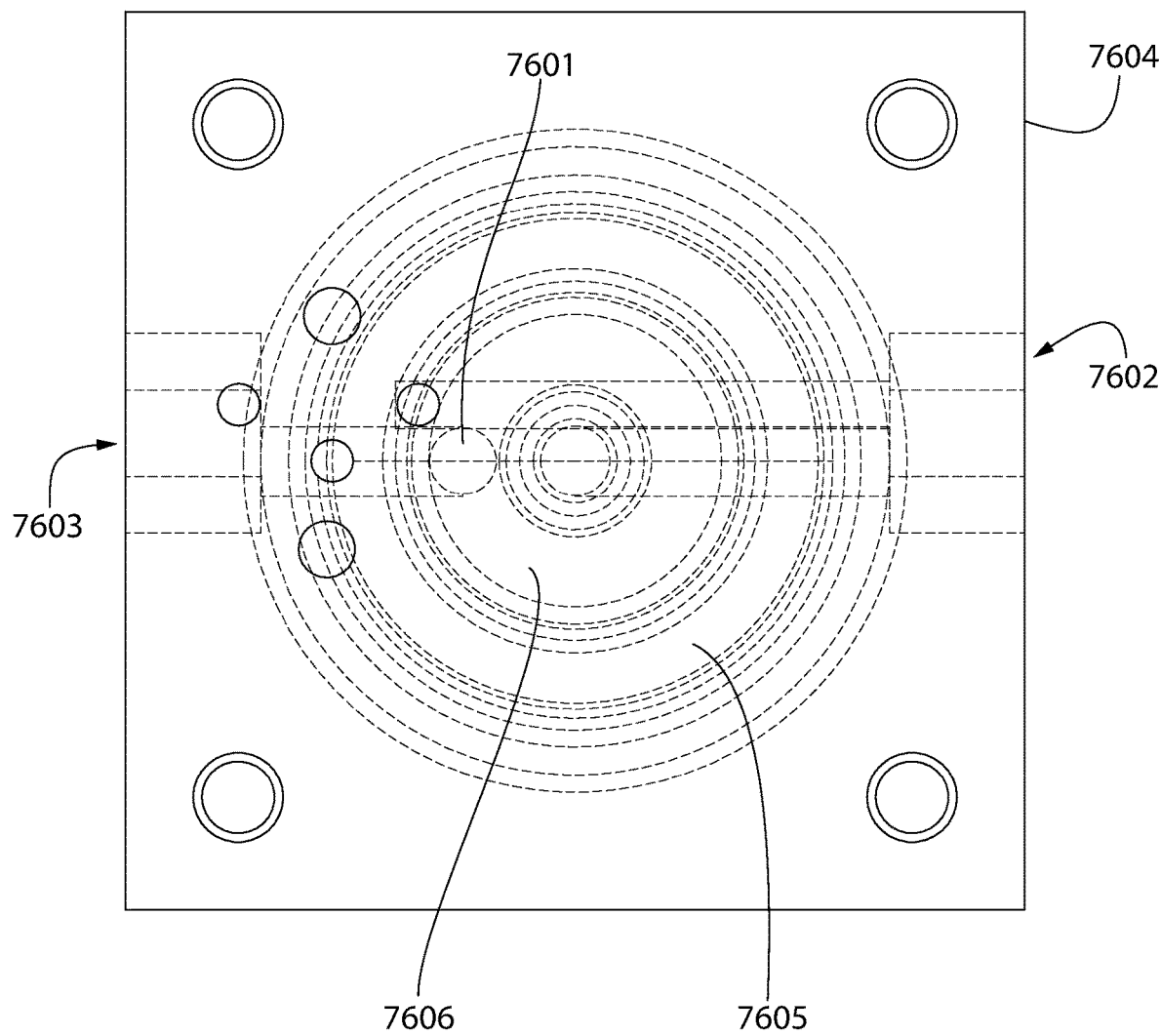
FIG. 39 is a top view thereof.
Figure 40:
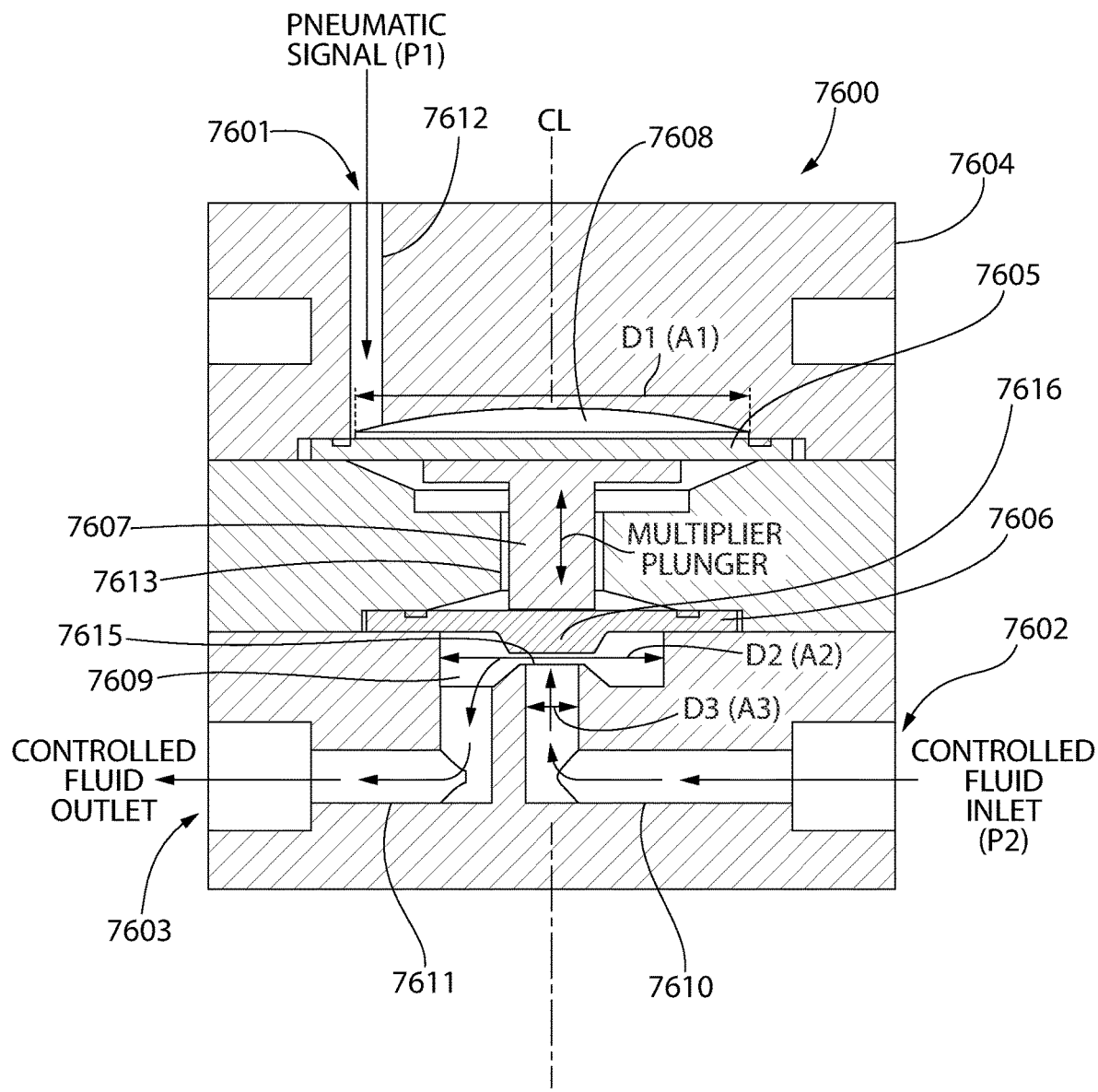
FIG. 40 is a transverse cross-sectional view thereof.

FIGS. 38-40 show a non-limiting embodiment of a pressure-amplified electro-pneumatic control air valve 7600. This valve allows multiplexing with a single electro-pneumatic actuated valve that is shared between similar functions of multiple analyses which can be conducted simultaneously by the slurry processing/analysis systems disclosed herein. As a non-limiting example, when multiple analyses are conducted for different analytes in different slurry processing trains or slurry analysis processing wedges 312 in parallel, each for example using their own associated slurry filter(s) or other flow components in which the slurry or water fluid flow through the component must be controlled (e.g. flow on/flow off), one common pressure pneumatic air signal can be sent to as many filters or flow components as necessary from upstream control air valve 7600 so they all actuate each separate function simultaneously. This advantageously avoids the requirement for multiple more costly electro-pneumatic valves for every single function for each slurry filter or other flow component. Fluid flow for each filter or flow component individual function in the complete slurry processing system may then be controlled by far less expensive air-piloted valve which received the pressure signal from control air valve 7600. Such a system arrangement is described further below in more detail.

With continuing reference to FIGS. 38-40, pressure-amplified electro-pneumatic control air valve 7600 may be a poppet valve in one embodiment as shown. Valve 7600 generally includes valve body 7604, air inlet 7601, fluid inlet 7602 communicating with a fluid inlet passageway 7610, fluid outlet 7603 communicating with fluid outlet passageway 7611, flexible air diaphragm 7608, flexible fluid diaphragm 7606, and multiplier plunger 7607 arranged therebetween. Plunger 7607 is coupled to the diaphragms at each end. The plunger is slideably disposed in central bore 7613 and may be arranged along and parallel to the actuating centerline CL of the valve. Fluid diaphragm 7606 is configured to alternatingly seal the fluid inlet passageway 7610 at valve seating surface 7615 from the fluid outlet passageway 7611. Seating surface 7615 is disposed in fluid chamber 7609 formed between the fluid inlet passageway and fluid diaphragm 7606. An air chamber 7608 is formed on the air-side of air diaphragm 7608 which receives the control air signal from the air inlet passageway 7612 and air inlet 7601. Valve body 7604 may be formed of any suitable non-metallic or metallic material. In one embodiment, the valve body may be plastic. The diaphragms 7605 and 7606 may be formed of any suitable elastomeric material. In some embodiments, as shown, the valve body 7604 may be formed of two or more removably coupled body segments 7604-1, 7604-2, and 7604-3. This allows the internal valve components such as the diaphragms and plunger to be easily assembled. The valve body segments may be fastened together in any suitable manner, such as a threadable coupling via threaded fasteners (not shown—see fastener mounting holes at each corner of valve body) as one non-limiting example. In other possible embodiments, the segments may be permanently coupled together such as via suitable adhesives.

Control valve 7600 may further include an electronic valve actuator 7620 which may be coupled directly to valve body 7604 in some embodiments for forming a compact valve unit. Actuator 7620 is activated and controlled via an electronic control signal transmitted from system controller 2820 (see, e.g. FIG. P-302 and prior description herein) operably coupled to the actuator (see, e.g. FIG. 42 dashed communication links). Control valve 7600 is fluidly coupled to an upstream control air source 7701 and downstream to operating valves of at least one filter such as ultrafine filter 5757 or other flow component of the agricultural slurry analysis system further described below.

Plunger 7607 is axially movable between an unactuated position without application of a control air signal to diaphragm 7608, and an actuated position with application of control air. In the actuated position, the fluid diaphragm 7606 engages valve seating surface 7615 to shut off fluid flow through the valve. This represents the closed position of valve 7600. In the unactuated position, the fluid diaphragm disengages seating surface 7615 to allow flow through the valve as shown in FIG. 40. This represents the open position of the valve.

Pressure amplified pneumatically operated control air valves allows a relatively low pressure air signal to actuate the valve which is controlling and providing downstream pressures that are relatively high. Air diaphragm 7605 is larger in diameter D1 and surface area A1 than diameter D2 and corresponding arear A2 of fluid diaphragm 7606. Fluid inlet passageway 7610 had a diameter D3 and corresponding area A3 at the penetration through the valve seating surface 7615. In one non-limiting example to illustrate the pressure amplification aspects of valve 7600, the air signal pressure P1×air diaphragm area A1=plunger force. Plunger force/A2 is larger than the controlled fluid pressure P2, even when P2 is greater than air signal pressure P1. Once the valve is closed, the valve is capable of holding back fluid at upstream fluid inlet pressures up to P1×A1/A3.

Figure 42:
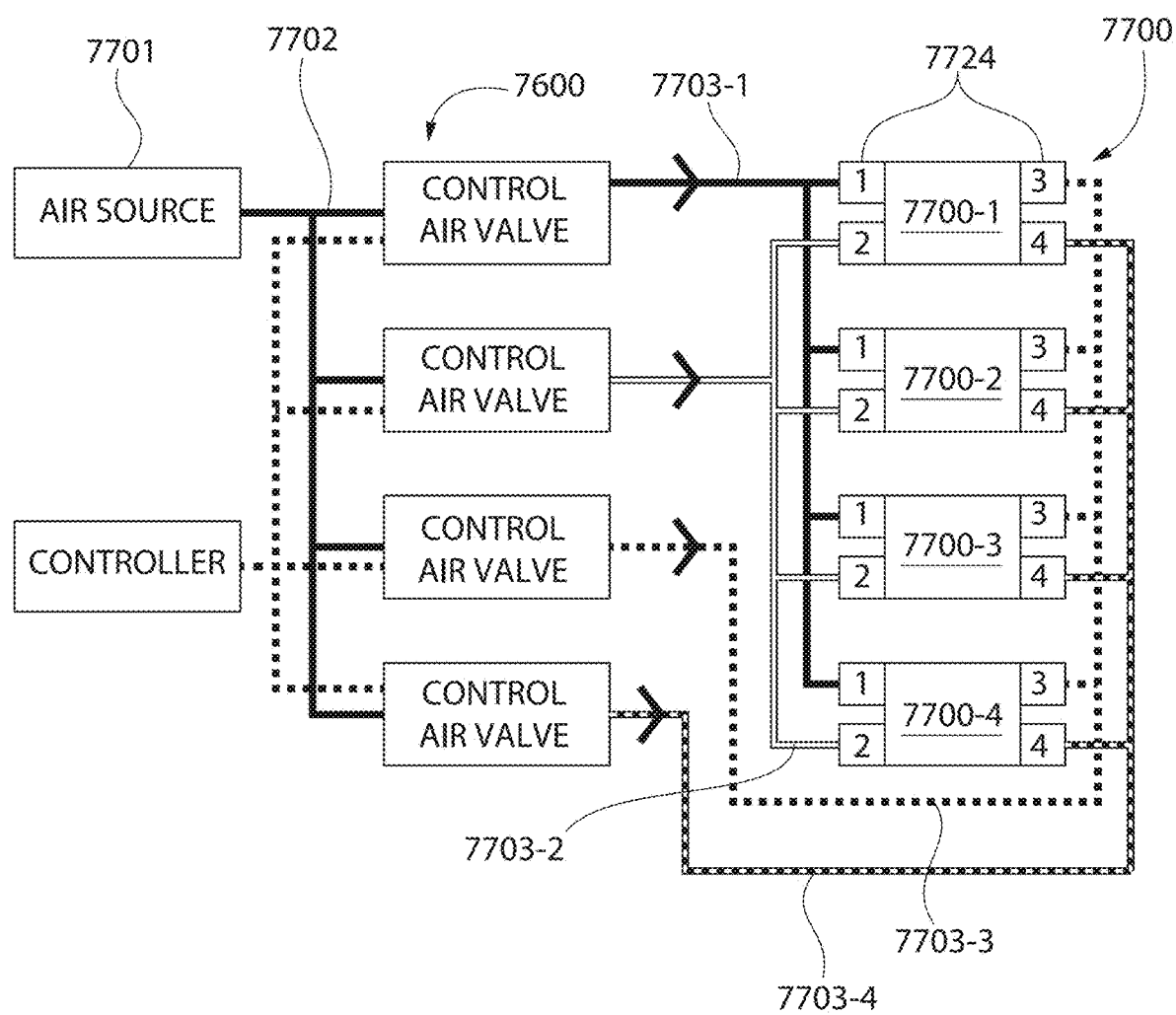
FIG. 42 is a schematic diagram of a multiplexed control air system using multiple pressure-amplified electro-pneumatic control air valves of FIG. 38 to control operation of an ultrafine filter unit.
Figure 43:
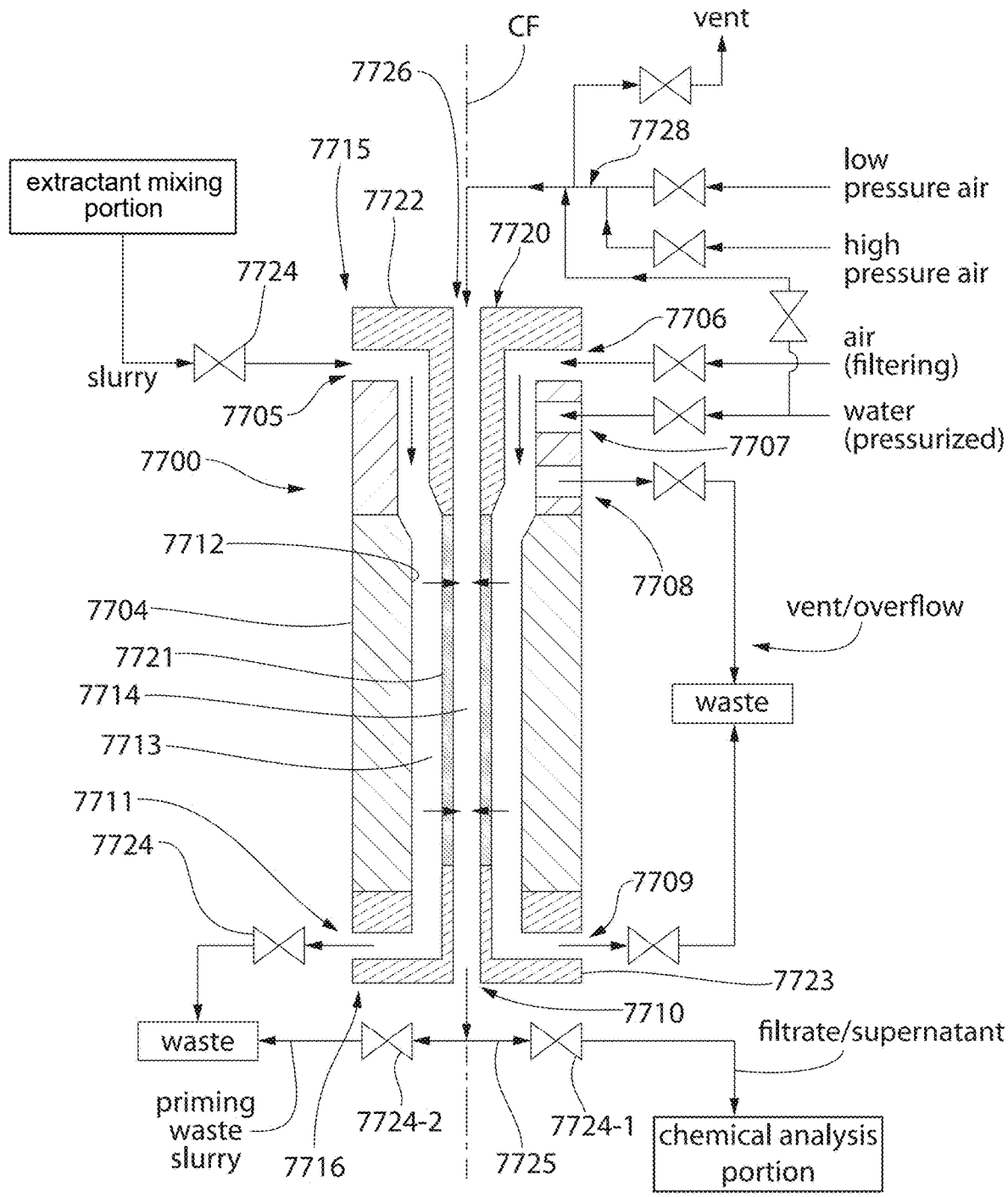
FIG. 43 is a side transverse cross-sectional view of the ultrafine filter unit.

FIG. 42 an exemplary non-limiting embodiment of a multiplexed control air system using the pressure-amplified electro-pneumatic control air valves 7600 described above. The multiplexed control air system uses valves 7600 for controlling the operation of multiple flow components in different slurry processing and analysis trains or processing wedges 312, such as for example ultrafine filter units 7700. Ultrafine filter units 770 are each configured and operable to produce a substantially clear filtrate which provides the supernatant for chemical analysis and quantification of a respective slurry analyte of interest in each train or wedge (e.g. soil nutrient or other) after the extractant addition to separate the analyte from the slurry, but before the reagent added for the analysis. FIG. 43 is a transverse cross-sectional view of one non-limiting exemplary construction of an ultrafine filter unit 7700 which will be described first before description of the multiplexed control air system.

Referring initially to FIG. 43, ultrafine filter unit 7700 includes an elongated filter body 7704 defining a filter centerline axis CF and comprising a first end such as top end 7715, an opposite second end such as bottom end 7716, and an internal central passage 7712 extending between the ends along centerline axis CF. Filter body 7704 may have a generally cylindrical configuration in one embodiment; however, other shaped bodies may be used in other implementations. The filter body may have a monolithic unitary structure in one embodiment, which may be cast or molded from any suitable chemically inert non-metallic or metallic materials which will not react with the slurry. In one embodiment, the filter body may be formed of plastic/polymer.

A filter media holder 7720 is removably positioned and received in central passage 7712 of filter body 7704. Filter media holder 7720 may be elongated having a first end portion 7722 defining a first end and opposite second end portion 7723 defining a second end. The ends may be flanged in one embodiment as shown; however, the ends may not be flanged in other embodiments. Each end portion 7722, 7723 is configured to mount and support an axially elongated filter media 7721 therebetween. Filter media 7721 may have a tubular configuration defining an internal filtrate chamber 7714 which receives filtered slurry (i.e. filtrate) passing radially inwards through the filter media from an annular slurry inlet plenum 7713 defined between the filter body and filter media. Any suitable microporous media similar to that previously described herein for ultrafine filter 5757 may be used for ultrafine filter media 7721, such as for example without limitation microporous polymeric material, or sintered metal or ceramic. An "ultrafine" filter for producing a filtrate (or supernatant) of suitable maximum particle size for chemical analysis by the system may be defined in some non-limiting embodiments as a filter media having a maximum particle size pass through in a range from 0.1 to 10 microns.

Ultrafine filter unit 7700 in one embodiment comprises a plurality of inlet and outlet ports, including but not limited to a slurry inlet port 7705, filtrate outlet port 7710, waste outlet ports 7709, 7711, vent/overflow port 7708, filter pressurization air inlet port 7706, air port 7726 and filter backwash inlet port 7707. Air port 7726 may be configured as a two-way port to introduce pressurized air into the filter unit and to vent air from the unit during the initial slurry fill, as further described herein. The air port 7726 and filtrate outlet port 7710 may be orientated parallel to the filter centerline axis CF and filter media 7721. All other ports described above are oriented transversely and tangentially to axis CF and the filter media to create a swirling/mixing action to occur in the annular slurry inlet plenum 7713.

Each of the foregoing ports has an associated pneumatic air pilot valve 7724 which is fluidly coupled on the process liquid or fluid side (e.g. slurry, water, air, etc.) to the ports to control the flow of the fluid to/from the ultrafine filter unit 7700. All valves shown in FIG. 43 are air pilot valves; only a few being labeled for sake of figure clarity. Each air pilot valve 7724 is fluidly coupled on the control air side in turn to a dedicated and associated control air valve 7600 as shown in FIG. 42 according to the type of port (e.g. water, air, slurry). The control air valve 7600 delivers pulse air to operate each air piloted valve 7724 to control its on or off position. In one embodiment, the air piloted valves may be configured as air pressure to open, and air or spring to close via an included return spring (single pilot pneumatic valve) or air pressure to close (double pilot pneumatic valve). Such air pilot valves are commercially available from numerous sources and relatively inexpensive in contrast to pneumatic pressure-amplified control air valve 7600 which requires an electrical signal to operate the valve's electronic valve actuator 7620. It bears noting that for the ultrafine filter unit 7700 disclosed herein, 11 air pilot valves 7724 would be required for a single filter unit associated with a single slurry processing/analysis train or processing wedge 312.

The ultrafine filter unit 7700 may operate in accordance with the following general procedure and method. The process described below may be entirely automated and controlled in a sequenced manner by the electronic system controller 2820 previously describe herein via suitable program instructions executed by the controller's processor. Preferably, the filter unit is vertically oriented such that end 7715 is at top (i.e. top end) and end 7716 is at bottom (i.e. bottom end). However, other orientations of the filter unit may be used. References below to open or closed ports of the filter unit are controlled by the air pilot valve 7724 associated with each of those ports unless explicitly noted otherwise.

To start the process, the slurry and extractant mixture is injected into the filter via open slurry inlet port 7705 from the upstream slurry extraction manifold of the slurry analysis processing system at the point after the extractant has been thoroughly mixed with the slurry. This may be similar to the extraction point in the process shown in FIG. P-261 (slurry processing system 3000) or FIG. P-263 (slurry analysis processing wedge 312) using the ultrafine filter 5757 as previously describe herein. This is represented in present FIG. 43 as the extractant mixing portion 7730 of the slurry processing system. The slurry flows circumferentially around the filter media 7721 and downwards in the annular slurry inlet plenum 7712 proximate to top end 7715 of the filter unit towards the opposite bottom end 7716 of the filter unit. During this process, the vent/overflow port 7708 is opened to allow residual air contained in the annular plenum to escape to waste at atmospheric pressure during the slurry filling procedure (which may include a small amount of slurry overflow).

The air pressurization-vent port 7726 is opened via a vent air pilot valve 7724 shown in FIG. 43 to allow residual air in the internal filtrate chamber 7714 inside the filter media 7721 to escape to atmosphere via air manifold 7728 fluidly coupled to port 7726 as shown. Both the filtrate chamber 7714 and slurry inlet plenum are thus vented to ambient atmospheric pressure. The vent air pilot valve is fluidly coupled with the air pressurization-vent port 7726 via air manifold 7728 which also includes air pilot valves associated with a low pressure and high pressure air supply fluidly coupled to port 7726 as shown. These air supply pilot valves were initially and remain closed at this stage of the process.

Next, the filter unit and slurry outlet flow conduit 7725 (e.g. tubing) are primed. The priming filtrate waste air pilot valve 7724-2 fluidly coupled to the slurry outlet flow conduit is opened. Slurry delivered via slurry inlet port 7705 to the filter unit fills the outer annular plenum 7713 and flows radially inwards from the plenum through filter media 7721 into the internal filtrate chamber 7714 via the pressure drop between the plenum and lower pressure filtrate chamber. The filtrate is directed to waste via filtrate waste air pilot valve 7724-2 for a short time sufficient to prime the filter unit and slurry outlet flow conduit. It bears noting that the filtrate supply air pilot valve 7724-1 associated with forwarding the filtrate/supernatant to the downstream chemical analysis portion 7731 of the slurry processing and analysis system is closed during the priming operation. After cessation of the priming step, the low pressure air pilot valve and filtrate waste air pilot valve 7724-2 are closed.

After the priming step, the annular slurry inlet plenum 7713 is pressurized via establishing a high pressure filtering air flow to filter pressurization air inlet port 7706 from a pressurized air source. The slurry passes through the filter media 7721 and into the internal filtrate chamber 7714 where filtered slurry (filtrate) which forms the supernatant for chemical analysis collects. It bears noting that the pressurized air source for all of the foregoing low and high pressure air to the internal filtrate chamber 7714 and high pressure air for the slurry inlet plenum 7713 may be a single source such as air compressor 3030 and air tank 3031 shown in FIG. P-1, or another suitable available air source previously describe herein. The air is supplied to the various air ports of the ultrafine filter unit 700 via appropriate configured and valved air conduits (e.g. tubing).

The filter is then again vented to ambient atmosphere by opening air pressurization-vent port 7726 fluidly coupled to the filter internal filtrate chamber 7714 and vent/overflow port 7708 fluidly coupled to the annular slurry inlet plenum 7713. To supply the filtrate/supernatant to the downstream chemical analysis portion 7731 of the slurry processing system, the low pressure air supply pilot valve 7724 and filtrate pilot valve are opened. The reagent is then added to the filtrate/supernatant mixture and the level of analyte is then measured in the manner previously describe herein.

Filter rinsing, backwash, and then air drying steps are performed to prepare the ultrafine filter unit 7700 for processing the next slurry sample. The rinse step is performed by opening the pressurized water supply air pilot valve 7724 fluidly coupled to filter backwash inlet port 7707 and lower waste ports 7709, 7711. The cyclonically swirling stream of water forcibly removes the excess/residual slurry from the slurry inlet plenum 7713 while tangentially scrubbing residual slurry particles from the outer surface of the filter media 7721. The backwash step is performed by first injecting water from the pressurized water supply through air pressurization-vent port 7726 into filtrate chamber 7714. This forces water radially outward through the filter media 7721 in the opposite radial direction than previously filtering the slurry. The water collecting in the slurry inlet plenum which contains slurry particles dislodged from the filter media is directed to waste via the waste air pilot valves. Water flow is terminated, and followed by applying high pressure cleaning air pulses through the air pressurization-vent port 7726 into the filter unit internal filtrate chamber 7714. This creates a hammering effect to knock any residual slurry particles off of the filter media 7721. This air pressure provided by the high pressure air supply is higher than "filtering pressure" or "low pressure" air shown in FIG. 43 to facilitate appropriate micropore cleaning by dislodging small particles that would otherwise stay imbedded in the surface of the filter media due to a zero pressure differential across the media. The filtering air pressure supply may be at an intermediate pressure which is higher than the low pressure air supply, but lower than the high pressure air supply pressure. The low pressure air supply is at a pressure selected to gently move the filtrate through and discharge it from the filter unit. The higher intermediate filtering pressure air supply is at a pressure selected to push the slurry through the filter media to produce the filtrate. The still higher high pressure air supply is at a pressure selected to "back punch" the cleaning air in a second reverse direction through the filter media than producing the filtrate with sufficient force to dislodge the particles entrapped on the filter. In some embodiments, cleaning pressure provided by the high pressure air supply is preferably at least 1.5-2 times the filtering pressure to achieve satisfactory dislodgement and clearing of entrapped particles from the filter media. The air dry step is then performed by opening the air pilot valve 7726 associated with the higher pressure air sources to allow "high" pressure air to push remnant water from filtrate chamber 7714 to slurry inlet plenum 7713 while the "filtering" air fluidly coupled to the inlet plenum 7713 then pushes the remnant water to atmospheric ports 7709, 7711 ports for wasting. This creates a vortex air flow drying effect within the filter. Drying may be facilitated in one embodiment by multiple tangential air inlet ports at the top of the filter and multiple waste outlet ports normal to the unit at the bottom of the filter. Preferably, an even number of air inlet and waste outlet ports may be provided to balance the flow. This axial separation and offset of ports at top and bottom along with a large volume of air creates the vortexing action favored for fast drying in order to filter the next slurry sample for the next analysis cycle in rapid succession.

The multiplexed pneumatic control air system shown in FIG. 42 illustrates the combination of more expensive pneumatic control air valves 7600 and greater number of less expensive air pilot valves 7724 which provides a cost-effective solution to meeting the control air demands of multiple ultrafine filter units 7700; each filter unit comprising a plurality of associated air pilot valves for controlling the multiple functional needs of the operational process described above. In the illustrated embodiment, each filter unit has 11 associated air pilot valves (more or less may be used in other system variations). Because each air pilot valve of each filter unit has the same function, each function can be actuated simultaneously across all filter units by multiplexing to produce a more economical control air system which is advantageous for the present slurry processing system in which multiple slurry analyses are desired to be processed and chemically quantified in parallel for different analyte contained in the same agricultural sample (e.g. soil). This produces quicker results, allowing the next agricultural sample to be processed sooner.

As an example for descriptive purposes only of the multiplexed pneumatic control air system, FIG. 42 shows only four ultrafine filter units 7700 for simplicity of illustration, which are designated 7700-1 to 7700-4. Each filter unit is shown having four ports and associated air pilot valves 7724 identified as valves "1-4." Each air pilot valve 1-4 is fluidly coupled to a respective upstream dedicated control air valve 7600 designated 7600-1 to 7600-4 via a respective dedicated and fluidly isolated shared air distribution manifolds 7703-1 to 7703-4. For example, air pilot valve 1 is fluidly coupled to and shares a first shared air distribution manifold 7703-1, and so on for remaining air pilot valves 2-4 in this example. Each control air valve 7600-1 to 7600-4 is fluidly coupled upstream in turn to a common air supply manifold 7702 which is in turn fluidly coupled to a common air source 7701, which may be air compressor 3030 and associated air tank 3031 shown in FIG. P-1, or any of the other air sources previously described herein.

An advantage of the present multiplexed pneumatic control air system shown in FIG. 42 is that only the control air valve 7600-1 to 7600-4 needs to be operably and communicably coupled to the system controller 2820 in order to control the supply of control air to ultrafine filter units 7700-1 to 7700-4 and air pilot valves "1-4" of each unit. This greatly simplifies the control system wiring and controller programming needed to control the slurry filtration and post-filtration cleaning operations of each filter unit described above. The control air system allows multiplexing with electro-pneumatic valves that are shared between similar functions of multiple analyses. When multiple analyses are present, each using their own filter(s), one common pneumatic signal can be sent to as many filters as necessary so they all actuate each function simultaneously, without requiring additional expensive electro-pneumatic valves for each incremental analysis.

In operation, as an example, when system controller 2820 is preprogrammed and timed to initiate the same filter function associated with opening air pilot valve "1" of each of the four filter units 7700-1 to 7700-4 (which may be any of the functions describe before) at the same time, the controller transmits an electrical control signal to control air valve 7600-1. Valve 7600-1 opens to transmit a control air signal flow through shared distribution manifold 7703-1 simultaneously to each air pilot valve "1" of every ultrafine filter unit 7700-1 to 7700-4. The air pilot valves are thus opened concurrently upon receiving the control air signal. Cessation of the control air signal causes each valve to close concurrently at the appropriate time controlled by system controller 2820. The same operational methodology applies to each of the remaining air pilot valves "2-4" which will be opened simultaneously at the appropriate time by the controller.

Accordingly, the control air system allows multiplexing with electro-pneumatic control air valves that are shared between similar functions of each filter unit for multiple analyses. When multiple analyses are present and run in parallel, each using their own filter(s), one common pneumatic signal can thus be sent to as many filters as necessary so they all actuate each function simultaneously, without requiring additional expensive electro-pneumatic valves for each incremental analysis.

In one aspect, a method for filtering a slurry may be basically summarized as comprising: providing the slurry filter comprising a body defining an internal central passage, a filter media arranged in the central passage and defining comprising an internal filtrate chamber and an annular slurry inlet plenum arranged defined between the body and filter media; flowing slurry into the slurry inlet plenum at a first end of the body; pressurizing the slurry inlet plenum to force the slurry radially inwards through the filter media to deposit a filtrate in the filtrate chamber; pressurizing the filtrate chamber to force the filtrate to a filtrate outlet port at a second end of the body opposite the first end.

In another aspect, a slurry filter unit for ultrafine slurry filtering may generally comprise: a body defining centerline axis; a first end, an opposite second end, and an internal central passage extending between the ends along centerline axis; a holder supporting an elongated filter media in the central passage, the filter media defining an internal filtrate chamber and an annular slurry inlet plenum arranged defined between the body and filter media; a slurry inlet port oriented radially to the centerline axis at the first end and a filtrate outlet port at the second end oriented parallel to the centerline axis; a filter pressurization air inlet port oriented radially to the centerline axis and fluidly coupled to the annular slurry inlet plenum for forcing slurry in the plenum radially through the filter media into the filtrate chamber; and air port oriented parallel to the centerline axis and fluidly coupled to filtrate chamber for forcing filtrate to the slurry outlet.

Microfluidic Process Fluid Mixing

When fluid passes from a large passage to a small passage abruptly, mixing occurs. This process may particularly be used with mixing of slurry, extractants, reagents, or other fluids within the microchannel flow network in microfluidic processing disk 310. A group of micropumps may be provided for mixing. When mixing two constituents together to form one mixture for example, a micropump with associated pump chamber can be sized for the particular volume of each constituent necessary in the required proportions to form the final mixture. A single larger micropump and chamber may further be provided which is sized to hole the total volume of the mixture comprised of two or more constituents.

In the non-limiting example shown in FIG. 41 and discussed below, pneumatically-actuated diaphragm micropump MP1 is sized for 2,500 μL of agricultural slurry (e.g. soil slurry in one embodiment), micropump MP2 is sized for 7,500 μL of extractant, and micropump MP3 is sized for between 10,000 and 10,200 μL of the combined mixture. The goal is for MP3 to always have a volume which can at least hold all of the fluid from micropumps MP1 and MP2. To account for manufacturing variability, micropump MP3 may be slightly higher in volume and displacement than the sum of MP1 and MP2. The foregoing micropumps may be formed and disposed in the layers of a slurry analysis processing wedge 312 of the microfluidic processing disk 310 shown in FIG. 41 and previously described herein. The micropumps may comprise the entire wedge or only a portion of an individual processing wedge 312. The pneumatically-actuated diaphragm micropumps are fluidly coupled together by the network of flow microchannels 322 and the pneumatically-actuated diaphragm microvalves as described below. Microvalves used in microfluidic processing disk 310 such as pneumatically-actuated diaphragm microvalves 328 were previously described herein.

Exemplary steps in a process/method for preparing and mixing a slurry-containing fluid will now be described. Reference made to an "open" pump chamber which follows means that the lower pump chamber 5765 of the micropump MP1, MP2, or MP3 is open to its maximum volume for receiving a fluid such as shown in FIG. P-257. The upper pump chamber 5764 is not pressurized by control air via air inlet 5768 so that diaphragm 5763 is in an undeformed upward position, which "opens" the lower chamber to intake fluid for pumping. A "closed" pump chamber means that pressurized air is applied to upper pump chamber 5764 which moves and deforms the diaphragm 5763 to assume a downward position proximate to the bottom surface 5765-2 of lower chamber 5765 (see, e.g. FIG. P-258). This squeezes and pumps the fluid outwards therefrom via the fluid outlet port 5767 for further processing of the slurry mixture.

The process/method may be summarized as follows: (1) Open slurry inlet microvalve 7650; (2) Open pump chamber of MP1 to pull a precise volume of slurry equal to the displacement of MP1 into MP1; (3) Close slurry inlet microvalve 7650; (4) Open extractant inlet microvalve 7653; (5) Open intermediate microvalve 7654 between MP1 and MP2; and (6) Open pump chamber of MP2 which causes suction through MP1 to pull extractant into MP1 with the existing slurry creating a slurry-extractant mixture. As extractant mixes with the slurry in MP1, some of the slurry extractant mixture enters MP2 until eventually MP2 is full and a quantity of extractant equal to the displacement of MP2 has been drawn into the system and mixed with the slurry. The process continues with steps of: (7) Close extractant inlet microvalve 7653; (8) Close MP1 and open MP3 simultaneously; (9) Close intermediate microvalve between MP1 and MP2; and (10) Close MP2. At this point, the entire quantity MP1+MP2 with precise amounts of slurry+extractant have been mixed and combined into pump chamber MP3. The process is completed by the steps of: (11) Open outlet microvalve 7656; and (12) Close pump MP3 to pump and forward the mixed slurry/extracted sample mixture to downstream slurry processing phases such as tertiary/ultrafine filtration which may use for example micro-porous ultrafine filter 5757 shown in FIG. P-261, or another filter. The ultrafine filter is configured to produce a clear filtered supernatant capable of being chemically analyzed such as via colorimetric analysis or another analytical technique used in the art for an analyte of interest contained in the supernatant. It bears noting that in FIGS. 41, P2 and P3 are not isolated from each other by a microvalve.

Figure 41:
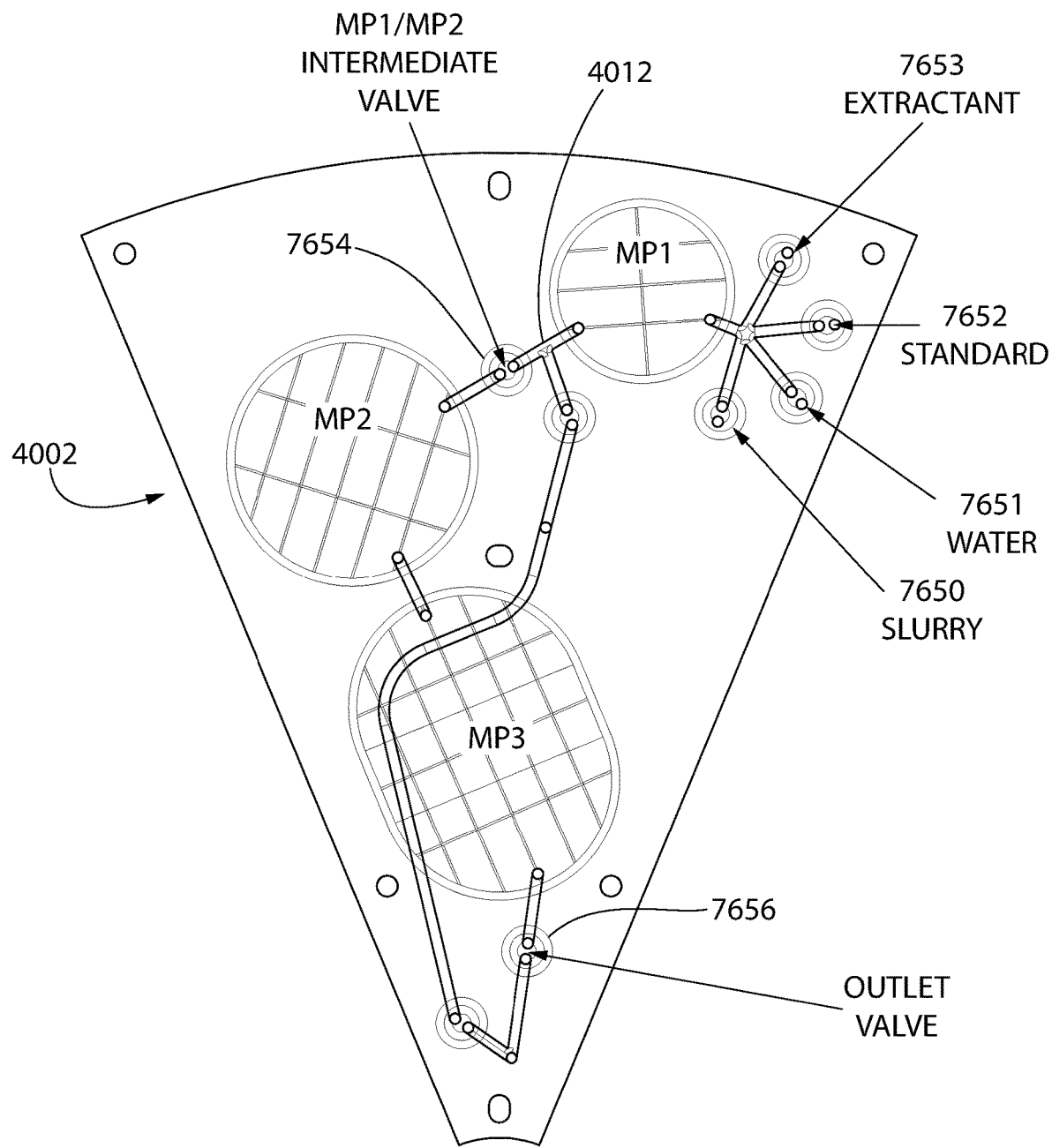
FIG. 41 is a top view of the analysis processing wedge showing a fluidly interconnected micropump array.

In FIG. 41, micropump MP1 may further be fluidly coupled to microvalve 7652 which controls the admission of a "standard" fluid used for testing the accuracy of the slurry analysis system in general. The standard will contain a known concentration (parts per million-ppm) of an analyte (e.g. nitrogen, phosphorous, etc.) which ultimately is measured via the flow analysis cell of the system previously described herein. Micropump MP1 may further be fluidly coupled to water microvalve 7651 which controls the admission of water into the micropump for periodically flushing out residual slurry remaining in the micropump lower pump chamber.

Knife-Type Soil Sample Collection System

Traditional agricultural soil sample collection for the purposes of nutrient analysis are performed with stationary systems requiring an inefficient investment in time and labor. This includes manual extraction of soil samples for testing. A machine powered non-stationary, or "On The Go," automated sample collection is desirable for faster and less laborious collection.

According to the present automated mobile soil sample collection system disclosed herein, the system includes a collection apparatus comprising a support frame and including one or more rotatable soil collection spools configured to penetrate the soil for sample collection at timed predetermined intervals. Each spool comprises a hollow tubular body with internal collection cavity included in its cross sectional geometry to capture a depth represented slice of soil and retain the sample. Spool rotational actuation may be achieved with various methods including but not limited to electric, pneumatic, or hydraulic power distribution using motors and gear train, linear cylinders, rack and pinion, solenoids, and/or actuators alone or in any combination. For sample collection, spools normally start in the down (i.e. into the soil) and closed position to the soil which precludes entry of soil into the collection cavity. At predetermined intervals, the spools alternate through cycles of rotating 180 degrees about their longitudinal centerline. The collection cavity cycles and changes upon rotation of the collection spool between a concealed condition relative to the soil (soil collection cavity obscured or blocked), an exposed condition (soil sample captured), and back to concealed condition (captured sample retained in spool). The sample collection apparatus may be controlled by a microprocessor-based system controller such as controller 2820 previously described herein or another controller. The support frame with collection apparatus is configured for mounting on a powered vehicle operable to traverse the agricultural field and collect samples "On The Go."

Figure 55:
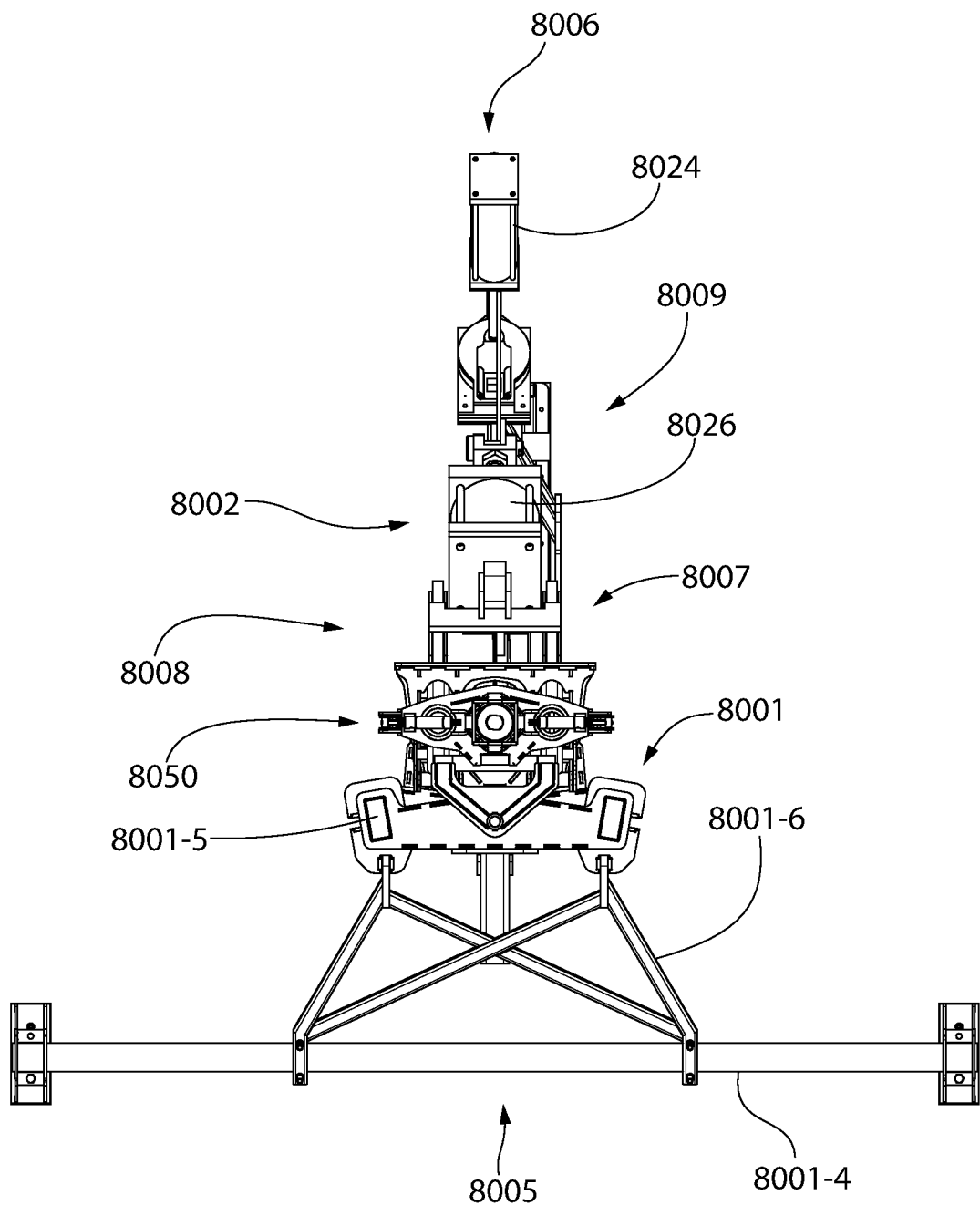
FIG. 55 is a top view thereof.
Figure 56:
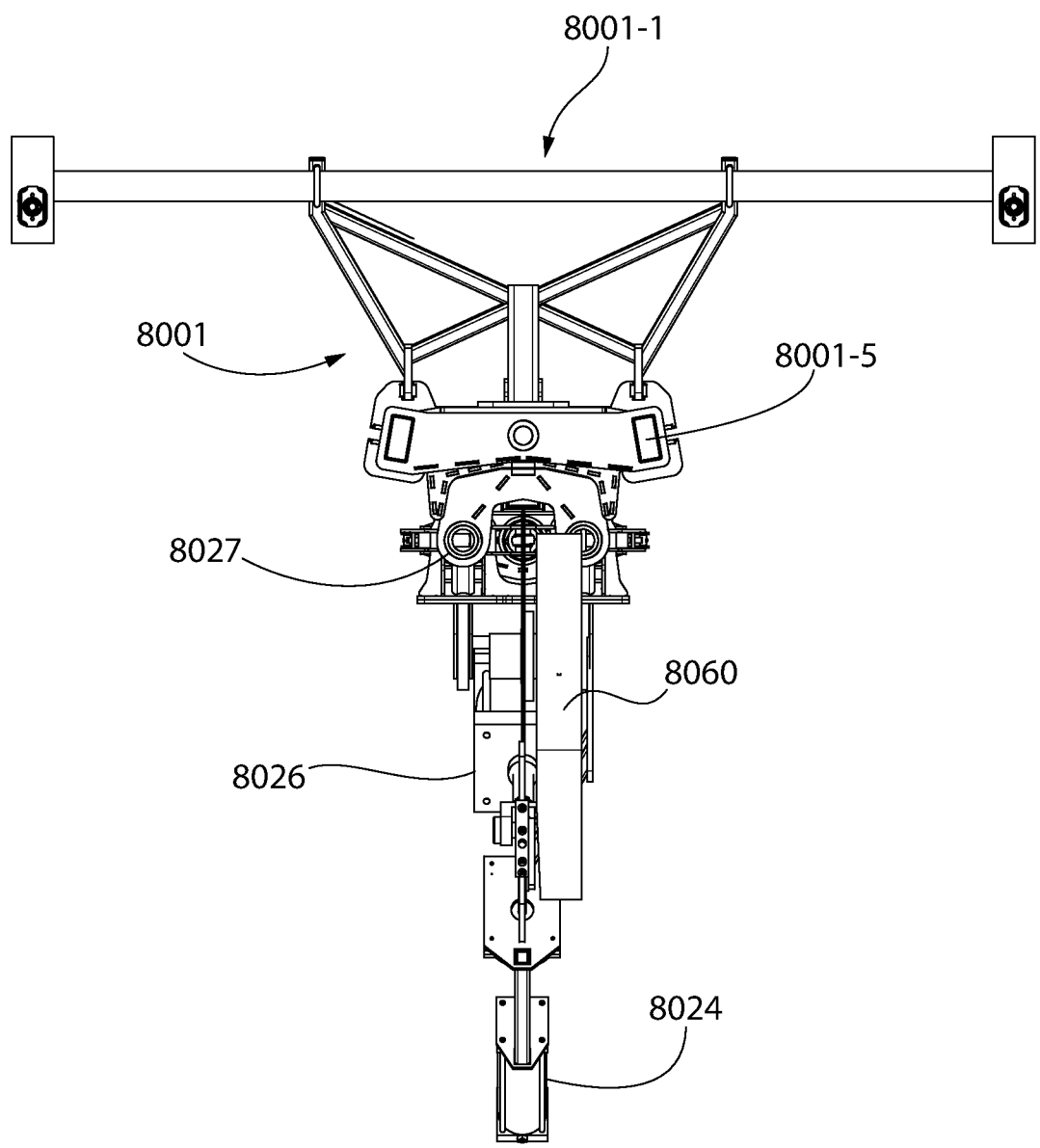
FIG. 56 is a bottom view thereof.
Figure 57:
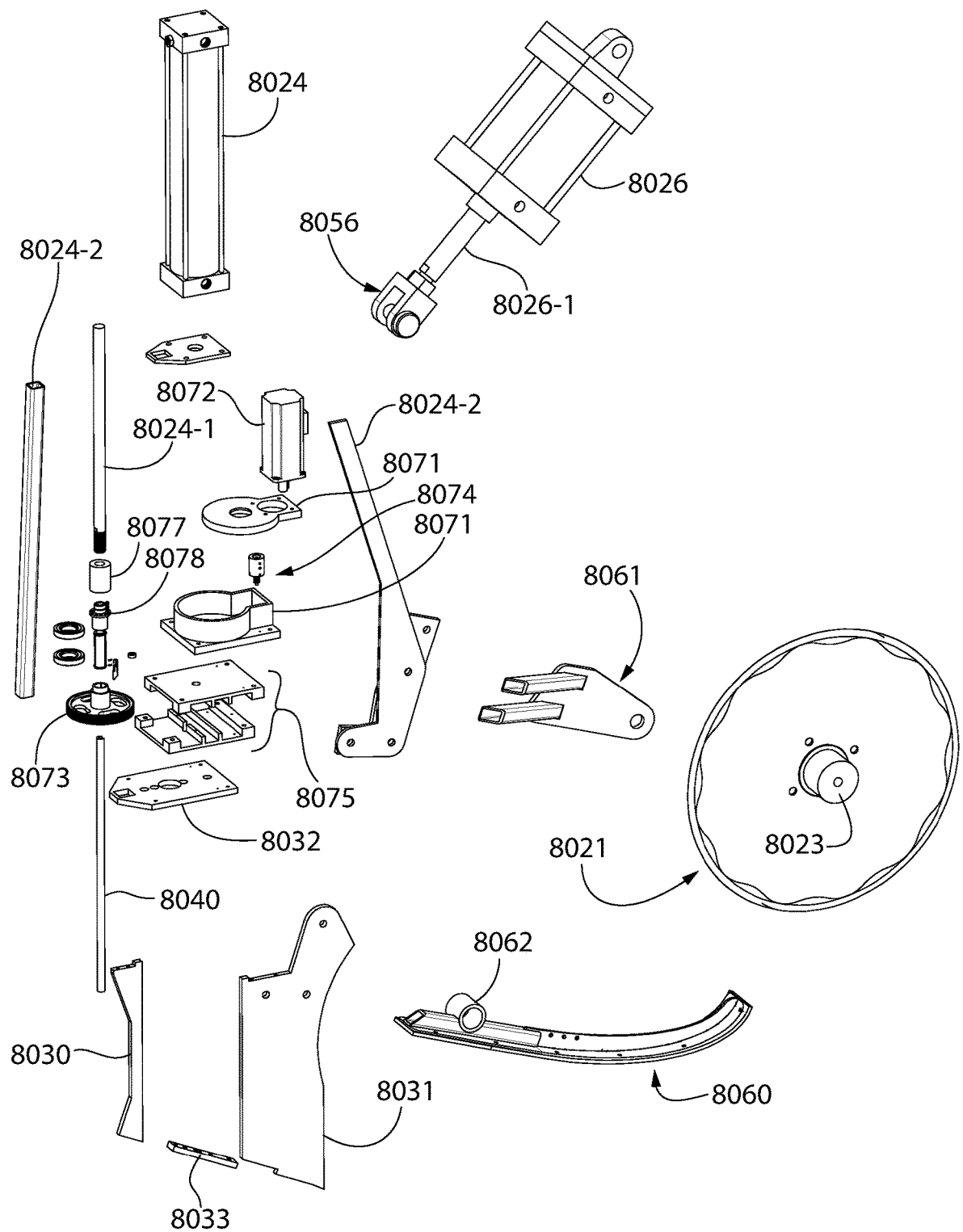
FIG. 57 is a rear exploded view of the collection apparatus of the collection assembly.
Figure 58:
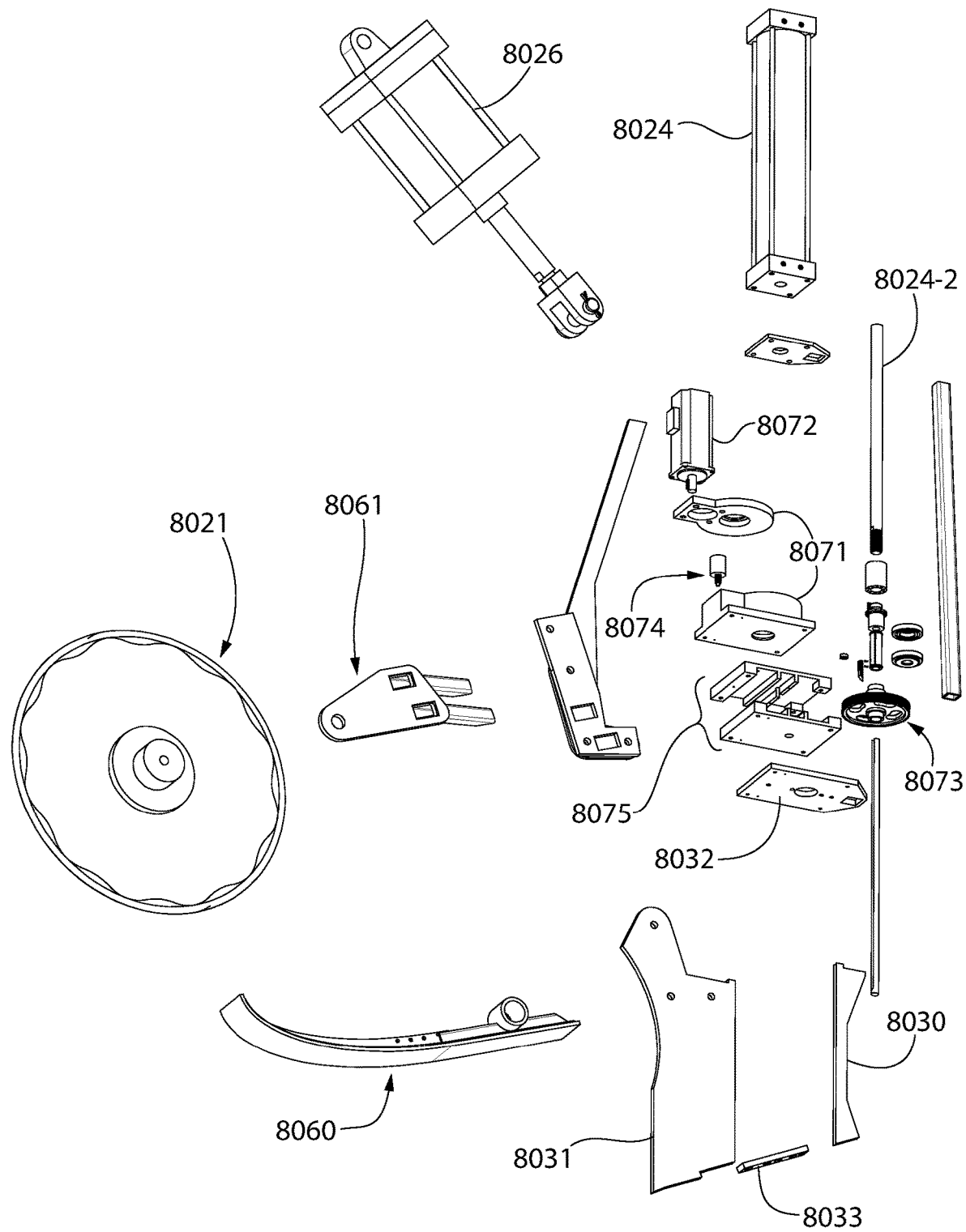
FIG. 58 is a front exploded view thereof.

FIGS. 44-82 depict one embodiment of a mobile soil collection sample system 8000 according to the present disclosure. The system comprises a collection assembly 8009 having a front 8005, rear 8006, left lateral side 8007, and right lateral side 8008 identified in FIG. 55 for convenience reference in describing the assembly. The assembly 8009 generally includes support frame 8001 and collection apparatus 8002 movably mounted to and supported by the frame. Frame 8001 is configured for detachable mounting to the rear portion of any type of mobile pulled trailer/equipment or self-powered wheeled vehicle 8003 operable to travel across the agricultural field AF containing soil to dynamically collect samples "On The Go" while the vehicle is moving. This differs from traditional stationary sampling techniques. Vehicle 8003 if self-powered may be driven by a gas-powered, electric, or hybrid type engine as some non-limiting examples. Vehicles 8003 may be used for solely soil sample collection, or may be any type of general purpose self-driven wheeled vehicle or equipment commonly used in the agricultural arts such as pickup or other trucks, tractors, harvesters, etc. The type of powered vehicle or pulled trailer/equipment used does not limit the disclosure. Collection apparatus 8002 is configured to be pulled through the field by vehicle 8003 to collect samples in the embodiment depicted in FIG. 44.

Support frame 8001 may generally comprise a forward-most primary frame section 8001-1 configured for direct or indirect detachably mounting or coupling to the vehicle, a rearward-most collection apparatus frame section 8001-3, and an intermediate rail frame section 8001-2 mounted therebetween which supports a carriage chassis 8058. Primary frame section 8001-1 may comprise a horizontally elongated mounting rod 8001-4 configured for coupling to the vehicle 8003 in one embodiment. Rod 8001-4 may be cylindrical in one embodiment. A plurality of mounting vibration dampers 8004 at the mounting locations to the vehicle accommodate upward/downward movement of the collection apparatus 8002 and reduce vibration as the collection apparatus penetrates and is pulled through the soil by the vehicle 8003. This avoids cracking of the mounts. In one embodiment, springs 8004-1 may be used for the dampers such a pair of dampers with springs: one spring mounted on each opposite end of the rod 8004-1 as shown. Other numbers of dampers and mounting locations may be used.

The intermediate rail frame section 8001-2 of support frame 8000 supports carriage chassis 8058 which comprises vertically movable carriage 8050 used to adjust the vertical position of the collection apparatus 8002 relative to the surface or ground level of the soil and vehicle 8003. Collection apparatus 8002 is movably coupled to and supported by the carriage as further described herein, which in turn is supported by the rail frame section. Rail frame section 8001-2 may include a pair of laterally spaced and elongated vertical support rods 8001-5, which may be rigidly coupled to horizontal mounting rod 8001-4 by a plurality of substantially horizontal angled struts 8001-6. The horizontal struts support the rail frame section 8001-2 and collection apparatus 8002 coupled thereto from vehicle 8003 in a cantilevered manner. Struts 8001-6 may be mounted proximate to the top portions of rods 8001-5 in one non-limiting embodiment. Rail frame section thus remains stationary relative to the primary frame section 8001-1 and vehicle 8003. Rods 8001-5 may have a tubular body with rectangular or square polygonal transverse cross-sectional shape in one embodiment; however, other polygonal and non-polygonal cross-sectional shapes (e.g. circular) may be used. The rods extend in the vertical direction between an upper mounting bracket 8051 and lower mounting bracket 8052. The top and bottom end portions of each rail 8001-5 are fixedly coupled to the brackets in a rigid manner as shown.

Carriage chassis 8058 includes a pair of laterally spaced apart vertical guide rails 8027 rigidly coupled at each end to and supported from upper and lower brackets 8051, 8052 of the support frame intermediate rail frame section 8001-2 via corresponding upper and lower chassis brackets 8058-1, 8058-2 respectively. Rails 8027 are spaced rearward from and parallel to support rods 8001-5. The rails 8027 may be cylindrical with circular transverse cross-section in one embodiment to engage a plurality of rollers 8028 mounted to the carriage 8050, as further described herein.

It bears noting that the various frame sections 8001-1, 8001-2, and 8001-3 and carriage chassis 8058 described above may include a plurality of additional subparts, components, fasteners, brackets, bearings, sleeves, collars, or other elements beyond the primary parts as shown in the figures which may be necessary to perform their intended support and mounting functions. It is well within the ambit of those skilled in the art to provide such minor parts without undue elaboration here.

Figure 44:
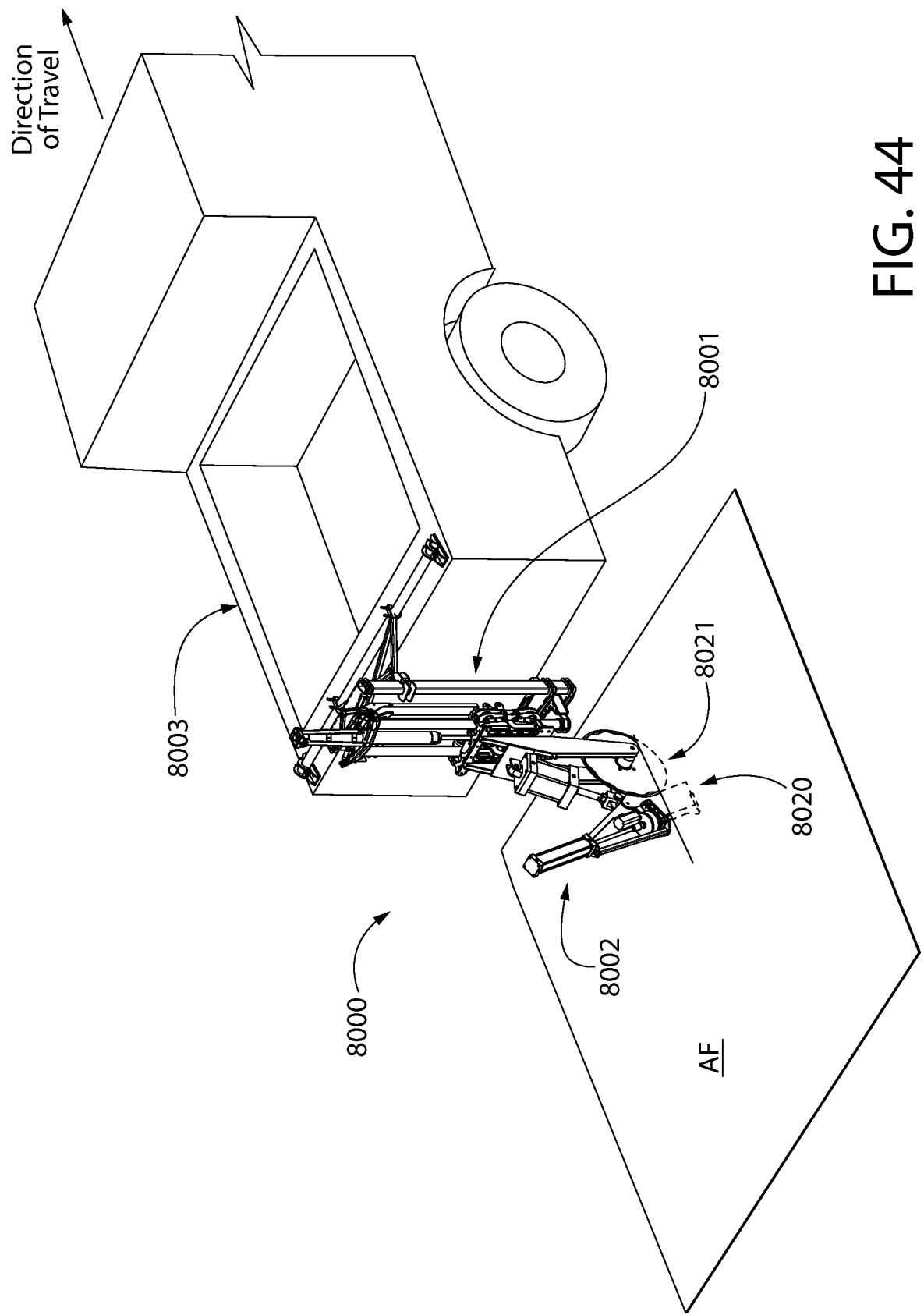
FIG. 44 is a perspective view of one embodiment of a mobile soil collection sample system according to the present disclosure.
Figure 45:
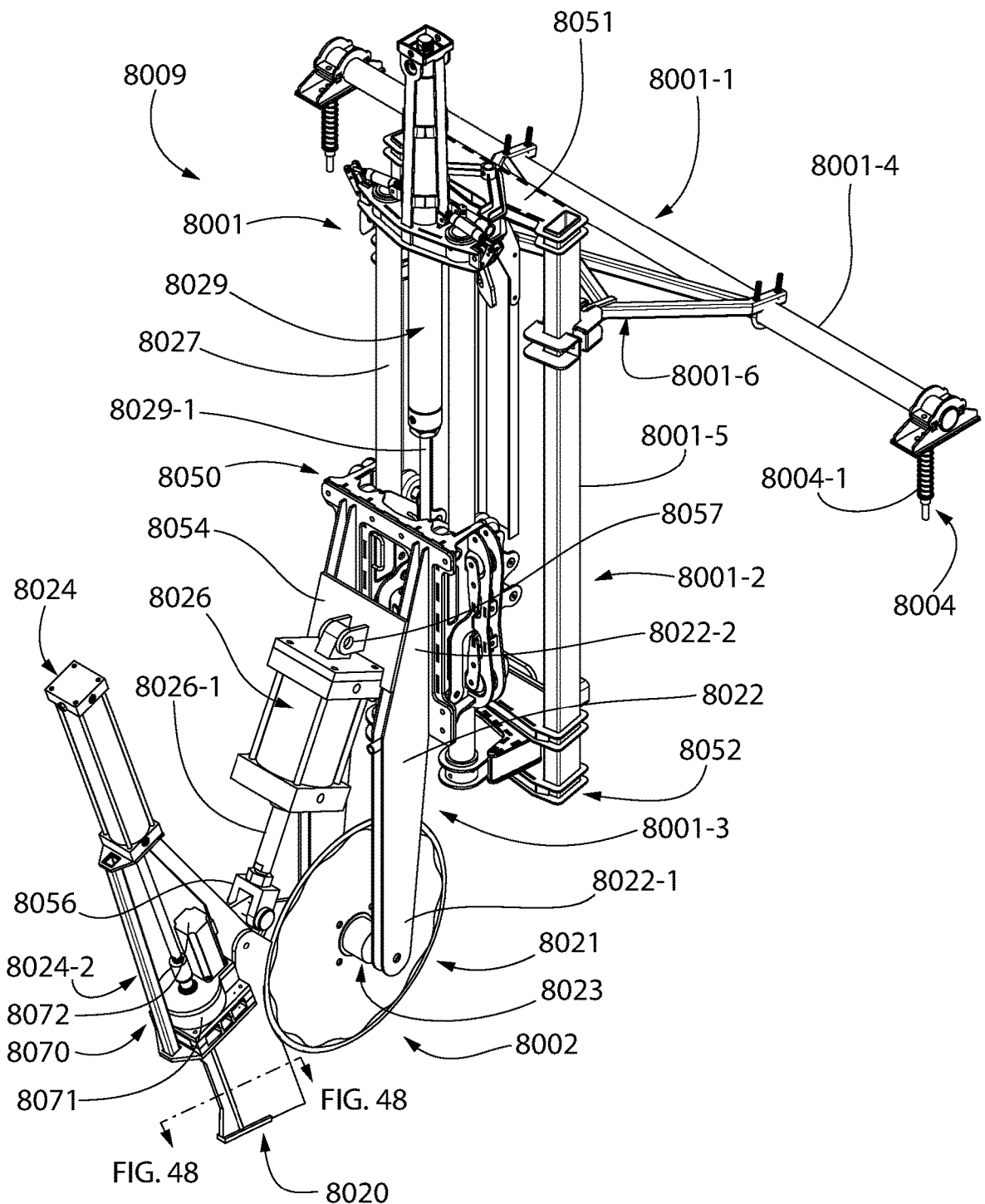
FIG. 45 is a rear top perspective view of a collection assembly thereof.
Figure 46:
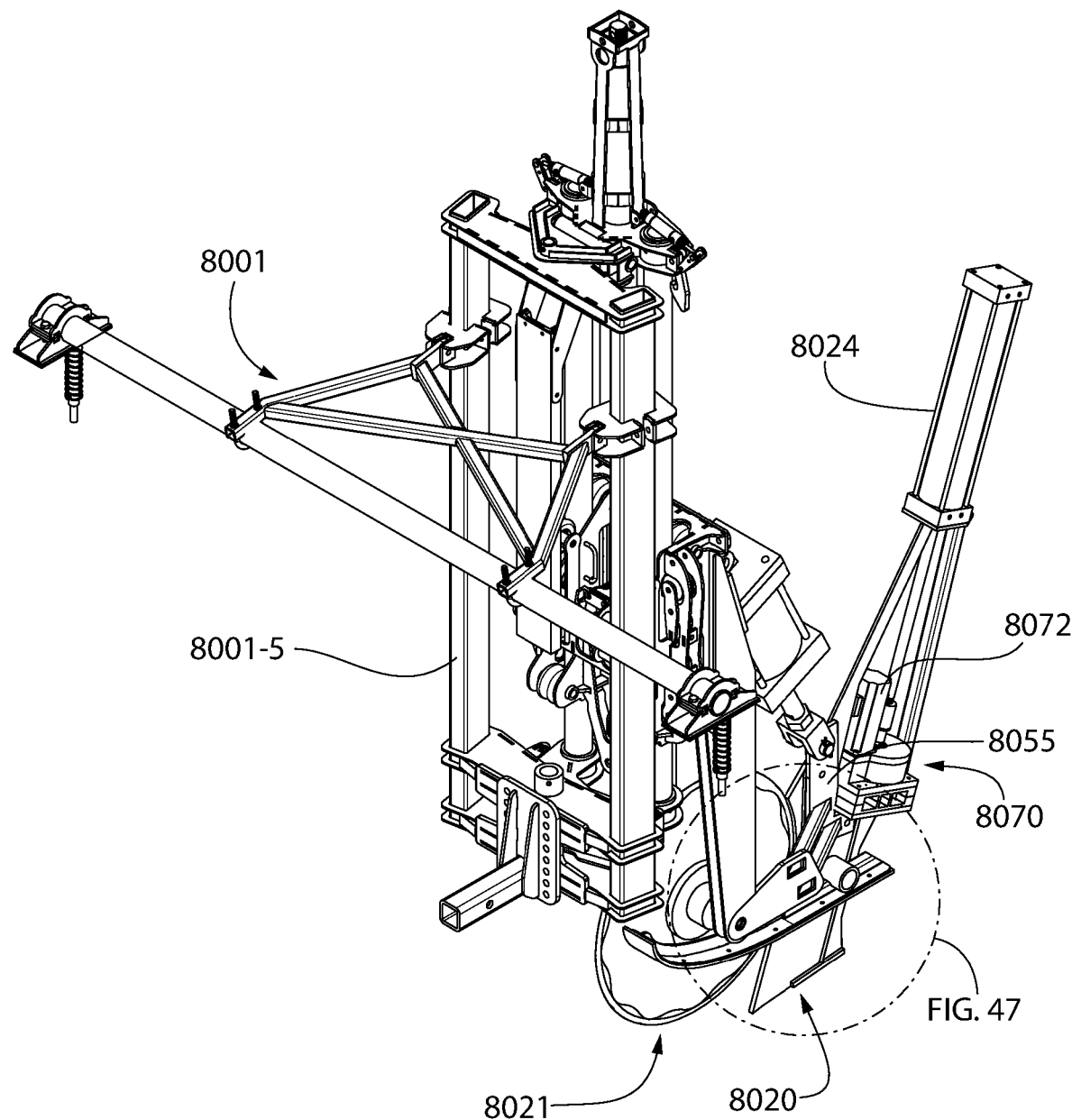
FIG. 46 is a front top perspective view thereof.
Figure 47:
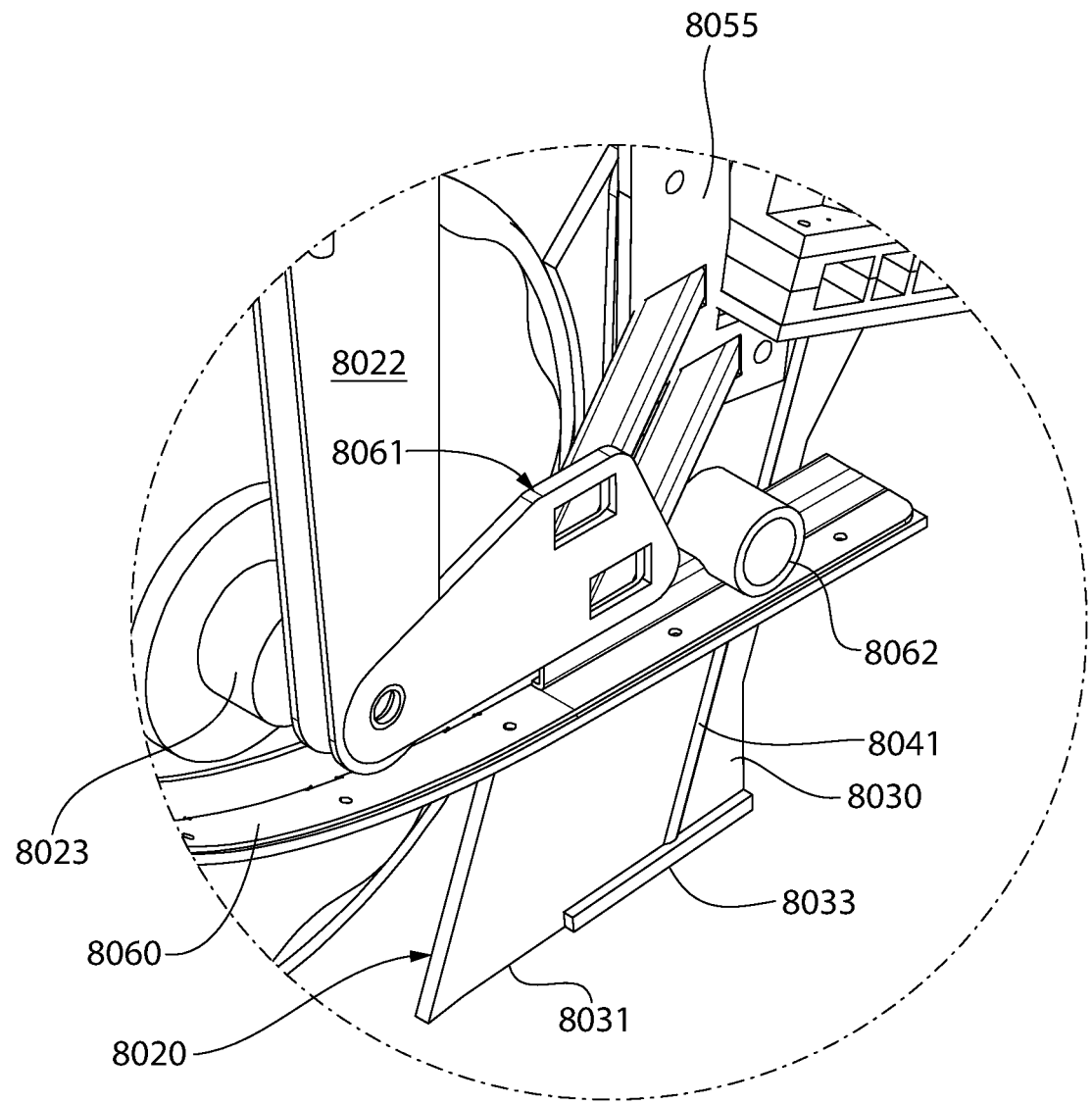
FIG. 47 is an enlarged detail view from FIG. 46.
Figure 67:
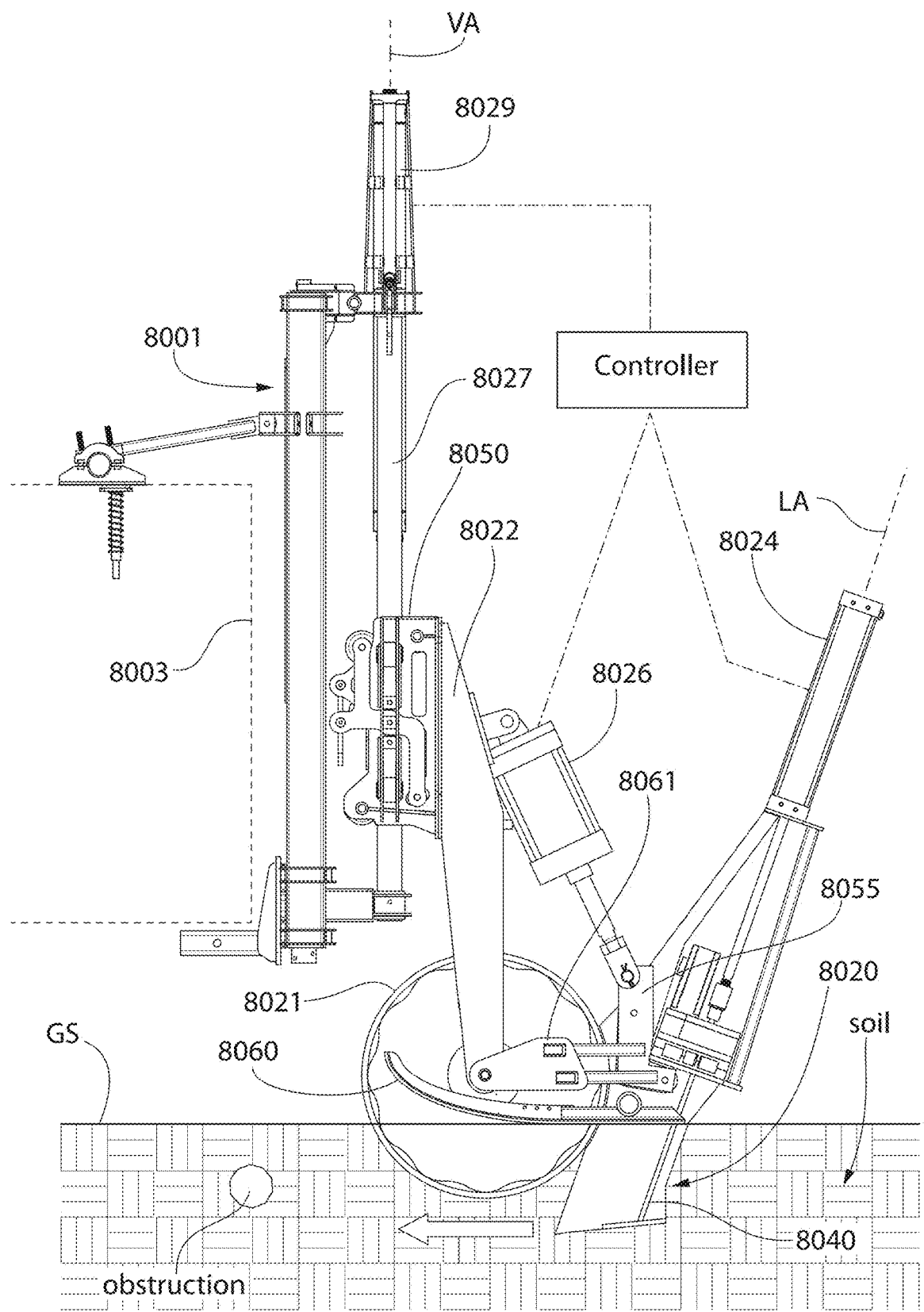
FIG. 67 is a first side view of the collection apparatus in an active lower soil sample collection position engage with the soil with the collection apparatus in a first angular rotated position.
Figure 68:
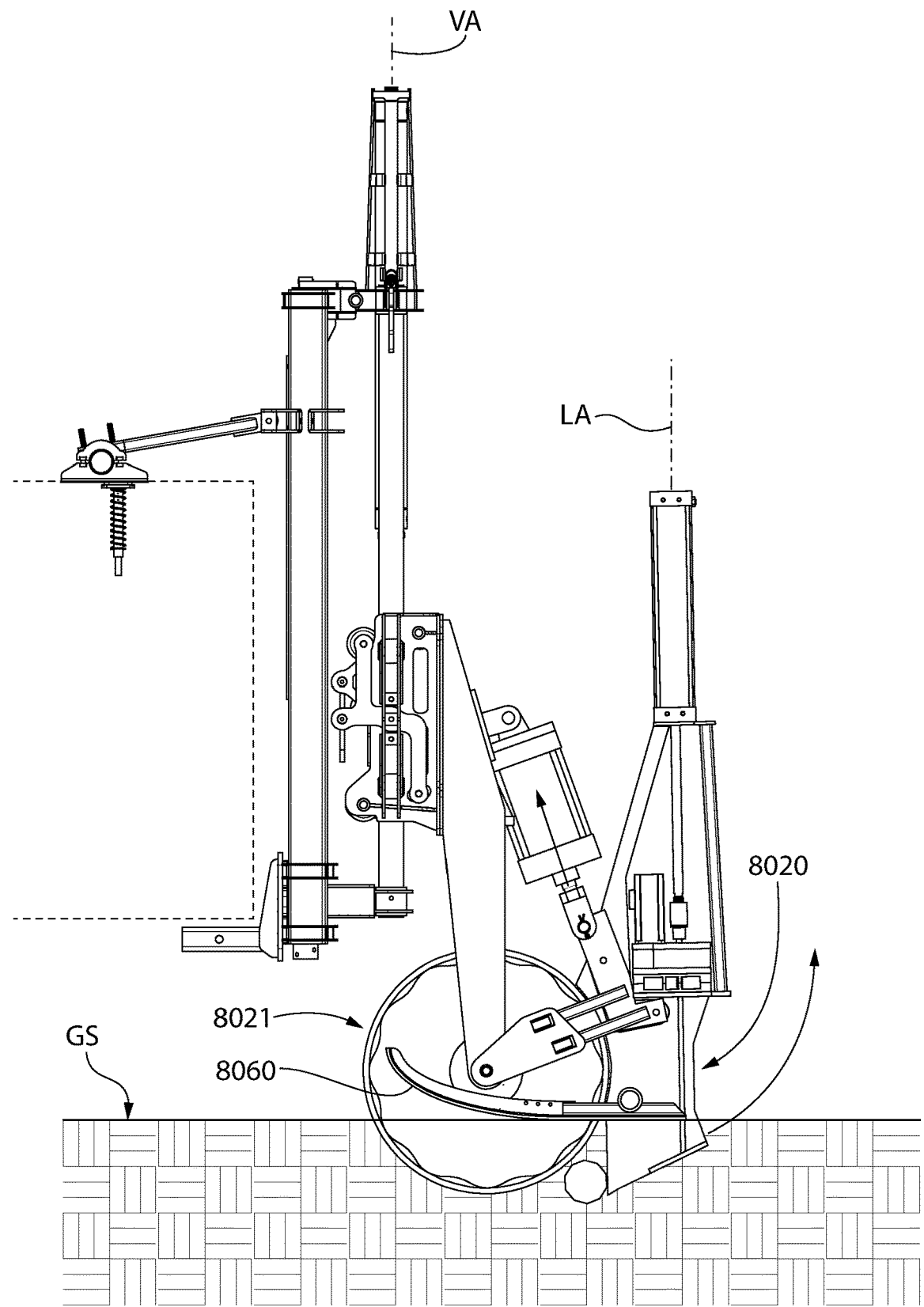
FIG. 68 is a second side view thereof with the collection apparatus in a second angular rotated position.
Figure 69:
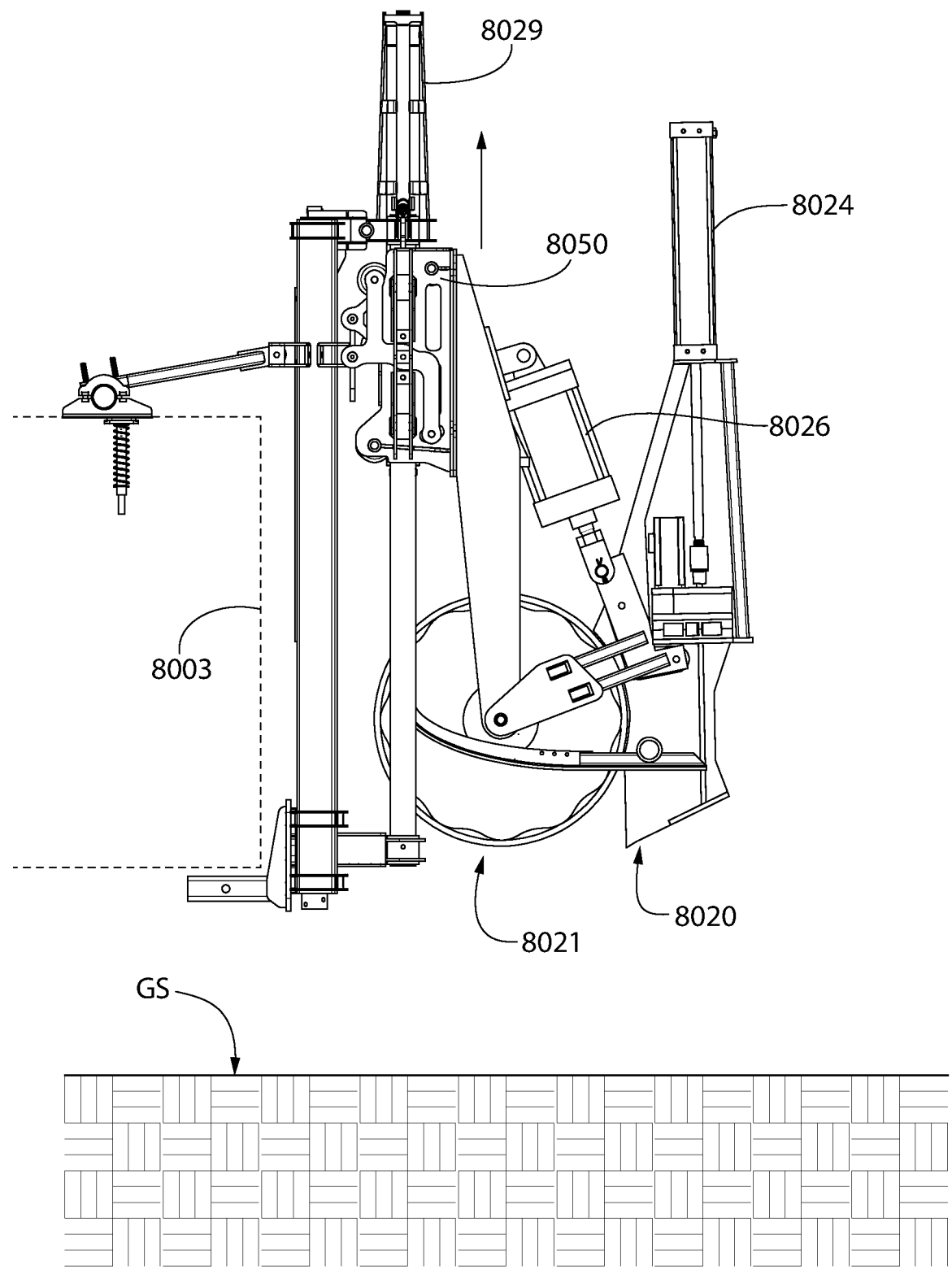
FIG. 69 is a side view of the collection apparatus in an upper stowed position.
Figures 70, 71:
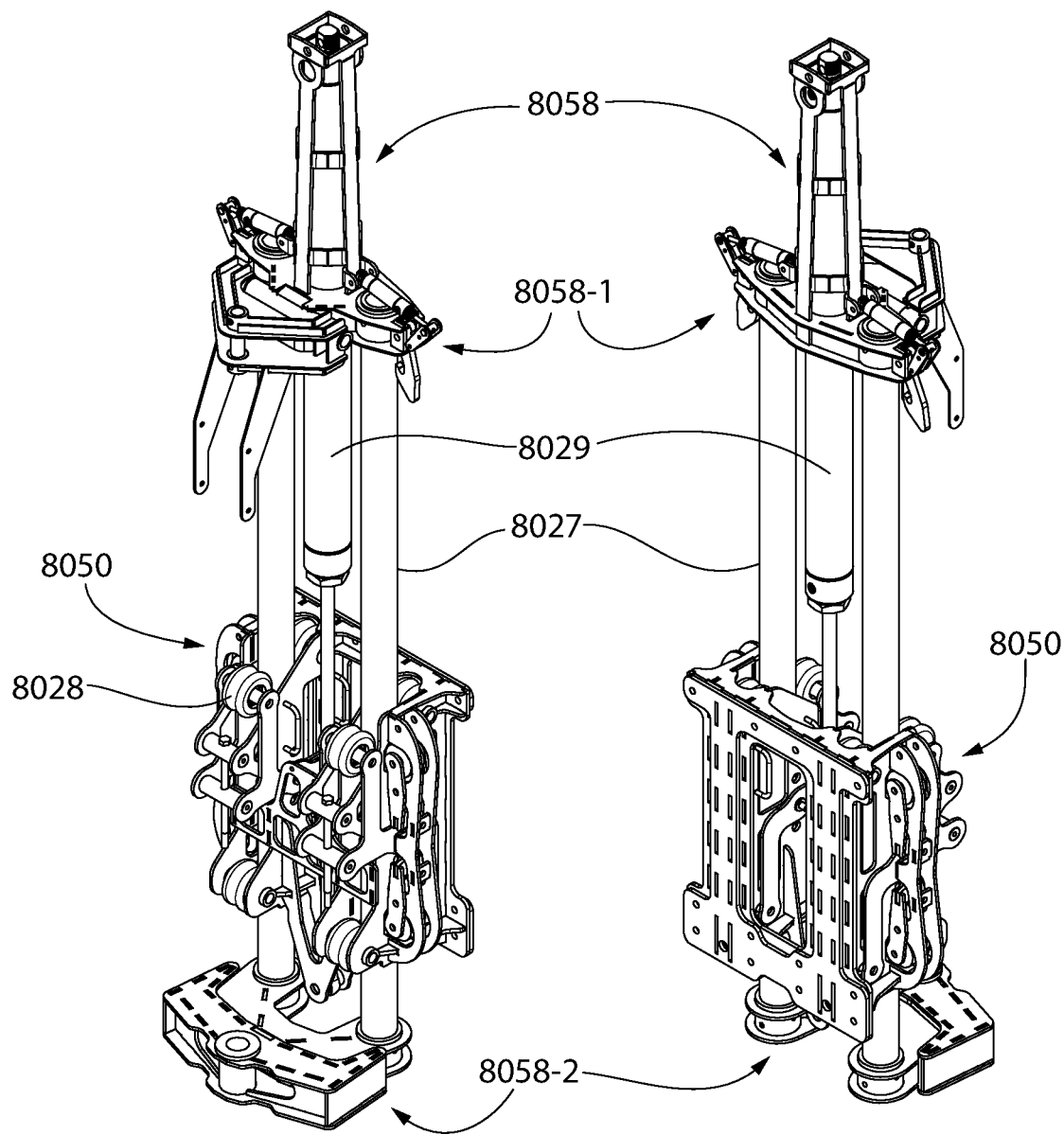
FIG. 70 is a front perspective view of a carriage chassis of the collection assembly supporting a rolling carriage to which the collection apparatus is mounted.
FIG. 71 is a rear perspective view thereof.
Figures 72, 73:
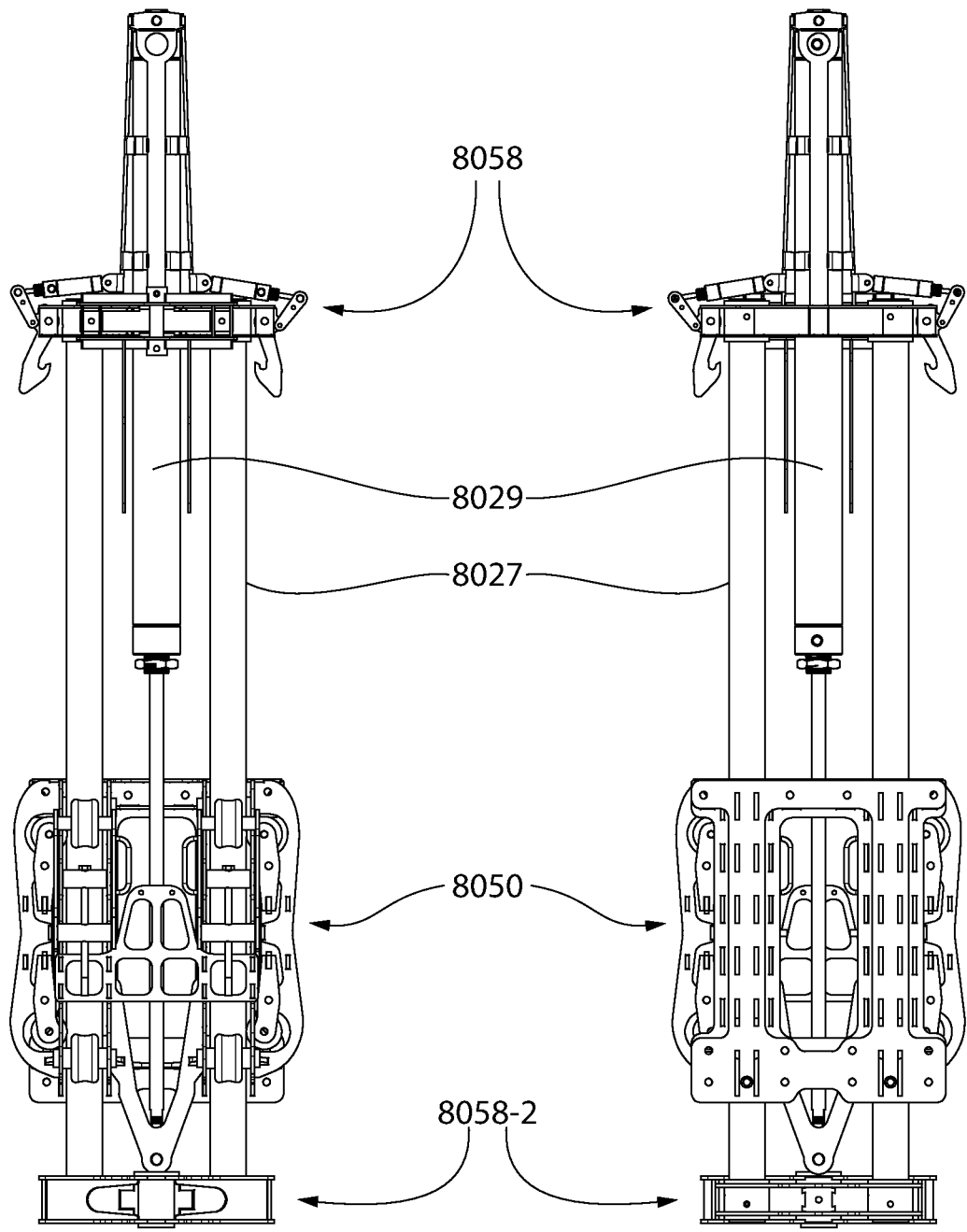
FIG. 72 is a front view thereof.
FIG. 73 is a rear view thereof.
Figure 77:
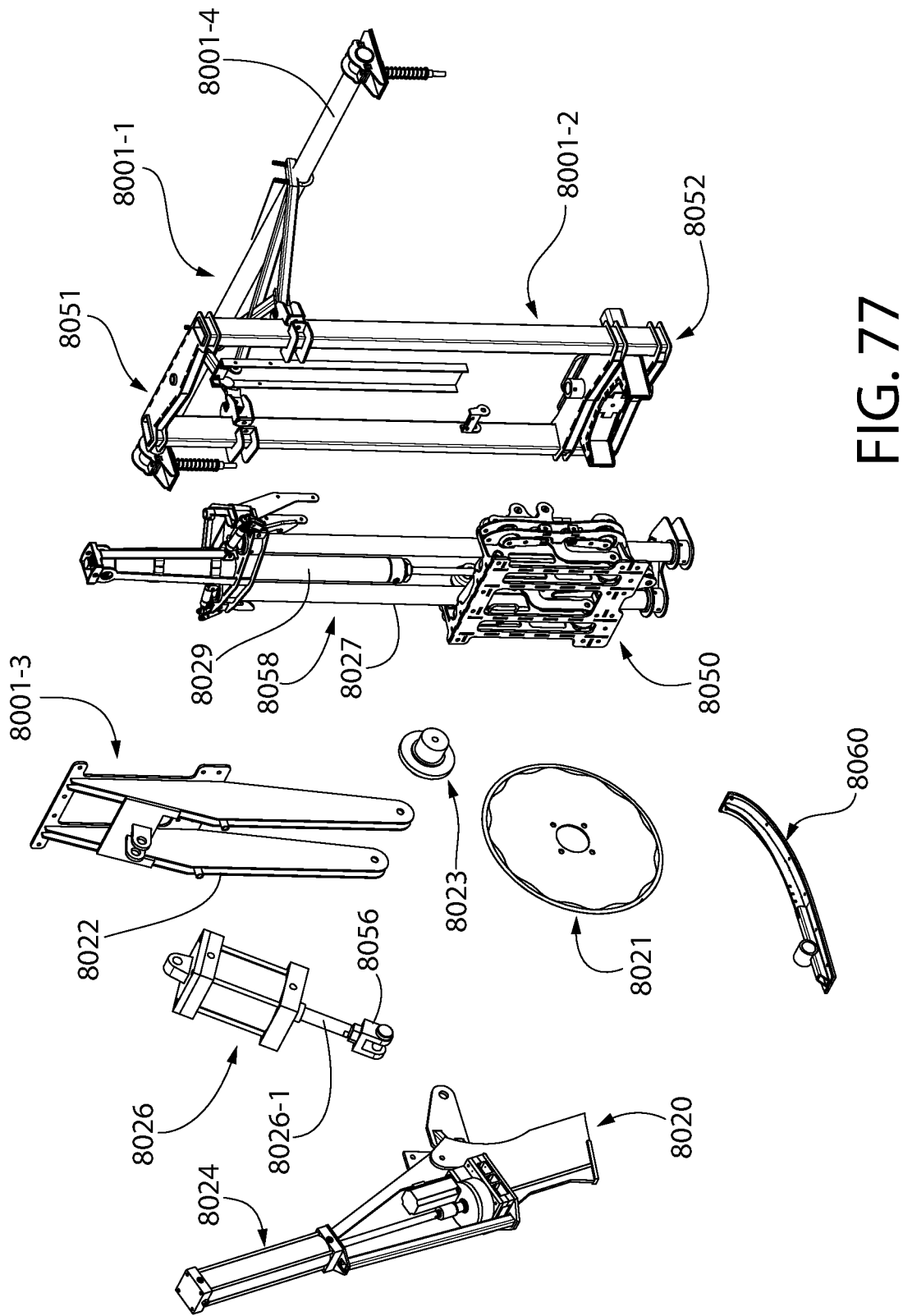
FIG. 77 is a rear exploded view thereof.
Figure 78:
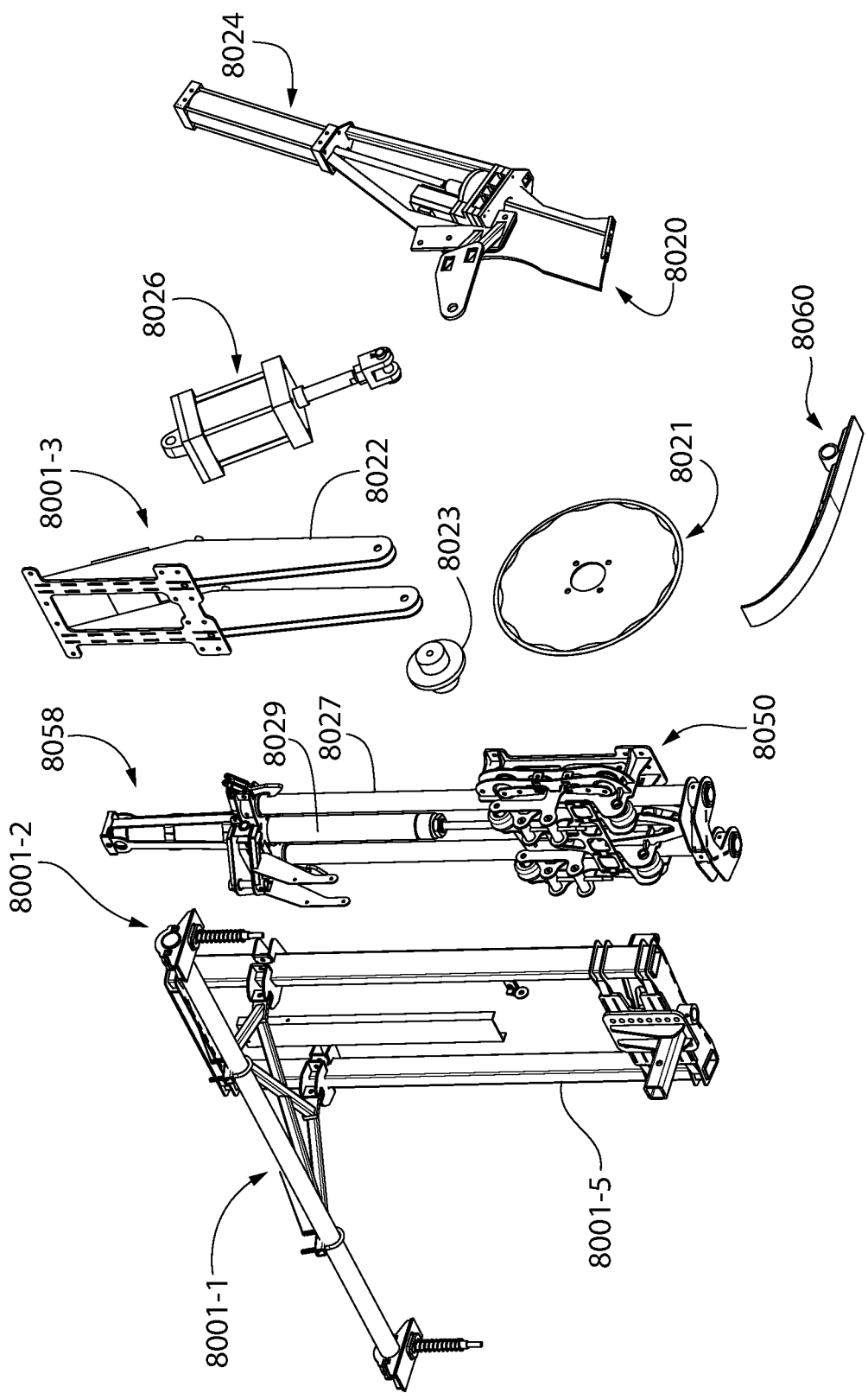
FIG. 78 is a front exploded view thereof.

With continuing reference to FIGS. 44-82, soil sample collection apparatus 8002 may generally include knife assembly 8020 rotatably supporting and housing at least one collection spool 8040 shown in the present embodiment being described, rotatable coulter blade 8021, spool positioning actuator 8024, knife positioning actuator 8026, rolling carriage 8050 with carriage actuator 8029, and at least one guide ski 8060 configured to slideably engage the ground or soil surface GS. Coulter blade 8021 is mounted forward and proximate to knife assembly 8020 in one embodiment to create a trench or furrow in the soil through which at least an upper portion of the knife assembly subsequently passes as the collection apparatus travels through soil. Samples are collected from within the furrow. The blade initially breaks up and loosens the soil for the knife assembly which follows thereafter. This helps the knife assembly more easily as the assembly contains the movable collection spool. Knife assembly 8020 and coulter blade 8021 are substantially axially aligned with each other as best seen in FIG. 67 to accomplish this. The term "substantially" as used here connotes that the knife assembly may be slightly offset laterally from the coulter blade along the horizontal axis HA but functionally will still travel in and benefit from the furrow created by the blade. As shown in FIGS. 44 and 67-68, the knife assembly 8020 and coulter blade 8021 partially penetrate the surface of the soil to a preselected depth for collecting the soil sample.

Coulter blade 8021 may be formed of a generally circular metallic plate in shape and may have a sharpened (i.e. taper or wedge shape) peripheral edge extending circumferentially around the blade body to better cut through the soil. In some embodiments, the blade may have a scalloped design as shown, or may be plain in other implementations. The coulter blade 8021 is rotatably coupled at its center to hub 8023 by a pair of support arms 8022 laterally spaced apart on opposite sides of the blade. Arms 8022 may be vertically elongated each having a bottom end 8022-1 coupled to one side of the hub in a manner which allows the blade 8021 to rotate, and a top end 8022-2 fixedly coupled to the body of the carriage 8050.

Figure 79:
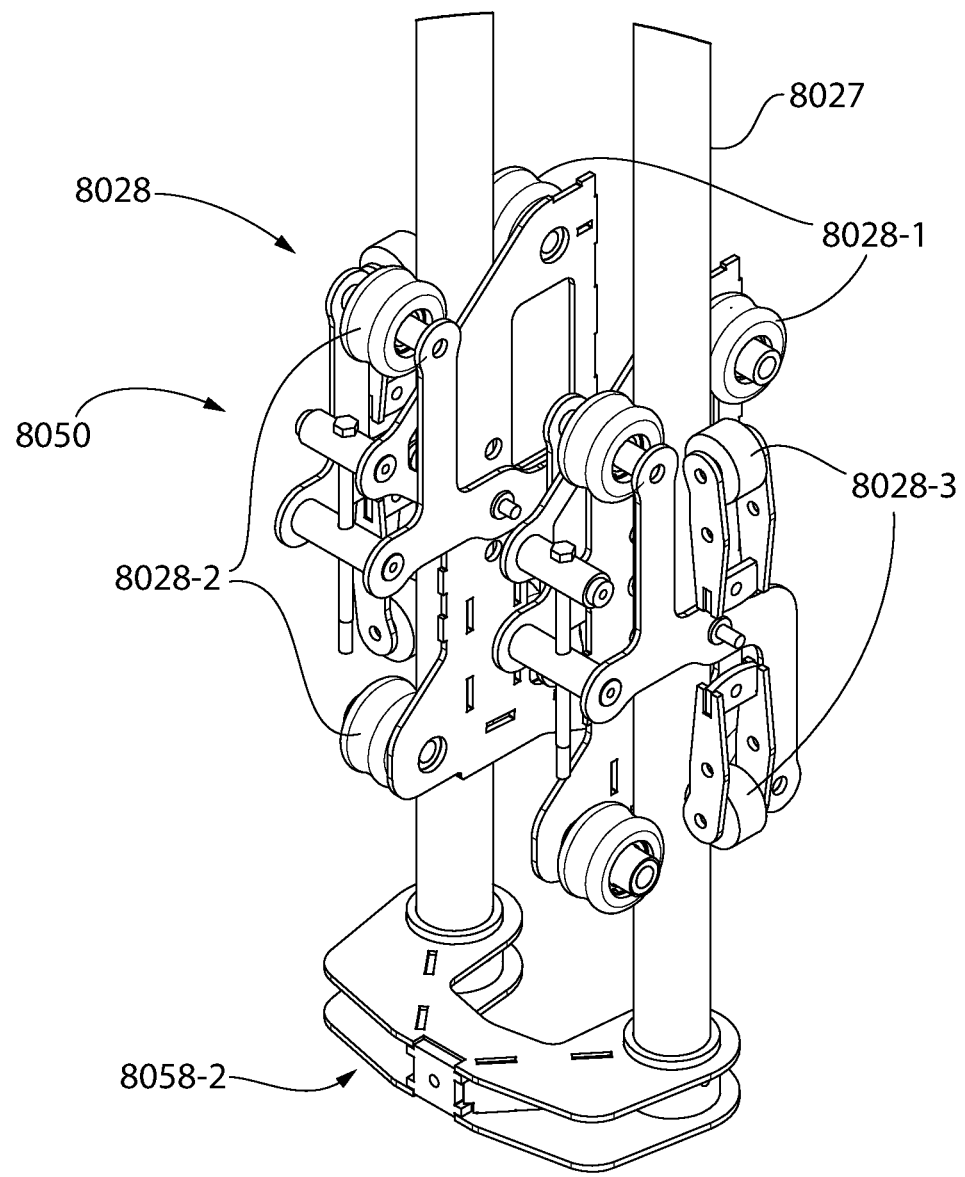
FIG. 79 is a rear perspective view of the carriage with wheels or rollers and guide rails with the outer carriage frame removed for clarity.
Figure 80:
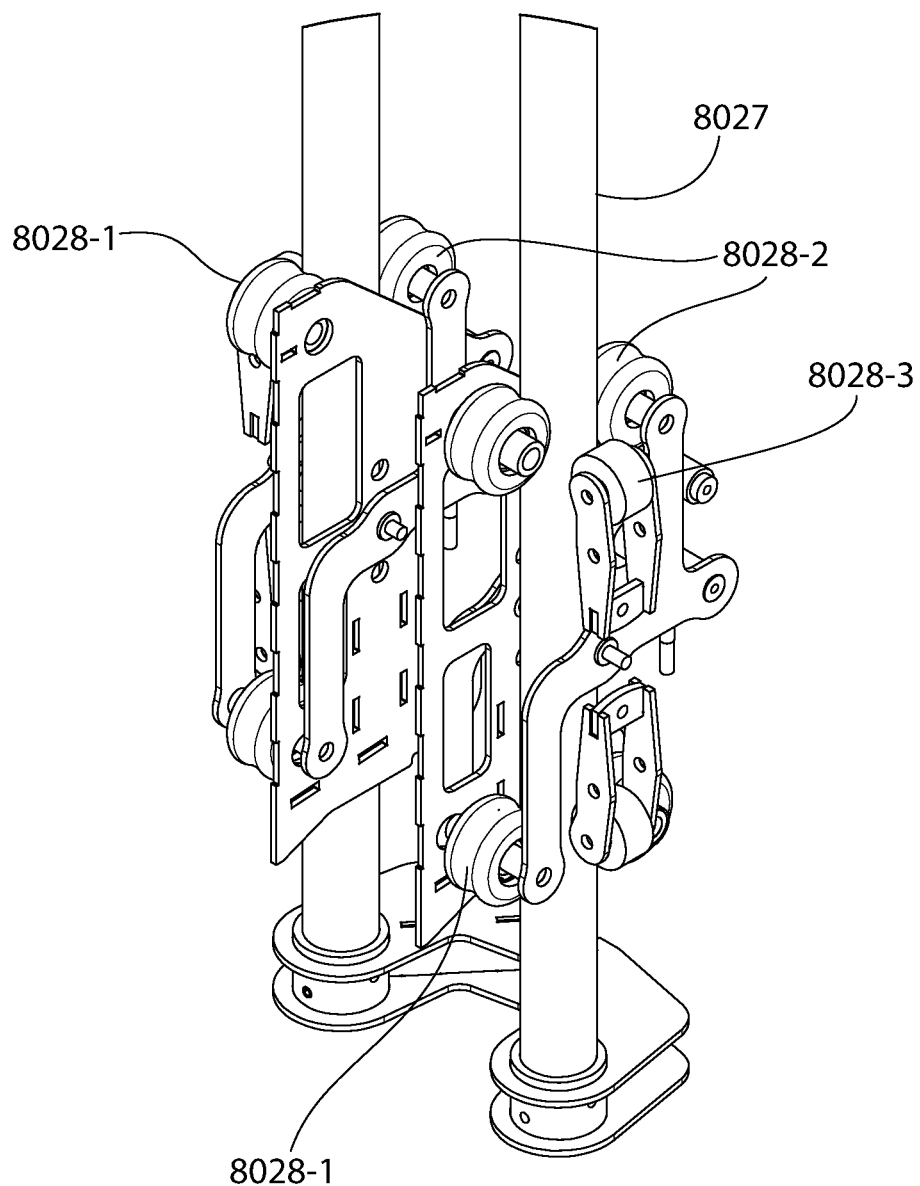
FIG. 80 is a front perspective view thereof.
Figures 81, 82:
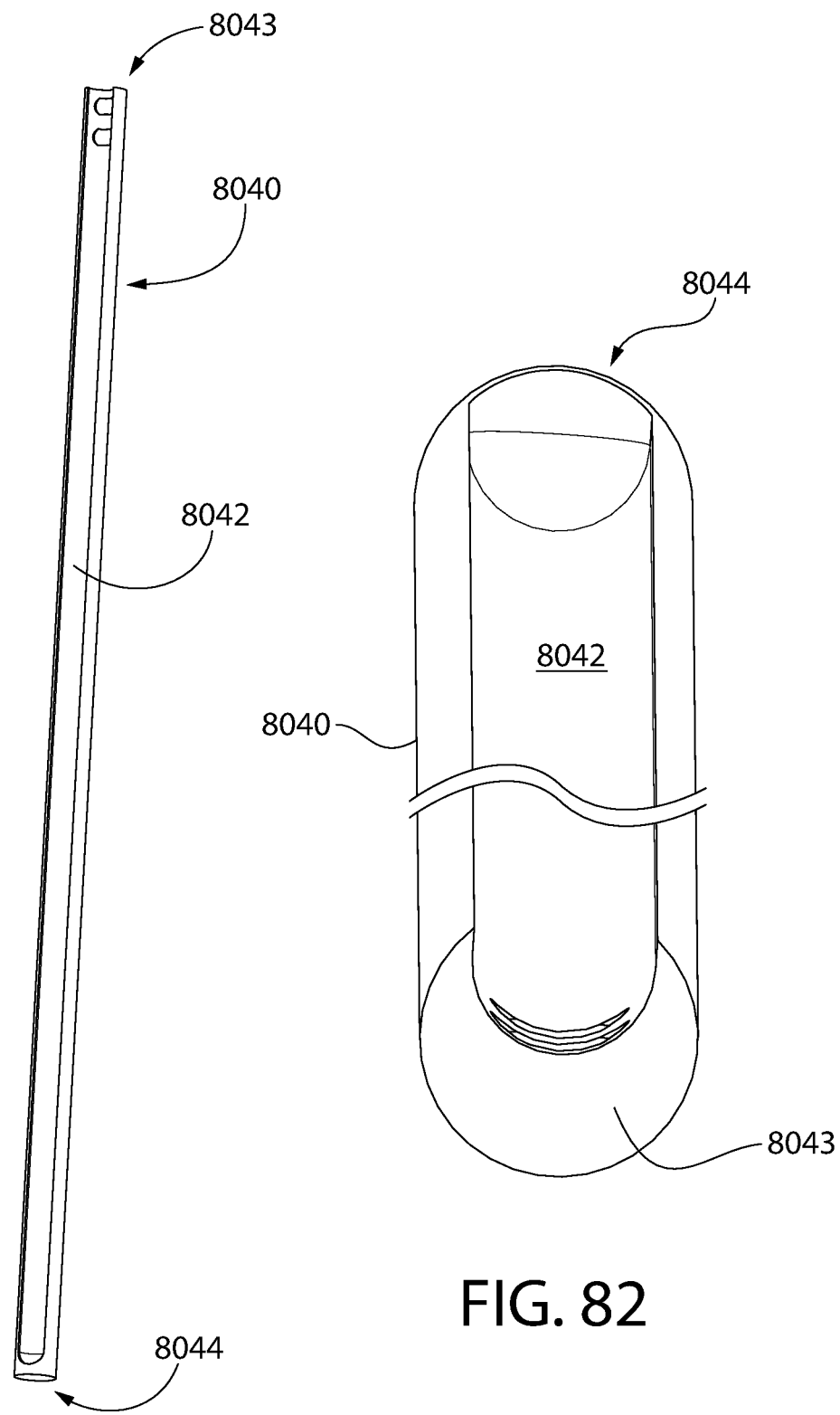
FIG. 81 is a perspective view of the collection spool of the collection apparatus.
FIG. 82 is an enlarged perspective view thereof.
Figure 83:
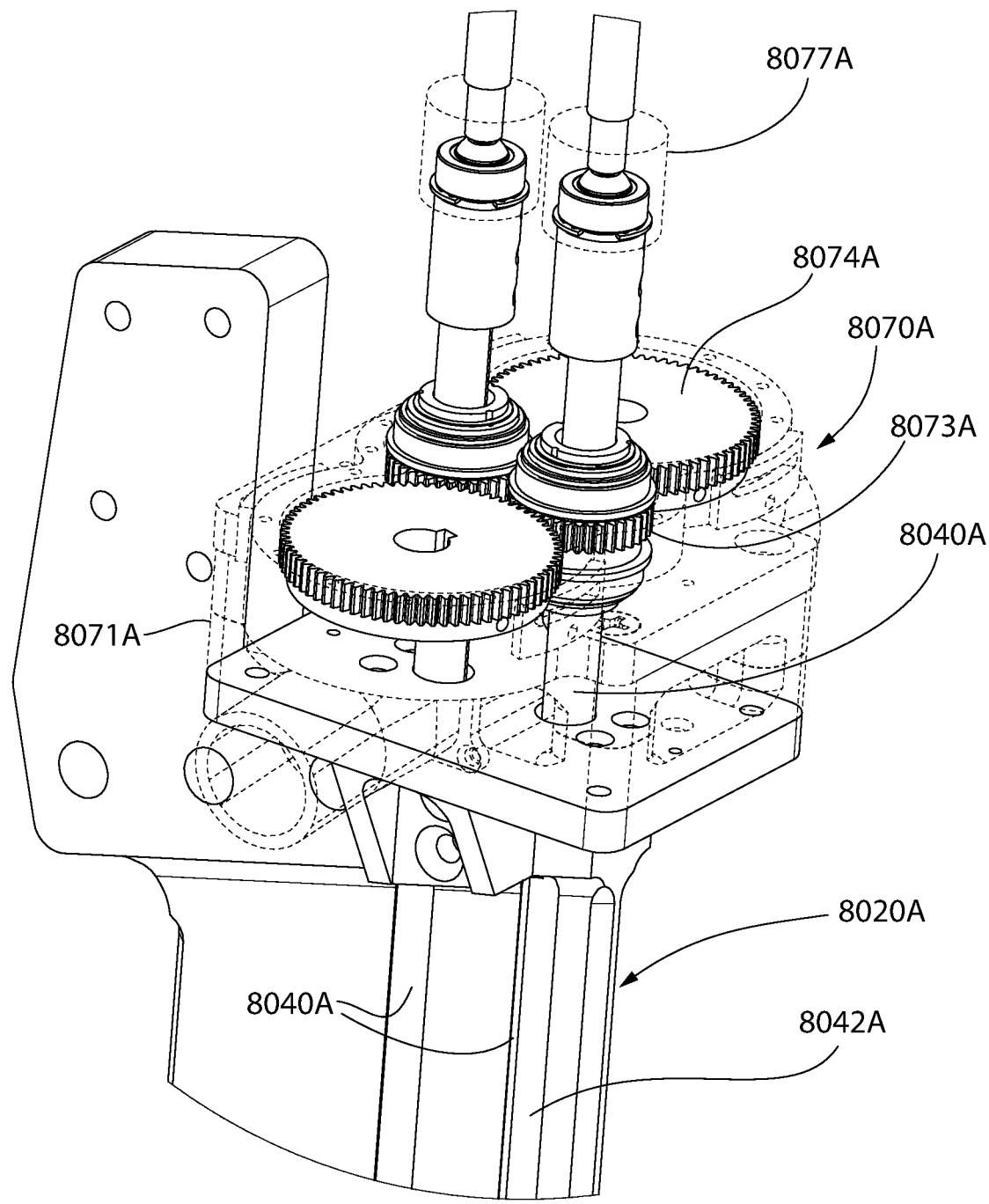
FIG. 83 is a rear perspective view of an alternative two spool embodiment of a collection apparatus showing the gear drive of the spool drive mechanism.
Figure 84:
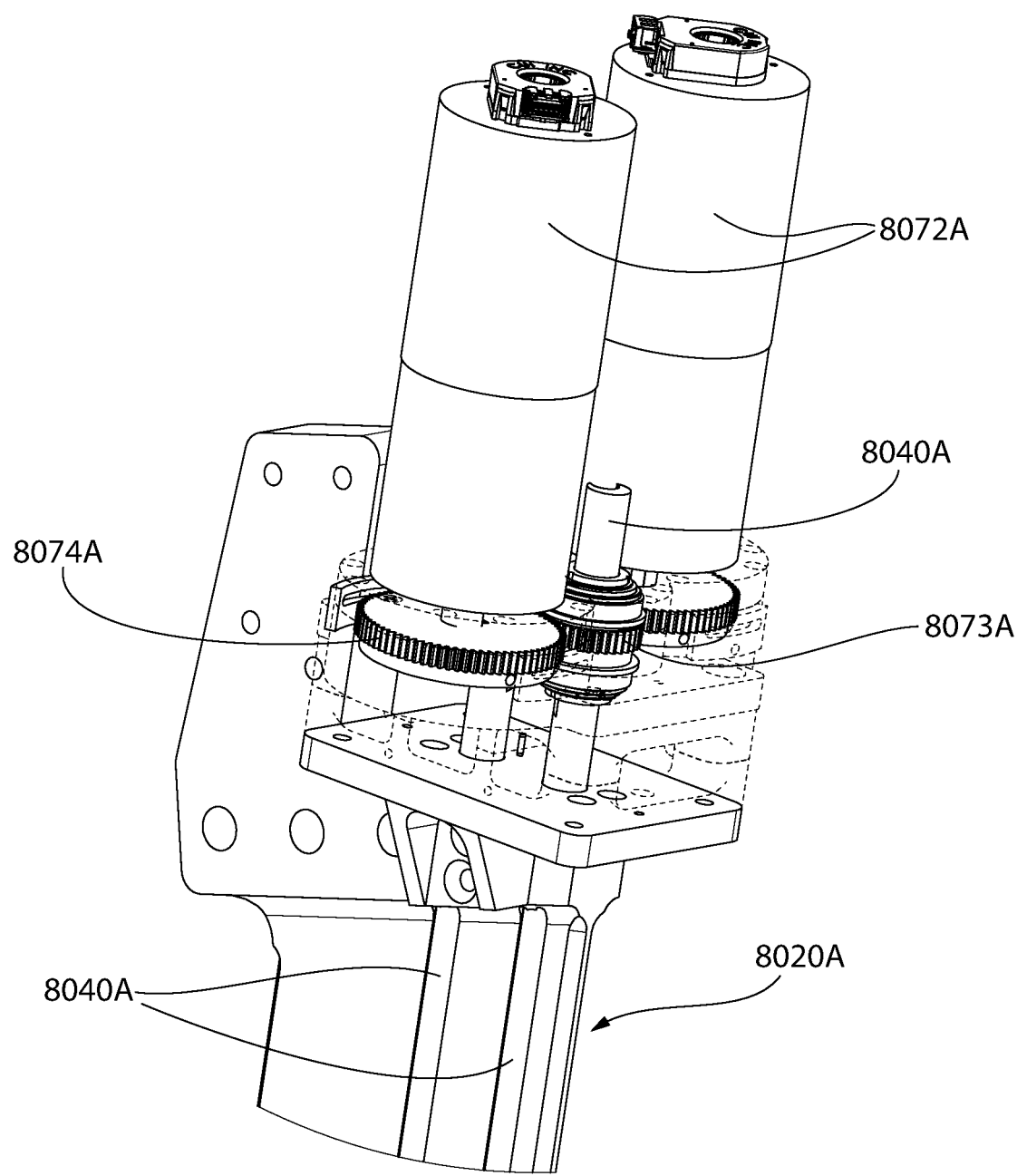
FIG. 84 is a rear perspective view thereof with the gear drive motors mounted.
Figure 85:
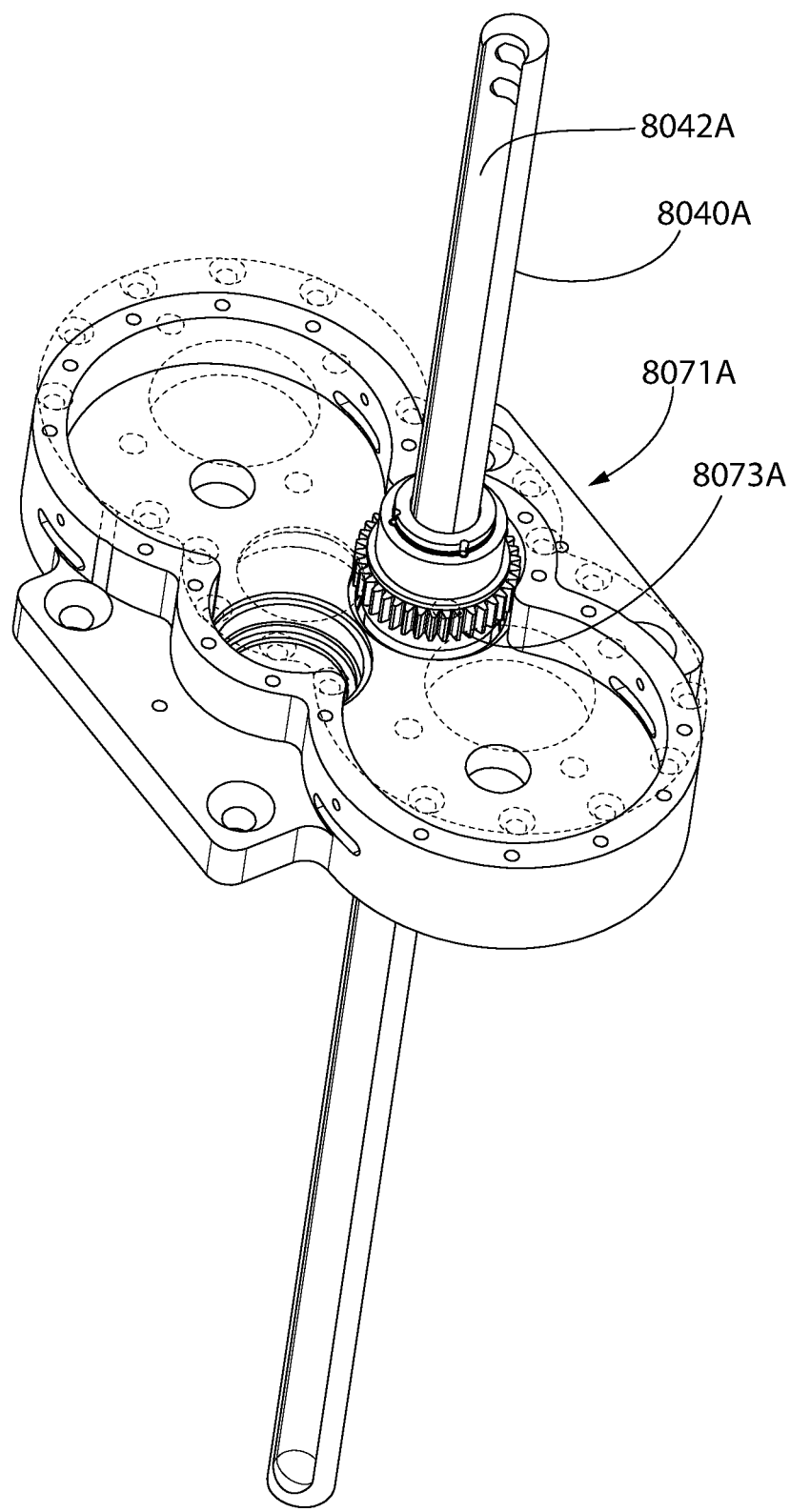
FIG. 85 is a top perspective view of a portion of the gear box and one of the driven gears and collection spool.
Figure 86:
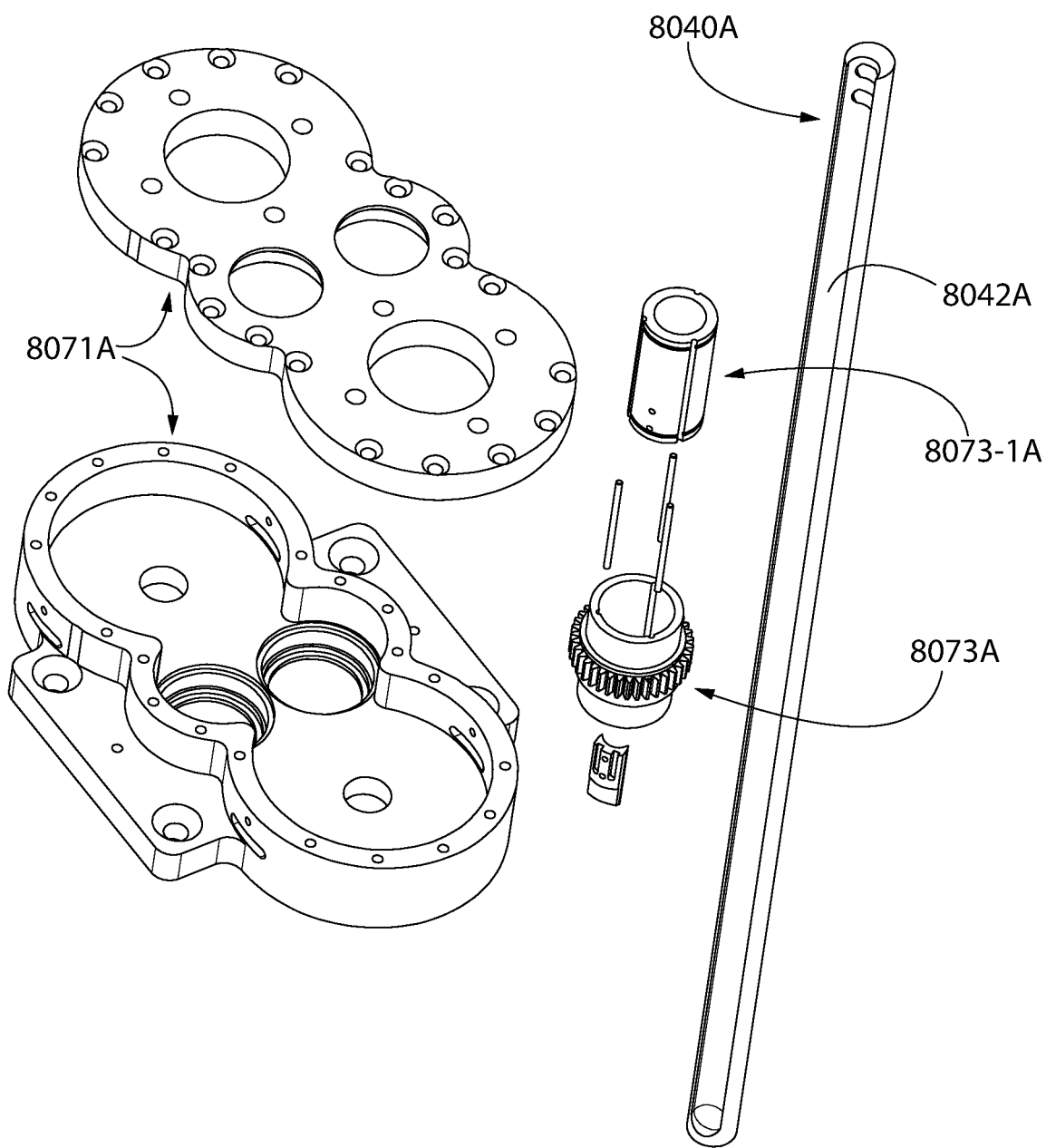
FIG. 86 is an exploded perspective view thereof.
Figure 88:
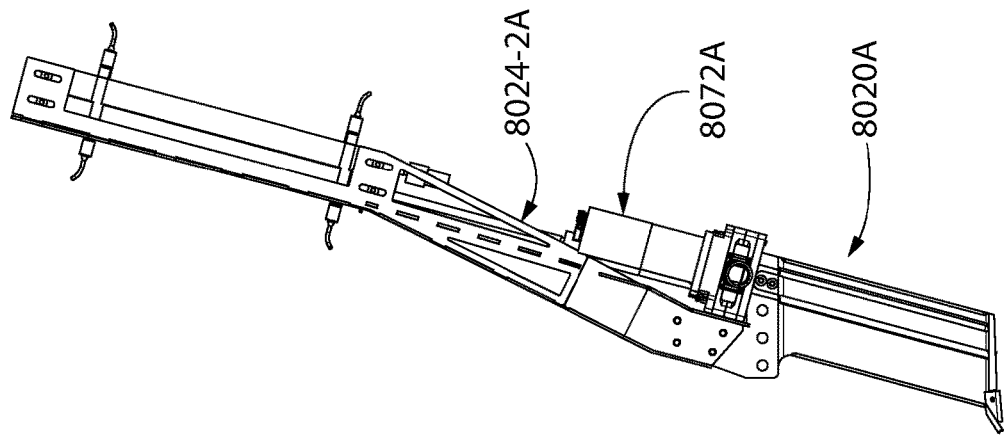
FIG. 88 is a left side view thereof with support frame.
Figure 87:
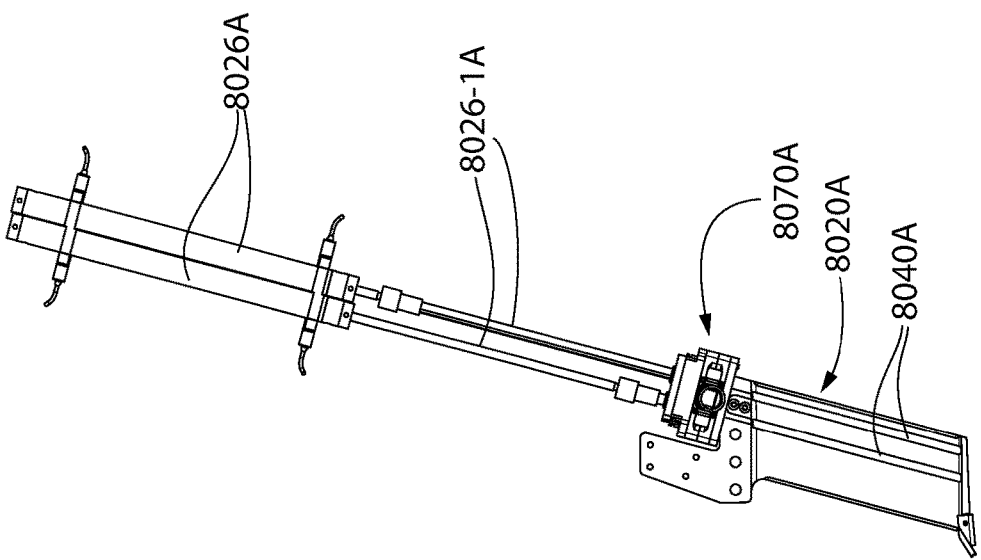
FIG. 87 is a left side view of the knife assembly of the collection apparatus showing the spool drive mechanism with spool positioning actuator support frame removed.
Figure 90:
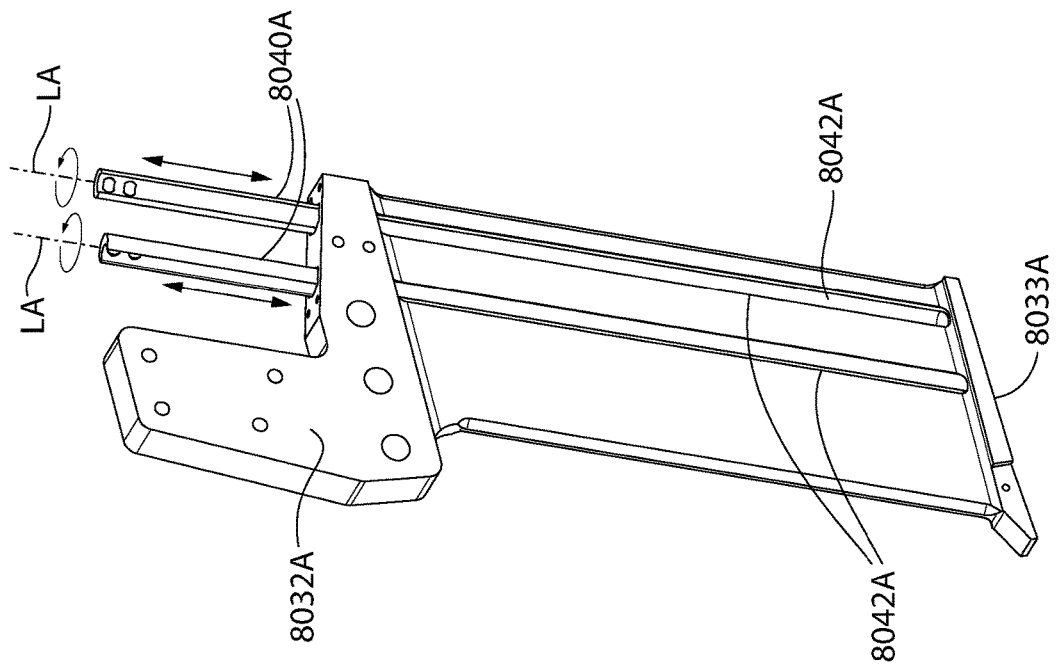
FIG. 90 is a second left side perspective view thereof.
Figure 89:
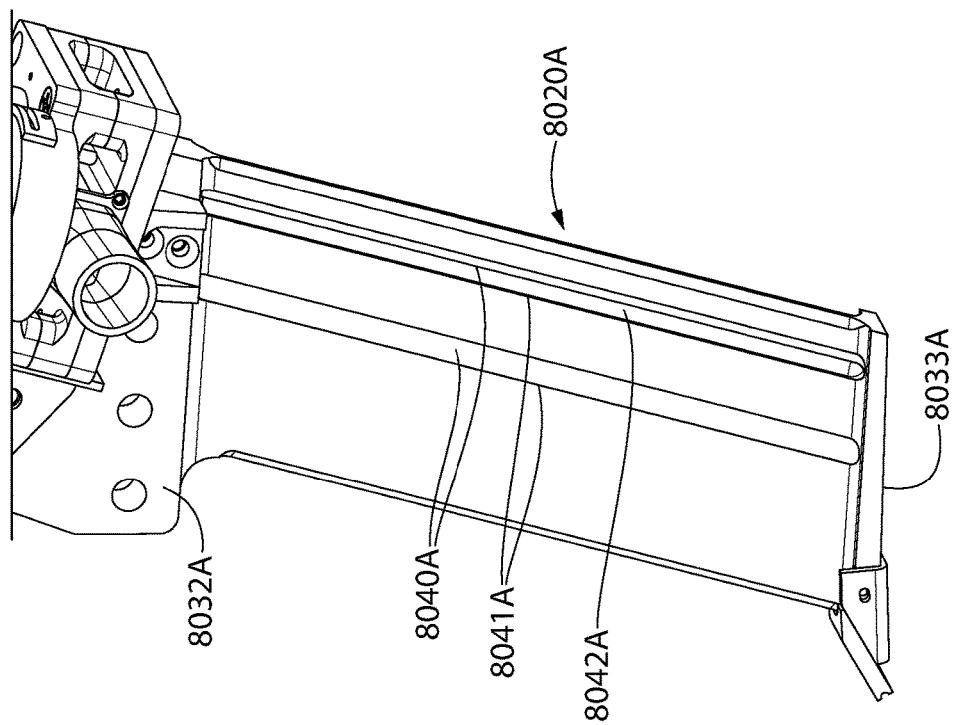
FIG. 89 is a first left side perspective view of the knife assembly.
Figure 91:
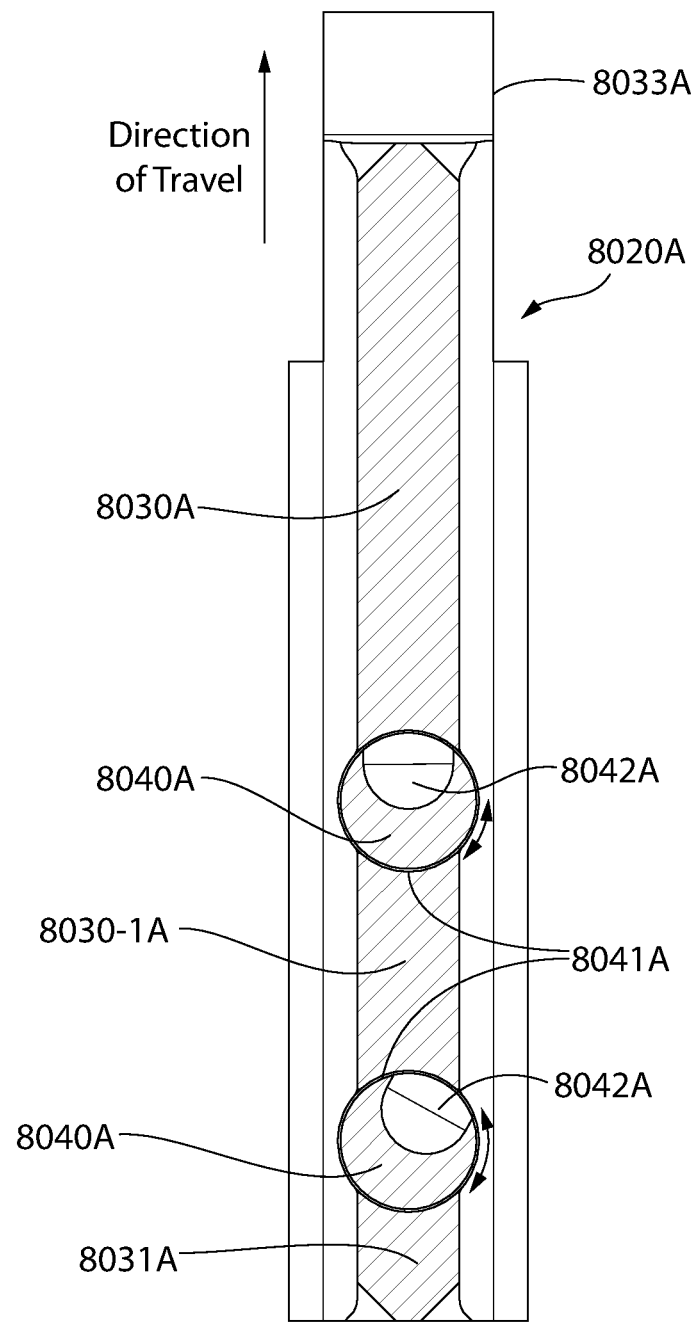
FIG. 91 is a horizontal transverse cross-sectional view of the two spool knife assembly.
Figure 92:
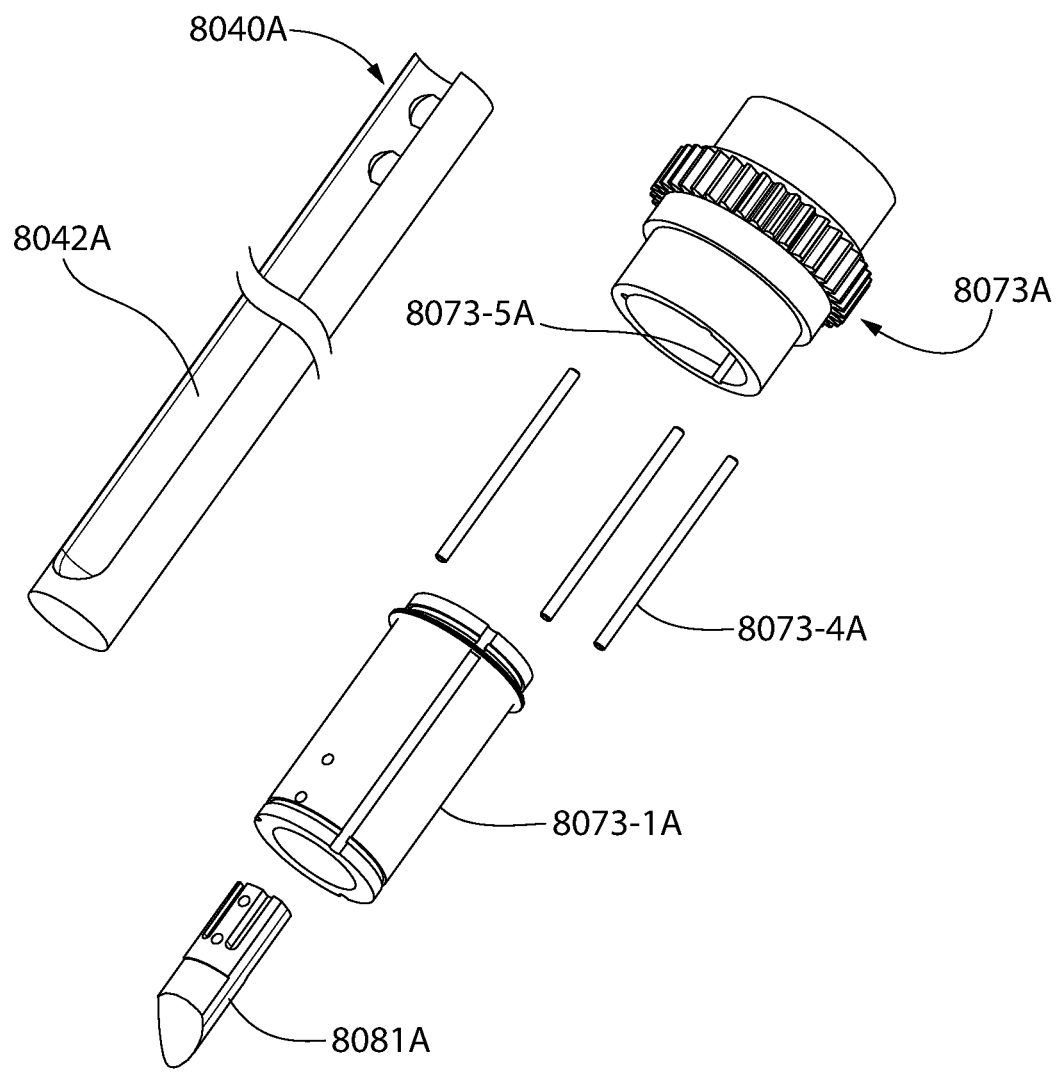
FIG. 92 is an exploded perspective view of the driven gear assembly.
Figure 93:
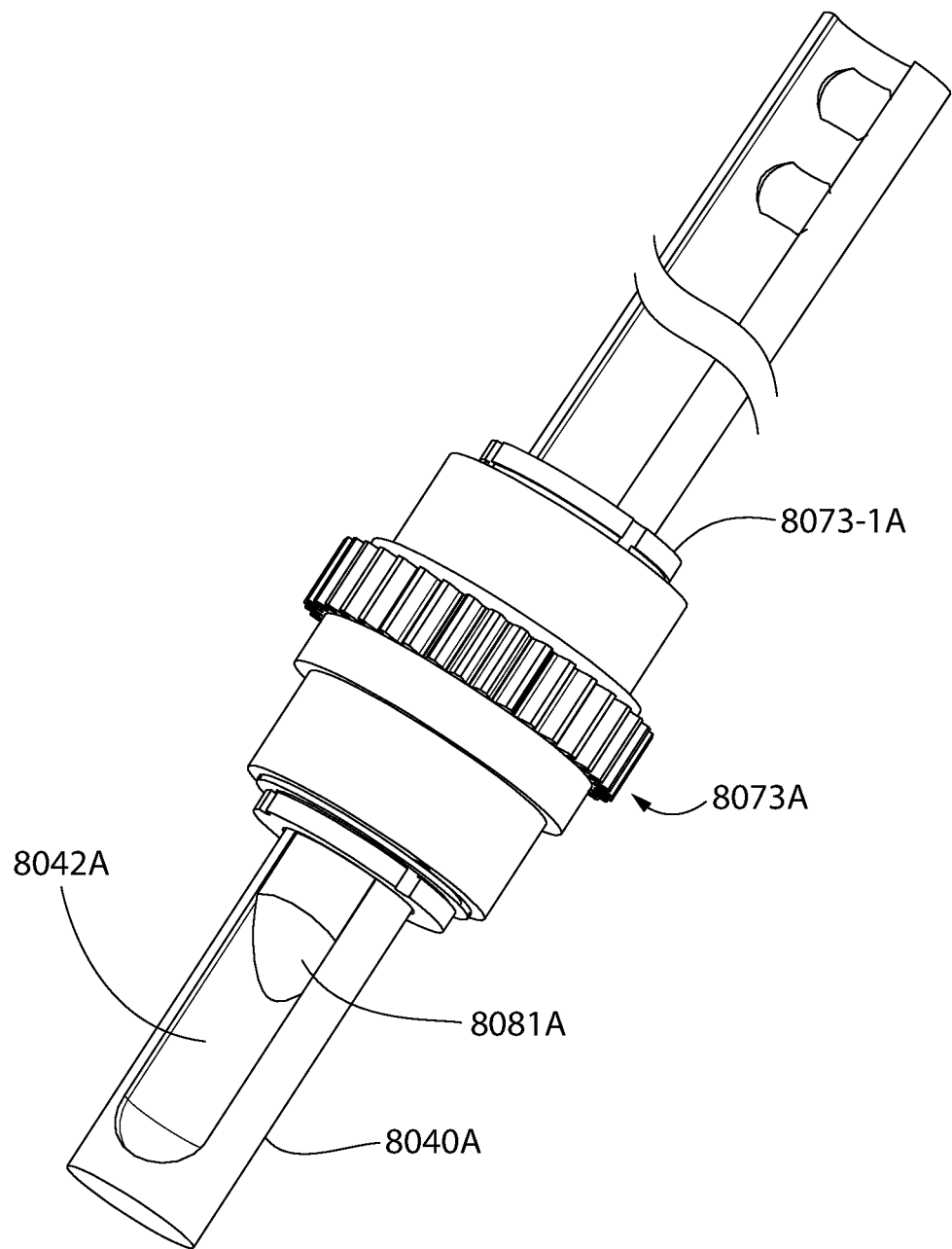
FIG. 93 is an assembled view thereof.

Carriage 8050 includes the plurality of rollers 8028 configured to rollingly engage and move up and down along the guide rails 8027 (best seen in FIGS. 79-80). The rollers may each have an arcuate concave rails engagement surface which is complementary configured to the circular cross-sectional shape of the guide rails to maintain positive mutual engagement while the carriage travels up and down on the rails. To maintain smooth rolling engagement between the rollers and guide rails, in one embodiment, each of the rails may be engaged by vertically spaced pairs of front rollers 8028-1, rear rollers 8028-2, and outboard side rollers 8028-3. The front and rear rollers stabilize movement of the carriage on the rails in the front to rear direction. The outboard rollers stabilize movement of the carriage in the lateral side to side direction. It bears noting that the set of rollers 8028 on carriage 8050 further serve to ameliorate front to rear and side to side forces which may be imparted to the collection apparatus 8002 supported by the carriage when the apparatus encounters rough and undulating soils conditions or rocks at the soil surface GS; neither of which are unexpected in agricultural fields.

The vertical position of the carriage 8050 on guide rails 8027 is controlled by linear-acting carriage actuator 8029. Actuator 8029 is vertically oriented and may be arranged at the vertical geometric centerline between the guide rails as shown. Actuator 8029 operates to lower or raise the carriage relative to the vehicle 8003 and in turn soil surface GS of the soil (see, e.g. FIGS. 65-67). Accordingly, the depth of penetration of the knife assembly 8020 and coulter blade 8021 of collection apparatus 8002 into the soil is primarily adjusted by carriage actuator 8029 to which the collection apparatus is mounted in a cantilevered manner. Actuator 8029 may be a pneumatic cylinder type actuator in one embodiment; however, hydraulic cylinders or electric linear actuators may also be used. The actuator 8029 is fixedly mounted to rail frame section 8001-2 at top and at bottom is operably coupled to the rolling carriage 8050 via operating or piston rod 8029-1. By retracting or extending the piston rod, the actuator 8029 selectively raises or lowers the carriage 8050 to which the entire collection apparatus 8002 is mounted and supported relative to the vehicle 8003 and soil surface. Actuator 8029 may raise the carriage 8050 and collection apparatus 8002 mounted thereto to an upper stowed position for transport when not collecting soil samples (see, e.g. FIG. 69). In a lower active position actively engaged with the soil (see, e.g. FIGS. 67-68), the collection apparatus is ready to collect soil samples.

Figure 53:
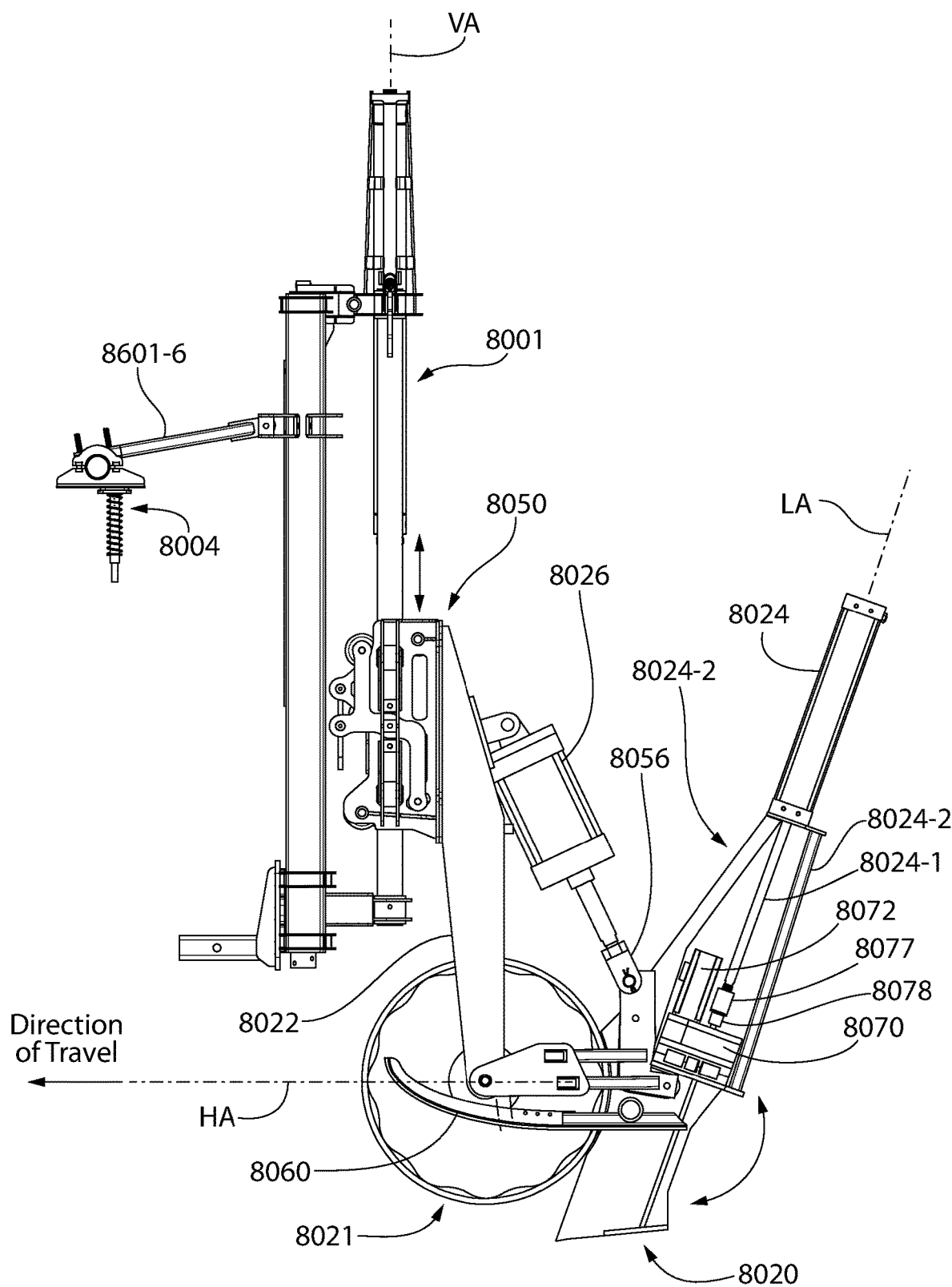
FIG. 53 is a left side view thereof.
Figure 54:
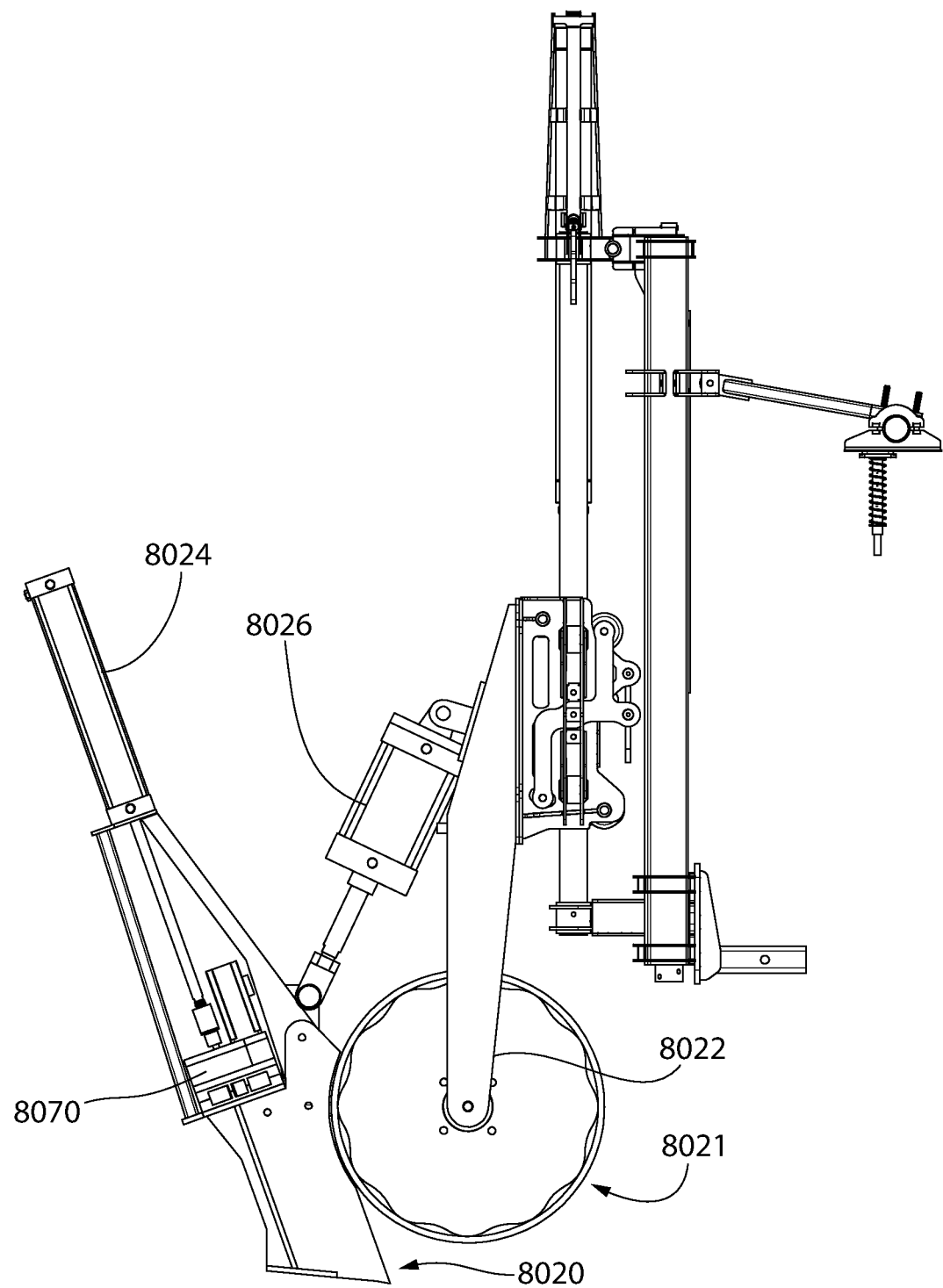
FIG. 54 is a right side view thereof.

For convenience of description, the collection assembly 8009 may be considered to define a vertical axis VA coaxial with the carriage actuator 8029 (passing through geometric centerline between guide rails 8027) and a horizontal axis HA passing through the hub 8023 of the coulter blade assembly (identified in FIG. 53). Whereas the vertical axis remains fixed in position relative to the carriage chassis 8058 and collection vehicle 8003, the horizontal axis is vertically movable with the coulter blade 8021 and knife assembly 8020 as the carriage 8050 moves up and down along the guide rails 8027. The elongated collection spool 8040 defines a longitudinal axis LA (identified in FIG. 53) which may change between positions parallel to vertical axis VA and obliquely angled to axis VA (see, e.g. FIGS. 67-68), as further described herein.

The collection apparatus 8002 (e.g. knife assembly 8020 and coulter blade 8021) is pivotably coupled to the pair of support arms 8022 coupled to the carriage 8050 via a pivot arm linkage 8061. Linkage 8061 has one end pivotably coupled to hub 8023 and an opposite end pivotably coupled to pivot arm bracket 8055 fixedly mounted to the knife assembly 8020. Bracket 8055 may be mounted to the larger front blade element 8031 in one non-limiting embodiment further described below, preferably on the top portion of the element which remains above the soil during sample collection (see, e.g. FIGS. 46-47, 58 and 67). The knife assembly 8020 of the collection apparatus has a pivot axis coinciding with the horizontally oriented rotational centerline of coulter blade hub 8023. Knife assembly 8020 is moveable about its pivot axis in an arcuate path upwards and downwards (see, e.g. FIGS. 67-68).

Knife positioning actuator 8026 may be a pneumatic cylinder type actuator in one embodiment; however, hydraulic cylinders or electric linear actuators may also be used. Actuator 8026 is configured to act in a linear direction via movable operating or piston rod 8026-1 rotatably coupled at bottom to the knife assembly swing arm bracket 8055 via a clevis and pin assembly 8056. At top, the top of the actuator housing is pivotably coupled to cross plate 8054 rigidly mounted between support arms 8022 of the coulter blade assembly via pinned connection 8057. The actuator 8026 supplies a holding force on the knife swing arm and can be used at least partially set both the penetration depth of the knife assembly 8020 and coulter blade 8021 in the soil, and the angle of the knife assembly relative to vertical axis VA.

The knife positioning actuator 8026 serves another useful purpose which protects the collection apparatus 8002 from damage. During use of collection apparatus when collecting a soil sample in the agricultural field AF, an obstruction in the soil may be encountered (e.g. rock, etc.) by the traveling collection apparatus 8002 (see, e.g. FIG. 67). In FIG. 67, the piston rod 8026-1 is in an extended position relative to the actuator housing with the knife assembly 8020 in an angled position (e.g. front side of front blade element 8031 obliquely angled to vertical axis VA) for easier plowing/travel through the soil. If overcoming the obstruction when struck by the knife assembly and/or coulter blade requires greater force than the holding force of the actuator can provide (e.g. air/oil pressure for pneumatic/hydraulic actuator or electric resistance for electric actuator), then the piston rod of the actuator becomes compressed and retracts into the actuator housing, thereby pivotably tilting the knife assembly rearward and raising the collection apparatus to allow the obstruction to pass beneath the knife assembly (compare, e.g. FIGS. 67-68). The front side of front blade element 8031 may be substantially parallel to vertical axis VA now. The cylinder of the knife positioning actuator 8026 thus advantageously serves as a shock absorber to provide a mechanical cushion or "breakaway" mechanism for the collection apparatus when encountering sub-surface soil obstructions to prevent damaging the equipment.

Knife assembly 8020 comprises a rear blade element 8030, front blade element 8031, top blade mounting bracket 8032, and bottom base plate 8033. Base plate 8033 and mounting bracket 8032 may be horizontally elongated with the blade elements sandwiched therebetween. The blade elements are rigidly mounted at their tops to mounting bracket 8032 and at their bottoms to base plate 8033 via any suitable method, such as for example without limitation threaded fasteners, welding, or other fixed mounting methods to provide rigidity to the knife assembly to counteract the soil pressure applied by pulling the assembly through the soil for sample collection. The rear and front blade elements 8030, 8031 may be mounted to the base plate in a horizontally axially spaced apart manner along horizontal axis HA of the collection apparatus to collectively define a vertically elongated spool slot 8041 therebetween (best shown in FIG. 48). Accordingly, slot 8041 is there collectively defined by the space created between each blade element. Slot 8041 has a transverse cross-sectional shape complementary configured to the cross-sectional shape of the spool 8040 which may be circular in one embodiment (see, e.g. FIG. 48). Additional slots 8041 may be provided if more than one spool is incorporated into the knife assembly in other embodiments, as further described hereafter. Spool slot 8041 is configured to rotatably and slideably receive the spool 8040 therein. Specifically, spool 8040 is vertically and slideably movable upwards/downwards in the slot, and rotatably movable as well for capturing and retaining the soil sample as further described herein. Both the slot 8041 and spool 8040 may have circular shapes in transverse cross-section as the spool may have a cylindrical configuration in the illustrated embodiment.

Rear and front blade elements 8030, 8031 may be formed of generally flat metallic plates in one embodiment; each having opposing right and left lateral major surfaces which are substantially parallel to each other. Any suitable overall general configuration of blade elements 8030, 8031 may be used so long as the elements sufficient support and house the collection spool 8040 and can penetrate the soil. The blade elements may have different shapes in perimetrical outline, which can be polygonal, non-polygonal, or combinations thereof. The front blade element 8031 which engages and plows through the soil head on may be larger and more robust to serve this functional purpose. The leading edge of front blade element 8031 may be angled or wedge shaped (in transverse cross-section) to better plow through the soil. The smaller rear blade element 8030 primarily functions to define the spool slot 8041. It bears noting that the forward coulter blade 8021 functions to partially loosen the soil before being encountered by the knife assembly 8020 as it is pulled through the soil. However, the rear and front blade elements 8030, 8031 of knife assembly 8020 extend vertically below the bottom of the coulter blade 8021 and guide ski 8060 (see, e.g. FIGS. 53-54) such the lower portion of the knife assembly encounters soil proximate to the bottom and just below of the furrow or trough plowed by the coulter blade. This soil layer may be somewhat loosed by the coulter blade to reduce frictional resistance on the knife assembly thereby making is easier for the knife assembly to progress forward through the soil to collect the soil samples.

Knife assembly 8020 includes guide ski 8060 which substantially limits the insertion depth of the knife assembly into the soil as seen in FIGS. 67-68. Ski 8060 has a horizontally elongated body and arcuately upturned front end to accommodate undulations in the soil surface of the agricultural field which naturally occur. The ski may be rigidly mounted to one lateral side of the knife assembly (e.g. front blade element 8031) via cylindrical mounting boss 8062. In one embodiment, boss 8062 may be welded to the top of the ski and to the side front blade element 8031. This creates a structurally robust attachment capable of maintaining the position of the knife assembly 8020 against the soil surface GS and the holding force of knife positioning actuator 8026 (described elsewhere herein) when undulating soil surface conditions or surface debris (e.g. valleys, ridges, rocks, tree branches, etc.) not uncommon in the agricultural field are encountered by the collection apparatus 8002. Ski 8060 may be preferably made of any suitable durable and strong metal.

FIGS. 48, 57-66, and 81-82 show aspects of the soil collection spool 8040 and associated spool drive mechanism in greater detail. In one embodiment, spool 8040 may have an elongated cylindrical body with a laterally and outwardly open collection cavity 8042. The cavity may extend for substantially the entire length of the spool from top end 8043 to bottom end 8044. The top end is configured for mounting to spool positioning actuator 8024 which operates to selectively raise or lower the spool in the knife assembly 8020. The bottom end may be closed to retain the captured soil sample. Cavity 8042 may have an arcuately curved contour or shape from side to side to facilitate removal of the captured sample. Spool 8040 may be formed of a suitable metal such as aluminum or steel for ruggedness and durability for the service conditions. In one embodiment, stainless steel may be used for corrosion protection to ensure smooth rotational and linear movement of the spool in the spool slot 8041 of the knife assembly 8020.

Knife assembly 8020 further includes a spool drive mechanism operably coupled to the collection spool 8040 which operates to (1) rotate the spool for capturing and retaining the soil sample, and (2) raise and lower the spool for ejecting the sample into a sample transport system. To accomplish the foregoing dual motions of the spool, the spool drive mechanism comprises a gear drive 8070 for rotational motion of the spool and a spool positioning actuator 8024 for linear up and down motion of the spool. Each motion and function will be described in turn below.

Figure 66:
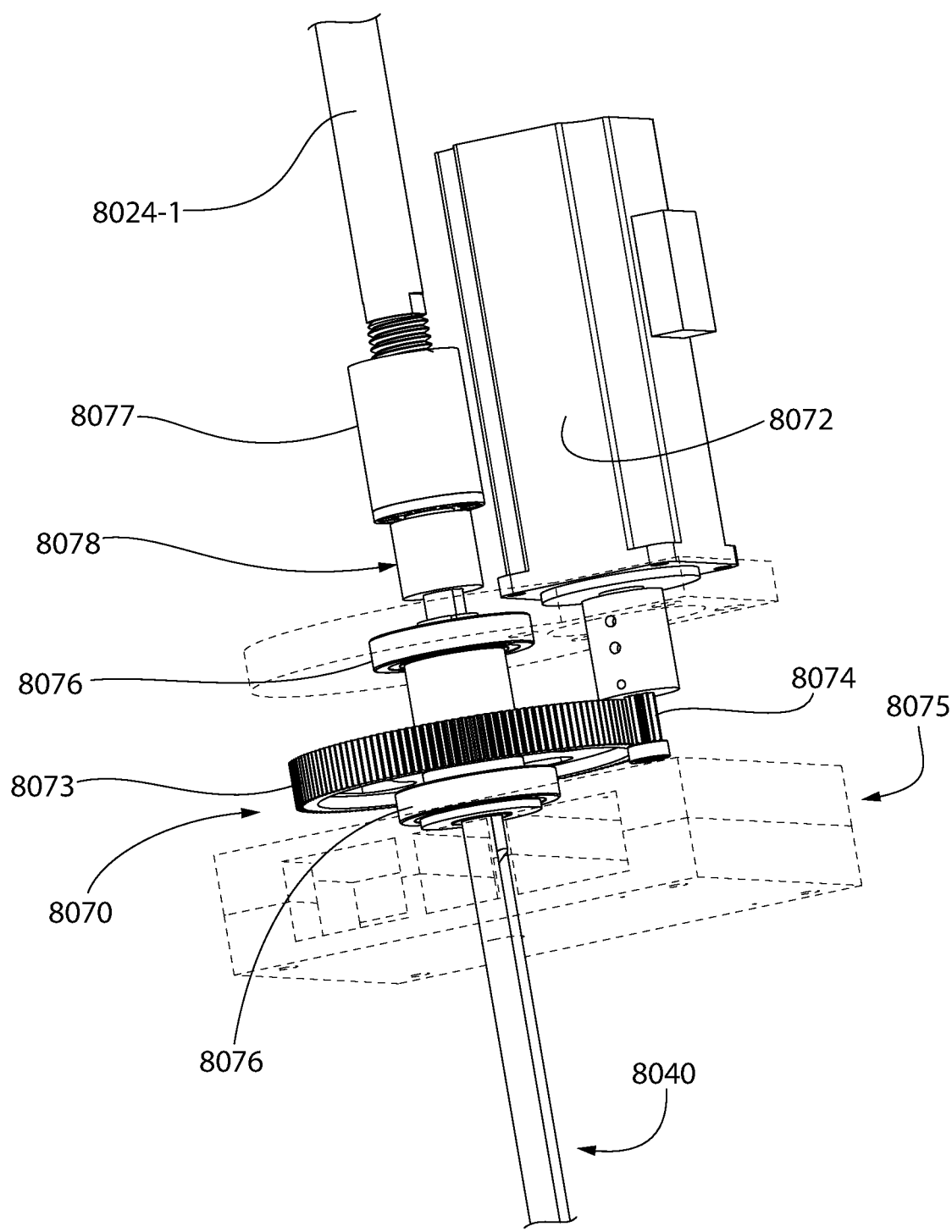
FIG. 66 is a perspective view of gear drive showing the drive and driven gears.

Gear drive 8070 comprises an electric motor 8072 including drive gear 8074 coupled to the motor's drive shaft and intermeshed with a main driven gear 8073 (see, e.g. FIG. 66). Driven gear 8073 is operably interfaced with the collection spool 8040, as further described herein. The drive gear and driven gear may be housed in gear box 8071 of any suitable configuration for protection from the elements and environment. The gear box and motor may in turn be mounted on and supported by the gear drive support base or platform 8075, which may be attached to the top of the knife assembly 8020. In some embodiments, the platform 8075 may be configured for coupling to a sample collection/conveyance system to transport the soil sample to the soil sample analysis system for slurry preparation and chemical analysis as previously described herein. Motor 8072 may be supported by the gear box and includes a drive shaft 8074-1 coupled to drive gear 8074, shaft support bearing 8074-2, and shaft sleeve fitting 8074-3 supporting and surrounding the drive shaft between the drive gear and motor housing.

Figure 59:
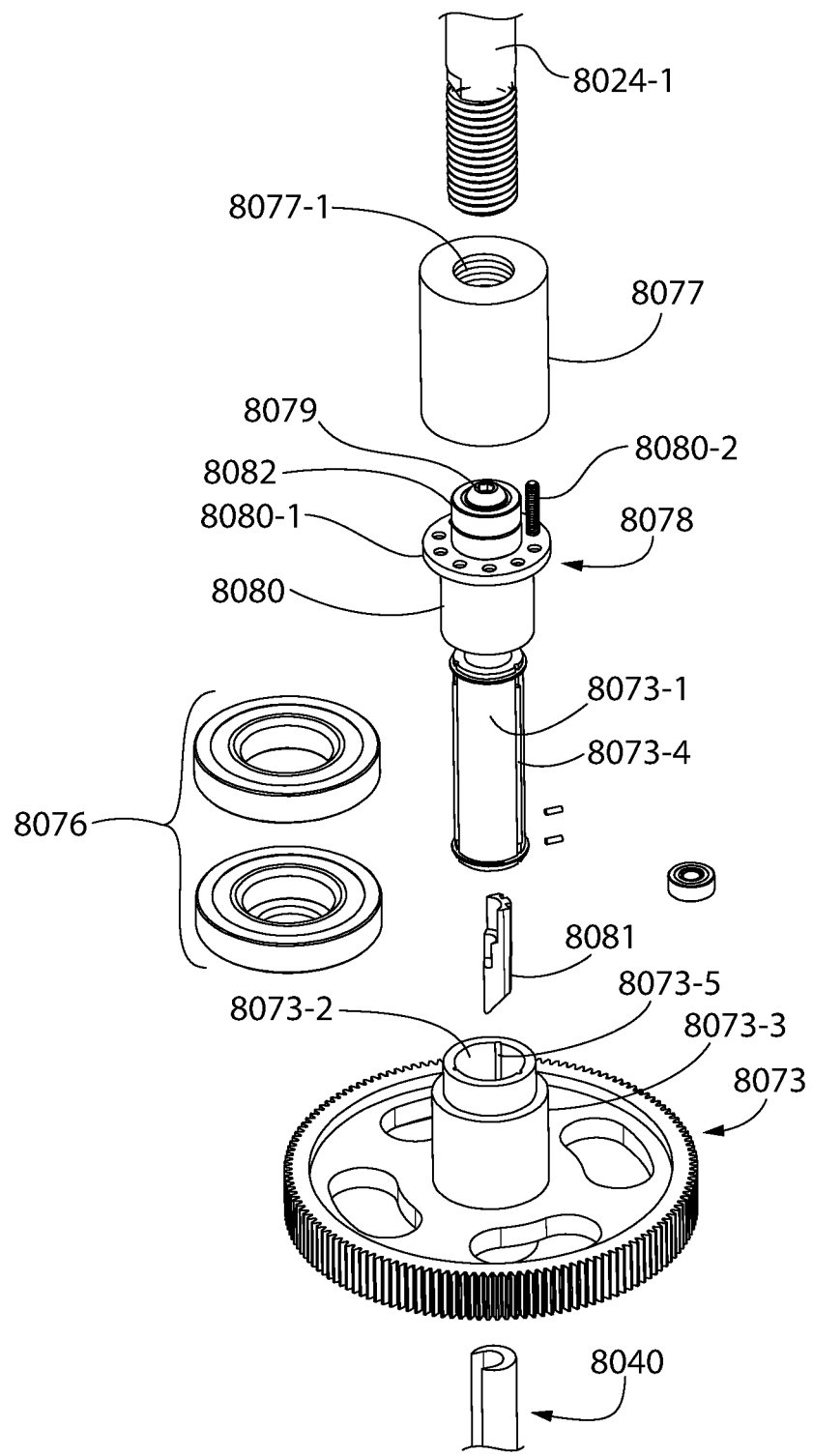
FIG. 59 is a top exploded perspective view of a portion of the collection spool drive mechanism of the collection apparatus.
Figure 60:
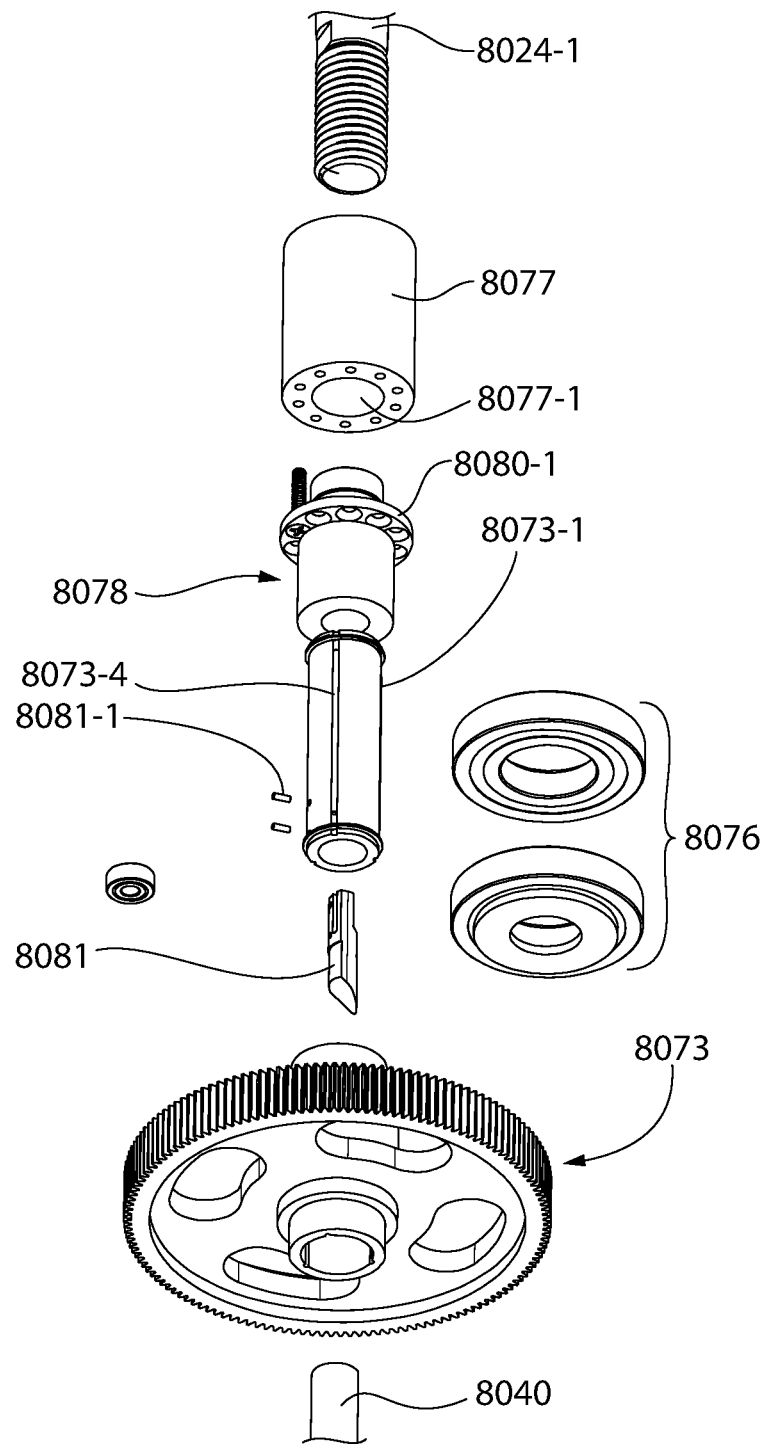
FIG. 60 is a bottom exploded perspective view thereof.
Figure 61:
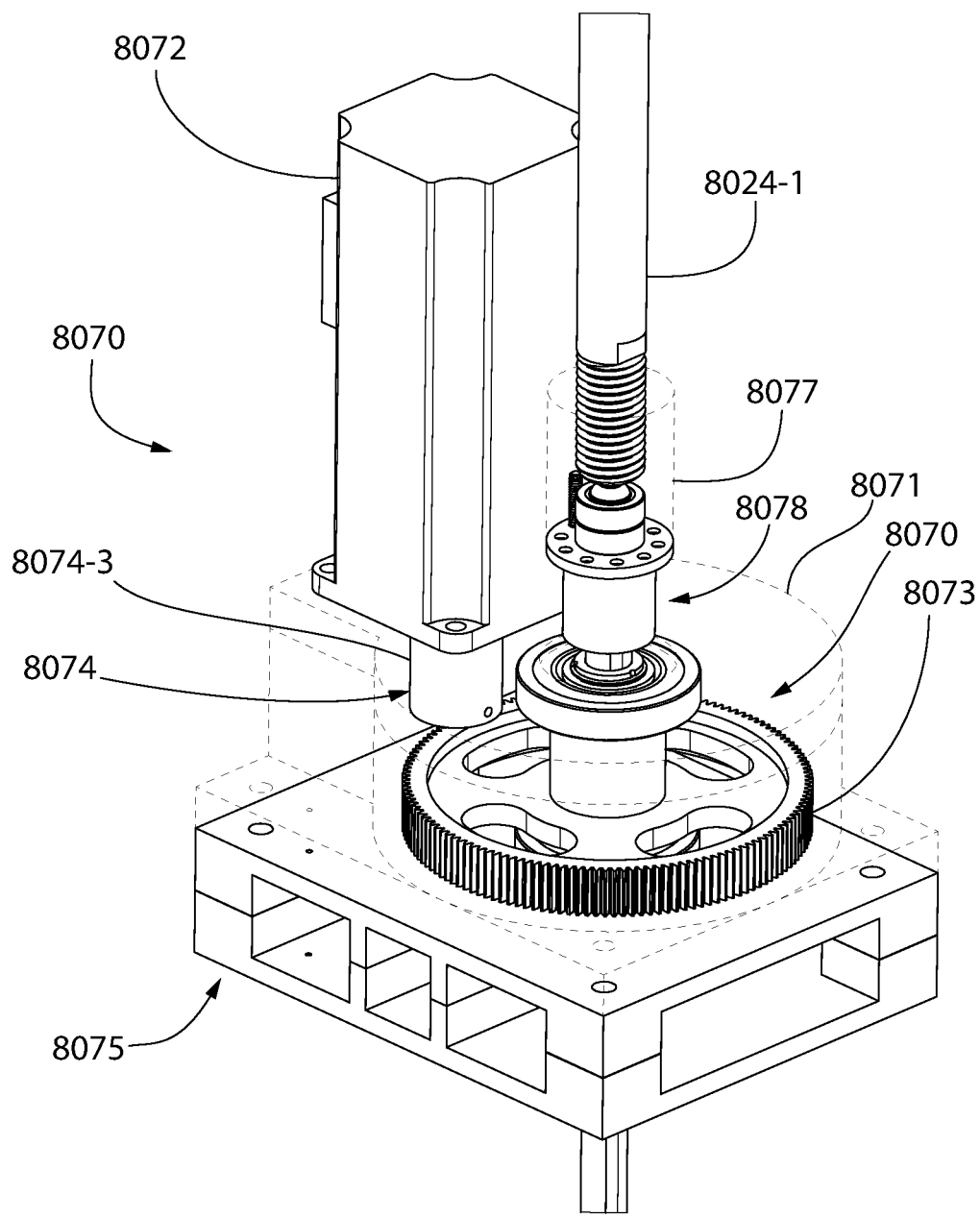
FIG. 61 is an assembled perspective view of gear drive of the spool drive mechanism.
Figure 62:
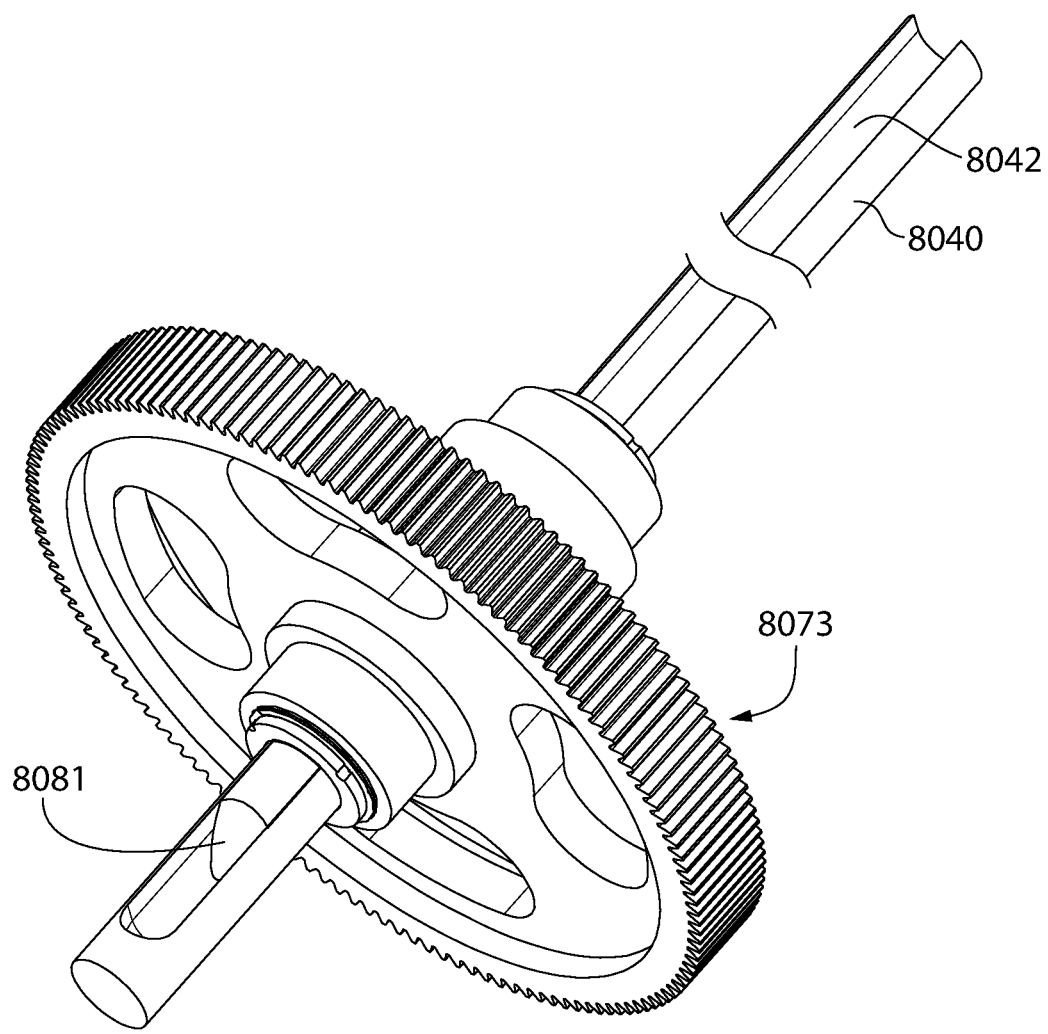
FIG. 62 is perspective view of the driven gear thereof coupled to the collection spool.
Figure 63:
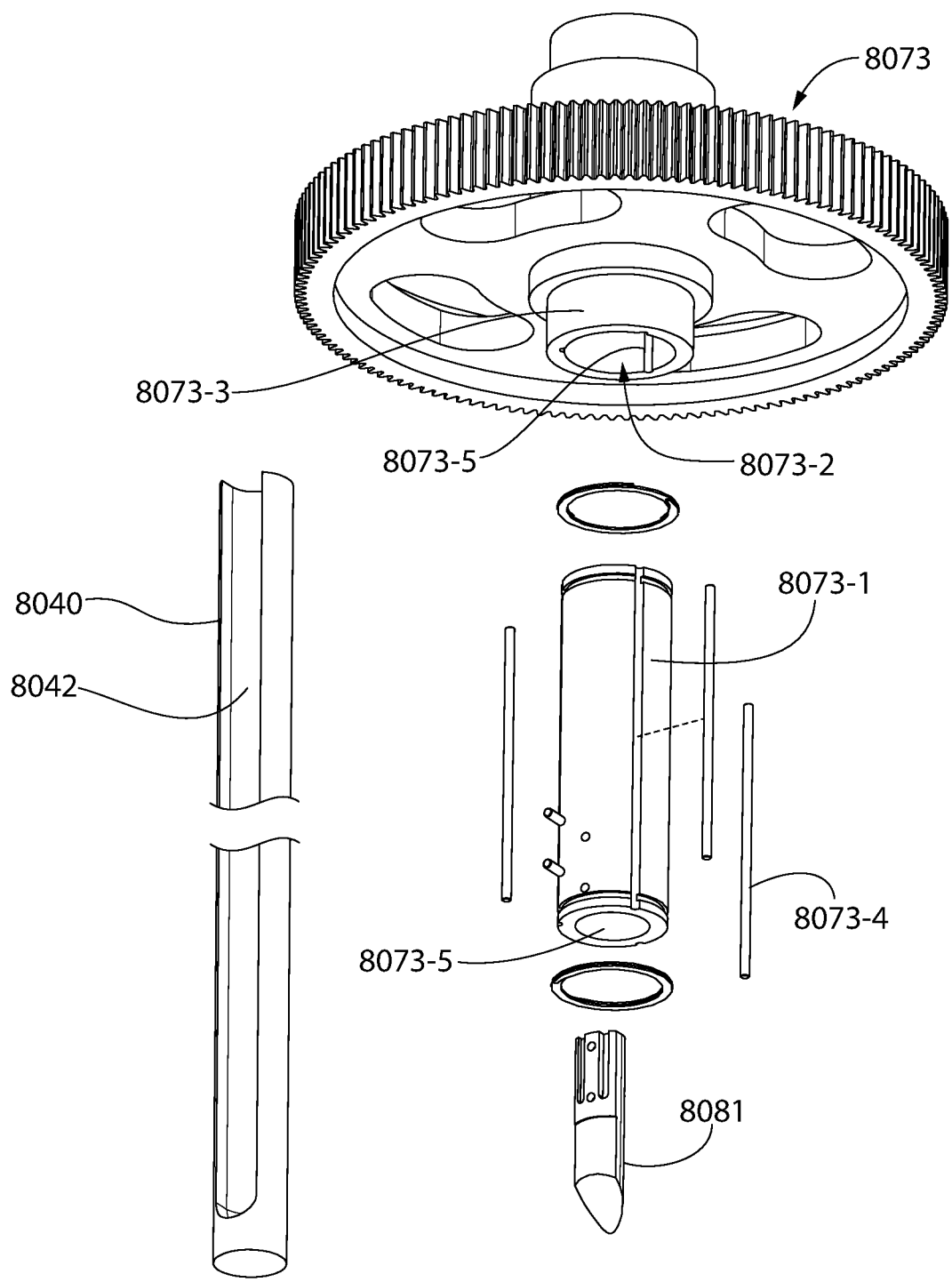
FIG. 63 is a bottom perspective view of the driven gear assembly.
Figure 64:
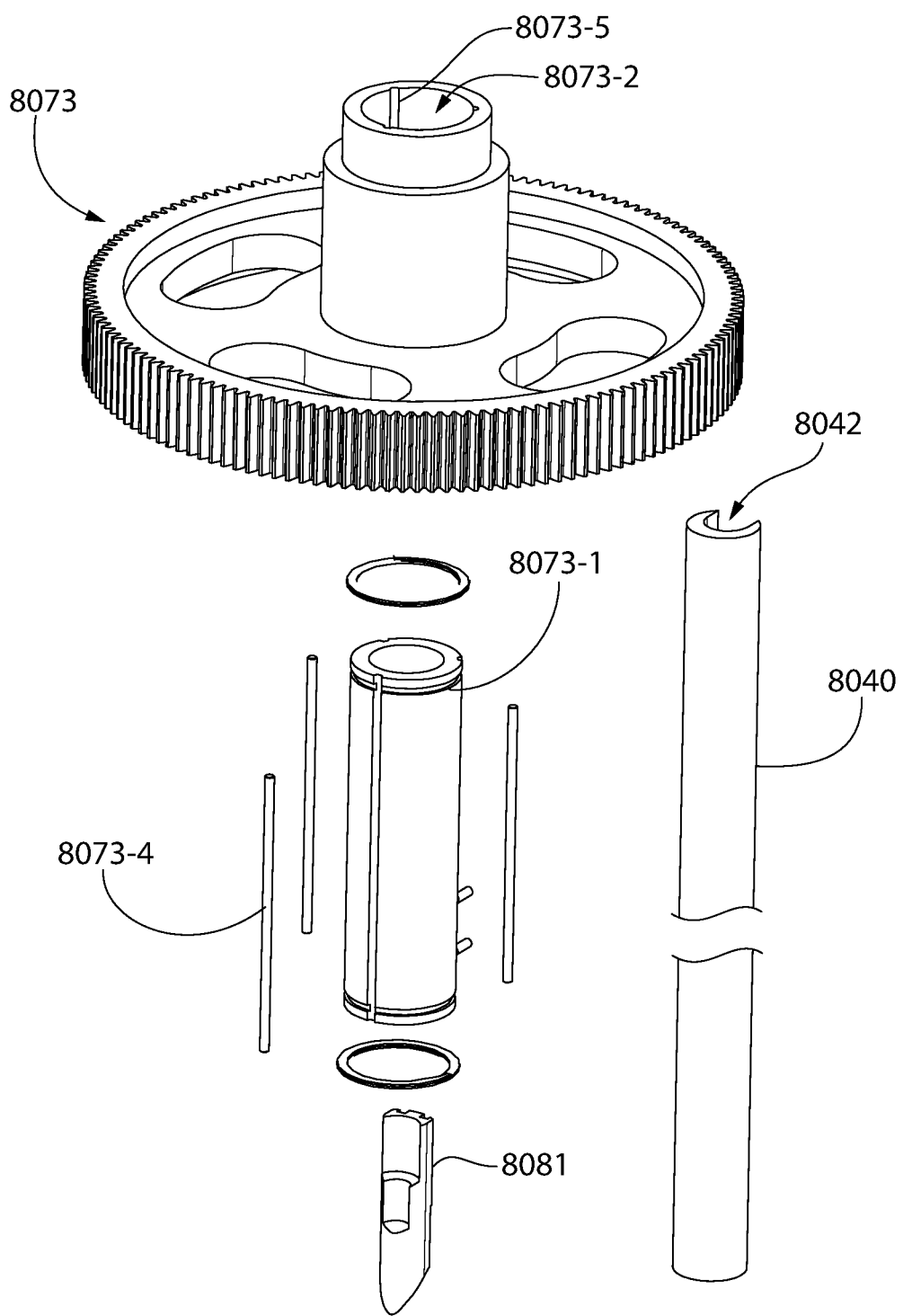
FIG. 64 is a top perspective view thereof.
Figure 65:
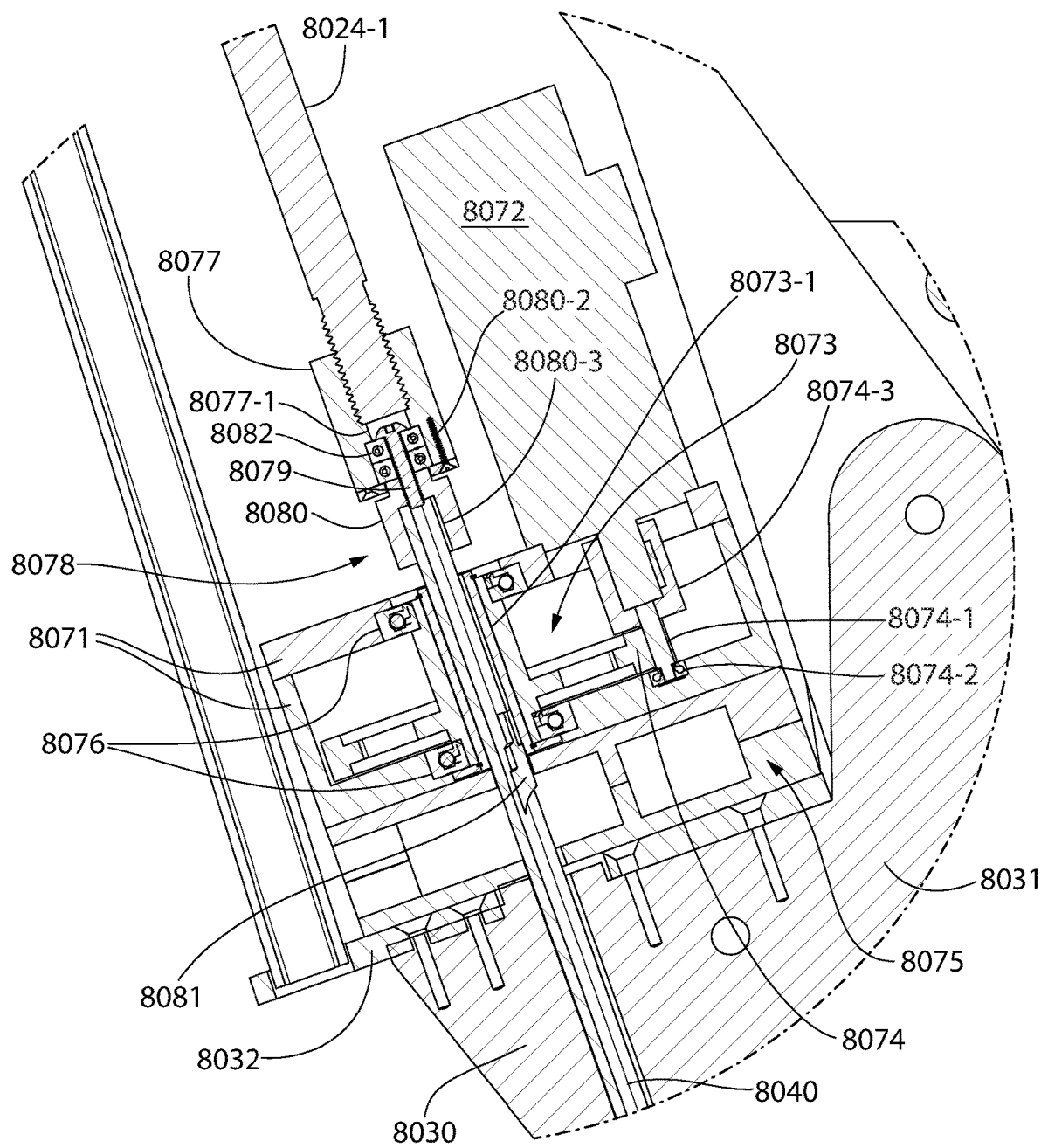
FIG. 65 is a side cross-sectional view of the gear drive.

A pair of gear bearings 8076 of suitable type support the driven gear 8073 for rotational movement (see, e.g. FIGS. 59 and 65). The driven gear assembly may include a tubular hollow drive sleeve 8073-1 inserted through central through passage 8073-2 of the gear hub 8073-3. Collection spool 8040 is received in and slideable upwards/downwards through the through passage 8073-5 of the drive sleeve when the spool is raised and lowered. Externally, the drive sleeve may include a plurality of longitudinal splines 8073-4 which may be removably and insertably keyed to mating longitudinal grooves 8073-5 formed inside the gear hub through passage 8073-2 to rotationally interlock the sleeve and driven gear 8073 such that the sleeve rotates in unison with the driven gear (see, e.g. FIGS. 59-60). The splines 8073-4 may be separate parts attached to the exterior of the drive sleeve in mating longitudinal slots as illustrated, or may be integrally formed as a unitary structural part of the drive sleeve tubular body. Drive sleeve 8073-1 is intended to be an easily replaceable and less costly component than the driven gear 8073 if replacement is required due to wear.

Drive sleeve 8073-1 forms an axially slideable but rotationally interlocked interface with the collection spool 8040 via sample ejector 8081, which may be fixedly attached to the drive sleeve inside through passage 8073-5 of the sleeve by any suitable means. In one embodiment, a pinned connection may be created by pins 8081-1; however, threaded fasteners or other means may be used for a fixed attachment. Ejector 8081 may be mounted to the bottom end of the drive sleeve 8073-1 such that the upper pinned portion of the ejector resides inside the lower portion of the drive sleeve taps 8073-5 while the wedge-shaped lower portion protrudes downwards below the drive sleeve and driven gear (see, e.g. FIG. 62). Sample ejector 8081 is rotationally locked to and nested at least partially within the collection cavity 8042 of collection spool 8040 in a manner which allows axial longitudinal movement of the spool relative to the ejector. The ejector is configured and operable to eject the captured soil sample from the collection cavity for collection and further processing/analysis by the soil analysis system. The ejector 8081 remains stationary in vertical position but rotatable with the gear drive while the collection spool 8040 can be selectively moved axially up/down by spool positioning actuator 8024 through the drive sleeve and driven gear. Ejector 8081 may have an angled wedge-shaped scraper end configured to wedge the soil sample out from the collection cavity 8042 of collection spool 8040 when the spool is raised.

The gear drive 8070 is operable to rotate the collection spool 8040 via engagement with ejector 8081 between an open position for capturing a soil sample, and a closed position for retaining the captured sample. It bears noting that as opposed to manually-operated handheld core extraction devices or probes which vertically pierce the soil in an axial direction, are pushed down to a desired depth, and collect a core sample that is simply retained in the tool as it is straight pulled back out, the present spool 8040 plows through the soil in a direction of travel parallel to the soil surface GS. This captures the soil sample which is forced into the collection cavity 8042 in a direction transverse to the longitudinal axis of spool LA and parallel to the direction of travel of the collection apparatus as it (i.e. coulter blade and knife assembly) plows through the soil at a preselected depth.

Spool positioning actuator 8024 may be a pneumatic cylinder type actuator in one embodiment; however, hydraulic cylinders or electric linear actuators may also be used. Actuator 8024 may be supported by substantially vertical actuator support frame members 8024-2 from the gear drive support platform 8075 and/or knife assembly 8020. The support frame is configured to coaxially align the piston rod with the collection spool 8040 along the longitudinal axis LA of the spool. Actuator 8024 is configured to act in a linear direction via movable operating or piston rod 8024-1 coupled via intermediate elements to the top end of the spool 8040.

Referring particularly to FIGS. 59-60 and 65-66, the bottom end of the spool positioning actuator piston rod 8024-1 may be rigidly coupled to a hollow tubular connector 8077 comprising a longitudinal through passage 8077-1 extending between and through the connector body ends. In one embodiment, a threaded coupling may be provided; however, other forms of rigidly coupling including without limitation pinned connections, shrink fit, threaded fasteners, etc. as some non-limiting examples. Connector 8077 in turn is coupled to freely-rotatable swivel coupling 8078 which is coupled to collection spool 8040. Swivel coupling 8078 includes collar 8080, fastening member 8079, and at least one or a pair of bearings 8082 which rotatably support the fastening member. Collar 8080 may be flanged comprising an annular radially protruding flange 8080-1 which is fixedly attached to the bottom of connector 8077 by a plurality of threaded fasteners 8080-2 such that the collar is not rotatable relative to the connector. The fasteners member 8079 may be a threaded fastener in one non-limiting embodiment (as shown) which extends through a central passage 8080-3 of collar 8080 to threadably engage the top end 8043 of the collection spool 8040. The top end of the spool is received in the lower portion of central passage 8080-3 to engage the fastening member 8079. Operation of the spool positioning actuator 8024 selectively raises and lowers the collection spool 8040 between a lower position for capturing/retaining the soil sample and an upper position for rejecting the soil sample.

Referring to FIG. 65, the connector 8077 and swivel coupling 8078 may be assembled by first attaching the bearings 8082 and fastening member 8079 to the top of the flanged collar 8080 and top end of the collection spool 8040. The head of the fastening member and bearings are inserted through the bottom end of the connector through passage 8077-1. The collar flange 8080-1 is then fastened to the connector 8077, which traps the bearings and fastening member inside the connector via the flange in a rotatable manner.

Figure 94:
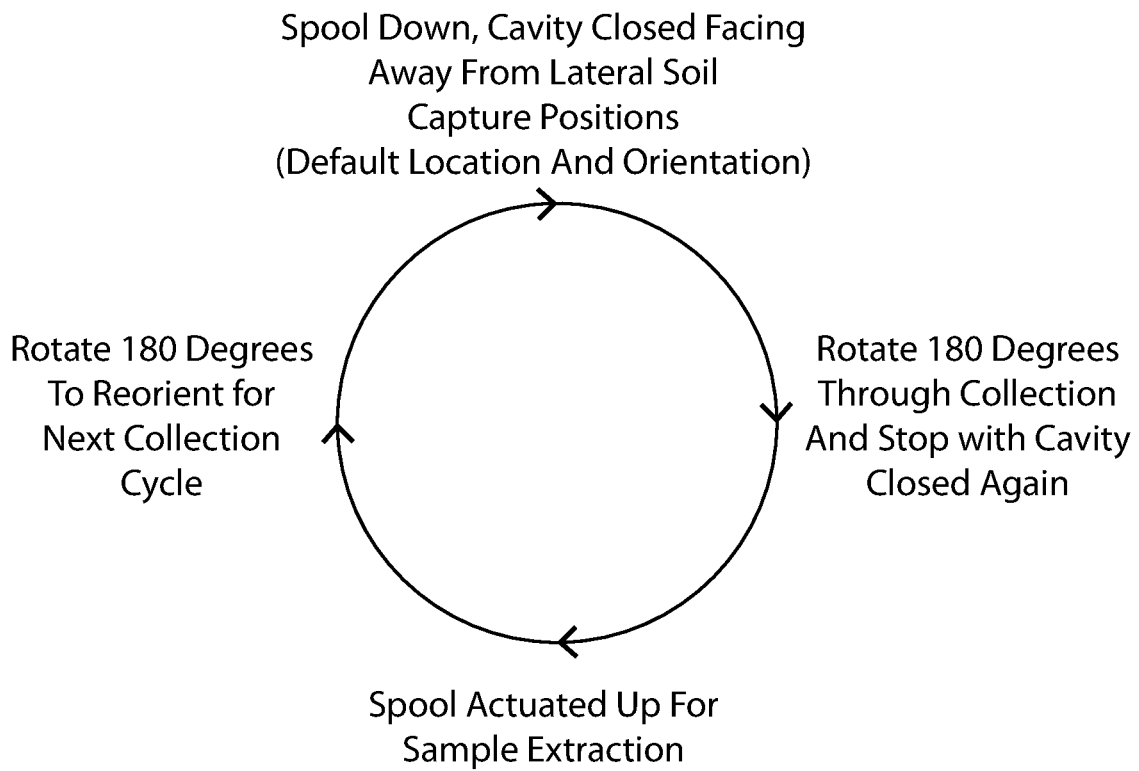
FIG. 94 is a schematic diagram showing a complete spool operating cycle for either the single or double spool embodiments.

A process or method for capturing a soil sample from an agricultural field using the collection apparatus 8002 will now be briefly described. FIG. 94 shows the complete cycle of the collection spool 8040 from start to finish through sample collection, retention, and ejection. First, the vehicle 8003 is driven or pulled to the desired starting location in the agricultural field. The collection apparatus 8002 is in an upper position relative to the soil surface GS and vehicle during transport. The collection apparatus is then lowered to actively penetrate and engage the soil. The desired depth of penetration of the knife assembly and coulter blade 8021 for collecting the soil sample may be adjusted and set by the vertical position of the carriage 8050 via operating the carriage actuator 8029 as previously described herein. This may be performed while the vehicle is stationary, or alternatively while moving. The angular orientation of the knife assembly 8020 may be adjusted by operating the knife positioning actuator 8026 as previously described herein. In one embodiment, the knife assembly may be set to an obliquely angled position to vertical axis VA of collection apparatus 8002 (i.e. front side/edge of front blade 8031) to more readily plow through the soil (see, e.g. FIG. 59). The collection apparatus comprises rotatable coulter blade 8021 and knife assembly 8020 arranged proximate to the coulter blade and comprising at least one rotatable collection spool 8040 comprising the collection cavity 8042. The collection spool may initially be in a lower position in the knife assembly 8020, which may be a lowest position (see, e.g. FIG. 59) set by operating spool positioning actuator 8024 as previously described herein. The bottom end of spool may therefore be positioned at the bottom end of the collection cavity 8042 engaging the top surface of the base plate 8033. The collection cavity 8042 of collection spool 8040 may facing forward or rearward and shield from the lateral openings on each side of the knife assembly 8020 at the spool slot 8041.

The collection apparatus 8002 (knife assembly 8020 and coulter blade 8021) is then moved and plowed through the soil at the desired depth in a direction of travel parallel to a surface GS of the soil. The coulter blade creates a furrow or trough ahead of the knife assembly which travels at least partially therein for capturing the soil sample. At a predetermined time (which may be part of a preprogrammed timed sequence), the collection spool 8040 is then rotated full 180 degrees from (1) a first closed position via the first 90 degrees of rotation in which the collection cavity 8042 is shielded from the soil (see, e.g. FIG. 48) to a laterally open position in which the collection cavity is exposed to the adjoining soil so that the soil sample is captured in in the collection cavity 8042, to a (2) opposite second closed/shielded position via the second 90 degrees of rotation for retaining the soil sample. The collection spool is rotated by gear drive 8070 at predetermined times to both capture and retain the soil sample. In some methods, the spool may rotate continuously through the foregoing first closed position-laterally open soil capture position-second closed positions. The rotational speed of the collection spool 8040 may be selected to allow sufficient time of soil to be forced into the exposed collection cavity 8042. Alternatively, the spool may be first rotated 90 degrees to the laterally open position, held in the open position for a predetermined period of time sufficient to allow soil to be forced into and enter the collection cavity, and then rotated 90 further back to the second closed position for retaining the sample. Either approach may be used as needed and/or desired to collect a complete sample which preferably may fill at least a majority of the spool collection cavity 8042 for its exposed length.

Once the soil sample has been captured, the collection spool 8040 may be raised while in the second closed position to an upper position relative to knife assembly 8020 via actuation and linear operation of spool positioning actuator 8024. As the spool is raised, the ejector 8081 exposed immediately below the driven gear 8073 in the gear drive support platform and above the top of the knife assembly 8020 slides through and scrapes the sample out of the spool collection cavity 8042 for capture by a sample collection/conveyance system for further processing to prepare the sample slurry and to ultimately chemically analyze the slurry to quantify concentration of the analyte of interest. It bears noting that because the ejector 8081 is positioned above the knife assembly 8020, the sample may be positively ejected from the spool 8040 while still in the second closed position without further rotation of the spool. Portions of the collection cavity 8042 above the knife assembly are therefore exposed.

Figure 48:
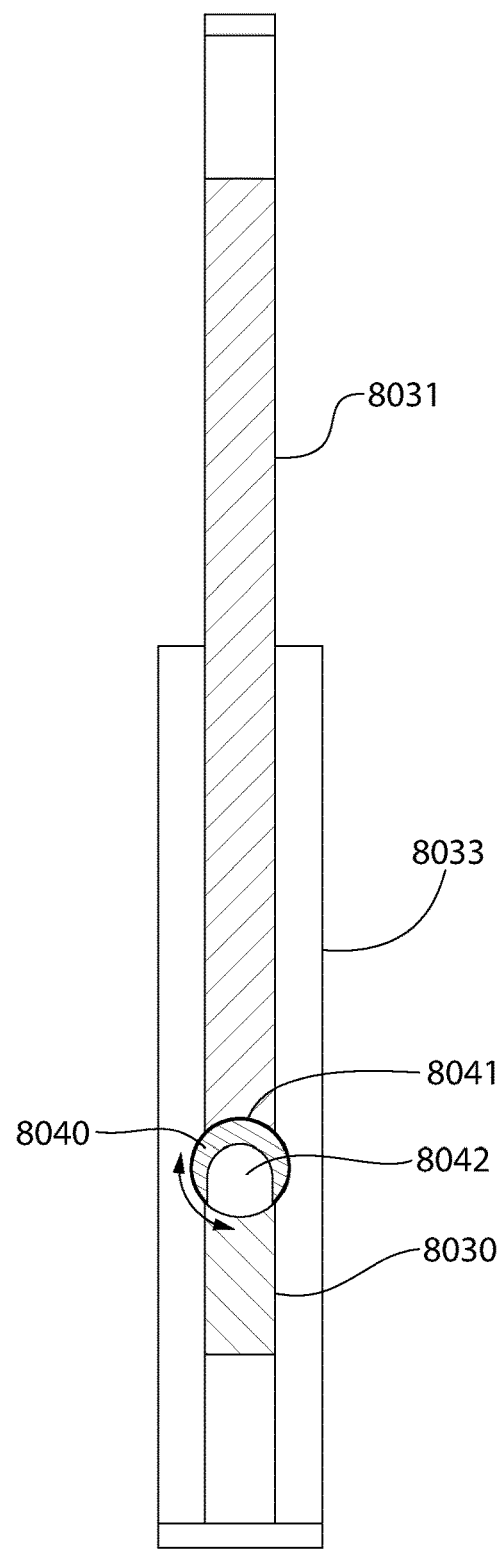
FIG. 48 is a horizontal transverse cross-sectional view of the knife assembly of the collection assembly of FIG. 45.
Figure 49:
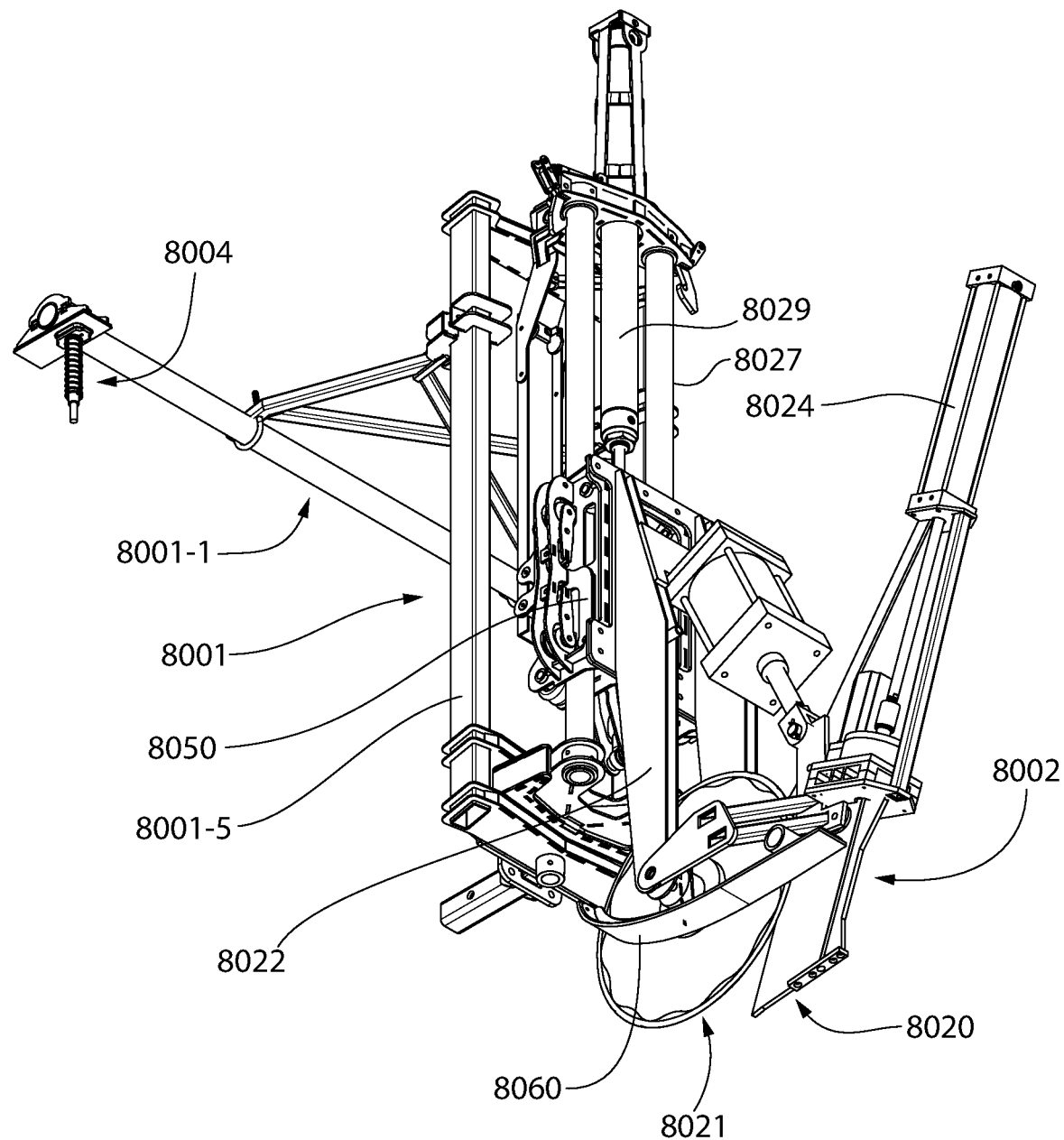
FIG. 49 is a rear bottom perspective view of the collection assembly.
Figure 50:
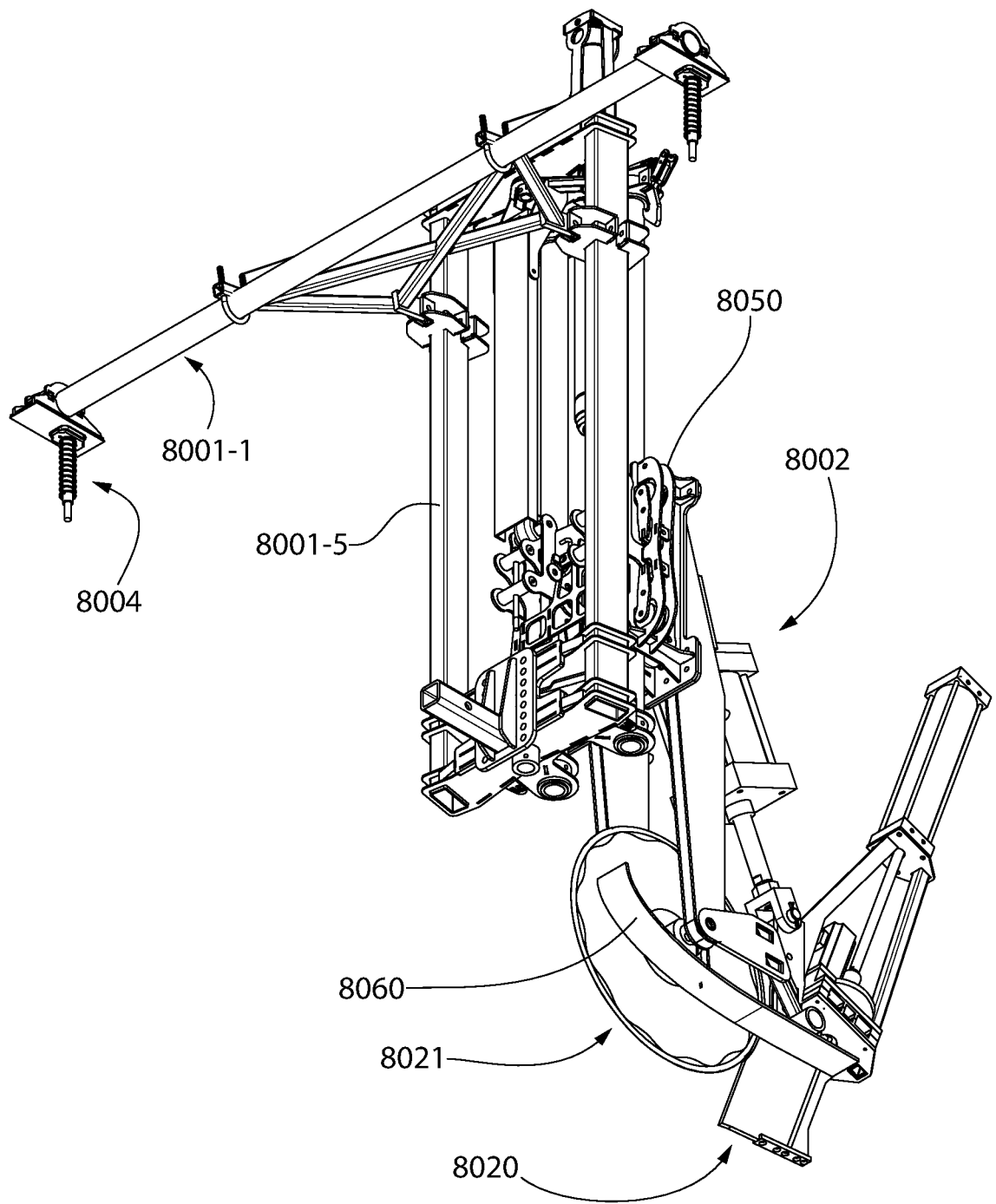
FIG. 50 is a front bottom perspective view thereof.
Figure 51:
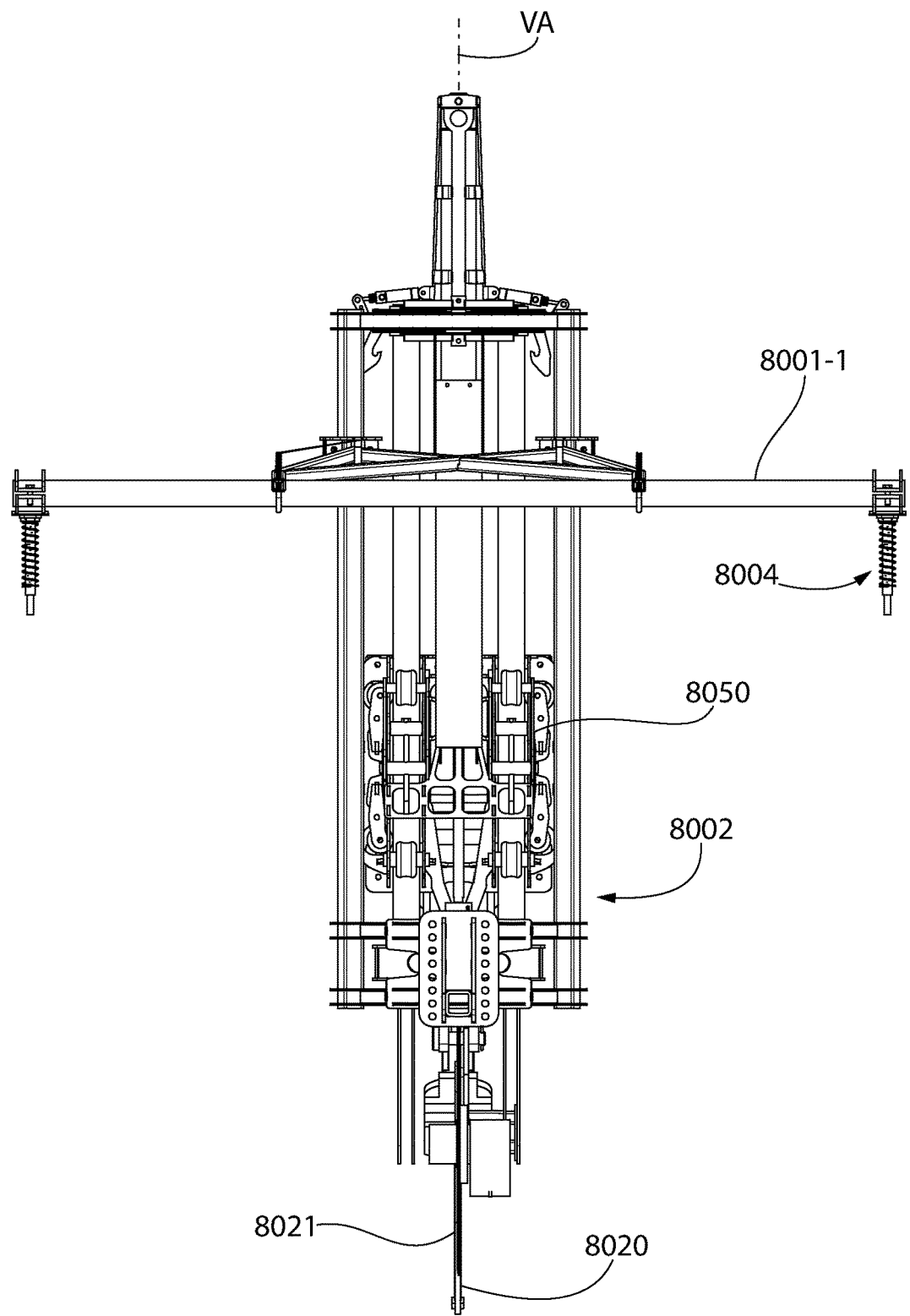
FIG. 51 is a front view thereof.
Figure 52:
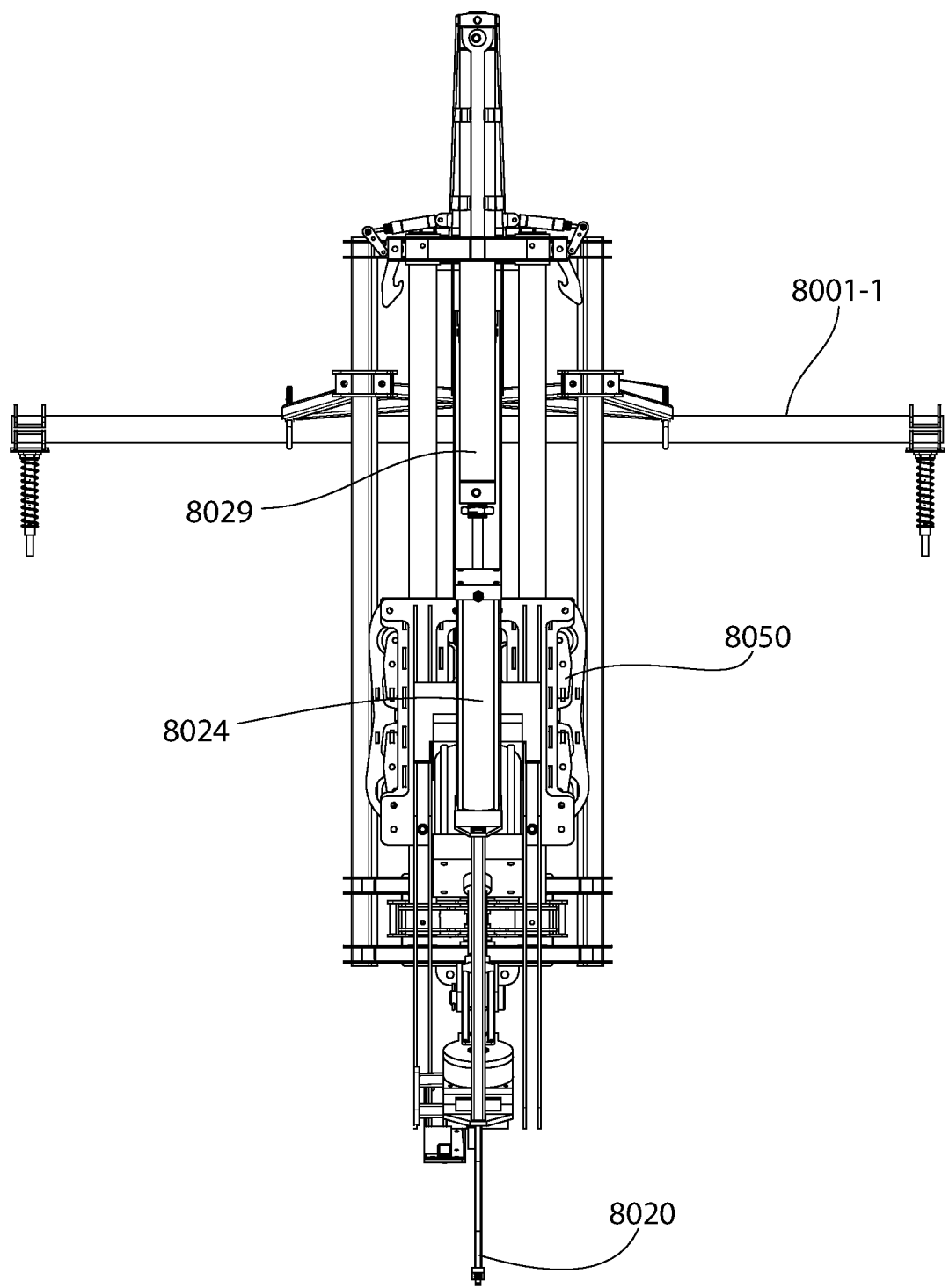
FIG. 52 is a rear view thereof.

After the sample has been ejected, the method may continue by rotating the spool back to the first closed position while the spool is still in the upper position, and then lowering the collection spool 8020 in the knife assembly back down to the initial lower position. In alternative implementations of the method, the spool may be lowered without rotation while in the second closed position. Since both lateral sides of the knife assembly 8020 are open at the spool slot 8041 as shown in FIG. 48, the foregoing sample collection cycle may be repeated in the same manner previously described above but from the second lateral side of the knife assembly as the spool is rotated. Using such an approach, a sample may be collected with each 180 degree rotation of the collection spool 8040 and cavity 8040 from front to rear, and rear to front. This doubles the number of samples collected with each 360 degree rotation of the spool. Accordingly, the spool need not be rotated back to the initial starting position of the collection cavity after sample ejection for each time a sample is to be collected.

It bears noting that the collection spool 8040 may be rotated in either direction during the soil sample capture and ejection process. In some embodiments if reversible motors 8072 are used, the spool may rotate 90 degrees in a first direction from an initial closed position to an open position to capture the sample, and then rotate back 90 degrees in an opposite direction back to the same initial closed position to reclose the collection cavity 8082 to retain the sample and raise the spool for sample ejection. Accordingly, numerous variations of the foregoing method are possible which are all contemplated by the present disclosure.

In a preferred but non-limiting embodiment referring to FIG. 67, the foregoing sample collection process or method may be automatically controlled by a programmable controller, such as without limitation system controller 2820 previously described herein or a separate dedicated collection controller which may be operably linked to and communicating with the system controller 2820 to coordinate the entire cycle of sample collection, processing, and analysis. The carriage actuator 8029, knife positioning actuator 8026, and spool positioning actuator 8024 may thus be operably and communicably coupled to and under the control of system controller 2820 which activates each actuator at the desired time which may be preprogrammed and/or based on input from a human operator via any suitable wired or wireless electronic processor-based personal input device (e.g. smartphone, tablet, laptop, etc.) which establishes two-way communications. In the case of pneumatic or hydraulic actuators, it bears noting that control may comprise the system controller 2820 operating air or oil control valving associated with the actuator, which in turn controls operation of these type actuators. In the case of electric linear actuators, the controller 2820 may be directly coupled to and act on the actuator to electrically control its operation. Various other control schemes are possible.

FIGS. 83-93 depict a two-spool embodiment of a collection apparatus 8002A according to the present disclosure. The support frame 8001 and other elements of the collection assembly 8009 previously described herein for the single spool embodiment of FIGS. 44-82 remain the same in structure and operation. They will not be described in repetitive detail again for sake of brevity. Only additional or different aspects of the dual spool embodiment will be further described as necessary. Elements previously assigned numerical designations for the foregoing single spool embodiment description have the suffix "A" added for the two-spool embodiment presently being described.

The primary difference in the present two-spool embodiment is that two spools 8020A are rotatably supported by the knife assembly 8020A which is modified to include two parallel elongated spool slots 8041A; one each rotatably and axially slideably receiving a spool. This allows a greater number of soil samples to be collected with each pass of the knife assembly through the field. In addition, the timing with which each spool 8040A will be open for collecting a sample, or closed for shielding the collection cavity 8042A or retaining a collected sample may be timed via the system controller 2820 to ensure that only a single sample is collected at a given time. Advantageously, one spool 8020A may be in the lower position collecting a soil sample while the second spool is in the upper position for ejecting the sample. The two spools then alternate and switch position as the collection apparatus 8002A travels, thereby allowing samples to be collected with greater frequency for a given distance of travel through the field by the knife assembly 8020A. For example, for 20 feet of linear travel of the vehicle 8003 and collection apparatus 8002 in a row through the soil, twice the number of soil samples may be collected in comparison to the foregoing single spool collection apparatus embodiment with a shorter linear distance between the collection points for each sample. When the samples are analyzed by the system, this data can be used to generate greater detailed mapping of levels of soil nutrients (e.g. nitrogen, potassium, etc.) or other analyte of interest for the agricultural field. It bears noting that in some embodiments, more than two spools may be provided which are movably carried by the knife assembly to further reduce the distance between soil sampling points in the field.

To accommodate independent rotary and axial linear motion of the two spools 8020A, a modified gear drive 8070A and separate spool positioning actuator 8024A are provided for each spool. It bears noting that only a single carriage actuator 8029 and knife positioning actuator 8026 is again needed for operation and deployment of the dual-spool collection apparatus 8002A. The two-spool gear drive 8070A includes two sets of electric motors 8072A each with a rotatable drive gear 8074A and an associated intermeshed driven gear 8073A, two drive sleeves 8073-1A each rotationally interlocked with a driven gear 8073A, two sample ejectors 8081A, and two sets of spool positioning actuator to collection spool 8040A couplings each including a connector 8077A and swivel coupling 8078A coupled thereto with the same previously described herein sub-parts. It bears noting that each driven gear 8073A and drive gear 8074A combination may act and rotate independently of the other thereby allowing the timing for rotating each spool to collect, retain, or eject a soil sample be independently controlled To accommodate two spools, the knife assembly 8020A is modified to incorporate two spool slots 8041A. Using the same fabrication methodology as the single spool collection knife assembly 8020, the present dual spool knife assembly 8020A therefore comprises a rear blade element 8030A, front blade element 8031A, intermediate blade element 8030-1A, and top blade mounting bracket 8032A and bottom base plate 8033A. The rear, front, and intermediate blade elements may be mounted to the base plate in a horizontally axially spaced apart manner along the horizontal axis HA of the collection apparatus 8002A to collectively define a pair of vertically elongated spool slots 8041A therebetween (see, e.g. FIGS. 89-91). The blade elements may have any suitable configuration and act in the manner shown in FIGS. 67-68 and previously described herein for collecting soil samples. The blade elements are fixedly attached to and between base plate 8033A and mounting bracket 8032A in the same manner previously described herein (e.g. fasteners used for detachable coupling or welding used for permanent coupling).

Each collection spool 8040A of the two-spool collection apparatus 8002A operates according to the same method/process previously described herein for the single spool embodiment, which will not be repeated here for the sake brevity. The collection cycle may be controlled automatically by the system controller 2820 in the same manner. Using the controller, the timing and sequencing for collection, retaining, and ejection of the samples for each of the pair of spools may be preprogrammed and automatically implemented in the manner previously described above.

In one embodiment, a method for capturing soil samples from an agricultural field may comprise: providing a collection apparatus comprising a rotatable coulter blade, and a knife assembly arranged proximate to the coulter blade and comprising rotatable first and second collection spool each comprising a collection cavity configured for capturing soil samples; placing each of the first and second collection spools in a first closed position; plowing through the soil at a depth with the collection apparatus in a direction of travel parallel to a surface of the soil; rotating the first collection spool from a first closed position in which the collection cavity is shielded from the soil to an open position in which the collection cavity is exposed to the soil to capture a first soil sample in the collection cavity; rotating the first collection spool to a second closed position for retaining the first soil sample; raising the first collection spool in the second closed position and ejecting the first soil sample from the collection cavity; and simultaneously with raising the first collection spool, rotating the second collection spool from a first closed position in which the collection cavity is shielded from the soil to an open position in which the collection cavity is exposed to the soil to capture a second soil sample in the collection cavity of the second collection spool. The method may further comprise rotating the second collection spool to a second closed position for retaining the second soil sample; and raising the second collection spool in the second closed position and ejecting the second soil sample from the collection cavity. The method may further comprise lowering the first collection spool simultaneous with raising the second collection spool.

Examples: The Following are Nonlimiting Examples

Example 1, a micropump for a microfluidic device, the micropump comprising: a first layer; a second layer adjacent the first layer; a resiliently flexible diaphragm arranged at an interface between the first and second layers, the diaphragm having a peripheral edge extending perimetrically around the diaphragm; and a first pump chamber formed on a first side of the diaphragm and a second pump chamber formed on a second side of the diaphragm; a plurality of restraining tabs protruding radially inwards from the first layer into the first pump chamber; wherein the restraining tabs abuttingly engage the peripheral edge of diaphragm.

Example 2, the micropump according to Example 1, further comprising an air inlet fluidly coupled to the first chamber, a fluid inlet fluidly coupled to the second pump chamber, and a fluid outlet fluidly coupled to the second pump chamber.

Example 3, the micropump according to Example 2, wherein the restraining tabs are perimetrically spaced apart from each other around a perimeter of the first pump chamber.

Example 4, the micropump according to any of Examples 1 to 3, further comprising a circumferential sealing channel recessed into the first layer around a perimeter of the first pump chamber, the sealing channel at least partially receiving the diaphragm therein.

Example 5, the micropump according to any of Examples 1 to 4, further comprising a raised annular lip arranged at an inner edge of the sealing channel, the annular lip separating the sealing channel from a main central recess of the first pump chamber.

Example 6, the micropump according to any of Examples 1 to 5, further comprising a plurality of anti-stall grooves formed in the second pump chamber.

Example 7, a method for assembling a micropump for a microfluidic device comprising: providing a first layer including a first pump chamber; positioning a resiliently deformable diaphragm on the first layer above the first pump chamber; positioning a second layer on the first layer and diaphragm; compressing the diaphragm between the first and second layers which causes the diaphragm to grow radially outwards; and engaging peripheral edges of the diaphragm with a plurality of restraining tabs arranged around the first pump chamber to restrain the outward growth of the diaphragm.

Example 8, a method for preparing a slurry mixture in a microfluidic device, the method comprising: providing in the microfluidic device a first micropump, a second micropump fluidly coupled to the first micropump by a first microchannel comprising a microvalve, and a third micropump fluidly coupled to the second micropump by a second microchannel; each of the micropumps comprising a chamber comprising a pneumatically deformable diaphragm changeable between a closed position for discharging pumping a fluid and an open position for receiving the fluid; opening a slurry inlet microvalve fluidly coupled to the first micropump; changing position of the first micropump from the closed position to the open position; drawing slurry into the first micropump; closing the slurry inlet microvalve; opening an extractant inlet microvalve fluidly coupled to the first micropump; opening an intermediate microvalve disposed in the first microchannel between the first and second micropumps; changing position of the second micropump from the closed position to the open position; drawing extractant into the first micropump; and mixing the slurry and extractant form a slurry-extractant mixture.

Example 9, the method according to Example 8, further comprising drawing the slurry-extractant mixture from the first micropump into the second micropump as a result of changing position of the second micropump from the closed position to the open position.

Example 10, the method according to Example 9, further comprising: changing position of the first micropump from the open position to the closed position, and simultaneously changing position of a third micropump from the closed position to the open position, the third micropump fluidly coupled to the second micropump; and closing the intermediate microvalve between the first and second micropumps; and changing position of the second micropump from the open position to the closed position which pumps the slurry-extractant mixture into the third micropump.

Example 11, the method according to Example 10, further comprising changing position of the third micropump from the open position to the closed position which pumps the slurry-extractant mixture to an ultrafine filter configured to produce a clear filtered supernatant capable of being chemically analyzed for an analyte in the slurry-extractant mixture.

Example 12, a multiplexed pneumatic control air system for slurry filtration, the system comprising: a plurality of filter units configured for filtering a slurry; each filter unit comprising a plurality of air pilot valves including at least a first air pilot valve associated with a first functional purpose, a second air pilot valve associated with a second functional purpose, and a third air pilot valve associated with a third functional purpose; the first air pilot valves of each filter unit fluidly coupled to a first shared air distribution manifold fluidly coupled to a first electro-pneumatic control air valve fluidly coupled to an air source; the second air pilot valves of each filter unit fluidly coupled to a second shared air distribution manifold fluidly coupled to a second electro-pneumatic control air valve fluidly coupled to the air source; the third air pilot valves of each filter unit fluidly coupled to a third shared air distribution manifold fluidly coupled to a third electro-pneumatic control air valve fluidly coupled to the air source; a system controller operably coupled to the first, second, and third electro-pneumatic control air valves to control a closed and open position each electro-pneumatic control air valve; the controller being configured to transmit control signals to change position of the first, second, and third electro-pneumatic control air valves to selectively initiate or stop a flow of air to the first, second, or third shared air distribution manifolds from the air source.

Example 13, the system according to Example 12, wherein the first air pilot valve of every filter unit is simultaneously changed between opened and closed positions by initiating or stopping the flow of air to the first air distribution manifold.

Example 14, the system according to Example 12 or 13, wherein each of the first, second, and third air pilot valves of each filter unit is fluidly coupled to a different port of its respective filter unit.

Example 15, the system according to Example 14, wherein the first air pilot valves are fluidly coupled to a slurry inlet port of each filter unit, the second air pilot valves are fluidly coupled to a slurry outlet of each filter unit, and the third air pilot valves are fluidly coupled to a filter pressurization air inlet port operable to drive slurry through a filter medium of each filter unit.

Example 16, the system according to any of Examples 12 to 15, wherein the slurry is an agricultural slurry.

Example 17, a method for filtering a slurry, the method comprising: providing the slurry filter comprising a body defining an internal central passage, a filter media arranged in the central passage and defining comprising an internal filtrate chamber and an annular slurry inlet plenum arranged defined between the body and filter media; flowing slurry into the slurry inlet plenum at a first end of the body; pressurizing the slurry inlet plenum to force the slurry radially inwards through the filter media to deposit a filtrate in the filtrate chamber; pressurizing the filtrate chamber to force the filtrate to a filtrate outlet port at a second end of the body opposite the first end.

Example 18, a slurry filter unit comprising: a body defining centerline axis; a first end, an opposite second end, and an internal central passage extending between the ends along centerline axis; a holder supporting an elongated filter media in the central passage, the filter media defining an internal filtrate chamber and an annular slurry inlet plenum arranged defined between the body and filter media; a slurry inlet port oriented radially to the centerline axis at the first end and a filtrate outlet port at the second end oriented parallel to the centerline axis; a filter pressurization air inlet port oriented radially to the centerline axis and fluidly coupled to the annular slurry inlet plenum for forcing slurry in the plenum radially through the filter media into the filtrate chamber; and an air port oriented parallel to the centerline axis and fluidly coupled to filtrate chamber for forcing filtrate therein to the slurry outlet.

Example 19, the system according to Example 18, further comprising an air manifold fluidly coupled to the air port, the air manifold fluidly coupled to a first air valve fluidly coupled in turn to a low pressure source of air at a first pressure, and a second air valve fluidly coupled in turn to a high pressure source of air at a second pressure higher than the first pressure.

Example 20, the system according to Example 19, wherein the manifold is further fluidly coupled to a vent valve in communication with atmosphere for venting air from the filter unit.

Example 21, the system according to any one of Examples 18-20, further comprising filter pressurization air inlet port fluidly coupled to the slurry inlet plenum and a filter pressurization air valve.

Example 22, the system according to any one of Examples 18-21, further comprising a filter backwash inlet port fluidly coupled to the slurry inlet plenum and a filter backwash valve fluidly coupled to a pressurized source of water, and a waste port fluidly coupled to the slurry inlet plenum at a location distal to the filter backwash inlet port.

Example 23, the system according to any one of Examples 18-22, further comprising a programmable system controller operably coupled to the filter unit and configured to control operation of the filter unit.

Example 24, a soil sample collection apparatus comprising: a support frame configured for mounting to a vehicle; a collection apparatus comprising: a coulter blade rotatably coupled to the frame; a knife assembly coupled to the frame proximate to the coulter blade; and a collection spool movably mounted to the knife assembly, the collection spool defining a longitudinal axis and comprising a collection cavity configured to capture a soil sample; a spool drive mechanism operably coupled to the collection spool and configured to rotate the collection spool; wherein the collection spool is rotatable between an open position for capturing the soil sample, and a closed position for retaining the soil sample in the collection cavity.

Example 25, the apparatus according to Example 24, wherein the collection spool has an elongated cylindrical tubular body and is rotatably and axially slideably received in a complementary configured elongated slot in the knife assembly.

Example 26, the apparatus according to Examples 24 or 25, wherein the spool drive mechanism includes a rotatable gear drive operably coupled the collection spool, the gear drive operable to rotate the spool between the open and closed positions.

Example 27, the apparatus according to Example 26, wherein the spool drive mechanism further comprises spool positioning actuator operably coupled to the collection spool, the spool drive mechanism operable to move the collection spool in a vertical axial direction between a lower position for capturing the soil sample, and an upper position for ejecting the sample from the collection cavity.

Example 28, the apparatus according to Example 27, wherein the spool positioning actuator is electrically, pneumatically, or hydraulically powered.

Example 29, the apparatus according to any one of Examples 27 or 28, further comprising a sample ejector slideably disposed at least partially within the collection cavity of the collection spool, the ejector configured and operable to eject the captured soil sample from the collection cavity when the collection spool is moved from the lower position to upper position.

Example 30, the apparatus according to Example 29, wherein the ejector has an angled scraper end configured to wedge the soil sample out from the collection cavity.

Example 31, the apparatus according to Examples 29 or 30, wherein the sample ejector is rotationally interlocked with the collection spool via the collection cavity such that rotating the gear drive rotates the collection spool in turn therewith between the open and closed positions.

Example 32, the apparatus according to any one of Examples 29-31, wherein the sample ejector is fixedly mounted to the gear drive in a stationary position relative to the collection spool such that as the collection spool is raised or lowered, the ejector slides up and down within the collection cavity of the collection spool.

Example 33, the apparatus according to any one of Examples 26-32, wherein the gear drive comprises a motor having a drive gear and a driven gear operably interfaced with the collection spool via the sample ejector.

Example 34, the apparatus according to Example 27, wherein the spool positioning actuator comprises a piston rod operably coupled to the collection spool, the piston rod extendible to lower the collection spool in the knife assembly and retractable to raise the spool in the knife assembly.

Example 35, the apparatus according to Example 34, wherein the piston rod is coupled to the collection spool by a swivel coupling, the swivel coupling configured to allow the collection spool to freely rotate relative to the piston rod when the collection spool is rotated by the gear drive.

Example 36, the apparatus according to Example 35, wherein the swivel coupling comprises a collar fixedly coupled to the piston rod, and a fastening member rotatably supported by the collar and fixedly attached to the collection spool, the fastening member and collection spool rotatable relative to the collar.

Example 37, the apparatus according to Example 36, further comprising at least one bearing rotatably supporting the fastening member on the collar.

Example 38, the apparatus according to Example 36, further comprising a tubular connector fixedly coupled to the collar and piston rod top form a rigid connection therebetween.

Example 39, the apparatus according to Example 38, wherein the connector tubular comprise a longitudinal through passage which receives the fastening member of the swivel coupling therein.

Example 40, the apparatus according to any one of Examples 24-39, wherein the knife assembly is pivotably coupled to the coulter blade for movement in an arcuate path between a first angled position and a second angled position.

Example 41, the apparatus according to Example 40, wherein the knife assembly is vertically oriented in the second angled position and obliquely angled to vertical in the first angled position.

Example 42, the apparatus according to Examples 40 or 41, further comprising a knife positioning actuator operably coupled to knife assembly, the knife positioning actuator operable to move the knife assembly between the first and second angled positions.

Example 43, the apparatus according to any one of Examples 40-42, further comprising a pivot arm linkage pivotably coupled at opposite ends to a central hub rotatably supporting the coulter blade and the knife assembly.

Example 44, the apparatus according to Example 43, wherein the hub defines a pivot axis of the knife assembly.

Example 45, the apparatus according to any one of Examples 24-44, wherein the collection apparatus is mounted to a movable carriage supported by the support frame, the carriage vertically movable between an upper position for transport and a lower position for collecting the soil sample.

Example 46, the apparatus according to Example 45, wherein the carriage comprises a plurality of rollers which rollingly engage a pair of guide rails for raising and lowering the carriage and collection apparatus.

Example 47, the apparatus according to Example 46, wherein each guide rails is engaged by a pair of front rollers, a pair of rear rollers, and a pair of lateral outboard rollers to stabilize movement of the carriage.

Example 48, the apparatus according to any one of Examples 45-47, wherein the carriage is coupled to a carriage actuator operable to raise and lower the carriage on the guide rails.

Example 49, the apparatus according to any one of Examples 45-48, wherein the support frame comprises a substantially horizontal primary frame section configured for direct or indirect detachable mounting to the vehicle, a rearward-most collection apparatus frame section which supports the collection apparatus, and a substantially vertical intermediate rail frame section which supports a carriage chassis to which the carriage is movably mounted.

Example 50, the apparatus according to any one of Examples 24-49, further comprising a second collection spool rotatably supported by the knife assembly and operably coupled to the a spool drive mechanism, wherein the second collection spool is rotatable independently of the collection spool between an open position for capturing the soil sample, and a closed position for retaining the soil sample in a collection cavity of the second collection spool.

Example 51, a method for capturing a soil sample from an agricultural field comprising: providing a collection apparatus comprising a rotatable coulter blade, and a knife assembly arranged proximate to the coulter blade and comprising at least one rotatable collection spool comprising a collection cavity configured for capturing the soil sample; plowing through the soil with the collection apparatus in a direction of travel generally parallel to a surface of the soil; rotating the collection spool from a first closed position in which the collection cavity is shielded from the soil to an open position in which the collection cavity is exposed to the soil; capturing the soil sample in the collection cavity of the collection spool; and rotating the collection spool to a second closed position for retaining the soil sample.

Example 52, the method according to Example 51, further comprising raising the collection spool in the second closed position; and ejecting the soil sample from the cavity.

Example 53, the method according to Example 52, further comprising rotating the collection spool back to the first closed position after the ejecting step; and lowering the collection spool in the knife assembly.

Example 54, the method according to any one of Examples 52 or 53, wherein the ejecting step comprises scraping the soil sample out of the collection cavity of the collection spool with a stationary ejector slideable within the collection cavity when collection spool is raised.

Example 55, the method according to Example 54, wherein the ejector is fixedly mounted to a gear drive operable to rotate the collection spool between the closed and open positions, the ejector forming a rotational interlock with the collection cavity of the collection spool for rotating the collection spool via operation of the gear drive.

Example 56, the method according to any one of Examples 52-55, further comprising a spool positioning actuator operably coupled to the collection spool and operable to raise and lower the collection spool.

Example 57, the method according to any one of Examples 52-56, wherein the collection cavity of the collection spool faces forward or rearward in the knife assembly when in the first or second closed positions, and faces laterally outwards from the knife assembly when in the open position.

Example 58, a method for capturing soil samples from an agricultural field comprising: providing a collection apparatus comprising a rotatable coulter blade, and a knife assembly arranged proximate to the coulter blade and comprising rotatable first and second collection spools each comprising a collection cavity configured for capturing soil samples; placing each of the first and second collection spools in a first closed position; plowing through the with the collection apparatus in a direction of travel generally parallel to a surface of the soil; rotating the first collection spool from a first closed position in which the collection cavity is shielded from the soil to an open position in which the collection cavity is exposed to the soil to capture a first soil sample in the collection cavity; rotating the first collection spool to a second closed position for retaining the first soil sample; raising the first collection spool in the second closed position and ejecting the first soil sample from the collection cavity; simultaneous with raising the first collection spool, rotating the second collection spool from a first closed position in which the collection cavity is shielded from the soil to an open position in which the collection cavity is exposed to the soil to capture a second soil sample in the collection cavity of the second collection spool.

Example 59, the method according to Example 58, further comprising rotating the second collection spool to a second closed position for retaining the second soil sample; and raising the second collection spool in the second closed position and ejecting the second soil sample from the collection cavity.

Example 60, the method according to Example 59, further comprising rotating the first collection spool back to the first closed position and lowering the first collection spool.

While the foregoing description and drawings represent some example systems, it will be understood that various additions, modifications and substitutions may be made therein without departing from the spirit and scope and range of equivalents of the accompanying claims. In particular, it will be clear to those skilled in the art that embodiments of the present disclosure may be embodied in other forms, structures, arrangements, proportions, sizes, and with other elements, materials, and components, without departing from the spirit or essential characteristics thereof. In addition, numerous variations in the methods/processes described herein may be made. One skilled in the art will further appreciate that the embodiments of the present disclosure may be used with many modifications of structure, arrangement, proportions, sizes, materials, and components and otherwise, used in the practice of the embodiments of the present disclosure, which are particularly adapted to specific environments and operative requirements without departing from the principles of the present embodiments of the present disclosure. The presently disclosed embodiments are therefore to be considered in all respects as illustrative and not restrictive, the scope of the embodiments of the present disclosure being defined by the appended claims and equivalents thereof, and not limited to the foregoing description or embodiments. Rather, the appended claims should be construed broadly, to include other variants and embodiments, which may be made by those skilled in the art without departing from the scope and range of equivalents of the embodiments of the present disclosure.

The invention claimed is:

1. A soil sample collection apparatus comprising:
   a support frame configured for mounting to a vehicle; and
   a collection apparatus comprising:
      a coulter blade rotatably coupled to the frame;
      a knife assembly coupled to the support frame; and
      a collection spool movably mounted to the knife assembly, the collection spool defining a longitudinal axis and comprising a collection cavity configured to capture a soil sample; and
      a spool drive mechanism operably coupled to the collection spool and configured to rotate the collection spool;
   wherein the collection spool is rotatable between an open position configured for capturing the soil sample, and a closed position configured for retaining the soil sample in the collection cavity;
   wherein the collection spool has an elongated cylindrical tubular body and is rotatably and axially slideably received in a complementary configured elongated slot in the knife assembly.

2. The apparatus according to claim 1, wherein the spool drive mechanism includes a rotatable gear drive operably coupling the collection spool, the rotatable gear drive operable to rotate the collection spool between the open and closed positions.

3. The apparatus according to claim 2, wherein the spool drive mechanism further comprises a spool positioning actuator operably coupled to the collection spool, the spool drive mechanism operable to move the collection spool in a vertical axial direction between a lower position configured for capturing the soil sample, and an upper position configured for ejecting the soil sample from the collection cavity.

4. The apparatus according to claim 3, wherein the spool positioning actuator is electrically, pneumatically, or hydraulically powered.

5. The apparatus according to claim 3, further comprising a sample ejector slideably disposed at least partially within the collection cavity of the collection spool, the sample ejector configured and operable to eject the captured soil sample from the collection cavity when the collection spool is moved from the lower position to upper position.

6. The apparatus according to claim 5, wherein the sample ejector has an angled scraper end configured to wedge the soil sample out from the collection cavity.

7. The apparatus according to claim 5, wherein the sample ejector is rotationally interlocked with the collection spool via the collection cavity such that rotating the rotatable gear drive rotates the collection spool in turn therewith between the open and closed positions.

8. The apparatus according to claim 5, wherein the sample ejector is fixedly mounted to the rotatable gear drive in a stationary position relative to the collection spool such that as the collection spool is raised or lowered, the sample ejector slides up and down within the collection cavity of the collection spool.

9. The apparatus according to claim 3, wherein the rotatable gear drive comprises a motor having a drive gear and a driven gear operably interfaced with the collection spool via the sample ejector.

10. The apparatus according to claim 3, wherein the spool positioning actuator comprises a piston rod operably coupled to the collection spool, the piston rod configured to be extendible to lower the collection spool into the knife assembly and retractable to raise the collection spool out of the knife assembly.

11. The apparatus according to claim 10, wherein the piston rod is coupled to the collection spool by a swivel coupling, the swivel coupling configured to allow the collection spool to freely rotate relative to the piston rod when the collection spool is rotated by the rotatable gear drive.

12. The apparatus according to claim 11, wherein the swivel coupling comprises a collar fixedly coupled to the piston rod, and a fastening member rotatably supported by the collar and fixedly attached to the collection spool, the fastening member and collection spool rotatable relative to the collar.

13. The apparatus according to claim 12, further comprising at least one bearing rotatably supporting the fastening member on the collar.

14. The apparatus according to claim 12, further comprising a tubular connector fixedly coupled to the collar and piston rod top form a rigid connection therebetween.

15. The apparatus according to claim 14, wherein the tubular connector comprises a longitudinal through passage which receives the fastening member of the swivel coupling therein.

16. The apparatus according to claim 1, wherein the knife assembly is pivotably coupled to the coulter blade to be configured for movement in an arcuate path between a first angled position and a second angled position.

17. The apparatus according to claim 16, wherein the knife assembly is vertically oriented in the second angled position and obliquely angled to vertical in the first angled position.

18. The apparatus according to claim 16, further comprising a knife positioning actuator operably coupled to the knife assembly, the knife positioning actuator operable to move the knife assembly between the first and second angled positions.

19. The apparatus according to claim 16, further comprising a pivot arm linkage pivotably coupled at opposite ends to a central hub rotatably supporting the coulter blade and the knife assembly.

20. The apparatus according to claim 19, wherein the hub defines a pivot axis of the knife assembly.

21. The apparatus according to claim 1, wherein the collection apparatus is mounted to a movable carriage supported by the support frame, the movable carriage vertically movable between an upper position configured for transport and a lower position configured for collecting the soil sample.

22. The apparatus according to claim 21, wherein the moveable carriage comprises a plurality of rollers which rollingly engage a pair of guide rails configured for raising and lowering the carriage and collection apparatus.

23. The apparatus according to claim 22, wherein each guide rail is engaged by a pair of front rollers, a pair of rear rollers, and a pair of lateral outboard rollers to stabilize movement of the moveable carriage.

24. The apparatus according to claim 21, wherein the moveable carriage is coupled to a carriage actuator operable to raise and lower the carriage on the pair of guide rails.

25. The apparatus according to claim 21, wherein the support frame comprises a horizontal primary frame section configured for direct or indirect detachable mounting to the vehicle, a rearward-most collection apparatus frame section which supports the collection apparatus, and a vertical intermediate rail frame section which supports a carriage chassis to which the moveable carriage is movably mounted.

26. The apparatus according to claim 1, further comprising a second collection spool rotatably supported by the knife assembly and operably coupled to the spool drive mechanism, wherein the second collection spool is rotatable independently of the collection spool between an open position configured for capturing the soil sample, and a closed position configured for retaining the soil sample in a collection cavity of the second collection spool.

27. A method for capturing a soil sample from an agricultural field comprising:
providing a collection apparatus comprising a rotatable coulter blade, and a knife assembly arranged and comprising at least one rotatable collection spool comprising a collection cavity configured for capturing the soil sample;
plowing through soil with the collection apparatus in a direction of travel parallel to a surface of the soil;
rotating the collection spool from a first closed position in which the collection cavity is shielded from the soil to an open position in which the collection cavity is exposed to the soil;
capturing the soil sample in the collection cavity of the collection spool; and
rotating the collection spool to a second closed position for retaining the soil sample.

28. The method according to claim 27, further comprising raising the collection spool in the second closed position; and ejecting the soil sample from the cavity.

29. The method according to claim 28, wherein the rotatable collection spool is configured to be rotatably and axially slideably received in a complementary configured elongated slot in the knife assembly, the method for capturing a soil sample form an agricultural field further comprising rotating the collection spool back to the first closed position after the ejecting step; and lowering the collection spool into the knife assembly.

30. The method according to claim 28, wherein the ejecting step comprises scraping the soil sample out of the collection cavity of the collection spool with a stationary ejector slideable within the collection cavity when the collection spool is raised.

31. The method according to claim 30, wherein the ejector is fixedly mounted to a gear drive operable to rotate the collection spool between the closed and open positions, the stationary ejector forming a rotational interlock with the collection cavity of the collection spool for rotating the collection spool via operation of the gear drive.

32. The method according to claim 28, further comprising a spool positioning actuator operably coupled to the collection spool and operable to raise and lower the collection spool.

33. The method according to claim 28, wherein the collection cavity of the collection spool faces forward or rearward in the knife assembly when in the first or second closed positions, and faces laterally outwards from the knife assembly when in the open position.

34. A method for capturing soil samples from an agricultural field comprising:
providing a collection apparatus comprising a rotatable coulter blade, and a knife assembly arranged and comprising rotatable first and second collection spools each comprising a collection cavity configured for capturing soil samples;
placing each of the first and second collection spools in a first closed position;
plowing through soil with the collection apparatus in a direction of travel parallel to a surface of soil;
rotating the first collection spool from a first closed position in which the collection cavity is shielded from the soil to an open position in which the collection cavity is exposed to the soil to capture a first soil sample in the collection cavity;
rotating the first collection spool to a second closed position for retaining the first soil sample;
raising the first collection spool in the second closed position and ejecting the first soil sample from the collection cavity; and
simultaneous with raising the first collection spool, rotating the second collection spool from a first closed position in which the collection cavity is shielded from the soil to an open position in which the collection cavity is exposed to the soil to capture a second soil sample in the collection cavity of the second collection spool.

35. The method according to claim 34, further comprising rotating the second collection spool to a second closed position for retaining the second soil sample; and raising the second collection spool in the second closed position and ejecting the second soil sample from the collection cavity.

36. The method according to claim 35, further comprising rotating the first collection spool back to the first closed position and lowering the first collection spool.

* * * * *